United States Patent
Kumar et al.

(10) Patent No.: US 11,208,129 B2
(45) Date of Patent: Dec. 28, 2021

(54) VEHICLE CONTROL SYSTEM AND METHOD

(71) Applicant: GE Global Sourcing LLC, Norwalk, CT (US)

(72) Inventors: Ajith Kuttannair Kumar, Erie, PA (US); Wolfgang Daum, Erie, PA (US); Martin Paget, Irvine, CA (US); Daniel Rush, Melbourne, FL (US); Brad Thomas Costa, Melbourne, FL (US); Seneca Snyder, Melbourne, FL (US); Jerry Duncan, Melbourne, FL (US); Mark Bradshaw Kraeling, Melbourne, FL (US); Michael Scott Miner, Melbourne, FL (US); Shannon Joseph Clouse, Erie, PA (US); Anwarul Azam, Lawrence Park, PA (US); Matthew Lawrence Blair, Lawrence Park, PA (US); Nidhi Naithani, Bangalore (IN); Dattaraj Jagdish Rao, Bangalore (IN); Anju Bind, Bangalore (IN); Sreyashi Dey Chaki, Bangalore (IN); Scott Daniel Nelson, Melbourne, FL (US);

(Continued)

(73) Assignee: Transportation IP Holdings, LLC, Norwalk, CT (US)

( * ) Notice: Subject to any disclaimer, the term of this patent is extended or adjusted under 35 U.S.C. 154(b) by 115 days.

(21) Appl. No.: 16/275,569

(22) Filed: Feb. 14, 2019

(65) Prior Publication Data
US 2019/0176862 A1 Jun. 13, 2019

Related U.S. Application Data

(60) Continuation-in-part of application No. 16/195,950, filed on Nov. 20, 2018, now abandoned, which is a
(Continued)

(51) Int. Cl.
*B61L 25/02* (2006.01)
*B61L 15/00* (2006.01)
(Continued)

(52) U.S. Cl.
CPC .......... *B61L 25/021* (2013.01); *B61L 15/009* (2013.01); *B61L 15/0027* (2013.01);
(Continued)

(58) Field of Classification Search
CPC .... B61L 25/021; B61L 15/0081; B61L 23/04; B61L 2205/04; B61L 15/009;
(Continued)

(56) References Cited

U.S. PATENT DOCUMENTS

| 7,493,202 B2 | 2/2009 | Demro et al. |
| 7,965,312 B2 | 6/2011 | Chung et al. |

(Continued)

FOREIGN PATENT DOCUMENTS

| CN | 1802678 A | 7/2006 |
| CN | 104112127 A | 10/2014 |

(Continued)

OTHER PUBLICATIONS

Examination report No. 4 for AU application 2015217470 dated Apr. 18, 2018 (4 pages).
(Continued)

*Primary Examiner* — Tung T Vo
(74) *Attorney, Agent, or Firm* — Joseph M. Butscher

(57) ABSTRACT

System includes a controller configured to obtain one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The discrete examinations of the one or more of the route or the
(Continued)

vehicle system separated from each other by one or more of location or time. The controller is configured to examine the one or more of the route parameter or the vehicle parameter to determine whether the one or more of the route or the vehicle system is damaged. The system also includes examination equipment configured to continually monitor the one or more of the route or the vehicle system responsive to determining that the one or more of the route or the vehicle is damaged.

17 Claims, 36 Drawing Sheets

(72) Inventors: Nikhil Uday Naphade, Maharashtra (IN); Wing Yeung Chung, Erie, PA (US); Daniel Malachi Bellesty, Wattsburg, PA (US); Glenn Robert Shaffer, Erie, PA (US); Jeffrey James Kisak, Erie, PA (US); Dale Martin DiDomenico, Melbourne, FL (US); Suresh Govindappa, Lawrence Park, PA (US); Manibabu Pippalla, Bangalore (IN); Sethu Madhavan, Erie, PA (US); Arunachala Karthik Sridharan, Bangalore (IN); Prabhu Marimuthu, Chennai (IN); Jared Klineman Cooper, Melbourne, FL (US); Joseph Forrest Noffsinger, Lee's Summit, MO (US); Paul Kenneth Houpt, Schenectady, NY (US); David Lowell McKay, Melbourne, FL (US)

Related U.S. Application Data continuation of application No. 15/651,630, filed on Jul. 17, 2017, now abandoned, which is a continuation-in-part of application No. 14/624,069, filed on Feb. 17, 2015, now Pat. No. 9,873,442, which is a continuation-in-part of application No. 15/044,592, filed on Feb. 16, 2016, said application No. 16/195,950 is a continuation-in-part of application No. 11/750,716, filed on May 18, 2007, now abandoned, said application No. 16/195,950 is a continuation of application No. 11/385,354, filed on Mar. 20, 2006, now Pat. No. 9,733,625, said application No. 14/624,069 is a continuation-in-part of application No. 14/541,370, filed on Nov. 14, 2014, now Pat. No. 10,110,795, and a continuation-in-part of application No. 14/217,672, filed on Mar. 18, 2014, and a continuation-in-part of application No. 14/253,294, filed on Apr. 15, 2014, now Pat. No. 9,875,414, and a continuation-in-part of application No. 14/457,353, filed on Aug. 12, 2014, now abandoned, and a continuation-in-part of application No. 14/479,847, filed on Sep. 8, 2014, now abandoned, which is a continuation-in-part of application No. 13/109,209, filed on May 17, 2011, now Pat. No. 8,913,131, which is a division of application No. 11/146,831, filed on Jun. 6, 2005, now Pat. No. 7,965,312, which is a continuation-in-part of application No. 10/361,968, filed on Feb. 10, 2003, now abandoned, said application No. 15/044,592 is a continuation-in-part of application No. 14/922,787, filed on Oct. 26, 2015, now Pat. No. 10,569,792, which is a continuation-in-part of application No. 14/155,454, filed on Jan. 15, 2014, now Pat. No. 9,671,358, which is a continuation-in-part of application No. 12/573,141, filed on Oct. 4, 2009, now Pat. No. 9,233,696, said application No. 14/155,454 is a continuation of application No. PCT/US2013/054284, filed on Aug. 9, 2013, application No. 16/275,569, which is a continuation-in-part of application No. 15/831,549, filed on Dec. 5, 2017, now Pat. No. 10,752,269, application No. 16/275,569, which is a continuation-in-part of application No. 15/218,529, filed on Jul. 25, 2016, now Pat. No. 10,678,734, application No. 16/275,569, which is a continuation of application No. 15/218,529, filed on Jul. 25, 2016, which is a continuation-in-part of application No. 14/922,787, filed on Oct. 26, 2015, now Pat. No. 10,569,792, which is a continuation-in-part of application No. 14/155,454, filed on Jan. 15, 2014, now Pat. No. 9,671,358, which is a continuation of application No. PCT/US2013/054284, filed on Aug. 9, 2013, said application No. 14/922,787 is a continuation-in-part of application No. 12/573,141, filed on Oct. 4, 2009, now Pat. No. 9,233,696, which is a continuation-in-part of application No. 11/385,354, filed on Mar. 20, 2006, now Pat. No. 9,733,625, said application No. 14/922,787 is a continuation-in-part of application No. 14/152,159, filed on Jan. 10, 2014, now Pat. No. 9,205,849, which is a continuation-in-part of application No. 13/478,388, filed on May 23, 2012, now abandoned, application No. 16/275,569, which is a continuation-in-part of application No. 15/044,592, filed on Feb. 16, 2016, now Pat. No. 10,308,265, which is a continuation of application No. 14/922,787, filed on Oct. 26, 2015, which is a continuation-in-part of application No. 14/155,454, filed on Jan. 15, 2014, now Pat. No. 9,671,358, which is a continuation-in-part of application No. PCT/US2013/054284, filed on Aug. 9, 2013, said application No. 14/922,787 is a continuation-in-part of application No. 12/573,141, filed on Oct. 4, 2009, now Pat. No. 9,233,696, which is a continuation-in-part of application No. 11/385,354, filed on Mar. 20, 2006, now Pat. No. 9,733,625, said application No. 14/922,787 is a continuation-in-part of application No. 14/152,159, filed on Jan. 10, 2014, which is a continuation-in-part of application No. 13/478,388, filed on May 23, 2012, now abandoned.

(60) Provisional application No. 62/469,368, filed on Mar. 9, 2017, provisional application No. 62/403,963, filed on Oct. 4, 2016, provisional application No. 62/134,518, filed on Mar. 17, 2015, provisional application No. 61/940,610, filed on Feb. 17, 2014, provisional application No. 61/940,696, filed on Feb. 17, 2014, provisional application No. 61/940,813, filed on Feb. 17, 2014, provisional application No. 61/940,660, filed on Feb. 17, 2014, provisional application No. 61/860,496, filed on Jul. 31, 2013, provisional application No. 61/729,188, filed on Nov. 21, 2012, provisional application No. 61/681,843, filed on Aug. 10, 2012, provisional application No. 60/894,006, filed on Mar. 9, 2007, provisional application No. 60/626,573, filed on Nov. 10, 2004, provisional application No. 60/385,645, filed on Jun. 4, 2002.

(51) Int. Cl.
| | |
|---|---|
| *B61L 27/00* | (2006.01) |
| *B64C 39/02* | (2006.01) |
| *B64D 47/08* | (2006.01) |
| *G06K 9/00* | (2006.01) |
| *H04N 7/18* | (2006.01) |
| *H04L 29/08* | (2006.01) |
| *G05D 1/00* | (2006.01) |
| *H04N 5/232* | (2006.01) |
| *H04W 4/40* | (2018.01) |
| *B61L 23/04* | (2006.01) |
| *H04N 5/33* | (2006.01) |

(52) U.S. Cl.
CPC ....... *B61L 15/0072* (2013.01); *B61L 15/0081* (2013.01); *B61L 25/023* (2013.01); *B61L 25/025* (2013.01); *B61L 25/026* (2013.01); *B61L 27/0077* (2013.01); *B61L 27/0088* (2013.01); *B61L 27/0094* (2013.01); *B64C 39/024* (2013.01); *B64D 47/08* (2013.01); *G05D 1/0094* (2013.01); *G06K 9/00651* (2013.01); *G06K 9/00771* (2013.01); *G06K 9/00798* (2013.01); *H04L 67/12* (2013.01); *H04N 5/23203* (2013.01); *H04N 5/23206* (2013.01); *H04N 5/23241* (2013.01); *H04N 7/183* (2013.01); *H04W 4/40* (2018.02); *B61L 23/04* (2013.01); *B61L 2205/04* (2013.01); *B64C 2201/123* (2013.01); *B64C 2201/208* (2013.01); *G06K 9/00805* (2013.01); *H04N 5/332* (2013.01); *H04N 7/185* (2013.01).

(58) Field of Classification Search
CPC ............. B61L 15/0072; B61L 27/0077; B61L 15/0027; B61L 27/0088; B61L 27/0094; B61L 25/026; B61L 25/023; B61L 25/025; H04W 4/40; B64D 47/08; H04L 67/12; G05D 1/0094; H04N 5/23241; H04N 5/23206; H04N 5/23203; H04N 5/332; H04N 7/185; H04N 7/183; G06K 9/00798; G06K 9/00771; G06K 9/00805; G06K 9/00651; B64C 2201/208; B64C 2201/123; B64C 39/024
USPC .......................................................... 348/148
See application file for complete search history.

(56) References Cited

U.S. PATENT DOCUMENTS

| | | | | |
|---|---|---|---|---|
| 10,151,582 | B1* | 12/2018 | Jovenall | G01M 17/10 |
| 10,343,700 | B2* | 7/2019 | Brundisch | G01H 1/00 |
| 2002/0027495 | A1* | 3/2002 | Darby, Jr. | H04L 1/188 |
| | | | | 340/298 |
| 2003/0236598 | A1* | 12/2003 | Villarreal Antelo | |
| | | | | B61L 27/0022 |
| | | | | 701/19 |
| 2004/0010432 | A1 | 1/2004 | Matheson et al. | |
| 2005/0125113 | A1* | 6/2005 | Wheeler | B61L 25/025 |
| | | | | 701/19 |
| 2006/0074544 | A1 | 4/2006 | Morariu et al. | |
| 2006/0132602 | A1 | 6/2006 | Muto et al. | |
| 2007/0005202 | A1 | 1/2007 | Breed | |
| 2007/0027583 | A1 | 2/2007 | Tamir | |
| 2008/0128563 | A1 | 6/2008 | Kumar et al. | |
| 2008/0312775 | A1* | 12/2008 | Kumar | B61L 3/006 |
| | | | | 701/2 |
| 2010/0023190 | A1* | 1/2010 | Kumar | G05B 13/021 |
| | | | | 701/20 |
| 2010/0049384 | A1* | 2/2010 | Kraeling | B61L 15/0027 |
| | | | | 701/20 |
| 2010/0204857 | A1* | 8/2010 | Forrest | B61L 27/0094 |
| | | | | 701/19 |
| 2011/0216200 | A1 | 9/2011 | Chung | |
| 2012/0140077 | A1 | 6/2012 | Muto et al. | |
| 2012/0176500 | A1 | 6/2012 | Muto et al. | |
| 2013/0018531 | A1* | 1/2013 | Kumar | B61L 25/025 |
| | | | | 701/2 |
| 2013/0151133 | A1* | 6/2013 | Kickbusch | B61L 27/0027 |
| | | | | 701/117 |
| 2013/0171590 | A1* | 7/2013 | Kumar | B61C 17/12 |
| | | | | 434/62 |
| 2013/0284859 | A1* | 10/2013 | Polivka | B61L 1/188 |
| | | | | 246/34 R |
| 2014/0046513 | A1* | 2/2014 | Cooper | B61L 23/044 |
| | | | | 701/20 |
| 2014/0129061 | A1* | 5/2014 | Cooper | B61C 17/12 |
| | | | | 701/19 |
| 2014/0136025 | A1* | 5/2014 | Cooper | G08G 9/00 |
| | | | | 701/2 |
| 2014/0151512 | A1 | 6/2014 | Cooper et al. | |
| 2014/0313333 | A1 | 10/2014 | Le et al. | |
| 2015/0070503 | A1* | 3/2015 | Kraeling | H04N 5/23206 |
| | | | | 348/148 |
| 2015/0158512 | A1* | 6/2015 | Shaffer | B61L 15/0072 |
| | | | | 701/1 |
| 2015/0158513 | A1* | 6/2015 | Costa | B61L 23/041 |
| | | | | 348/144 |
| 2015/0200712 | A1* | 7/2015 | Cooper | B60T 17/228 |
| | | | | 375/257 |
| 2015/0217790 | A1* | 8/2015 | Golden | B61C 17/12 |
| | | | | 701/19 |
| 2015/0338848 | A1* | 11/2015 | Kumar | B61L 23/00 |
| | | | | 701/70 |
| 2016/0039436 | A1* | 2/2016 | Bhagwatkar | B61L 23/00 |
| | | | | 348/148 |
| 2016/0039439 | A1* | 2/2016 | Fahmy | B61L 27/0038 |
| | | | | 701/20 |
| 2016/0046308 | A1* | 2/2016 | Chung | B61L 25/021 |
| | | | | 701/20 |
| 2016/0159381 | A1* | 6/2016 | Fahmy | B61L 27/0088 |
| | | | | 701/19 |
| 2016/0202199 | A1* | 7/2016 | Rao | G01N 21/88 |
| | | | | 250/340 |
| 2016/0244078 | A1* | 8/2016 | Noffsinger | B61L 3/10 |
| 2016/0304105 | A1* | 10/2016 | Seaton | B61L 27/0038 |
| 2016/0304106 | A1* | 10/2016 | Seaton | B61L 27/0038 |
| 2016/0304107 | A1* | 10/2016 | Seaton | B61L 15/0027 |
| 2016/0306360 | A1* | 10/2016 | Seaton | B61L 25/025 |
| 2016/0359741 | A1* | 12/2016 | Cooper | H04L 45/74 |
| 2016/0362022 | A1* | 12/2016 | Mathews, Jr. | B60L 15/2018 |
| 2017/0066458 | A1* | 3/2017 | Huchrowski | B61L 15/0081 |
| 2017/0106888 | A1* | 4/2017 | Shubs, Jr. | B61L 27/02 |
| 2017/0129512 | A1* | 5/2017 | Shubs, Jr. | G07C 5/008 |
| 2017/0129514 | A1* | 5/2017 | Shubs, Jr. | B61L 27/04 |
| 2017/0210404 | A1* | 7/2017 | Brooks | B61L 23/007 |
| 2017/0255824 | A1* | 9/2017 | Miller | B61L 27/0088 |
| 2017/0313332 | A1* | 11/2017 | Paget | H04N 5/23203 |
| 2018/0097288 | A1* | 4/2018 | DiDomenico | B64C 39/024 |
| 2018/0222505 | A1* | 8/2018 | Chung | B61L 27/0038 |
| 2018/0273066 | A1* | 9/2018 | Mulligan | B61L 27/0088 |
| 2019/0161101 | A1* | 5/2019 | Brooks | B61L 23/34 |

FOREIGN PATENT DOCUMENTS

| | | |
|---|---|---|
| EP | 0953491 A1 | 3/1999 |
| JP | 2008247154 A | 10/2008 |
| WO | 2005120925 A2 | 12/2005 |
| WO | 2007111768 A2 | 10/2007 |
| WO | 2012150591 A2 | 11/2012 |

OTHER PUBLICATIONS

Examination report No. 1 for AU application 2018202825 dated Aug. 15, 2019 (5 pages).
Second Examination Report dated Nov. 1, 2019 for corresponding AU Application No. 2018202825.

(56) References Cited

OTHER PUBLICATIONS

Second Examination Report dated Sep. 9, 2019 for corresponding AU Application No. 2015217535.
Office Action dated Sep. 9, 2019 for corresponding JP Application No. 2015-173383.
English Translation of the Office Action dated Sep. 9, 2019 for corresponding JP Application No. 2015-173383.
Fourth Examination Report dated Apr. 17, 2020 for corresponding Australian patent application No. 2018202825 (4 pages).
First Examination Report for corresponding AU Application No. 2015217535 dated Jun. 5, 2019 (3 pages).
First Office Action issued in connection with corresponding CN Application No. 201580020135.7 dated Jan. 29, 2019.
Final Office Action dated Dec. 17, 2019 for Japanese Application No. 2015-173383.
Examination Report dated Feb. 11, 2020 for Australian Application No. 2018202825.
Office Action dated Nov. 3, 2020 for corresponding Chinese Patent Application No. 2019108511987 (7 pages).
English translation of the Office Action dated Nov. 3, 2020 for corresponding Chinese Patent Application No. 2019108511987 (5 pages).
Examination Report dated Nov. 5, 2020 for corresponding Australian Patent Application No. 2019205977 (5 pages).
Search Report dated Dec. 7, 2020 for corresponding European Application No. 20173964.6 (11 pages).

* cited by examiner

VEHICLE CONTROL SYSTEM AND METHOD

CROSS-REFERENCE TO RELATED APPLICATIONS

The present application is a continuation-in-part of U.S. patent application Ser. No. 16/195,950 ("the '950 Application"), filed on 20 Nov. 2018, which is a continuation of U.S. patent application Ser. No. 15/651,630 ("the '630 Application") filed on 17 Jul. 2017, which claims priority to U.S. Provisional Application No. 62/403,963, filed 4 Oct. 2016. The '630 Application is a continuation-in-part of U.S. patent application Ser. No. 14/624,069 ("the '069 Application"), filed 17 Feb. 2015, and is a continuation-in-part of U.S. patent application Ser. No. 15/044,592 ("the '592 Application"), filed 16 Feb. 2016.

The '950 Application is also a continuation-in-part of U.S. patent application Ser. No. 11/750,716 filed 18 May 2007, which claims priority to U.S. Provisional Application No. 60/894,006, filed 9 Mar. 2007, and is also a continuation-in part of U.S. application Ser. No. 11/385,354, filed 20 Mar. 2006.

The '069 Application claims priority to U.S. Provisional Application Nos. 61/940,813; 61/940,660; 61/940,610; and 61/940,696, all of which were filed on 17 Feb. 2014.

The '069 Application also is a continuation-in-part of U.S. patent application Ser. No. 14/541,370 ("the '370 Application"), filed on 14 Nov. 2014, which claims priority to U.S. Provisional Application No. 61/940,813, filed on 17 Feb. 2014. The '370 Application is a continuation-in-part of U.S. patent application Ser. No. 14/217,672, filed 14 Mar. 2014, U.S. patent application Ser. No. 14/253,294, filed on 15 Apr. 2014, U.S. patent application Ser. No. 14/457,353, filed 12 Aug. 2014, U.S. patent application Ser. No. 14/479,847, filed 8 Sep. 2014, U.S. patent application Ser. No. 14/485,398, filed 12 Sep. 2014, and U.S. patent application Ser. No. 13/109,209 ("the '209 Application"), filed 17 May 2011 (now U.S. Pat. No. 8,913,131, issued 16 Dec. 2014).

The '209 Application is a divisional application of U.S. patent application Ser. No. 11/146,831, filed 6 Jun. 2005 (now U.S. Pat. No. 7,965,312, issued 21 Jun. 2011), which claims priority to U.S. Provisional Application No. 60/626,573, filed 10 Nov. 2004 and is a continuation-in-part of U.S. patent application Ser. No. 10/361,968, filed 10 Feb. 2003, which claims priority to U.S. Provisional Application No. 60/385,645, filed 4 Jun. 2002.

The '592 Application claims priority to U.S. Provisional Application No. 62/134,518, filed 17 Mar. 2015, and is a continuation-in-part of U.S. application Ser. No. 14/922,787 ("the '787 Application"), filed 26 Oct. 2015, which claims priority to U.S. Provisional Application No. 62/134,518.

The '787 Application also is a continuation-in-part of U.S. application Ser. No. 14/155,454 ("the '454 Application"), filed 15 Jan. 2014, and is a continuation-in-part of U.S. application Ser. No. 12/573,141 ("the '141 Application"), filed 4 Oct. 2009. The '141 Application is a continuation-in-part of U.S. application Ser. No. 11/385,354, filed 20 Mar. 2006

The '454 Application is a continuation of International Application No. PCT/US13/54284, filed 9 Aug. 2013, which claims priority to U.S. Provisional Application No. 61/681,843, filed 10 Aug. 2012, to U.S. Provisional Application No. 61/729,188, filed 21 Nov. 2012, to U.S. Provisional Application No. 61/860,469, filed 31 Jul. 2013, and to U.S. Provisional Application No. 61/860,496, filed 31 Jul. 2013.

The present application is also a continuation-in-part of U.S. patent application Ser. No. 15/831,549, filed on 5 Dec. 2017, which claims priority to U.S. Provisional Application No. 62/469,368, which was filed on 9 Mar. 2017.

The present application is also a continuation-in-part of U.S. patent application Ser. No. 15/218,529, filed on 25 Jul. 2016.

The present application is also a continuation-in-part of the '787 Application), filed on 26 Oct. 2015, which claims priority to U.S. Provisional Application No. 62/134,518, which was filed on 17 Mar. 2015. The '787 Application is also a continuation-in-part of the '454 Application, filed 15 Jan. 2014 (the "'454 Application"). The '454 Application is a continuation of International Application No. PCT/US13/54284, which was filed on 9 Aug. 2013, and claims priority to U.S. Provisional Application No. 61/681,843, which was filed on 10 Aug. 2012, to U.S. Provisional Application No. 61/729,188, which was filed on 21 Nov. 2012, to U.S. Provisional Application No. 61/860,469, which was filed on 31 Jul. 2013, and to U.S. Provisional Application No. 61/860,496, which was filed on 31 Jul. 2013. The '787 Application is also a continuation-in-part of U.S. application Ser. No. 12/573,141, filed on Oct. 4, 2009, which is a continuation-in-part of U.S. application Ser. No. 11/385,354, which was filed on 20 Mar. 2006. The '787 Application is also a continuation-in-part of U.S. application Ser. No. 14/152,159, filed on 15 Jan. 2014, which is a continuation-in-part of U.S. application Ser. No. 13/478,388, which was filed on 23 May 2012.

The present application is also a continuation-in-part of the '592 Application, which claims priority to U.S. Provisional Application No. 62/134,518, which was filed on 17 Mar. 2015. The '592 Application is also a continuation-in-part of the '787 Application, filed 26 Oct. 2015, which claims priority to U.S. Provisional Application No. 62/134,518. The '787 Application is also a continuation-in-part of the '454 Application, filed 15 Jan. 2014. The '454 Application is a continuation of International Application No. PCT/US13/54284, which was filed on 9 Aug. 2013, and claims priority to U.S. Provisional Application No. 61/681,843, which was filed on 10 Aug. 2012, to U.S. Provisional Application No. 61/729,188, which was filed on 21 Nov. 2012, to U.S. Provisional Application No. 61/860,469, which was filed on 31 Jul. 2013, and to U.S. Provisional Application No. 61/860,496, which was filed on 31 Jul. 2013. The '787 Application is also a continuation-in-part of U.S. application Ser. No. 12/573,141, filed on Oct. 4, 2009, which is a continuation-in-part of U.S. application Ser. No. 11/385,354, which was filed on 20 Mar. 2006. The '787 Application is also a continuation-in-part of U.S. application Ser. No. 14/152,159, filed on 15 Jan. 2014, which is a continuation-in-part of U.S. application Ser. No. 13/478,388, which was filed on 23 May 2012.

The entire disclosure for each and every application stated above is incorporated herein by reference in its entirety.

BACKGROUND

Technical Field

Embodiments of the subject matter disclosed herein relate to obtaining and communicating data using one or more autonomous vehicles as a sensor platform.

Discussion of Art

Equipment may be sometimes outfitted with various sensors, such as sensor package units for capturing and storing video data of the environment around a vehicle. For example, law enforcement vehicles may be provided with "dashboard cams" to record a view out the front windshield of the vehicle, to capture video data of interactions between a law enforcement officer and (for example) the occupants of another vehicle. As another example, passenger automobiles may be provided with fixed-position rear view sensor packages for capturing a video stream of the region directly behind the automobile, which is displayed on a console display screen to aid the driver in safely backing up.

In addition to in-vehicle sensor packages, transportation networks (referring to infrastructure for movement of vehicles, e.g., railroad track networks for rail vehicles, or highway and other road networks for automobiles, semi-trailer trucks, and other on-highway vehicles) are sometimes outfitted with wayside sensor packages for capturing video data of the transportation network. For example, a sensor package may be affixed to a mast at the side of a highway, to capture video data of the highway for traffic tracking and reporting purposes.

For both in-vehicle and wayside sensor package systems, the sensor package systems may be fixed in place, to capture video data only of a designated field of view, e.g., to the front or rear of a vehicle, or a designated segment of road. For vehicles, this may be because the sensor package systems are designated for capturing video data that may be safety critical (rear view) or important from a public-policy standpoint (law enforcement dashboard cams). For wayside sensor package systems, this may be because the designated field of view must be constantly monitored (e.g., view of a tollgate), or to keep data consistent (e.g., roadway monitoring over time).

It may be desirable to have mobile sensor platforms that differ from those data collection systems that are currently available.

Moreover, vehicles may include various subsystems that provide designated functions for the vehicle, such as a propulsion subsystem to generate tractive effort for moving the vehicle and a cooling system to maintain temperatures of components of the vehicle at safe levels to prevent damage to the components and maintain operability of the components. Other subsystems may include an electrical subsystem that provides current to power lights, batteries, displays, communication devices, and computing devices of the vehicle, and a heating, ventilation, and air-conditioning (HVAC) subsystem that maintains temperatures of designated spaces of the vehicle, such as passenger compartments or refrigerated cargo compartments.

Over time, the various subsystems may become damaged and/or fail. Unexpected damage and/or failure of some subsystems may cause the vehicle to be non-operational for a downtime period until the subsystem is repaired. Such downtime periods can result in significant delays and financial losses. Furthermore, the failures of some subsystems, such as a propulsion subsystem or a cooling subsystem, can leave a vehicle debilitated on a route. The debilitated vehicle can block movement of other vehicles along the route, increasing the extent of the delays and financial losses attributable to the failed subsystem.

One way to reduce the occurrence of damage and/or failure to the subsystems of a vehicle is to increase the frequency at which the subsystems are inspected, repaired, and/or replaced, but such actions can be time consuming and expensive. The time spent to inspect the vehicles reduces the time that the vehicles are in operation, therefore reducing the productivity and financial gain of the vehicles. Furthermore, even routine inspections may not reduce damage and/or failure of the subsystems. For example, the root cause of damage to a subsystem may occur after one inspection and cause the subsystem to fail before a subsequent inspection. Additionally, it may be difficult to identify and diagnose a root cause of damage to a subsystem during an inspection.

Implementations described herein may also relate to a communication system for vehicles that permits applications to communicate with interfaces for controlling or monitoring vehicle components.

A vehicle, such as a train, a railcar, or a locomotive, includes various components that can be controlled and/or monitored (e.g., via actuators or sensors). For example, a vehicle may include an engine, a brake system, a fuel tender, a safety valve, a steam collector, a smoke box, a boiler, a heater, or the like.

Embodiments of the subject matter described herein may also relate to systems and methods for vehicle control system, and, in some embodiments, to methods of obtaining and using information from multiple sources to allow the vehicle control system to operate in a determined manner.

Vehicle systems, such as automobiles, mining equipment, rail vehicles, over-the-road truck fleets, and the like, may be operated, at least in part, by vehicle control systems. These vehicle control systems may perform under the manual instruction of an operator, may perform partly on manual input that is supplemented with some predetermined level of environmental awareness (such as anti-lock brakes that engage when a tire loses traction), or may perform entirely autonomously. Further, the vehicles may switch back and forth from one operating mode to another.

The vehicle system may not be used efficiently if the path over which it travels is in disrepair. For example, a train (including both a locomotive and a series of rail cars) may derail if the rails are not within designated specifications. Railroads may experience many derailments per year. In addition to the repair work to the rails, the resulting costs include network congestion, idled assets, lost merchandise, and the like. At least some derailments may be caused by, at least in part, faults in the track, bridge, or signal and in the mechanical aspects of the rail cars. Contributing aspects to derailments may include damaged or broken rails and wheels.

To reduce or prevent derailments, it has been prudent to conduct a periodic visual inspection of the track and of rail cars while in rail yards. Additionally, technology has been introduced that uses ultrasonic detection and lasers that may be mounted on hi-rail vehicles, track-geometry test cars, and wayside detectors (every 24 kilometers to 483 kilometers apart) that monitor freight car bearings, wheel impacts, dragging equipment, and hot wheels. This approach relies on the ability to maintain the track to be within tolerances so that operating a vehicle system on that track can be done in a consistent manner.

Various freight movers have introduced the use of unmanned vehicle ("drone") technology to inspect right of ways or routes. These drones are equipped with at least visible light cameras, but may be equipped with more advanced LIDAR systems if certain technical challenges are overcome. The image payload is delivered to human reviewers for determination of the route status. It may be desirable to have a system that differs from those that are currently available.

BRIEF DESCRIPTION

In one embodiment, a system includes a mobile platform configured to move under remote control and/or under autonomous control, a sensor package supported by the mobile platform configured to obtain information relating to a component of a transportation network; one or more processors configured to receive the obtained information from the sensor package and to analyze that data in combination with other information that is not obtained from the sensor package. The one or more processors generate an output that displays information relating to a status, condition and/or state of health of the component of the transportation network, initiate an action to make a change to the operational state of the component at based least in part on the output, identify a hazard to one or more vehicles traveling within the transportation network, and collect the information relating to the component. The component is not communicatively coupled to an information network, and the mobile platform provides the collected information to the information network.

In one embodiment, a system includes a mobile platform configured to move under remote control or under autonomous control, a sensor package supported by the mobile platform and configured to obtain information relating to a component of a transportation network, and one or more processors configured to receive the information obtained by the sensor package and to analyze the information in combination with other information that is not obtained from the sensor package. The one or more processors also are configured to generate an output that at least one of displays information relating to one or more of a status, a condition, or a state of health of the component of the transportation network; initiates an action to change an operational state of the component; identifies a hazard to one or more vehicles traveling within the transportation network; and/or collects the information relating to the component. The component is not communicatively coupled to an information network and the mobile platform provides the information that is obtained by the sensor package to the information network in one embodiment.

Optionally, the one or more processors can be configured to generate an output, based on the information obtained by the sensor package analyzed in combination with the other information, that identifies a hazard to one or more vehicles traveling within the transportation network, that initiates an action to change an operational state of the component responsive to the identified hazard, and that initiates a control signal for controlling the one or more vehicles responsive to the identified hazard. For example, responsive to the one or more processors receiving the information obtained by the sensor package and analyzing the information in combination with other information that is not obtained from the sensor package, the one or more processors can identify a damaged route segment, a damaged switch at an intersection between routes, a damaged gate, a damaged signal, a damaged or an immobile vehicle ahead on a route, etc. The one or more processors can then generate and communicate a control signal to control a vehicle headed toward the hazard (e.g., to automatically slow, stop, and/or change a direction of movement of the vehicle heading toward the hazard, or to instruct an operator of that vehicle to slow, stop, or change a direction of movement of the vehicle) based on the identification of the hazard. The one or more processors also can generate another control signal (or use the same control signal) and communicate the control signal to a component of the transportation network, such as a signal, gate, switch, etc. This control signal can help in preventing the vehicle heading toward the hazard from reaching the hazard, such as by changing a color or other state of a signal (e.g., changing from a green light to a red light), by lowering a gate (e.g., to prevent passage of the vehicle on a route toward the hazard), by changing which routes are connected by a switch (e.g., to cause the vehicle to move onto another route that does not include the hazard), etc.

In one embodiment, a method includes controlling movement of a mobile platform having a sensor package supported thereon. The sensor package is configured to obtain information relating to a component of a transportation network. The method also includes analyzing the information relating to the component of the transportation network and obtained by the sensor package. The information relates to the component analyzed in combination with other information that is not obtained from the sensor package. The method also includes generating an output that at least one of displays information relating to one or more of a status, a condition, or a state of health of the component of the transportation network; initiates an action to change an operational state of the component; identifies a hazard to one or more vehicles traveling within the transportation network; and/or collects the information relating to the component. The component is not communicatively coupled to an information network, and the mobile platform provides the information that is obtained by the sensor package to the information network in one embodiment.

In one embodiment, a system includes a mobile platform configured to move off-board of a vehicle moving along one or more routes of a transportation network. The mobile platform includes a sensor package configured to sense information and output data indicative of a state of a component of the transportation network. The system also includes one or more processors configured to receive the data that is output from the sensor package. The one or more processors are configured to identify a hazard to the vehicle based on the data that is output. The one or more processors are configured to generate an autonomous control signal that changes movement of the vehicle responsive to the hazard being identified.

Certain embodiments of the present disclosure provide a locomotive control system that includes a locomotive controller that is configured to control the operation of at least one locomotive, a mobile platform configured to move under remote control or under autonomous control, a sensor package supported by the mobile platform and configured to obtain information relating to a component of a railroad, and one or more processors configured to receive the information obtained by the sensor package and to analyze the information in combination with other information that is not obtained from the sensor package, and to generate an output that at least one of: displays information relating to one or more of a status, a condition, or a state of health of the component of the railroad, initiates an action to change an operational state of the component, identifies a hazard to the at least one locomotive within the railroad, or collects the information relating to the component. The component is not communicatively coupled to an information network, and the mobile platform provides the information that is obtained by the sensor package to the information network. The other information that is not obtained from the sensor package is obtained from the locomotive controller.

The information relating to the component of the railroad may be one or more of a condition or a state of health of the component.

In at least one embodiment, a control unit is configured to control a path of travel of the mobile platform. The control unit is configured to autonomously prevent the mobile platform from moving outside of a determined multi-dimensional movement envelope or from moving into a restricted airspace. In at least one embodiment, the control unit may be further configured to control the mobile platform to move to a safe position or operating mode in response to the mobile platform being located within a defined distance of a beacon or being located outside of the determined multi-dimensional movement envelope. The control unit may be further configured to communicate with an air traffic control system prior to controlling the mobile platform from moving from within the determined multi-dimensional movement envelope to commercial airspace. The control unit may be further configured to respond to a signal from a beacon to avoid controlling the mobile platform into a collision with an object operably coupled with the beacon.

The information obtained from the sensor package may be video or image data. The other information that is not obtained from the sensor package may be further obtained from one or more of: a route planning system that is configured to map or control locomotives traveling through at least part of the railroad, a wayside device that is configured to monitor a segment of the railroad, or a satellite that is configured to monitor the segment of the railroad. In at least one embodiment, the route planning system determines at least one of volume and velocity of the locomotives based at least in part on the information obtained from the sensor package.

The one or more processors may be configured to determine that the hazard exists on a route of the railroad and the route planning system responds to the hazard being determined by the one or more processors re-routing the locomotives traveling through the railroad to avoid collision with the hazard that is determined.

The one or more processors may be configured to determine that the hazard exists on a route of the railroad and the locomotive controller responds to the hazard by at least one of re-routing the at least one locomotive through the railroad to avoid collision with the hazard that is determined, or by stopping the at least one locomotive to avoid collision with the hazard that is determined.

The one or more processors may be configured to direct an output device to display the information relating to the one or more of the status, the condition, or the state of health of the component of the railroad, the information that is displayed including a map and icons indicating a location of the component on the map.

In at least one embodiment, the one or more processors are configured to initiate the action to change the operational state of the component by one or more of: activating a switch to change a pathway defined by rail tracks, activating a signal light to change a traffic flow pattern in the railroad, opening a closed gate, closing an open gate, or dumping bulk materials from one or more locomotives.

The one or more processors may be configured to collect the information relating to the component, and the mobile platform may provide instructions or information to the component. In at least one embodiment, the mobile platform is further configured to communicate with two or more of a plurality of locomotives traveling through the railroad, and the two or more locomotives communicate with each other through the mobile platform.

The one or more processors may be configured to be disposed onboard the at least one locomotive. The one or more processors may also be configured to identify at least one of a broken component of one or more tracks of the railroad or an obstacle on the one or more tracks based on the information relating to the component.

In at least one embodiment, the locomotive control system includes a mission optimizer on board the at least one locomotive and configured to determine a trip plan for a trip of the at least one locomotive. The trip plan includes at least one of plural speed settings, plural power settings, or plural throttle settings as a function of at least one of time or distance of the at least one locomotive along a route of the trip, based on information of the at least one locomotive and information of the route. The mission optimizer is configured to determine the trip plan before the at least one locomotive commences a trip along the route. The mission optimizer is further configured to output signals representative of the at least one of plural speed settings, plural power settings, or plural throttle settings for control of an engine system of the at least one locomotive along the route. The locomotive control system may also include a sensor on board the at least one locomotive configured to collect operational data of the at least one locomotive. The operational data includes data of at least one of tractive effort or emissions actually generated by the at least one locomotive as the at least one locomotive travels along the route. A communication system may be on board the at least one locomotive configured to communicate the operational data to the mission optimizer. The mission optimizer is configured to change the signals representative of the at least one of plural speed settings, plural power settings, or plural throttle settings that are output from the mission optimizer as the at least one locomotive travels along the route, based in part on the data of the at least one of tractive effort or emissions actually generated by the at least one locomotive.

The mission optimizer may be configured to re-determine, at a point along the route, the trip plan based on the information of the at least one locomotive and the information of the route and the operational data, and may include a converter coupled to the mission optimizer and the communication system. The converter is configured to convert the signals that are output from the mission optimizer to electrical signals for controlling the engine system of the at least one locomotive. A master controller may be coupled to the converter and the at least one locomotive for controlling the engine system of the at least one locomotive. The master controller includes at least one switch operable by an operator of the at least one locomotive. The at least one of plural speed settings, plural power settings, or plural throttle settings are determined in part based on minimizing fuel consumption, time, considerations, and emissions output.

Certain embodiments of the present disclosure provide a locomotive control method comprising: controlling movement of a mobile platform having a sensor package supported thereon, the sensor package configured to obtain information relating to a component of a railroad; analyzing the information relating to the component of the railroad and obtained by the sensor package, the information relating to the component analyzed in combination with other information that is not obtained from the sensor package; and generating an output that at least one of: displays information relating to one or more of a status, a condition, or a state of health of the component of the railroad, initiates an action to change an operational state of the component, identifies a hazard to one or more locomotives traveling within the railroad, or collects the information relating to the component, wherein the component is not communicatively coupled to an information network, and the mobile platform provides the information that is obtained by the sensor package to the information network.

Certain embodiments of the present disclosure provide a locomotive control system comprising: a mobile platform configured to move off-board of a locomotive moving along one or more routes of a railroad, the mobile platform including a sensor package configured to sense information and output data indicative of a state of a component of the railroad; and one or more processors configured to receive the data that is output from the sensor package, the one or more processors configured to identify a hazard to the locomotive based on the data that is output, wherein the one or more processors are configured to generate an autonomous control signal that changes movement of the locomotive responsive to the hazard being identified.

In an embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data. The one or more processors are also configured to control the vehicle during the trip or during a subsequent trip of the vehicle based on the performance composite index.

In another embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data.

In another embodiment, a method is provided that includes obtaining operating parameters of a subsystem of a vehicle that is configured to travel along a route during a trip. The method also includes generating a digital twin of the subsystem based on the operating parameters, and receiving simulated performance data generated by execution of the digital twin with a designated model of the subsystem. The method further includes obtaining field performance data of the subsystem that is monitored by one or more sensors onboard the vehicle during the trip, and determining a performance composite index of the subsystem of the vehicle based on a variance between the simulated performance data and the field performance data.

In another embodiment, a system is provided that includes one or more processors. The one or more processors are configured to obtain operating parameters of a subsystem of a vehicle during a trip of the vehicle along a route and environmental conditions experienced by the subsystem during the trip. The one or more processors are configured to evaluate the operating parameters and the environmental conditions in a numerical model of the subsystem to generate simulated performance data of the subsystem. The simulated performance data represents expected performance of the subsystem during the trip based on the operating parameters and the environmental conditions experienced by the subsystem. The numerical model of the subsystem is built using characteristic information about the subsystem, one or more physics-based models associated with how the subsystem operates, and historical performance data acquired over time by monitoring one or more of the subsystem or similar subsystems. The one or more processors are further configured to obtain field performance data of the subsystem that is monitored by one or more sensors onboard the vehicle during the trip and to determine a performance composite index of the subsystem of the vehicle based on a variance between the simulated performance data and the field performance data. The one or more processors are further configured to control the vehicle during the trip or during a subsequent trip of the vehicle based on the performance composite index.

According to some possible implementations, a system may include a controller configured to receive interface information associated with one or more interfaces used to communicate with one or more components of a vehicle. The controller may be configured to receive application information associated with one or more applications configured to receive information from the one or more components of the vehicle via the one or more interfaces. The controller may be configured to store, based on the interface information and the application information, registration information that indicates whether the one or more applications are permitted to communicate via the one or more interfaces. The controller may be configured to receive, from an application of the one or more applications, a request for vehicle information from an interface of the one or more interfaces. The controller may be configured to verify whether the application is permitted to communicate via the interface, and to selectively route the request for the vehicle information to the interface based on verifying whether the application is permitted to communicate via the interface.

According to some possible implementations, a non-transitory computer-readable medium may store one or more instructions that, when executed by one or more processors, cause the one or more processors to store registration information that indicates whether an application, of one or more applications, is permitted to communicate via an interface of one or more interfaces. The one or more interfaces may be configured to be used to communicate with one or more sensors of a vehicle. The one or more applications may be configured to request information from the one or more sensors of the vehicle via the one or more interfaces. The one or more instructions may cause the one or more processors to receive, from the application, a request for vehicle information from a sensor of the one or more sensors. The one or more instructions may cause the one or more processors to verify, based on the registration information, whether the application is permitted to communicate via an interface, of the one or more interfaces, associated with the sensor. The one or more instructions may cause the one or more processors to selectively provide the request for the vehicle information to the interface based on verifying whether the application is permitted to communicate via the interface.

According to some possible implementations, a method may include receiving, by a device, interface information associated with a plurality of interfaces used to communicate with a plurality of components of a vehicle. The method may include receiving, by the device, application information associated with a plurality of applications configured to request information from at least one component, of the plurality of components, via at least one interface of the plurality of interfaces. The method may include storing, by the device and based on the interface information and the application information, registration information that indicates whether an application, of the plurality of applications, is permitted to communicate via one or more of the plurality of interfaces. The method may include receiving, by the device and from the application, a request for vehicle information from a component of the plurality of components. The method may include verifying, by the device and based on the registration information, whether the application is permitted to communicate via an interface, of the plurality of interfaces, associated with the component. The method may include selectively providing, by the device, the request for the vehicle information to the interface based on verifying whether the application is permitted to communicate via the interface.

In one example of the subject matter described herein, a system is provided that includes a controller operable to receive information from a plurality of discrete information sources and from a continuous monitoring system on-board a vehicle system, and the controller further is operable to control one or both of the speed and operation of the vehicle system.

In another embodiment, a method (e.g., for examining a route and/or vehicle system) includes obtaining one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The discrete examinations of the one or more of the route or the vehicle system are separated from each other by one or more of location or time. The method also includes examining the one or more of the route parameter or the vehicle parameter to determine whether the one or more of the route or the vehicle system is damaged and, responsive to determining that the one or more of the route or the vehicle is damaged, continually monitoring the one or more of the route or the vehicle system.

In one embodiment, a system (e.g., an examination system) includes a controller and examination equipment. The controller is configured to obtain one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The discrete examinations of the one or more of the route or the vehicle system are separated from each other by one or more of location or time. The controller is configured to examine the one or more of the route parameter or the vehicle parameter to determine whether the one or more of the route or the vehicle system is damaged. The examination equipment is configured to continually monitor the one or more of the route or the vehicle system responsive to determining that the one or more of the route or the vehicle is damaged. The system can complement, correlate with, and/or fill in monitoring or examination gaps of the discrete examinations collected by the controller.

In one embodiment of the subject matter described herein, a system is provided that includes a controller and route examination equipment. The route examination equipment obtains a route parameter indicative of a condition of a route over which a vehicle system travels. The controller receives the route parameter, and examines the route parameter to determine the condition of the route. The controller can control at least one operational aspect of the vehicle system in response to the determined condition of the route.

In one aspect, the route examination equipment includes one or both of a stationary wayside unit and a mobile route inspection unit. And, can combine the inspection information from multiple sources so as to predict the route condition for a particular route segment at a particular point in time. When the vehicle system is about to enter that segment, the controller can determine, based on the predicted condition of the route segment, the status of the vehicle system, and other factors, a speed ceiling for the vehicle system such that below that speed ceiling the possibility of a undesirable event (e.g., a crash or a derailment) is below a determined confidence threshold level.

In one embodiment of the subject matter described herein, a method includes obtaining two or more route parameters indicative of a condition of a segment of a route over which a vehicle system travels. The condition of the segment of the route is determined based on a combination of the two or more route parameters. At least one operational aspect of the vehicle system is controlled in response to the determined condition of the route.

In one aspect, controlling the at least one operational aspect of the vehicle system can include slowing, stopping or rerouting the vehicle system in response to the condition of the route segment being below a determined threshold prior to or during the vehicle system traversing the segment.

BRIEF DESCRIPTION OF THE DRAWINGS

The subject matter described herein will be better understood from reading the following description of non-limiting embodiments, with reference to the attached drawings, wherein.

DETAILED DESCRIPTION

Figure 1:
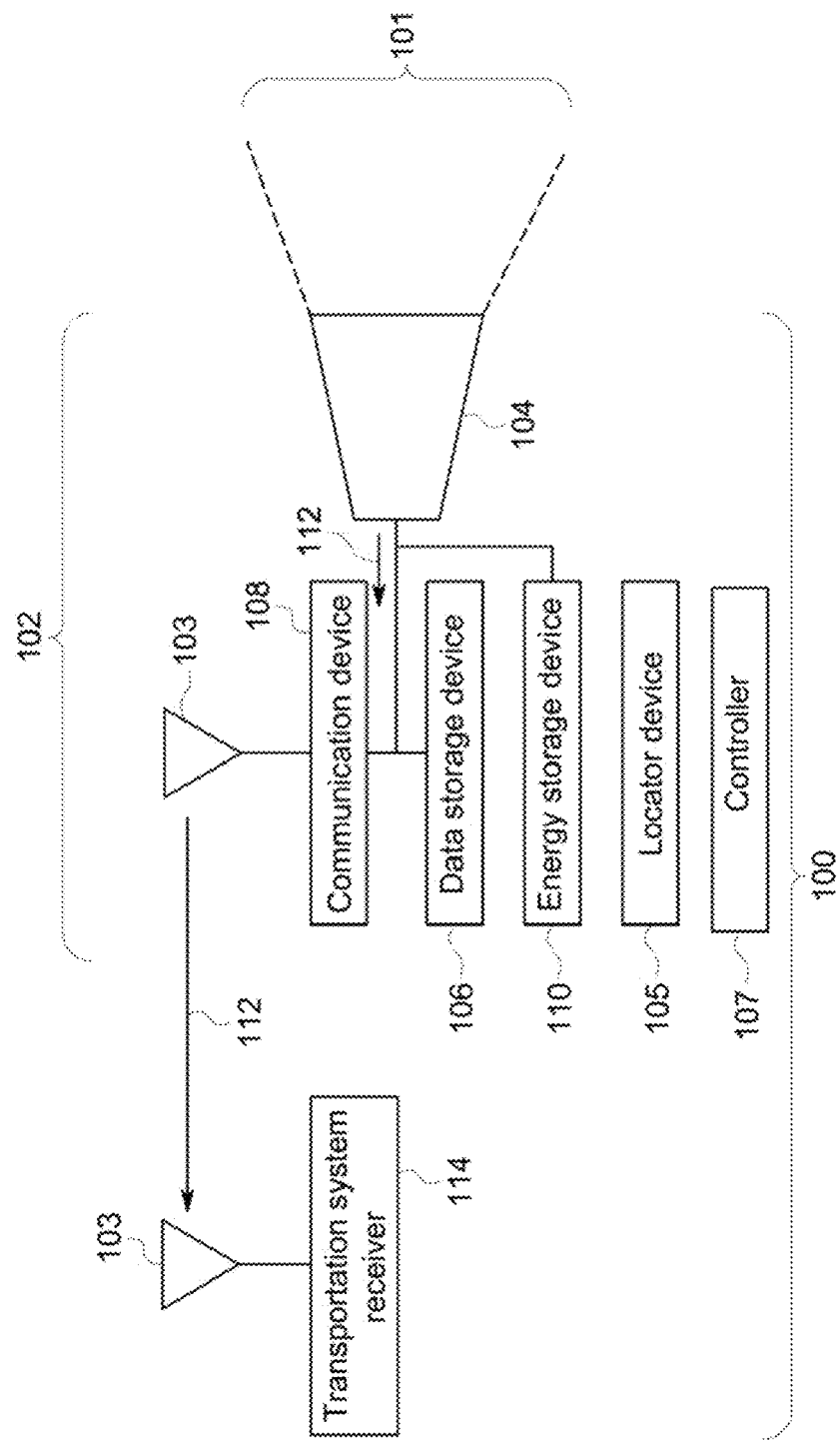
FIG. 1 illustrates a sensor system for capturing and communicating transportation data related to vehicles or otherwise to a transportation system according to one embodiment.

Embodiments described herein relate to sensor packages for capturing and communicating data, particularly with regard to a transportation system or network. For example, a sensor package (e.g., a video/IR camera, microphone, accelerometer, radiation detector, LIDAR) may be connected or otherwise disposed onboard a mobile platform (e.g., a driverless or remotely controlled automobile, drone, marine vessel, helicopter, or airplane) to allow the sensor package unit to move. The transportation system or network can include interconnected routes (e.g., tracks, roads, waterways, or other paths), wayside devices, and/or other components, such as bridges, tunnels, gates, etc.

An aerial unmanned vehicle (also referred to as a drone) may be used as an example of the mobile platform, which, in this example, may have a video camera supported on the drone. The drone can move along a route ahead of a non-aerial transport vehicle and can communicate image data back to the non-aerial vehicle. Suitable examples of non-aerial vehicles include a vehicle that is restricted to propelling itself along non-airborne routes, such as rail vehicles, other off-highway vehicles (e.g., mining vehicles or other ground-based vehicles that are not designed and/or not normally permitted to travel on public roadways), marine vessels, agricultural equipment, automobiles, and the like.

This image data can include still images (e.g., snapshots), videos (e.g., data that shows movement), or a combination thereof. The image data can provide an operator of the non-aerial vehicle a view of the route well in advance of the arrival of the non-aerial vehicle. For high speed non-aerial vehicles, the stopping distance may be beyond the visibility provided from the vantage of the non-aerial vehicle. The view from the mobile platform, then, may extend or supplement that visible range. In addition, the sensor package itself may be repositionable and may have the ability to pan left, right, up and down, as well as the ability to zoom in and out.

As used herein, a sensor package that is a video camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable sensor package that is a video camera may capture and record in a determined band of wavelengths of light or energy. For example, in one embodiment the sensor package may sense wavelengths in the visible spectrum and in another the sensor package may sense wavelengths in the infrared spectrum. Multiple sensors may be combined in a single sensor package and may be used selectively based on the application. Further, stereoscopic and 3D sensor packages are contemplated for at least some embodiments described herein. These sensor packages may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

FIG. 1 illustrates a sensor package system 100 for capturing and communicating transportation data related to vehicles or otherwise to a transportation system according to one embodiment. The system includes a portable sensor package unit 102 having a sensor package 104, a data storage device 106 and/or a communication device 108, a battery or another energy storage device 110, and a controller 107. The sensor package unit may be portable in that the sensor package unit is small and/or light enough to be carried by a single adult human, a drone, or the like. The sensor package unit can capture and/or generate image data 112 of a field of view 101 of the sensor package unit. For example, the field of view may represent the solid angle through which the sensor package unit is sensitive to light, electromagnetic radiation, or other energy that is used to form images, videos, or the like. The image data can include still images, videos (e.g., moving images or a series of images representative of a moving object), or the like, of one or more objects within the field of view of the sensor package unit. In any of the embodiments of any of the sensor package systems described herein, data other than image data may be captured and communicated, e.g., the portable sensor package unit may have a microphone for capturing audio data, a vibration sensor for capturing vibration data, and so on.

A suitable portable sensor package unit may be an Internet protocol sensor package unit, such as a sensor package that can send video data via the Internet or another network. In one aspect, the sensor package can be a digital sensor package capable of obtaining relatively high quality image data (e.g., static or still images and/or videos). For example, the sensor package may be Internet protocol (IP) sensor packages that generate packetized image data. The sensor package can be a high definition (HD) sensor package capable of obtaining image data at relatively high resolutions. For example, the sensor package may obtain image data having at least 480 horizontal scan lines, at least 576 horizontal scan lines, at least 720 horizontal scan lines, at least 1080 horizontal scan lines, or an even greater resolution. Alternatively, the sensor package may be another type of sensor package.

The data storage device may be electrically connected to the sensor package unit and can store the image data. The data storage device may include one or more computer hard disk drives, removable drives, magnetic drives, read only memories, random access memories, flash drives or other solid state storage devices, or the like. Optionally, the data storage device may be disposed remote from the sensor package unit, such as by being separated from the sensor package unit by at least several centimeters, meters, kilometers, as determined at least in part by the application at hand.

The communication device may be electrically connected to the sensor package unit and can wirelessly communicate (e.g., transmit, broadcast, or the like) the image data to a transportation system receiver 114 located off-board the sensor package unit. Optionally, the image data may be communicated to the receiver via one or more wired connections, over power lines, through other data storage devices, or the like. The communication device and/or receiver can represent hardware circuits or circuitry, such as transceiving circuitry and associated hardware (e.g., antennas) 103, that include and/or are connected with one or more processors (e.g., microprocessors, controllers, or the like). In one embodiment, the antenna includes a vertical dipole antenna operating at gain or focus of 4 dBi (or another value).

In one aspect, the communication device includes a low cost, light weight, low power and/or long range L/S band transceiver. FIGS. 23A-E illustrate a block diagram of one embodiment of the communication device shown in FIG. 1.

The embodiment of the communication device shown in FIGS. 23A-E is but one example of a communication device that can be used in connection with one or more embodiments described herein. Optionally, the communication device shown in FIGS. 23A-E may be included in the receiver. The block diagram shown in FIGS. 23A-E includes a digital module or section 2300, an S-band module or section 2302, and an L-band module or section 2304. The digital section 2300 can process baseband video and/or serial data for both the communication device and the receiver, or alternatively, for just one of the communication device and receiver. The receiver may process data inversely to the communication device (e.g., with inverse function and/or order), but the processing performed by the communication device and/or receiver may otherwise be the same or similar.

The processing functions performed by the communication device and/or receiver can include, but are not limited to, serial interface buffering, digital data interleaving, encryption and/or decryption (e.g., using the Advanced Encryption Standard, or AES), forward error correction/restoration, framing and synchronization, digital interface encoding/decoding, video compression, or the like. The digital section 2300 can support a serial I/O interface. One or more communication processors 2306 (e.g., a field programmable gate array or other device) of the digital module 2300 can provide an adaptive transmit power feature of the communication device shown in FIG. 23. This feature can include receiving an indication of a signal level from a receiver (e.g., the antenna 103) and encoding a back channel command to the digital module 2300, using a dedicated control word in the up-linked serial data line, to command the antenna 103 that is transmitting a data signal to adjust the power level at which the data signal is being wirelessly communicated according to the signal level from the receiver (e.g., the received signal strength).

The digital module 2300 may default to a designated upper limit on transmitted power levels in the event that an uplink signal is not received, which could occur prior to synchronizing the receiver 114 and the communication device. The digital module 2300 may include one or more video inputs (e.g., analog National Television System Committee video inputs) while the S-band and L-band modules 2302, 2304 may include another type of output device, such as a Universal Serial Bus (USB) connection. Plural interface chips (e.g., processors) can be provided to support digitizing and converting video at the front end of the processor 2306. If video compression is used, de-compression may not be used for the modules 2302, 2304. An external computing device 2308, such as a laptop computer, desktop computer, or the like, may be connected with the digital module 2300 to perform video de-compression. The digital module 2300 can interface with one or more of the modules 2302, 2304 using a common (e.g., the same) interface (e.g., a 70 MHz digital I/F) to either an L band or an S band transceiver module.

The communication device shown in FIG. 23 can communicate video or image data using single frequency radio operation in the L band or S band by communicating the data using the corresponding module 2304, 2302. The digital module 2300 can use a software-based switch to select the operating band to be used (e.g., the L band or the S band). This software-based switch may be included in one or more sets of instructions for the processor 2306, and may be stored in the data storage device 106 or in another location. The communication device may use 100 MHz of continuous band spectrum space supporting four sub channels (e.g., 25 MHz each channel) for the communication of image data.

The communicating range of the communication device may be relatively large, such as up to 5 km, up to 10 km, or another distance. The communication device can adapt the power at which signals are wirelessly communicated to the receiver 114. The resolution of the video and/or images communicated by the communication device may be on the order of 15 frames per second (or another rate) and/or 320×240 resolution (or another resolution). Multiple serial full duplex channels of the communication device can communicate or process the data at a rate up to 19,200 bits per second (bps), up to 57,000 bps, or another rate.

As described herein, the communication device can be disposed onboard a mobile platform. Due to the relatively small size of one or more of the mobile platforms described herein, the size and/or weight of the communication device may be relatively small and/or light. For example, the outer dimensions of the communication device may be up to 1.5 inches by 1.5 inches by 0.25 inches, or one or more other dimensions. The total weight of the communication device may be up to 20 grams or another weight. In order to conserve power, the communication device may consume electric power at less than 10 watts or another limit. The communication device can use time division multiplexing (TDM) to encode and wirelessly communicate the image data described herein. Alternatively, another encoding technique may be used.

The energy storage device may be electrically connected to the sensor package unit, the data storage device, and/or the communication device. The energy storage device can represent one or more devices that store and/or generate electric current to power the sensor package unit, the data storage device, and/or the communication device. For example, the energy storage device can include one or more batteries, pantographs (e.g., that receive current from an off-board source via a catenary or overhead line), conductive shoes (e.g., that contact a conductive body, such as an electrified rail, to receive current from an off-board source), generators, alternators, or the like.

In one embodiment, the sensor package unit comprises the sensor package, the data storage device, and the energy storage device, but not the communication device. In such an embodiment, the sensor package unit may be used for storing captured image data for later retrieval and use. In another embodiment, the sensor package unit comprises the sensor package, the communication device, and the energy storage device, but not the data storage device. In such an embodiment, the portable sensor package unit may be used to communicate the image data to a vehicle or other location for immediate use (e.g., being displayed on a display screen), and/or for storage remote from the portable sensor package unit (this is, for storage not within the portable sensor package unit). In another embodiment, the sensor package unit comprises the sensor package, the communication device, the data storage device, and the energy storage device. In such an embodiment, the portable sensor package unit may have multiple modes of operation, such as a first mode of operation where image data is stored within the portable sensor package unit on the data storage device 106, and a second mode of operation where the image data is transmitted off the portable sensor package unit for remote storage and/or immediate use elsewhere.

The sensor package may be a digital video sensor package, such as a sensor package having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that can wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a battery, such as a rechargeable lithium-ion battery, a rechargeable Ni-Mh battery, an alkaline cell, or other device useful for portable energy storage for use in an electronic device. Another suitable energy storage device, albeit more of an energy provider than storage, include a piezoelectric vibration harvester and a solar panel, where energy is generated and then provided to the sensor package system.

The sensor package unit can include a locator device 105 that generates data used to determine the location of the sensor package unit. The locator device can represent one or more hardware circuits or circuitry that include and/or are connected with one or more processors (e.g., controllers, microprocessors, or other electronic logic-based devices). In one example, the locator device represents a global positioning system (GPS) receiver that determines a location of the sensor package unit, a beacon or other communication device that broadcasts or transmits a signal that is received by another component (e.g., the transportation system receiver) to determine how far the sensor package unit is from the component that receives the signal (e.g., the receiver), a radio frequency identification (RFID) tag or reader that emits and/or receives electromagnetic radiation to determine how far the sensor package unit is from another RFID reader or tag (e.g., the receiver), or the like. The receiver can receive signals from the locator device to determine the location of the locator device relative to the receiver and/or another location (e.g., relative to a vehicle or vehicle system). Additionally or alternatively, the locator device can receive signals from the receiver (e.g., which may include a transceiver capable of transmitting and/or broadcasting signals) to determine the location of the locator device relative to the receiver and/or another location (e.g., relative to a vehicle or vehicle system).

The controller 107 represents hardware circuitry that includes and/or is connected with one or more processors (e.g., one or more microprocessors, field programmable gate arrays, and/or integrated circuits) that control operations of the sensor package unit 102. In one embodiment, the controller 107 also controls movement of a mobile platform (e.g., a mobile platform 174 shown in FIGS. 7 through 10) that carries the sensor package unit 102. For example, the controller 107 is disposed onboard the mobile platform and generates control signals to propulsion systems (e.g., rotors, motors, etc.) of the mobile platform to control movement of the mobile platform in one embodiment.

The image data may be autonomously examined by one or more image data analysis systems or image analysis systems described herein. For example, one or more of the transportation receiver system, a vehicle, and/or the sensor package unit may include an image data analysis system (also referred to as an image analysis system) that examines the image data for one or more purposes described herein.

Figure 2:
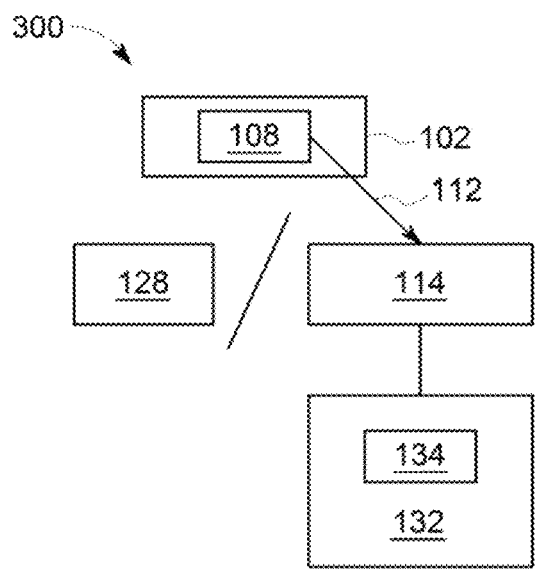
FIG. 2 illustrates another embodiment of a sensor system.

FIG. 2 illustrates another embodiment of a sensor package system 300. The system can include a display screen system 132 remotely located from the portable sensor package unit and/or the non-aerial vehicle. Optionally, the display screen system is at least partially disposed onboard the non-aerial vehicle. The display screen system receives the image data from the transportation system receiver as a live feed and display the image data (e.g., converted back into moving images) on a display screen 134 of the display screen system. The live feed can include image data representative of objects contemporaneous with capturing the video data but for communication lags associated with communicating the image data from the portable sensor package unit to the display screen system. Such an embodiment may be used, for example, for communicating image data, captured by the portable sensor package unit disposed onboard a mobile platform moving ahead of the non-aerial vehicle to a remote human operator viewing the display screen. The remote human operator, for example, may be onboard the non-aerial vehicle that is moving behind the mobile platform, an expert in the particular task or tasks, or another person, that can examine the image data and/or provide advice or instructions to the on-scene human operator based on the image data.

In another embodiment, the system has the display screen disposed onboard the non-aerial vehicle, such as in an operator cab of the non-aerial vehicle. The communication device of the portable sensor package unit can wirelessly transmit the image data to the transportation system receiver which may be located onboard the non-aerial vehicle and operably connected to the display screen, for the image data to be displayed on the display screen. Such an embodiment may be used for one operator of the non-aerial vehicle to view the image data captured by a mobile platform moving ahead of the non-aerial vehicle.

Figure 3:
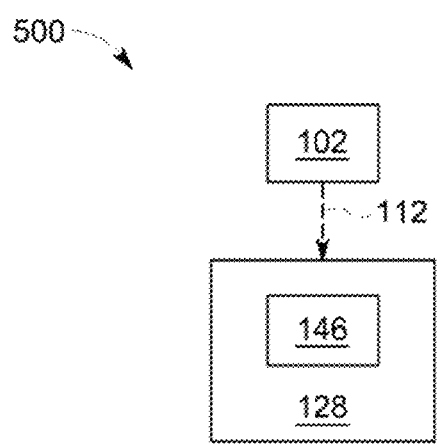
FIG. 3 illustrates another embodiment of a sensor system.

FIG. 3 illustrates another embodiment of a sensor package system 500. A control system 146 onboard the vehicle may be provided for controlling movement of the non-aerial vehicle. The control system can include or represent the control unit, and can include hardware circuits or circuitry that include and/or are connected with one or more processors (e.g., microprocessors, controllers, or the like). The control system can control operations of the non-aerial vehicle, such as by communicating command signals to a propulsion system of the vehicle (e.g., motors, engines, brakes, or the like) for controlling output of the propulsion system.

The control system can prevent movement of the non-aerial vehicle responsive to a first data content of the image data and allow movement of the non-aerial vehicle responsive to a different, second data content of the image data. For example, the control system onboard the non-aerial vehicle may engage brakes and/or prevent motors from moving the non-aerial vehicle to prevent movement of the non-aerial vehicle responsive to the first data content of the image data indicating the image data from the portable sensor package unit (e.g., onboard a mobile platform moving ahead of the non-aerial vehicle) indicating that one or more segments of the route ahead of the non-aerial vehicle along a direction of travel are damaged, obstructed by one or more obstacles, occupied by one or more other vehicles, or otherwise unsafe to travel over.

Figure 4:
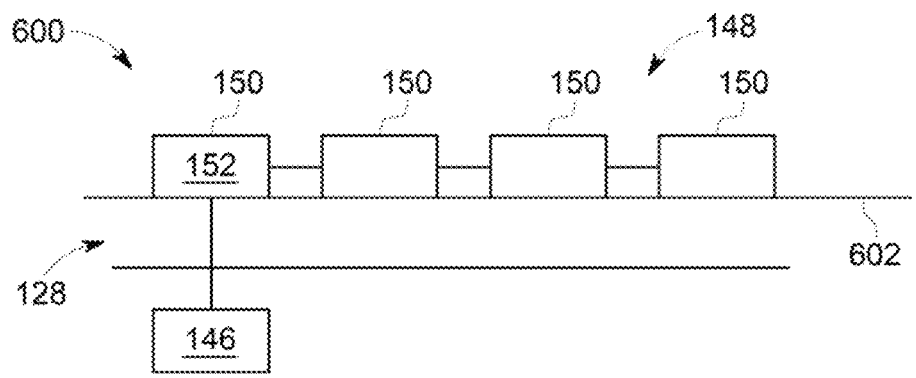
FIG. 4 illustrates one embodiment of a non-aerial vehicle.

FIG. 4 illustrates one embodiment of the non-aerial vehicle. The non-aerial vehicle can include one or more vehicle consists 148 having plural interconnected non-aerial vehicle units 150, with at least one of the plural vehicle units being a propulsion-generating, non-aerial vehicle unit 152. The non-aerial vehicle can represent a rail vehicle system, such as a train, with the vehicle units 150, 152 representing locomotives, rail cars, or other types of rail vehicles. For example, the vehicle unit 150 can represent a propulsion-generating vehicle unit, while the vehicle units 152 represent non-propulsion-generating vehicle units, such as rail cars. Alternatively, the non-aerial vehicle can represent another type of vehicle, such as an automobile, marine vessel, mining vehicle, other off-highway vehicle (e.g., a vehicle that is not designed for and/or legally permitted to travel on public roadways), or the like. The consist can represent plural vehicle units mechanically connected to travel together along a land or water route 602, such as a track, road, waterway, or the like. Alternatively, the consist and/or vehicle can include plural vehicle units that communicate with each other to travel together along the route 602, but that are not connected with each other. For example, the vehicle unit may send command signals to the vehicle units to instruct the vehicle units how to move along the route 602 to maintain separation distances between the vehicle units.

The control system onboard the vehicle can prevent movement of the vehicle consist responsive to the first data content of the image data indicating that one or more segments of the route ahead of the vehicle are damaged or otherwise unsafe for continued travel. For example, responsive to the image data indicating that an upcoming segment of the route is being worked on, is occupied by another vehicle, is impassable due to an obstacle on the route (e.g., an automobile stuck on the track at a crossing), is damaged (e.g., has a broken rail), has a broken switch, or the like, the control system may implement one or more remedial actions. These actions can include, but are not limited to, generating a warning (e.g., visual, audible, or a combination thereof) to an operator of the non-aerial vehicle, automatically slowing or stopping movement of the non-aerial vehicle, communicating a request to an off-board location (e.g., dispatch center, maintenance facility, etc.) for repair, maintenance, and/or inspection of the upcoming segment of the route, change a scheduled trip or route of the vehicle to avoid the upcoming segment, or the like.

Figure 5:
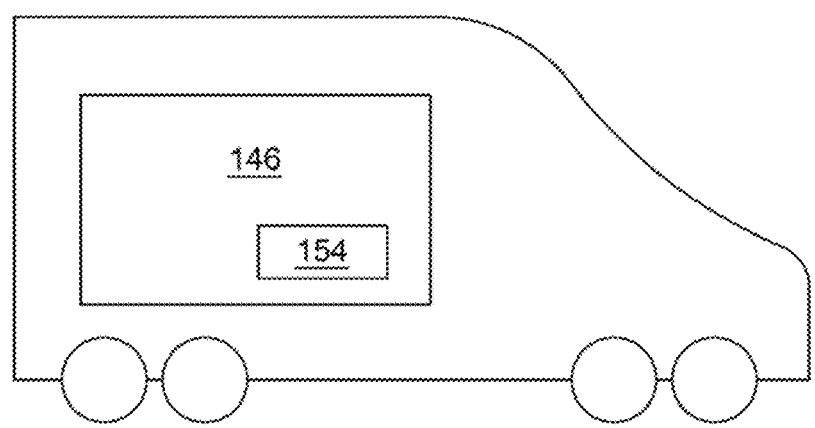
FIG. 5 illustrates a control system according to one embodiment.

FIG. 5 illustrates the control system according to one embodiment. The control system can be disposed onboard the non-aerial vehicle and also can include an image data analysis system 154. The analysis system can automatically process the image data for identifying data content in the image data. The control system can automatically prevent and allow movement of the vehicle responsive to the first data and the second data, respectively, that is identified by the image data analysis system. The image data analysis system can include one or more image analysis processors that autonomously examine the image data obtained by the sensor package unit for one or more purposes, as described herein.

Figure 6:
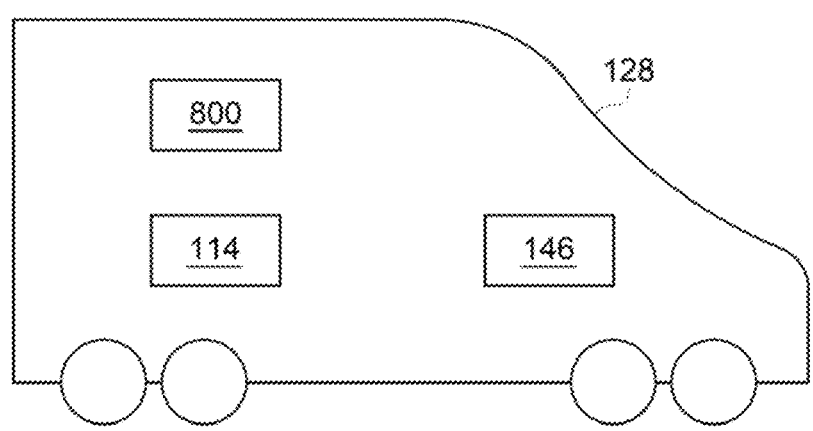
FIG. 6 illustrates a transportation system receiver located onboard the non-aerial vehicle according to one embodiment.

FIG. 6 illustrates the transportation system receiver 114 located onboard the non-aerial vehicle 128 according to one embodiment. The transportation system receiver can wirelessly communicate network data onboard and/or off-board the non-aerial vehicle, and/or to automatically switch to a mode for receiving the image data from the portable sensor package unit responsive to the portable sensor package unit being active to communicate the image data. For example, responsive to the portable sensor package unit being active to transmit the image data, the transportation system receiver can automatically switch from a network wireless client mode of operation (transmitting data originating from a device onboard the vehicle, such as the control unit) to the mode for receiving the image data from the portable sensor package unit. The mode for receiving the image data from the portable sensor package unit may comprise a wireless access point mode of operation (receiving data from the portable sensor package unit).

In another embodiment, the sensor package system further comprises the transportation system receiver located onboard the non-aerial vehicle. The transportation system receiver can wirelessly communicate network data onboard and/or off-board the vehicle, and/or to automatically switch from a network wireless client mode of operation to a wireless access point mode of operation, for receiving the image data from the portable sensor package unit. This network data can include data other than image data. For example, the network data can include information about an upcoming trip of the vehicle (e.g., a schedule, grades of a route, curvature of a route, speed limits, areas under maintenance or repair, etc.), cargo being carried by the vehicle, volume and type of bulk material being transported by the vehicle, or other information. Bulk material refers to solids, such as grain, coal, sand or ore as well as to liquids, such as oil, water, liquefied gases, and the like. Alternatively, the network data can include the image data.

In another embodiment of one or more of the sensor package systems described herein, the system stores the image data for use locally (e.g., in the vehicle), or it can transmit it to a remote location (e.g., off-vehicle location) based on where the vehicle is located. For example, if the vehicle is in a yard (e.g., a switching yard, maintenance facility, or the like), the image data may be transmitted to a location in the yard. But, prior to the vehicle entering the yard or a designated location in the yard, the image data may be stored onboard the vehicle and not communicated to any location off of the vehicle.

Thus, in an embodiment, the system further comprises a control unit 800 that, responsive to at least one of a location of the portable sensor package unit or a control input, controls at least one of the portable sensor package unit or the transportation system receiver to a first mode of operation for at least one of storing or displaying the video data on board the vehicle and to a second mode of operation for communicating the video data off board the vehicle for at least one of storage or display of the video data off board the vehicle. For example, the control unit may be can automatically control at least one of the portable sensor package unit or the transportation system receiver from the first mode of operation to the second mode of operation responsive to the location of the portable sensor package unit being indicative of the rail vehicle being in a yard. The control unit 800 can represent hardware circuitry that includes and/or is connected with one or more processors (e.g., microprocessors, field programmable gate arrays, integrated circuits, etc.).

During operation of the vehicle and/or sensor package unit outside of a designated area (e.g., a geofence extending around a vehicle yard or other location), the image data generated by the sensor package may be locally stored in the data storage device of the sensor package unit, shown on a display of the vehicle, or the like. Responsive to the vehicle and/or sensor package unit entering into the designated area (e.g., as determined by the controller or control unit), the sensor package unit can switch modes to begin wirelessly communicating the image data to the receiver, which may be located in the designated area. Changing where the image data is communicated based on the location of the vehicle and/or sensor package unit can allow for the image data to be accessible to those operators viewing the image data for safety, analysis, or the like. For example, during movement of the vehicle outside of the vehicle yard, the image data can be presented to an onboard operator, and/or the image data may be analyzed by an onboard analysis system of the vehicle to ensure safe operation of the vehicle. Responsive to the vehicle and/or sensor package unit entering into the vehicle yard, the image data can be communicated to a central office or management facility for remote monitoring of the vehicle and/or operations being performed near the vehicle.

As one example, event data transmission (e.g., the transmitting, broadcasting, or other communication of image data) may be can occur based on various vehicle conditions, geographic locations, and/or situations. The image data may be either pulled (e.g., requested) or pushed (e.g., transmitted and/or broadcast) from the vehicle. For example, image data can be sent from a vehicle to an off-board location by the control unit or controller based on selected operating conditions (e.g., emergency brake application), a geographic location (e.g., in the vicinity of a crossing between two or more routes), selected and/or derived operating areas of concern (e.g., high wheel slip or vehicle speed exceeding area limits), and/or time driven messages (e.g., sent once a day). The off-board location may also request and retrieve the image data from specific vehicles on demand.

Figure 7:
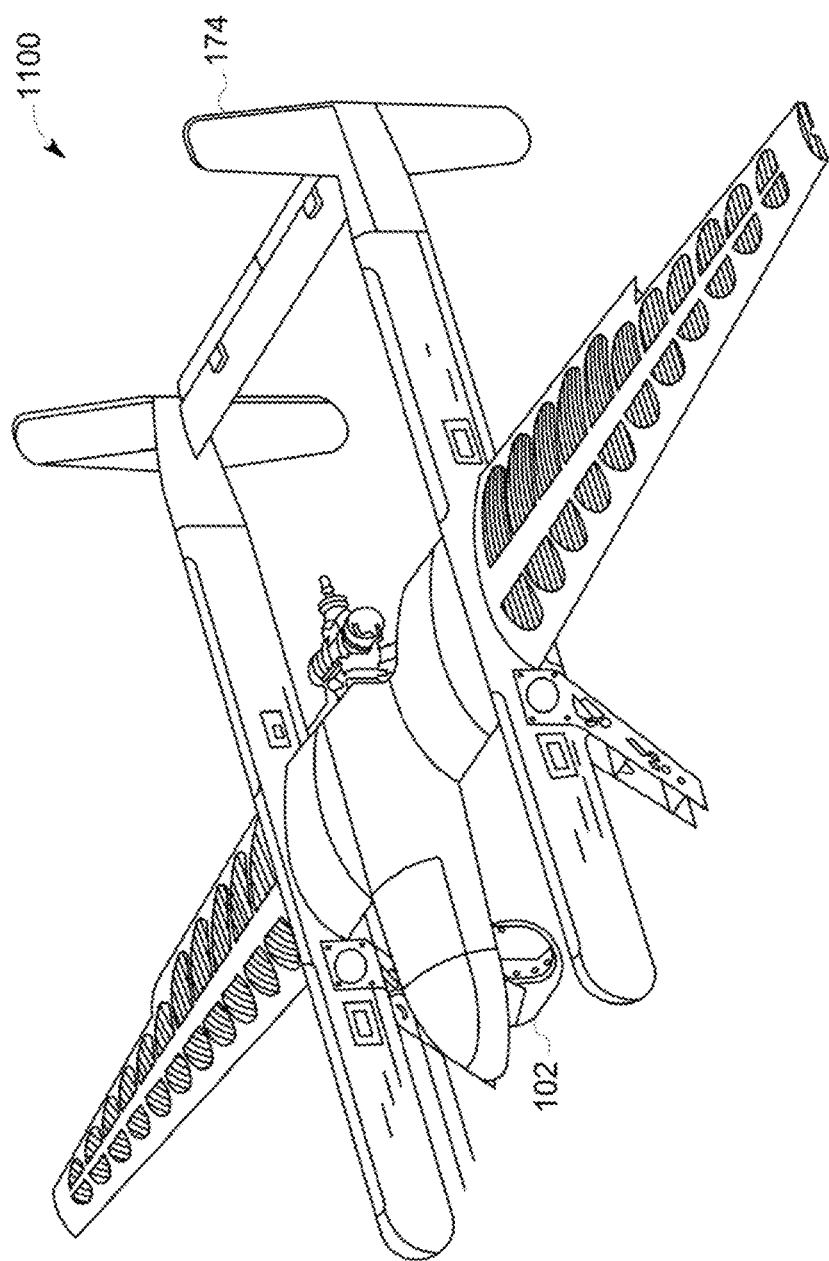
FIG. 7 illustrates a perspective view of a sensor system.
Figure 8:
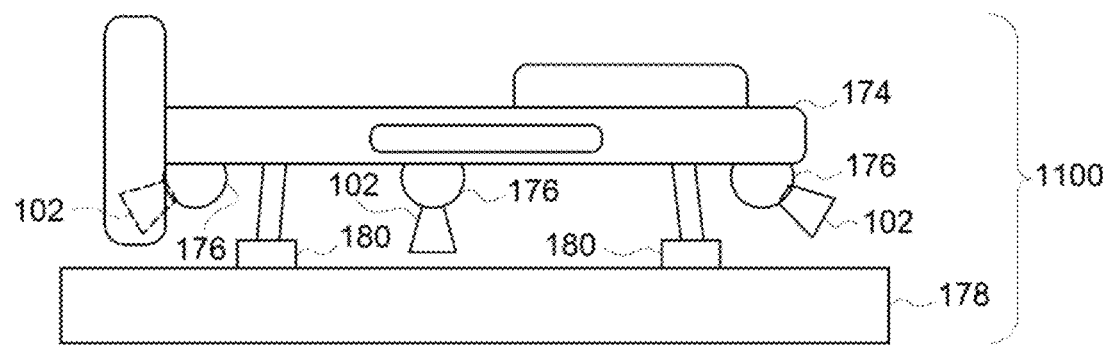
FIG. 8 illustrates a side view of the sensor system shown in FIG. 7.
Figure 9:
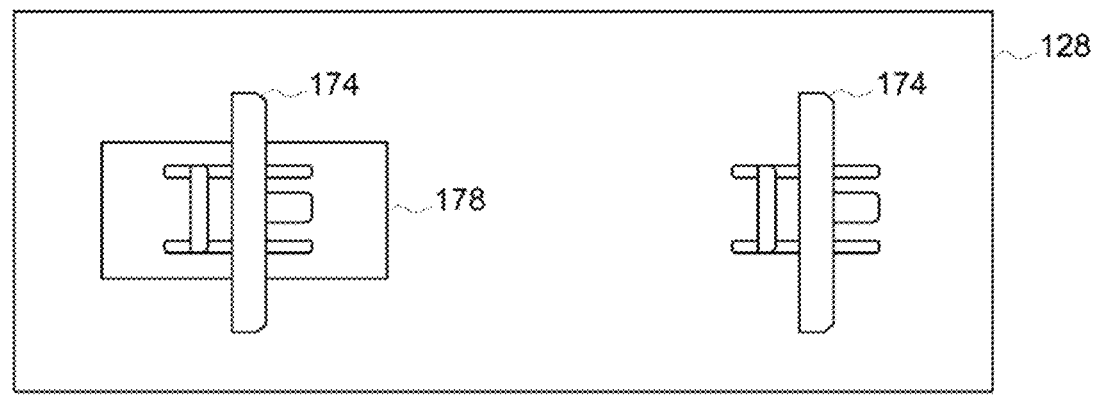
FIG. 9 illustrates a top view of the sensor system shown in FIG. 7.

FIGS. 7, 8, and 9 illustrate another embodiment of a sensor package system 1100. FIG. 7 illustrates a perspective view of the sensor package system, FIG. 8 illustrates a side view of the sensor package system, and FIG. 9 illustrates a top view of the sensor package system 1100. The system includes a mobile platform 174 that may be operated by at least one of remote control or autonomous control moving over a ground route of the non-aerial vehicle. The mobile platform may have one or more sensor package docks 176 for receiving one or more portable sensor package units, and may have also a vehicle dock for coupling the mobile platform to the non-aerial vehicle. In the illustrated example, the mobile platform includes three sensor packages, with one sensor package unit facing along a forward direction of travel of the mobile platform, another sensor package unit facing along a downward direction toward the ground or route over which the mobile platform flies, and another sensor package unit facing along a rearward direction of the mobile platform. Alternatively, a different number of sensor package units may be used and/or the sensor package units may be oriented in other directions.

When the aerial mobile platform is in the air, the portable sensor package units can be positioned for the sensor packages to view the route, the vehicle, or other areas near the vehicle. The mobile platform may be, for example, a scale dirigible, a scale helicopter, or the like (e.g., the mobile platform may be smaller than needed for transporting humans, such as ⅒ scale or smaller). A suitable scale helicopter can include quadcopters and the like.

The system can include a mobile platform vehicle dock 178 to attach the mobile platform to the vehicle. The mobile platform vehicle dock can receive the mobile platform for at least one of detachable coupling of the mobile platform to the vehicle, charging of a battery of the mobile platform from a power source of the non-aerial vehicle, or the like. For example, the dock can include one or more connectors 180 that mechanically or magnetically coupled with the mobile platform to prevent the mobile platform from moving relative to the dock, that conductively couple an onboard power source (e.g., battery) of the mobile platform with a power source of the vehicle (e.g., generator, alternator, battery, pantograph, or the like) so that the power source of the mobile platform can be charged by the power source of the non-aerial vehicle during movement of the vehicle.

The mobile platform can move off the vehicle to obtain image data that is communicated from one or more of the sensor packages onboard the mobile platform to one or more receivers 114 onboard the vehicle. The mobile platform can move relative to the vehicle while the vehicle is stationary and/or while the vehicle is moving along a route. The image data may be displayed to an operator on a display device onboard the vehicle and/or may be autonomously examined as described herein. The image data can be examined by the operator and/or an image analysis system, such as to examine the vehicle itself, to examine other vehicles traveling relative to the vehicle (e.g., to avoid collisions between the vehicles), to examine the route being traveled upon (e.g., to perform route inspection), to warn of upcoming obstructions or other problems along the route ahead of the vehicle, and the like. In one aspect, the image data obtained by the mobile platform can be automatically examined by the image analysis system onboard the non-aerial vehicle to detect hazards. Hazards can include one or more of an impending collision with obstacles onboard the route ahead of the non-aerial vehicle; potential derailment due to cracks, breaks or other types of damage to the route; a potential collision with another vehicle on an intercept trajectory; or the like.

When the mobile platform is coupled into the vehicle dock, one or more sensor packages can be positioned to view the route during movement of the vehicle. In one mode of operation, the system includes three or more mobile platforms, such two or more of the mobile platforms docked onboard the non-aerial vehicle. A control unit onboard the non-aerial vehicle (e.g., the control unit 146 or a control unit that is separate from the control unit 146) can remotely control flight of at least one of the mobile platforms.

Figure 10:
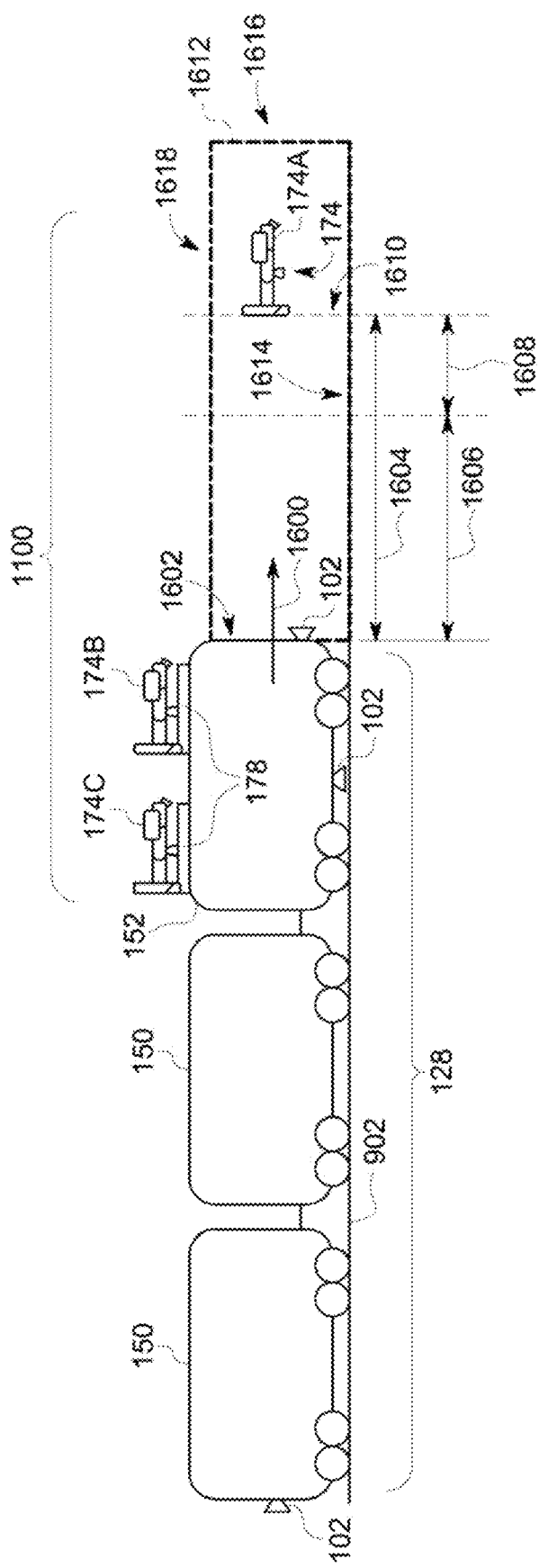
FIG. 10 illustrates operation of the sensor system shown in FIGS. 7, 8, and 9 according to one embodiment.

FIG. 10 illustrates operation of the sensor package system 1100 shown in FIGS. 7, 8, and 9 according to one embodiment. The sensor package system can include several mobile platforms 174, such as three mobile platforms (e.g., mobile platforms 174A-C) or another number of mobile platforms. In one aspect, a first mobile platform 174A can move off a vehicle system 128 (such as ahead of the vehicle system), and second and/or third mobile platforms 174B, 174C can be on one or more docks 178 of the vehicle system (such that the second and third mobile platforms are moving with, but not relative to, the vehicle). The vehicle system 128 can represent a single vehicle (also referred to as a vehicle unit) or, as shown in FIG. 10, multiple vehicles traveling together along a route 902. Optionally, the mobile platforms may land and remain on the vehicle without use of the docks. While the mobile platforms and docks are shown on the same vehicle unit 152 of the vehicle, optionally, one or more of the mobile platforms and/or docks may be disposed on another vehicle unit of the consist. Additionally, while the mobile platforms and docks are shown onboard the leading vehicle unit of the vehicle (along a direction of travel 1600 of the vehicle), one or more (or all) of the mobile platforms that are onboard the vehicle may be disposed onboard one or more other vehicle units.

The mobile platforms can switch off duties or operations between the mobile platforms to ensure that at least one mobile platform is generating image data 112, another mobile platform 174 is being charged with current from the vehicle, and/or another mobile platform can be stationary on the vehicle and ready to begin moving relative to the vehicle. For example, to ensure continual generation of the image data representative of areas ahead of the vehicle by at least one mobile platform, the first mobile platform may move ahead of the vehicle to obtain image data of the route for sending back to the vehicle for examination. Prior to the first mobile platform returning to a dock of the vehicle (e.g., to recharge batteries of the first mobile platform), the second mobile platform can move off the vehicle to a location at or near the first mobile platform and begin generating the image data. The first mobile platform can return to a dock of the vehicle to charge batteries of the first mobile platform. In one aspect, the first mobile platform may return to the vehicle only after the second mobile platform is moving ahead of the vehicle in a location that allows the second mobile platform to obtain image data of areas ahead of the first mobile platform. At a later time, the third mobile platform can move to the location of the second mobile platform and begin generating the image data so that the second mobile platform can return to a dock to charge batteries of the second mobile platform. At an even later time, the first mobile platform can move ahead of the vehicle to replace operation of the third mobile platform. In doing so, the mobile platforms can ensure that at least one mobile platform is obtaining image data, another mobile platform is charged with energy and ready to move off the vehicle, and another mobile platform is charging at all times. Similarly, the plurality of mobile platforms may be based on a stationary dock. And, rather than swap positions to maintain coverage for a moving vehicle, they swap positions with each other to maintain coverage of a determined geospace or area. These positions may be identified as a single, or few, specific locations or may be done as a loop or sentry-like pass through fixed (albeit not necessarily the same) movement corridors.

In FIG. 10, the vehicle system is shown as a rail vehicle, but alternatively may be another type of vehicle. The vehicle moves along the route in the direction of travel 1600. The vehicle can include one or more onboard sensor package units to generate image data of portions of the route 902 located beneath the vehicle, portions of the route ahead and/or behind the vehicle, or other areas around the vehicle. This image data can be displayed onboard the vehicle to an operator and/or examined by an image analysis system to identify damaged sections of the route.

At least one of the mobile platforms can move ahead of the vehicle along the direction of travel to generate image data representative of areas ahead of the vehicle along the direction of travel. This image data can represent portions of the route ahead of the mobile platform, portions of the route beneath the mobile platform, and/or portions of the route behind the mobile platform (e.g., between the mobile platform and the vehicle). Alternatively, the image data can represent other areas. The image data obtained by the sensor package unit(s) onboard the vehicle and by the sensor package unit(s) onboard the mobile platform can be examined to detect obstacles on the route, problems with the route, or other hazards, as described herein. In one embodiment, the mobile platform can communicate the image data to an image analysis system onboard the vehicle, which also examines the image data for obstacles, problems, or hazards.

In one aspect, the locations where the mobile platform is permitted to move relative to the vehicle may be limited. For example, the mobile platform may not move closer to a leading end 1602 of the vehicle (e.g., along the direction of travel) than a designated leading distance 1604 along the route. The leading distance may be measured along the path of the route and, in situations where the route is not linear, the leading distance may be measured along the non-linear path of the route. Alternatively, the leading distance may be a linear distance that does is not measured along the path of the non-linear route.

The leading distance can change based on changing operations of the vehicle. For example, the leading distance can be a combination (e.g., sum) of a safe braking distance 1606 and a response time distance 1608. The safe braking distance represents the distance along the path of the route that the vehicle would move before stopping in response to engagement of one or more brakes of the vehicle. For example, if the vehicle were to engage air brakes of the vehicle, the safe braking distance represents how far the vehicle would continue to move subsequent to engaging the brakes before stopping all movement. The response time distance represents the distance along the path of the route that the vehicle would travel before an operator onboard the vehicle could engage the brakes of the vehicle in response to identifying an event. For example, the response time distance represents how far the vehicle would move during a time period that begins with the operator seeing or being warned of an obstacle in the route or damage in the route ahead of the vehicle, the operator seeing the obstacle and/or damage, the operator receiving a warning of the obstacle and/or damage to the route, or the like. This time period ends when the operator actuates the brakes of the vehicle.

The control system disposed onboard the vehicle can calculate and/or change the leading distance, the safe braking distance, and/or the response time distance based on the operations of the vehicle and/or characteristics of the route. For example, the safe braking distance and/or the response time distance can change based on how fast the vehicle is moving, based on the path of the route, based on the grade of the route, based on adhesion between wheels of the vehicle and the route, based on an available braking effort, or the like. For example, the safe braking distance and/or the response time distance can be longer for faster speeds of the vehicle and shorter for slower speeds of the vehicle.

The safe braking distance and/or the response time distance can be longer for segments of the route having larger radii of curvature or straight segments of the route, and shorter for segments of the route having smaller radii of curvature. Route segments having smaller radii of curvature may resist movement of the vehicle more than route segments having larger radii of curvature and, as a result, the distance needed to stop the vehicle may be shorter on the segments having smaller radii of curvature.

The safe braking distance and/or the response time distance can be longer for segments of the route having flat and/or downhill grades and shorter for segments of the route having uphill grades. The additional acceleration of the vehicle caused by gravity on downhill grades can lengthen the distance needed to stop the vehicle. The deceleration of the vehicle caused by gravity on downhill grades and/or the absence of acceleration caused by gravity on flat grades can shorten the distance needed to stop movement of the vehicle.

The safe braking distance and/or the response time distance can be longer for smaller coefficients of friction between wheels of the vehicle and the route and shorter for segments of the route having larger coefficients of friction between wheels of the vehicle and the route. The distance needed to stop movement of the vehicle can increase when more wheel slip between the wheels and the route occurs, which can be a result of decreased coefficients of friction between the wheels and the route. The safe braking distance and/or the response time distance can be longer for smaller available braking efforts of the vehicle (e.g., smaller air pressures in air brakes of the vehicle) and shorter for larger available braking efforts of the vehicle (e.g., larger air pressures in air brakes of the vehicle). For example, if the vehicle has reduced available braking efforts, such as during time periods when the air reservoirs or other components of an air brake system are recharging, the distance needed to stop the vehicle may increase relative to the vehicle having increased available braking effort.

The control system can calculate and update the leading distance, the safe braking distance, and/or the response time distance as the vehicle moves along the route and changes operations. For example, as the vehicle speeds up, travels along downhill grades, has increased wheel slip, or the like, the control system can increase the length of the leading distance, the safe braking distance, and/or the response time distance. The control system similarly can shorten the length of the leading distance, the safe braking distance, and/or the response time distance as the vehicle slows down, travels along uphill grades, has decreased wheel slip, or the like.

The updated leading distance, safe braking distance, and/or response time distance may be communicated to the mobile platform, which can autonomously limit how far the mobile platform flies ahead of the vehicle. Optionally, if the mobile platform is being remotely controlled by an operator onboard the vehicle, the operator may limit how far the mobile platform flies ahead of the vehicle based on the leading distance, safe braking distance, and/or response time distance. For example, the leading distance may be communicated to the operator and/or the control system may generate an audible and/or visual warning for the operator responsive to the mobile platform approaching a far or distal end 1610 of the leading distance (e.g., coming within ten meters, fifty meters, 100 meters, or another threshold distance of the far end of the leading distance that opposes the leading end 1602 of the vehicle). The mobile platform may approach the distal end of the leading distance when the mobile platform slows relative to movement of the vehicle.

A movement envelope 1612 can be defined by sides or boundaries that limit where the mobile platform may move. This envelope 1612 represents a multi-dimensional bounded volume that restricts or defines where the mobile platform is able to move. The envelope 1612 may move with the vehicle system and change over time, as described herein. The controller of the mobile platform may autonomously control movement of the mobile platform so that the platform does not move outside of the envelope 1612. Optionally, the envelope 1612 may define one or more boundaries of a volume into which the mobile platform is prevented from entering. For example, the envelope 1612 can represent at least part of a restricted airspace that the mobile platform is not allowed to fly into, such as the area around an airport, government restricted area, commercial airspace, or the like. In one embodiment, the controller (also referred to as the control unit) of the mobile platform can communicate with an off-board location or facility (e.g., a wayside unit) to determine where and/or when the mobile platform is permitted to move. For example, the controller can communicate with an air traffic control system prior to controlling the mobile platform from moving from within the movement envelope to commercial airspace. This can allow the controller to obtain permission for the mobile platform to enter into the commercial airspace from the air traffic control system. This communication may occur automatically, such as by the controller of the mobile platform automatically sending a request signal to the air traffic control system prior to the mobile platform leaving the envelope or entering into commercial airspace, and the air traffic control system automatically sending a reply signal in response to the request signal. The reply signal can grant or deny permission to the mobile platform to move into the commercial airspace.

In one embodiment, the envelope 1612 is defined by receipt of a signal from a beacon. For example, a beacon may be coupled with a stationary object (e.g., a building, tower, etc.) or mobile object (e.g., another vehicle), and may broadcast a signal. This signal can be received by the mobile platform to inform the mobile platform of the presence of the beacon (and optionally the corresponding object), and optionally inform the mobile platform of how far the mobile platform is from the beacon. The mobile platform may base or treat the signal from the beacon as representative of the envelope 1612. For example, upon receipt of the beacon signal, the controller of the mobile platform may establish or determine the envelope 1612 in locations that prevent the mobile platform from coming too close (e.g., within a designated distance) to the beacon. This can autonomously prevent the mobile platform from flying into or otherwise colliding with the beacon or the object to which the beacon is coupled. The beacon may be directly coupled with the object (e.g., the beacon is attached to the object), or may be positioned near, but not coupled with, the object. In either situation, the beacon is operably coupled or connected with the object.

One side or boundary of this movement envelope can be the leading edge of the vehicle. An opposite side or boundary of the movement envelope can be an outer leading edge or boundary 1616 represented by a vertically oriented plane that is parallel to the leading edge of the vehicle and separated from the leading edge of the vehicle by at least the leading distance. The leading edge or boundary can be farther from the leading end of the vehicle in order to provide room for the mobile platform to move, as shown in FIG. 10. Alternatively, the leading edge or boundary may be separated from the leading end of the vehicle by the leading distance.

A bottom edge or boundary 1614 of the movement envelope can be the ground or water on which the vehicle is traveling. Alternatively, the bottom side or boundary can be elevated above and spaced apart from the ground or water, such as one or more meters above the route. An opposite upper side or boundary 1618 of the movement envelope can be separated from an upper surface of the route by a designated distance. The upper side or boundary can be defined to prevent the mobile platform from moving too high above the route. For example, the vehicle may travel through tunnels, beneath other routes, beneath trees, beneath wires, or the like. The upper side or boundary may be defined to be no higher than the limits of the tunnels, other routes, trees, wires, or other obstacles such that, as long as the mobile platform flies no higher than the upper side or boundary, the mobile platform avoids contact with the obstacles. Other upper side or boundary limits may include legal or permitting restrictions. In one example, a flight ceiling of 500 feet may be the limit above which is restricted commercial airspace. Naturally, to fly above that ceiling would require a proper permit. Operation of the mobile platform may be restricted (or allowed) based on the lack of a correspond permit, or whether such a permit has been obtained. If permitted to operate above the ceiling, navigation of the mobile platform may entail coordination with the flight path of aircraft.

Because aircraft tend to fly in determined flight corridors, a hybrid navigational approach may be employed. In one embodiment, the mobile platform may operate in one of several available navigational modes. In one mode, the mobile platform stays below the restricted ceiling, for example below 400 feet (to allow for a 100-foot buffer zone relative to the 500-foot restriction). In a second mode, the space above the movement envelop is not commercial airspace nor a known flight path for aircraft. In this second mode, the mobile platform may operate without coordinating with an external body, but may optionally be alert for approaching aircraft and may broadcast a location signal so that nearby aircraft may be aware of its location and/or trajectory. In a third mode, the space above the movement envelop is commercial airspace or a known flight path for aircraft. In this instance where air traffic is expected, the mobile platform's navigation may be coordinated with an air traffic controller to determine whether entry into the commercial airspace would interfere with aircraft operation. If no aircraft are schedule to be in the airspace, then the mobile platform may enter the expanded movement envelop, at least until the time interval elapses and the commercial airspace may be occupied again by aircraft operations.

While the restricted areas where the mobile platform are permitted to fly are described in terms of locations ahead of a direction of travel of the land-based vehicle, the restricted areas optionally are in other directions. For example, the envelope in which the mobile platforms are permitted to fly may be located to one or both sides of the vehicle 128 (e.g., ninety degrees relative to the direction of movement of the vehicle 128) and/or behind the vehicle 128 (e.g., in a direction that is opposite the direction of movement of the vehicle 128).

Of note is the use of non-fixed wing aircraft, for example, helicopters. Helicopters may operate below the commercial airspace, and in fact may land. They may also operate outside of normal aircraft flight lanes. Thus, they present a different navigational challenge in coordinating their operation with the mobile platform relative to fixed-wing aircraft. In this situation, it may be useful for the helicopter and/or the mobile platform to broadcast their location(s), and to receive such broadcasts. In such a way, a helicopter is advised of at least one of the proximity and location and trajectory of the mobile platform, and the mobile platform may be can steer clear, or move away from, the helicopter. Regardless of the interaction with a helicopter, when the navigational constraints on the safe operation of the mobile platform are in jeopardy of being violated, the mobile platform may initiate a transition to a safe mode of operation. This may include seeking an opportunity to land and park until retrieved or until safe operation may continue.

Optionally, the locations where the mobile platform is permitted to move relative to the vehicle system may be limited based on planned movements of the vehicle system and/or weather conditions. With respect to planned movements of the vehicle system, the controller or control unit of the vehicle system controls the vehicle system (e.g., autonomously and/or by directing an operator how to control the vehicle system) to travel along a designated path on one or more routes while using operational settings that are designated at different locations along the path, different times, and/or different distances along the path in one embodiment. These operational settings include throttle settings or positions, brake settings, speeds, or the like. The path and/or operational settings optionally are referred to as a trip plan of the vehicle 128. An outer limit on the distance that the mobile platform is permitted to move away from the vehicle system is based on the planned movements of the vehicle system in one example. For example, the leading boundary 1616 changes based on the planned movement of the vehicle system according to one embodiment.

In operation, the control unit 146 of the land-based vehicle 128 may communicate information to the controller 107 of the mobile platform 174. This information represents planned movement of the vehicle 128 in one embodiment. For example, the information can include the scheduled path that the vehicle 128 is to travel along for at least a segment of an upcoming or current trip, the times at which the vehicle 128 is scheduled to be at various locations or distances along the path, the speeds at which the vehicle 128 is to travel at various locations or distances along the path, etc. This information is determined from a trip plan of the vehicle 128 in one embodiment, but optionally is determined from a previously designated schedule of the vehicle 128 and/or from input provided by an operator of the vehicle 128 to the control unit 146. This upcoming movement information can be communicated from the control unit 146 to the controller 107 prior to deployment of the mobile platform 174 (e.g., prior to departure of the mobile platform 174 from the vehicle 128). Updates or modifications to the upcoming movement (e.g., trip plan) may be communicated from the control unit 146 to the controller 107 during movement of the mobile platform 174 off the vehicle 128.

The controller 107 of the mobile platform 174 receives the upcoming movement information from the control unit 146 of the vehicle 128 and restricts how far the mobile platform 174 moves away from the vehicle 128 based on the upcoming movement information in one embodiment. For example, if the controller 107 determines that the mobile platform 174 is moving in a direction (e.g., along a vector) that is away from the direction (e.g., vector) of movement of the vehicle 128, then the controller 107 reduces the leading boundary 1616 of the movement envelope of the mobile platform 174 (relative to the mobile platform 174 moving in another direction, as described below). The controller 107 can determine that the mobile platform 174 is moving in a direction away from the direction of movement of the vehicle 128 when the movement direction of the mobile platform 174 is at least a designated angle from the movement direction of the vehicle 128. For example, if the movement direction of the mobile platform 174 is oriented relative to the movement direction of the vehicle 128 at an angle of at least twenty degrees, then the controller 107 can determine that the mobile platform 174 is moving in a direction away from the vehicle 128. This may occur when the mobile platform 174 flies away from (e.g., in the opposite direction of, at a ninety degree angle from, etc.) the scheduled or designated path of a trip plan of the vehicle 128. Reducing the leading boundary 1616 (e.g., moving the boundary 1616 closer to the vehicle 128) prevents the mobile platform 174 from losing power before being able to return to the vehicle 128 for re-charging.

But, if the controller 107 determines that the mobile platform 174 is moving in a direction (e.g., along a vector) that is away from the direction (e.g., vector) of movement of the vehicle 128, then the controller 107 increases the leading boundary 1616 of the movement envelope of the mobile platform 174 (relative to the mobile platform 174 moving in another direction, as described below). For example, the controller 107 can determine that the mobile platform 174 is not moving in a direction away from the direction of movement of the vehicle 128 when the movement direction of the mobile platform 174 is no greater than the designated angle from the movement direction of the vehicle 128. This may occur when the mobile platform 174 flies above the scheduled or designated path of a trip plan of the vehicle 128. Reducing the leading boundary 1616 (e.g., moving the boundary 1616 closer to the vehicle 128) prevents the mobile platform 174 from losing power before being able to return to the vehicle 128 for re-charging. Increasing the leading boundary 1616 (e.g., moving the boundary 1616 farther from the vehicle 128) allows the mobile platform 174 to inspect the upcoming segments of the routes being traveled upon farther from the vehicle 128 while having sufficient power to be able to return to the vehicle 128 for re-charging.

In one embodiment, the controller 107 changes the boundary 1616 based on a designated buffer power amount required to be maintained in the energy storage device 110 of the mobile platform 174. For example, movement of the mobile platform 174 may be at least partially powered by electric energy stored in one or more batteries onboard the mobile platform 174. In order to ensure that the mobile platform 174 has sufficient power to return to the vehicle 128, the controller 107 may keep the boundary 1616 sufficiently close to the vehicle 128 that the mobile platform 174 is able to fly back to the vehicle 128 even if only the batteries have the designated power amount stored in the batteries, regardless of the direction of movement of the vehicle 128 and/or mobile platform 174. The designated power amount may be determined based on prior movements of the mobile platform 174 and/or vehicle 128.

The controller 107 may change the boundary 1616 based on whether the vehicle 128 will be moving during travel of the mobile platform 174 off the vehicle 128. For example, if the vehicle 128 will be stationary (e.g., static) during flight of the mobile platform 174, then the boundary 1616 or upper limit on distance that the mobile platform 174 can travel from the vehicle 128 ($D_{static}$) may be a function of a ratio of a product of the total energy stored onboard the mobile platform 174 (e.g., $E_{total}$) and the distance that the mobile platform 174 can travel (d) per unit of energy (E), and two (due to the out-and-back travel of the mobile platform):

$$D_{static} = \frac{\frac{d}{E} * E_{total}}{2}$$

But, if the vehicle 128 will be moving during flight of the mobile platform 174, then the boundary 1616 or upper limit on distance that the mobile platform 174 can travel from the vehicle 128 ($D_{moving}$) may be a function of a product of the total energy stored onboard the mobile platform 174, the distance that the mobile platform 174 can travel per unit of energy, and the distance that the vehicle 128 will move ($d_v$):

$$D_{moving} = \frac{d}{E} * E_{total} * d_v$$

Optionally, the controller 107 of the mobile platform 174 determines weather conditions in which the mobile platform 174 is or will be moving and changes or determines the outer leading boundary 1616 to which the mobile platform 174 is permitted to fly. The wind speed and wind direction is determined from a sensor onboard the mobile platform 174 (e.g., an anemometer), a sensor onboard the vehicle 128, and/or from input provided by an operator of the vehicle 128. In one embodiment, if the wind speed is too fast (e.g., greater than a designated threshold), then the controller 107 does not permit the mobile platform 174 to fly off the vehicle 128. Optionally, the controller 107 determines or changes the leading boundary 1616 based on the wind speed and/or direction. For example, the location of the leading boundary 1616 may be based on the planned travel of the vehicle 128 (as described above) and the weather conditions in which the mobile platform 174 is to move.

The controller 107 examines the weather conditions and determines whether the mobile platform 174 will travel into a headwind (wind oriented against the direction of movement) as the mobile platform 174 flies back toward the vehicle 128. Responsive to determining that the mobile platform 174 will travel into the headwind during return of the mobile platform 174 to the vehicle 128, the controller 107 reduces the boundary 1616 by moving the boundary 1616 closer to the vehicle 128. This can reduce or eliminate the likelihood of the mobile platform 174 running out of onboard power before the mobile platform 174 returns to the vehicle 128. Optionally, responsive to determining that the mobile platform 174 will travel with a tailwind during return of the mobile platform 174 to the vehicle 128 (e.g., the wind is in the same direction as the movement of the mobile platform 174), the controller 107 increases the boundary 1616 by moving the boundary 1616 closer to the vehicle 128. This can allow the mobile platform 174 to cover greater distances while not significantly increasing the likelihood of running out of onboard power before the mobile platform 174 returns to the vehicle 128.

Figure 24:
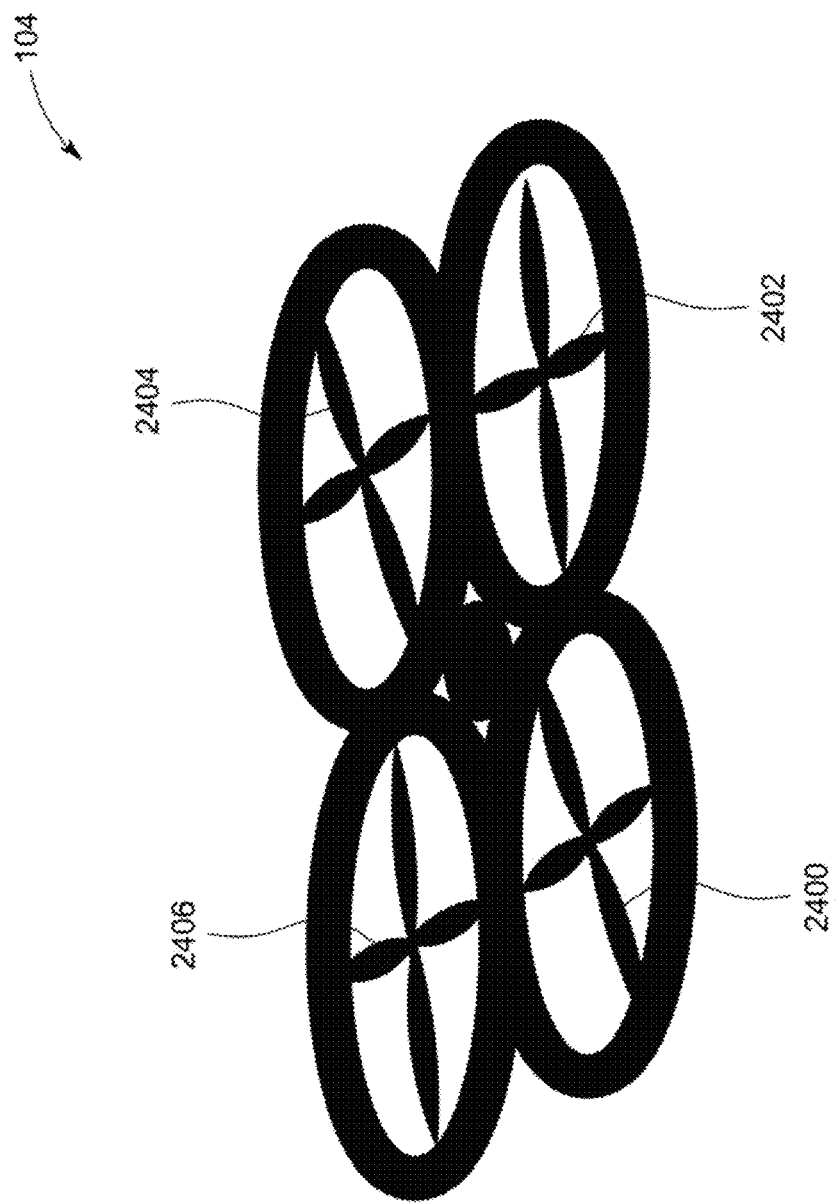
FIG. 24 illustrates one embodiment of the mobile platform having multiple propulsion-generating components that operate to propel the mobile platform.

In one embodiment, the mobile platform 174 determines the weather conditions using one or more propulsion components of the mobile platform 174. FIG. 24 illustrates one embodiment of the mobile platform 174 having multiple propulsion-generating components 2400, 2402, 2404, 2406 that operate to propel the mobile platform 174. The mobile platform 174 shown in FIG. 24 may be referred to as a quadcopter, with individually controllable rotors being the components 2400, 2402, 2404, 2406. The controller 107 can deactivate one of the rotors while activating one or more other rotors to cause the mobile platform 174 to hover or fly. External wind acts on the deactivated rotor and causes the deactivated rotor to rotate. This rotation of the deactivated rotor creates a back electromagnetic field (EMF) on the motor coupled with the deactivated rotor, similar to regenerative braking in a traction motor of the vehicle 128. The magnitude of the back EMF can indicate the speed of the wind. The controller 107 may then determine the wind speed based on the back EMF generated by rotation of the deactivated rotor.

Figure 11:
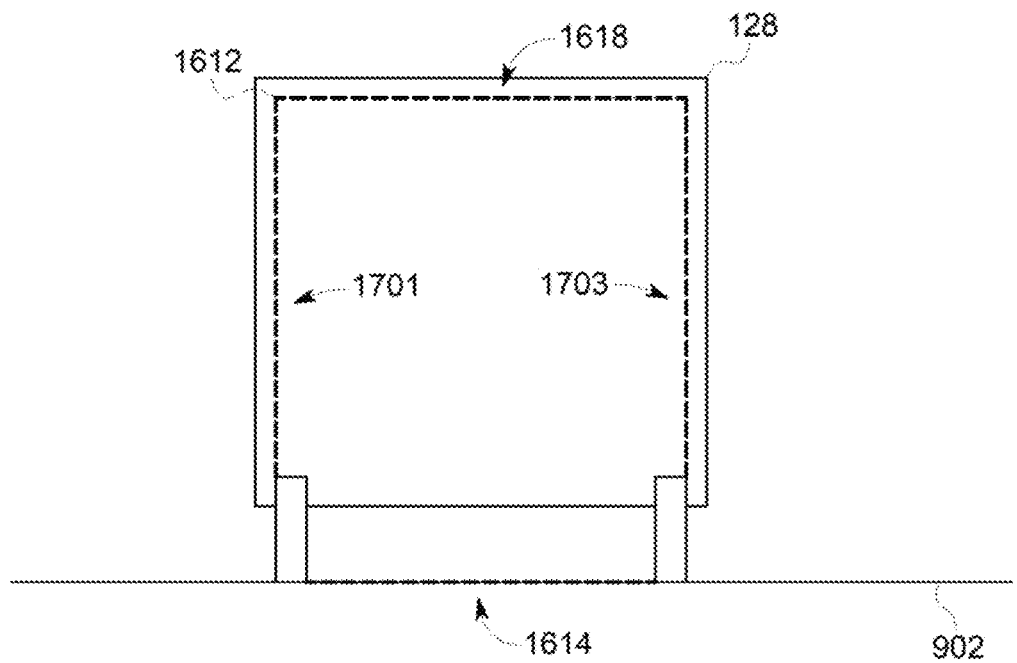
FIG. 11 illustrates a schematic diagram of a front view of a non-aerial vehicle and a movement envelope of an aerial device according to one embodiment.

FIG. 11 illustrates a schematic diagram of a front view of the vehicle 128 and the movement envelope 1612 of the mobile platform 174 (shown in FIG. 7) according to one embodiment. As described above, the movement envelope may be defined by boundaries, such as upper and lower boundaries shown in FIG. 11. The movement envelope optionally may be defined by opposite lateral edges or boundaries 1701, 1703, as shown in FIG. 11. These lateral edges or boundaries may represent parallel, vertically oriented planes that are about perpendicular to the leading edge or boundary of the movement envelope. Similar to the upper edge or boundary of the movement envelope, the lateral edges or boundaries may be defined based on upcoming obstacles above the route. For example, the lateral edges or boundaries may be closer together than opposite vertical sides of an upcoming tunnel, than the distance between trees, buildings, or other objects on opposite sides of the route, etc.

In one embodiment, the movement envelop is a movement corridor represented by a determined distance perpendicular to a determined path or route. For example, a road or track may indicate a ground route, and the movement corridor would be a determine distance on either side of the road or track. An operator of the mobile platform may adjust the distance from the road, which would be the width of the movement corridor, or the movement corridor may be fixed and static as it follows the contours of the road or track. The operator may, for example, set a geofence represented on a map-based graphical user interface (GUI) or human machine interface (HMI). In one embodiment, the movement corridor parameters may be responsive to external factors. For example, the resolution of the sensor package may be affected by environmental factors—sun glare, smoke or haze, ambient light availability, rain, etc. In such a case, the movement corridor may be modified to place the mobile platform so that the sensor package is within the range of the inspected object (such as wayside equipment, road, track, etc.).

The mobile platform may be can automatically prevent it from moving outside of the movement envelope. For example, if autonomously controlled, the control unit of the vehicle and/or onboard the mobile platform can prevent the mobile platform from moving outside of the movement envelope. If manually controlled, the control unit can disregard or otherwise ignore commands entered by an operator that attempt to move the mobile platform outside of the movement envelope.

Figure 12:
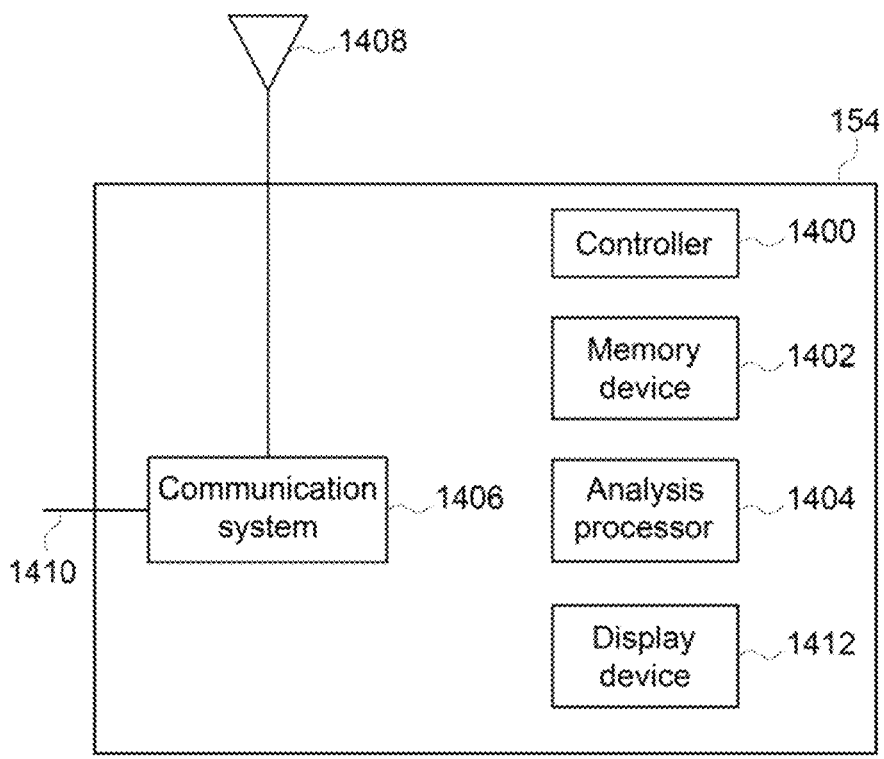
FIG. 12 is a schematic illustration of an image analysis system according to one embodiment.

FIG. 12 is a schematic illustration of the image analysis system 154 according to one embodiment. As described herein, the image analysis system can be used to examine the data content of the image data to automatically identify objects in the image data, damage in the route, or the like. A controller 1400 of the system includes or represents hardware circuits or circuitry that includes and/or is connected with one or more computer processors, such as one or more computer microprocessors. The controller can save image data obtained by the sensor package unit to one or more memory devices 1402 of the imaging system, generate alarm signals responsive to identifying one or more problems with the route and/or the wayside devices based on the image data that is obtained, or the like. The memory device 1402 includes one or more computer readable media used to at least temporarily store the image data. A suitable memory device can include a computer hard drive, flash or solid state drive, optical disk, or the like.

During travel of the vehicle along a route, the sensor package unit(s) onboard the vehicle and/or the mobile platforms can generate image data representative of images and/or video of the field of view of the sensor package unit(s). For example, the image data may be used to inspect the health of the route, status of wayside devices along the route being traveled on by the vehicle, or the like. The field of view of the sensor package unit can encompass at least some of the route and/or wayside devices disposed ahead of the vehicle along a direction of travel of the vehicle. During movement of the vehicle along the route, the sensor package unit(s) can obtain image data representative of the route and/or the wayside devices for examination to determine if the route and/or wayside devices are functioning properly, or have been damaged, need repair, and/or need further examination.

The image data created by the sensor package unit can be referred to as machine vision, as the image data represents what is seen by the system in the field of view of the sensor package unit. One or more analysis processors 1404 of the system may examine the image data to identify conditions of the vehicle, the route, and/or wayside devices. Optionally, the analysis processor can examine the terrain at, near, or surrounding the route and/or wayside devices to determine if the terrain has changed such that maintenance of the route, wayside devices, and/or terrain is needed. For example, the analysis processor can examine the image data to determine if vegetation (e.g., trees, vines, bushes, and the like) is growing over the route or a wayside device (such as a signal) such that travel over the route may be impeded and/or view of the wayside device may be obscured from an operator of the vehicle. The analysis processor can represent hardware circuits and/or circuitry that include and/or are connected with one or more processors, such as one or more computer microprocessors, controllers, or the like.

As another example, the analysis processor can examine the image data to determine if the terrain has eroded away from, onto, or toward the route and/or wayside device such that the eroded terrain is interfering with travel over the route, is interfering with operations of the wayside device, or poses a risk of interfering with operation of the route and/or wayside device. Thus, the terrain "near" the route and/or wayside device may include the terrain that is within the field of view of the sensor package unit when the route and/or wayside device is within the field of view of the sensor package unit, the terrain that encroaches onto or is disposed beneath the route and/or wayside device, and/or the terrain that is within a designated distance from the route and/or wayside device (e.g., two meters, five meters, ten meters, or another distance).

Acquisition of image data from the sensor package unit can allow for the analysis processor 1404 to have access to sufficient information to examine individual video frames, individual still images, several video frames, or the like, and determine the condition of the route, the wayside devices, and/or terrain at or near the wayside device. The image data optionally can allow for the analysis processor to have access to sufficient information to examine individual video frames, individual still images, several video frames, or the like, and determine the condition of the route. The condition of the route can represent the health of the route, such as a state of damage to one or more rails of a track, the presence of foreign objects on the route, overgrowth of vegetation onto the route, and the like. As used herein, the term "damage" can include physical damage to the route (e.g., a break in the route, pitting of the route, or the like), movement of the route from a prior or designated location, growth of vegetation toward and/or onto the route, deterioration in the supporting material (e.g., ballast material) beneath the route, or the like. For example, the analysis processor may examine the image data to determine if one or more rails are bent, twisted, broken, or otherwise damaged. Optionally, the analysis processor can measure distances between the rails to determine if the spacing between the rails differs from a designated distance (e.g., a gauge or other measurement of the route). The analysis of the image data by the analysis processor can be performed using one or more image and/or video processing algorithms, such as edge detection, pixel metrics, comparisons to benchmark images, object detection, gradient determination, or the like.

A communication system 1406 of the system represents hardware circuits or circuitry that include and/or are connected with one or more processors (e.g., microprocessors, controllers, or the like) and communication devices (e.g., wireless antenna 1408 and/or wired connections 1410) that operate as transmitters and/or transceivers for communicating signals with one or more locations. For example, the communication system may wirelessly communicate signals via the antenna and/or communicate the signals over the wired connection (e.g., a cable, bus, or wire such as a multiple unit cable, train line, or the like) to a facility and/or another vehicle system, or the like.

The image analysis system optionally may examine data obtained by the sensor package unit to identify features of interest and/or designated objects in the image data. By way of example, the features of interest can include gauge distances between two or more portions of the route. With respect to rail vehicles, the features of interest that are identified from the image data can include gauge distances between rails of the route. The designated objects can include wayside assets, such as safety equipment, signs, signals, switches, inspection equipment, or the like. The image data can be inspected automatically by the route examination systems to determine changes in the features of interest, designated objects that are missing, designated objects that are damaged or malfunctioning, and/or to determine locations of the designated objects. This automatic inspection may be performed without operator intervention. Alternatively, the automatic inspection may be performed with the aid and/or at the request of an operator.

With regard to the wayside assets, the data capture and/or transfer from the wayside asset to the mobile platform may include such items of information as to the functionality of the wayside asset. For example, the mobile platform may assess whether a switch is set to the left or right, whether a signal light is properly showing a correct color and the light source is functioning properly, and whether the signage is properly situated. To do so, the mobile platform may capture the state of the wayside asset and the date/time for future comparison to what the expected state was supposed to be at that date/time. Or may observe the operation of the wayside asset itself subject to known rules of operation. For example, if a cross-buck should be down while a train traverses an intersection, if there is a train observed as traversing an intersection the mobile platform may observe the state of cross buck and calculate whether it is in the proper state for the current operating conditions. Another example may be a signal light, which may change colors depending on the operational state and situation. In one instance, the mobile platform can detect whether any signal is signaling at all (regardless of whether it is red, yellow, green, or the like) if at least one of the signals is designed to always be present. In another instance, the mobile platform can determine which of the signals is signaling (and functionally healthy) and whether that is the correct signal for the operational circumstance.

In some cases, the wayside asset may not be communicatively coupled to an information network but may collect data, such as data relating to its use and operation, its state of health, the state of health of a proximate transportation network segment (such as an intersection or a length of track), or other information (such as weather, traffic volumes, traffic velocity, types of vehicles passing nearby, which vehicles are on which tracks or in which lanes, whether the vehicles are loaded or unloaded), and the like. In such a case, the mobile platform may communicatively couple to the wayside asset and exchange information therewith. The communication coupling between the wayside device or asset and the mobile platform can be achieved by a wireless connection or communication between the wayside device and the platform that does not pass through or use a communication network, such as a mesh network of wireless routers or devices that communicate other data between other devices, a publicly available network, a private network, or the like. For example, the platform can wirelessly transmit the data directly to the wayside device.

The information that is communicated may include the foregoing, but further may include software updates or software version checks and compliance, navigational calibration data (if, for example, the wayside asset is at a known location the mobile platform may calibrate against that as if it is a location beacon), and the like. The mobile platform may function as an information storage and courier device to transport that data either directly via its own communication network (if so connected) or may physically travel to a location where the mobile platform can exchange the data with a connected network. In such a way, dark territory or remote sensor packages may bridge communication gaps and provide information to the inventive analytics and prognostics system. The vehicle system can communicate data to the platform without using another public or private network of additional communication devices (other than the device sending the data from onboard the vehicle system and the device on the platform receiving the data), and the platform can then communicate the data to one or more other communication devices on a public or private network. For example, the vehicle system can communicate sensor data indicative of damage to a route, bridge, gate, signal, etc. directly to the mobile platform without sending the data through any computing device connected to the Internet or another network that includes devices other than the platform and the communication device onboard the vehicle system. The platform can communicate the data through a network such as the Internet, a private network, or another network that includes devices other than the platform and the communication device onboard the vehicle system at a later time. This can allow the platform to operate as a communication bridge between the vehicle system and one or more networks that are not accessible to the vehicle system.

The image analysis system can use analysis of the image data to detect damage to the route. For example, misalignment of track traveled by rail vehicles can be identified. Based on the detected misalignment, an operator of the vehicle can be alerted so that the operator can implement one or more responsive actions, such as by slowing down and/or stopping the vehicle. When the damaged section of the route is identified, one or more other responsive actions may be initiated. For example, a warning signal may be communicated (e.g., transmitted or broadcast) to one or more other vehicles to warn the other vehicles of the damage, a warning signal may be communicated to one or more wayside devices disposed at or near the route so that the wayside devices can communicate the warning signals to one or more other vehicles, a warning signal can be communicated to an off-board facility that can arrange for the repair and/or further examination of the damaged segment of the route, or the like.

In another embodiment, the image analysis system can examine the image data to identify text, signs, or the like, along the route. For example, information printed or displayed on signs, display devices, vehicles, or the like, indicating speed limits, locations, warnings, upcoming obstacles, identities of vehicles, or the like, may be autonomously read by the image analysis system. The image analysis system can identify information by the detection and reading of information on signs. In one aspect, the image analysis processor can detect information (e.g., text, images, or the like) based on intensities of pixels in the image data, based on wireframe model data generated based on the image data, or the like. The image analysis processor can identify the information and store the information in the memory device. The image analysis processor can examine the information, such as by using optical character recognition to identify the letters, numbers, symbols, or the like, that are included in the image data. This information may be used to autonomously and/or remotely control the vehicle, such as by communicating a warning signal to the control unit of a vehicle, which can slow the vehicle in response to reading a sign that indicates a speed limit that is slower than a current actual speed of the vehicle. As another example, this information may be used to identify the vehicle and/or cargo carried by the vehicle by reading the information printed or displayed on the vehicle.

In another example, the image analysis system can examine the image data to ensure that safety equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

In another example, the image analysis system can examine the image data to predict when repair or maintenance of one or more objects shown in the image data is needed. For example, a history of the image data can be inspected to determine if the object exhibits a pattern of degradation over time. Based on this pattern, a services team (e.g., a group of one or more personnel and/or equipment) can identify which portions of the object are trending toward a bad condition or already are in bad condition, and then may proactively perform repair and/or maintenance on those portions of the object. The image data from multiple different sensor package units acquired at different times of the same objects can be examined to determine changes in the condition of the object. The image data obtained at different times of the same object can be examined in order to filter out external factors or conditions, such as the impact of precipitation (e.g., rain, snow, ice, or the like) on the appearance of the object, from examination of the object. This can be performed by converting the image data into wireframe model data, for example.

In one aspect, the analysis processor of the image analysis system can examine and compare image data acquired by sensor package units of the mobile platform and the vehicle to detect hazards ahead of the vehicle, such as obstacles in front of the vehicle along the route, detect damaged segments of the route, or the like. For example, the mobile platform can include a forward-facing sensor package unit that generates image data representative of a field of view ahead of the mobile platform along the direction of travel 1600 (shown in FIG. 10), a downward-facing sensor package unit that generates image data representative of a field of view beneath the mobile platform, and a rearward-facing sensor package that generates image data representative of a field of view behind the mobile platform (e.g., opposite to the direction of travel of the vehicle and/or between the mobile platform and the vehicle). The vehicle optionally may include one or more sensor package units, such as forward-facing, downward-facing, and/or rearward-facing sensor package units that generate image data.

Figure 13:
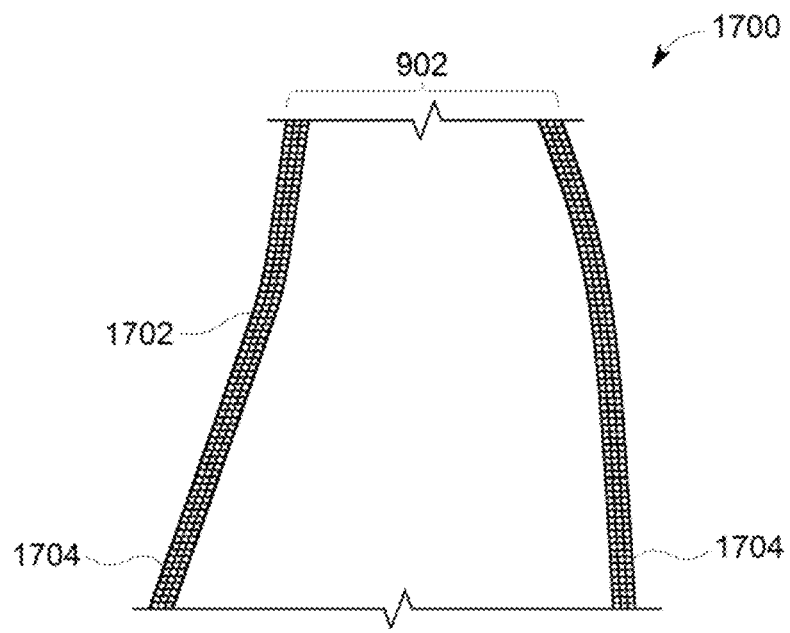
FIG. 13 illustrates one example of image data of a segment of a route.
Figure 14:
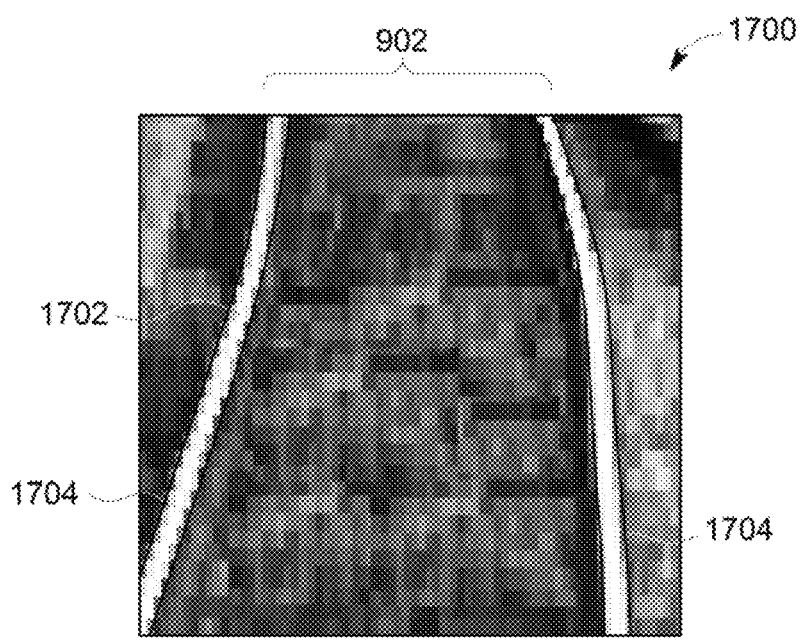
FIG. 14 illustrates another example of the image data shown in FIG. 13.

In one embodiment, the image data from the various sensor package units can be compared to benchmark visual profiles of the route by the image analysis processor to detect obstacles on the route, damage to the route (e.g., breaks and/or bending in rails of the route), or other hazards. FIGS. 13 and 14 illustrate one example of image data 1700 of a segment of the route 902. As shown in FIGS. 13 and 14, the image data may be a digital image formed from several pixels 1702 of varying color and/or intensity. Pixels with greater intensities may be lighter in color (e.g., more white) while pixels with lesser intensities may be darker in color. In one aspect, the image analysis processor examines the intensities of the pixels to determine which portions of the image data represent the route (e.g., rails 1704 of a track, edges of a road, or the like). For example, the processor may select those pixels having intensities that are greater than a designated threshold, the pixels having intensities that are greater than an average or median of several or all pixels in the image data, or other pixels as representing locations of the route. Alternatively, the processor may use another technique to identify the route in the image.

The image analysis processor can select one or more benchmark visual profiles from among several such profiles stored in a computer readable memory, such as the memory device 1402. The memory device can include or represent one or more memory devices, such as a computer hard drive, a CD-ROM, DVD ROM, a removable flash memory card, a magnetic tape, or the like. The memory device can store the image data obtained by the sensor package units and the benchmark visual profiles associated with a trip of the vehicle.

The benchmark visual profiles represent designated layouts of the route that the route is to have at different locations. For example, the benchmark visual profiles can represent the positions, arrangements, relative locations, of rails or opposite edges of the route when the rails or route were installed, repaired, last passed an inspection, or otherwise.

In one aspect, a benchmark visual profile is a designated gauge (e.g., distance between rails of a track, width of a road, or the like) of the route. Alternatively, a benchmark visual profile can be a previous image of the route at a selected location. In another example, a benchmark visual profile can be a definition of where the route is expected to be located in an image of the route. For example, different benchmark visual profiles can represent different shapes of the rails or edges of a road at different locations along a trip of the vehicle from one location to another.

The processor can determine which benchmark visual profile to select in the memory device based on a location of the vehicle when the image data is obtained by sensor package units disposed onboard the vehicle and/or a location of the mobile platform when the image data is obtained by sensor package units disposed onboard the mobile platform. The processor can select the benchmark visual profile from the memory device that is associated with and represents a designated layout or arrangement of the route at the location of the vehicle and/or mobile platform when the image data is obtained. This designated layout or arrangement can represent the shape, spacing, arrangement, or the like, that the route is to have for safe travel of the vehicle. For example, the benchmark visual profile can represent the gauge and alignment of the rails of the track when the track was installed or last inspected.

Figure 15:
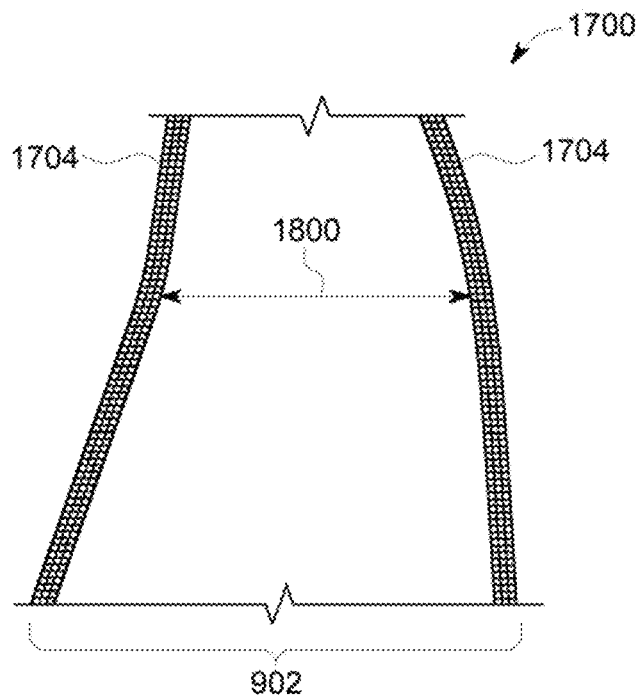
FIG. 15 illustrates another example of the image data of the route.
Figure 16:
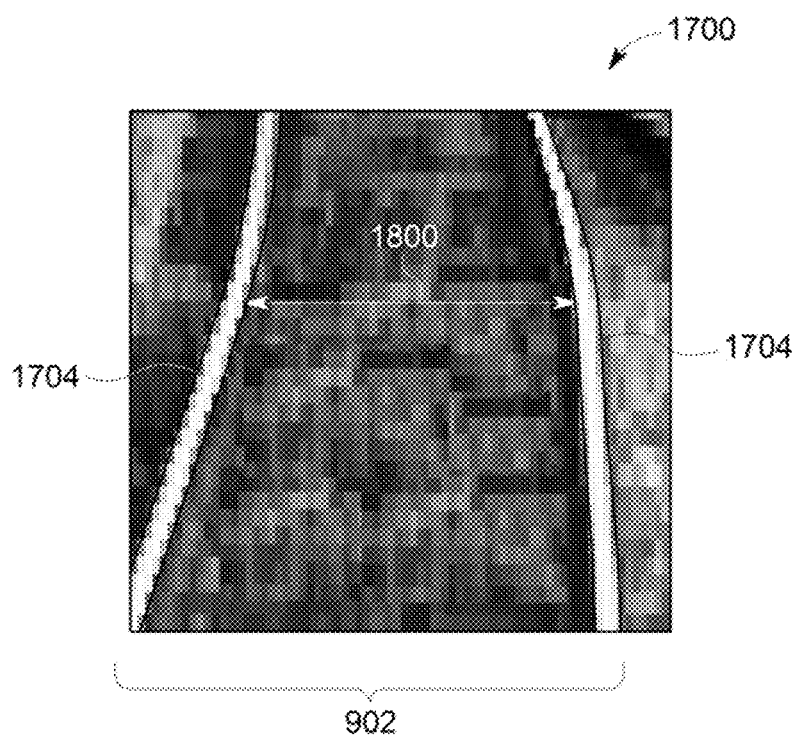
FIG. 16 illustrates another example of the image data of the route.

In one aspect, the image analysis processor can measure a gauge of the segment of the route shown in the image data to determine if the route is misaligned. FIGS. 15 and 16 illustrate another example of the image data of the route. The image analysis processor can examine the image data to measure a gauge distance 1800 between the rails of the route, between opposite sides or edges of the route, or the like. Optionally, the gauge distance can represent a geometric dimension of the route, such as a width of the route, a height of the route, a profile of the route, a radius of curvature of the route, or the like.

The image analysis processor can measure a straight line or linear distance between one or more pixels in the image data that are identified as representing one rail, side, edge, or other component of the route to one or more other pixels identified as representing another rail, side, edge, or other component of the route, as shown in FIGS. 15 and 16. This distance can represent a gauge distance of the route. Alternatively, the distance between other pixels may be measured. The image analysis processor can determine the gauge distance by multiplying the number of pixels between the rails, edges, sides, or other components of the route by a known distance that the width of each pixel represents in the image data, by converting the number of pixels in the gauge distance to length (e.g., in centimeters, meters, or the like) using a known conversion factor, by modifying a scale of the gauge distance shown in the image data by a scaling factor, or otherwise. In one aspect, the image analysis processor can convert the image data to or generate the image data as wireframe model data. The gauge distances may be measured between the portions of the wireframe model data that represent the rails.

The measured gauge distance can be compared to a designated gauge distance stored in the memory device onboard the vehicle (or elsewhere) for the imaged section of the route. The designated gauge distance can be a benchmark visual profile of the route, as this distance represents a designated arrangement or spacing of the rails, sides, edges, or the like, of the route. If the measured gauge distance differs from the designated gauge distance by more than a designated threshold or tolerance, then the image analysis processor can determine that the segment of the route that is shown in the image data is misaligned. For example, the designated gauge distance can represent the distance or gauge of the route when the rails of a track were installed or last passed an inspection. If the measured gauge distance deviates too much from this designated gauge distance, then this deviation can represent a changing or modified gauge distance of the route.

Optionally, the image analysis processor may determine the gauge distance several times as the vehicle and/or mobile platform(s) travel over the route, and monitor the measured gauge distances for changes. If the gauge distances change by more than a designated amount, then the image analysis processor can identify the upcoming segment of the route as being potentially misaligned. As described below, however, the change in the measured gauge distance alternatively may represent a switch in the route that the vehicle is traveling toward.

Measuring the gauge distances of the route can allow the image analysis processor to determine when one or more of the rails in the route are misaligned, even when the segment of the route includes a curve. Because the gauge distance should be constant or substantially constant (e.g., within manufacturing tolerances, such as where the gauge distances do not vary by more than 1%, 3%, 5%, or another value), the gauge distance should not significantly change in curved or straight sections of the route, unless the route is misaligned.

In one embodiment, the image analysis processor can track the gauge distances to determine if the gauge distances exhibit designated trends within a designated distance and/or amount of time. For example, if the gauge distances increase over at least a first designated time period or distance and then decrease over at least a second designated time period, or decrease over at least the first designated time period or distance and then increase over a least the second designated time period, then the image analysis processor may determine that the rails are misaligned. Optionally, the image analysis processor may determine that the rails are misaligned responsive to the gauge distances increasing then decreasing, or decreasing then increasing, as described above, within a designated detection time or distance limit.

Figure 17:
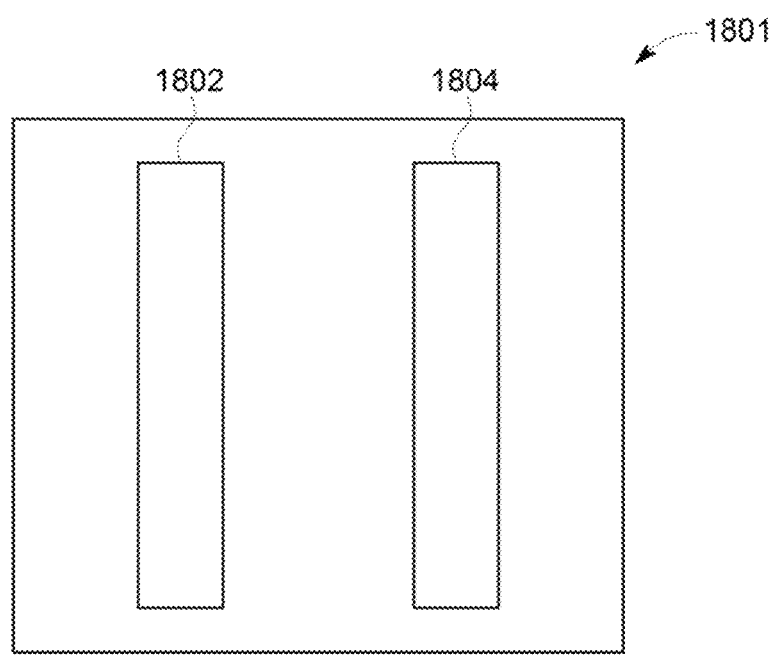
FIG. 17 illustrates an example of a benchmark visual profile.

FIG. 17 illustrates an example of a benchmark visual profile 1801. The benchmark visual profile represents a designated layout of the route 902, such as where the route is expected to be in the image data obtained by one or more of the sensor package units disposed onboard the mobile platform and/or vehicle. In the illustrated example, the benchmark visual profile includes two designated areas 1802, 1804 that represent designated positions of rails of a track, edges or sides of a route, or other components of the route. The designated areas can represent where the pixels of the image data that represent the rails, edges, sides, or the like, of the route should be located if the rails, edges, sides, or the like, are aligned properly. For example, the designated areas can represent expected locations of the rails, edges, sides, or the like, of the route prior to obtaining the image data. With respect to rails of a track, the rails may be properly aligned when the rails are in the same locations as when the rails were installed or last passed an inspection of the locations of the rails, or at least within a designated tolerance. This designated tolerance can represent a range of locations that the rails, edges, sides, or the like, may appear in the image data due to rocking or other movements of the vehicle.

Optionally, the benchmark visual profile may represent a former image of the route obtained by a sensor package unit on the same or a different vehicle. For example, the benchmark visual profile may be an image or image data obtained from a sensor package unit onboard a mobile platform moving ahead of the vehicle and the image data acquired by a sensor package unit disposed onboard the vehicle can be compared to the benchmark visual profile. The designated areas can represent the locations of the pixels in the former image that have been identified as representing components of the route (e.g., rails, edges, sides, or the like, of the route). Alternatively, the former image of the route may be image data obtained from a different source than a mobile platform. Suitable examples of sources may include satellite imagery, ground-based mapping, and the like.

In one aspect, the image analysis processor can map the pixels representative of components of the route to the benchmark visual profile or can map the designated areas of the benchmark visual profile to the pixels representative of the route. This mapping may include determining if the locations of the pixels representative of the components of the route in the image are in the same locations as the designated areas of the benchmark visual profile.

Figure 18:
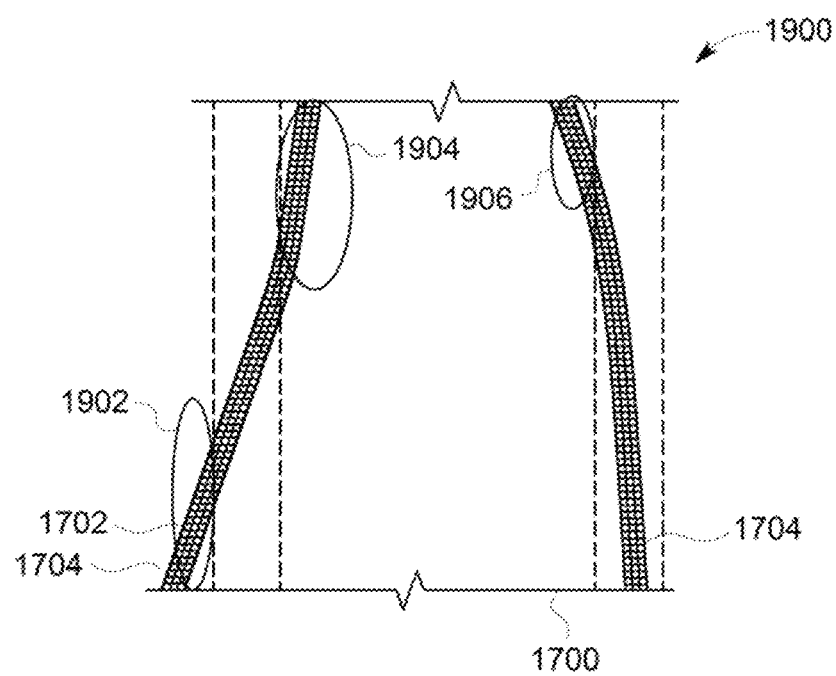
FIG. 18 illustrates a visual mapping diagram of image data and a benchmark visual profile according to one example.
Figure 19:
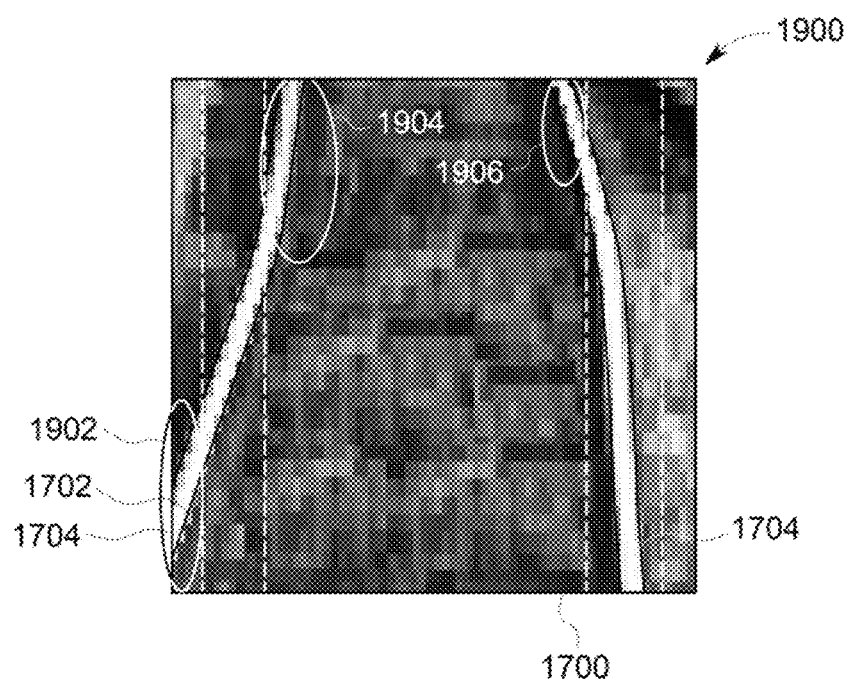
FIG. 19 illustrates another view of the visual mapping diagram shown in FIG. 18.

FIGS. 18 and 19 illustrate different views of a visual mapping diagram 1900 of the image data and the benchmark visual profile 1801 according to one example of the inventive subject matter described herein. The mapping diagram represents one example of a comparison of the image with the benchmark visual profile that is performed by the image analysis processor disposed onboard the vehicle, onboard the mobile platform, and/or off-board the vehicle. As shown in the mapping diagram, the designated areas of the benchmark visual profile can be overlaid onto the image data. The image analysis processor can then identify differences between the image data and the benchmark visual profile. For example, the image analysis processor can determine whether the pixels representing the components of the route are disposed outside of the designated areas in the benchmark visual profile. Optionally, the image analysis processor can determine if locations of the pixels representing the components of the route in the image data (e.g., coordinates of these pixels) are not located within the designated areas (e.g., are not coordinates located within outer boundaries of the designated areas in the benchmark visual profile).

If the image analysis processor determines that at least a designated amount of the pixels representing one or more components of the route are outside of the designated areas in the benchmark visual profile, then the image analysis processor can identify the segment of the route that is shown in the image data as being misaligned. For example, the image analysis processor can identify groups 1902, 1904, 1906 of the pixels that represent one or more components of route as being outside of the designated areas. If the number, fraction, percentage, or other measurement of the pixels that are representative of the components of the route and that are outside the designated areas exceeds a designated threshold (e.g., 10%, 20%, 30%, or another amount), then the segment of the route shown in the image data is identified as representing a hazard (e.g., the route is misaligned, bent, or otherwise damaged). On the other hand, if the number, fraction, percentage, or other measurement of the pixels that are representative of components the route and that are outside the designated areas does not exceed the threshold, then the segment of the route shown in the image data is not identified as representing a hazard.

Figure 20:
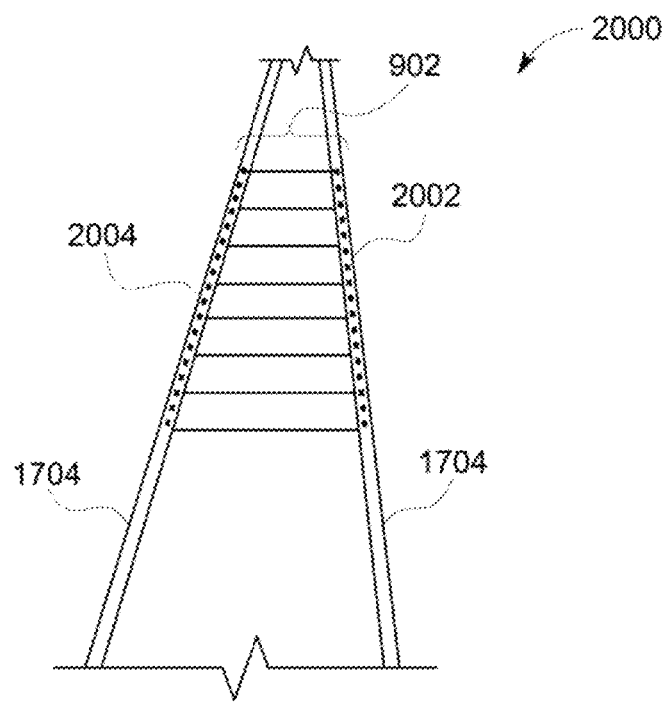
FIG. 20 illustrates image data generated by one or more camera units disposed onboard the vehicle and/or aerial devices and benchmark visual profiles of the route according to another embodiment.

FIG. 20 illustrates image data 2000 generated by one or more sensor package units disposed onboard the vehicle and/or mobile platforms and benchmark visual profiles 2002, 2004 of the route according to another embodiment. The benchmark visual profiles can be created by the image analysis processor from the image data. For example, the image analysis processor can examine intensities of the pixels in the image data to determine the location of the route, as described above. Within the location of the route in the image data, the image analysis processor can find two or more pixels having the same or similar (e.g., within a designated range of each other) intensities. Optionally, the image analysis processor may identify many more pixels with the same or similar intensities. The benchmark visual profiles therefore may be determined without having the profiles previously created and/or stored in a memory.

The image analysis processor then determines a relationship between these pixels. For example, the image analysis processor may identify a line between the pixels in the image for each rail, side, edge, or another component or the route. These lines can represent the benchmark visual profiles shown in FIG. 20. The image analysis processor can then determine if other pixels representative of the components of the route are on or within the benchmark visual profiles (e.g., within a designated distance of the benchmark visual profiles), or if these pixels are outside of the benchmark visual profiles. In the illustrated example, most or all of the pixels representative of the rails of the route are on or within the benchmark visual profiles.

Figure 21:
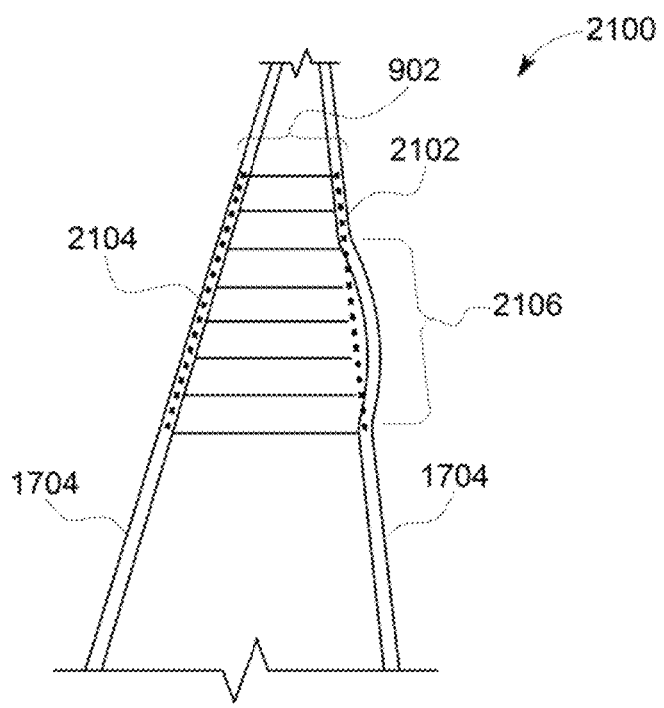
FIG. 21 illustrates other image data with benchmark visual profiles of the route according to another embodiment.

FIG. 21 illustrates other image data with benchmark visual profiles 2104, 2102 of the route 902 according to another embodiment. The benchmark visual profiles may be created using the image data obtained by one or more sensor package units disposed onboard the mobile platform(s) and/or the vehicle, as described above in connection with FIG. 20. In contrast to the image data shown in FIG. 20, however, the image data shown in FIG. 21 shows a segment 2106 of the route that does not fall on or within the benchmark visual profile 2102. This segment curves outward and away from the benchmark visual profile. The image analysis processor can identify this segment because the pixels having intensities that represent the components of the route are no longer on or in the benchmark visual profile. Therefore, the image analysis processor can identify the segment as a hazard (e.g., a misaligned segment of the route) that the vehicle is traveling toward.

In one aspect, the image analysis processor can use a combination of techniques described herein for examining the route. For example, if both rails of the route are bent or misaligned from previous positions, but are still parallel or about parallel to each other, then the gauge distance between the rails may remain the same or substantially the same, and/or may not substantially differ from the designated gauge distance of the route. As a result, only looking at the gauge distance in the image data may result in the image analysis processor failing to identify damage (e.g., bending) to the rails. In order to avoid this situation, the image analysis processor additionally or alternatively can generate the benchmark visual profiles using the image data and compare these profiles to the image data of the rails, as described above. Bending or other misalignment of the rails may then be identified when the bending in the rails deviates from the benchmark visual profile created from the image data.

In one embodiment, responsive to the image analysis processor determining that the image data represents an upcoming hazard on the route, the image analysis processor may direct generate a warning signal to notify the operator of the vehicle of the upcoming hazard. For example, the image analysis processor can direct the control unit of the vehicle to display a warning message and/or display the image data (e.g., obtained from one or more sensor package units onboard the mobile platform moving ahead of the vehicle and/or one or more sensor package units onboard the vehicle). The operator of the vehicle then may have until the vehicle moves through the safe braking distance described above to make a decision as to whether to ignore the warning or to stop movement of the vehicle. If the hazard is detected within the safe braking distance based on the image data obtained from one or more sensor package units of the mobile platform and/or a sensor package unit disposed onboard the vehicle, then the operator of the vehicle may be notified by the image analysis processor of the hazard in the event that the operator has not yet spotted the hazard or is otherwise distracted, thereby allowing the operator to react to try and mitigate the hazard, such as by stopping or slowing movement of the vehicle.

As one example, the image analysis system can examine the image data. The image analysis system can receive image data from one or more sensor package units disposed onboard one or more mobile platforms and/or vehicles, convert the image data into wireframe model data, and examine changes in the wireframe model data over time and/or compare wireframe model data from image data obtained by different sensor package units (e.g., a sensor package unit onboard the mobile platform and another sensor package unit disposed onboard the vehicle) to identify hazards in the route, predict when the route will need maintenance and/or repair, etc. The image data can be converted into the wireframe model data by identifying pixels or other locations in the image data that are representative of the same or common edges, surfaces, or the like, of objects in the image data. The pixels or other locations in the image data that represent the same objects, surfaces, edges, or the like, may be identified by the image analysis system by determining which pixels or other locations in the image data have similar image characteristics and associating those pixels or other locations having the same or similar image characteristics with each other.

The image characteristics can include the colors, intensities, luminance, locations, or other information of the pixels or locations in the image data. Those pixels or locations in the image data having colors (e.g., wavelengths), intensities, and/or luminance that are within a designated range of each other and/or that are within a designated distance from each other in the image data may be associated with each other by the image analysis system. The image analysis system can group these pixels or locations with each other because the pixels or locations in the image data likely represent the same object (e.g., a rail of a track being traveled by a rail vehicle, sides of a road, or the like).

The pixels or other locations that are associated with each other can be used to create a wireframe model of the image data, such as an image that represents the associated pixels or locations with lines of the same or similar colors, and other pixels or location with a different color. The image analysis system can generate different wireframe models of the same segment of a route from different sets of image data acquired by different sensor package units and/or at different times. The image analysis system can compare these different wireframe models and, depending on the differences between the wireframe models that are identified, identify and/or predict hazards such as damage to the route, and/or when maintenance and/or repair is needed for the route.

In one aspect, the image analysis system may have different predicted amounts of damage to the route associated with different changes in the wireframe data. For example, detection of a bend or other misalignment in the route based on changes in the wireframe model data may be associated with more damage to the route than other types of changes in the wireframe model data. As another example, the changing of a solid line in earlier wireframe model data to a segmented line in later wireframe model data can be associated with different degrees of damage to the route based on the number of segments in the segmented line, the size of the segments and/or gaps between the segments in the segmented line, the frequency of the segments and/or gaps, or the like. Based on the degree of damage identified from changes in the wireframe model data, the image analysis system may automatically order maintenance and/or repair of the route.

Figure 22:
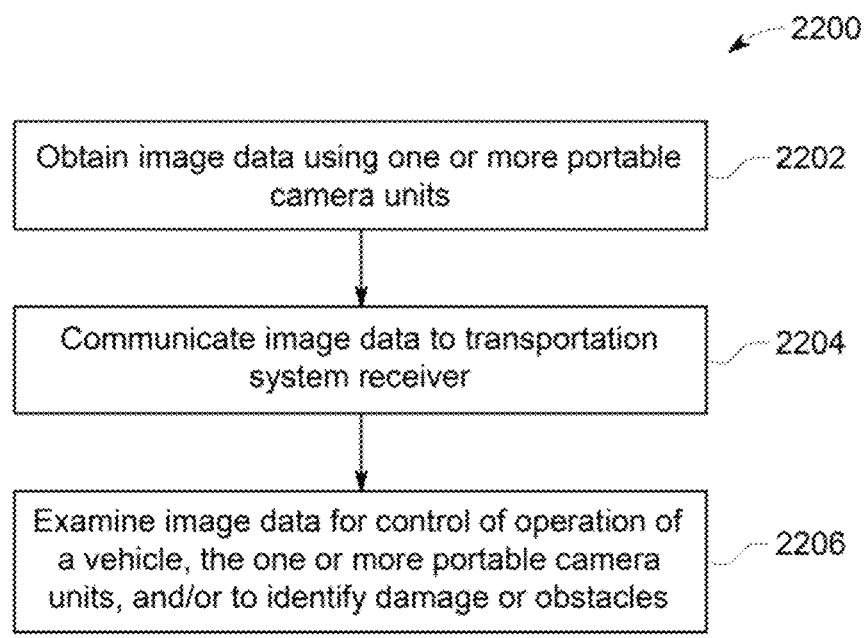
FIG. 22 illustrates a flowchart of one embodiment of a method for identifying route-related hazards.
Figure 23A:
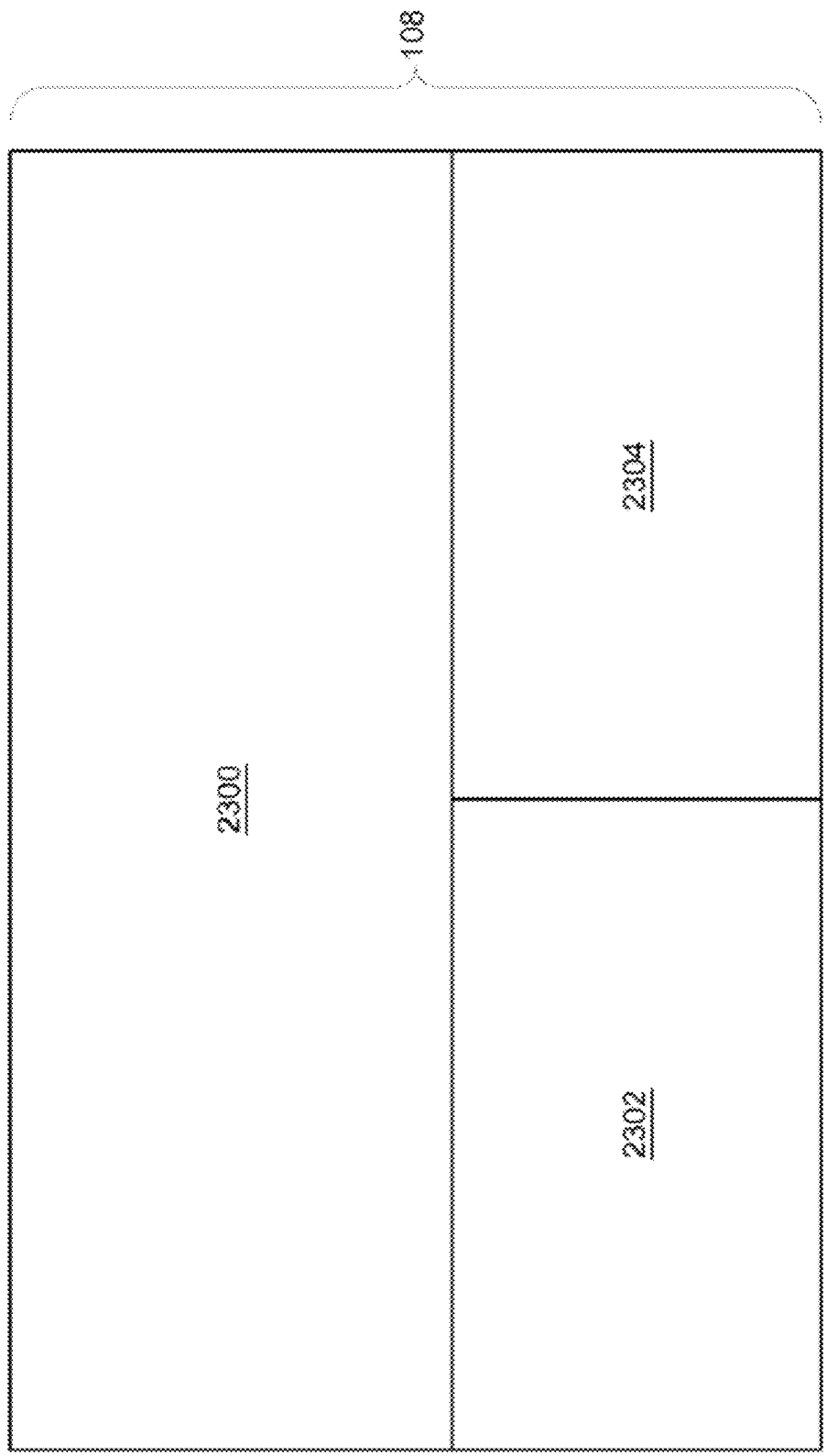
FIGS. 23A-E illustrate a block diagram of one embodiment of the communication device shown in FIG. 1.
Figure 23B:
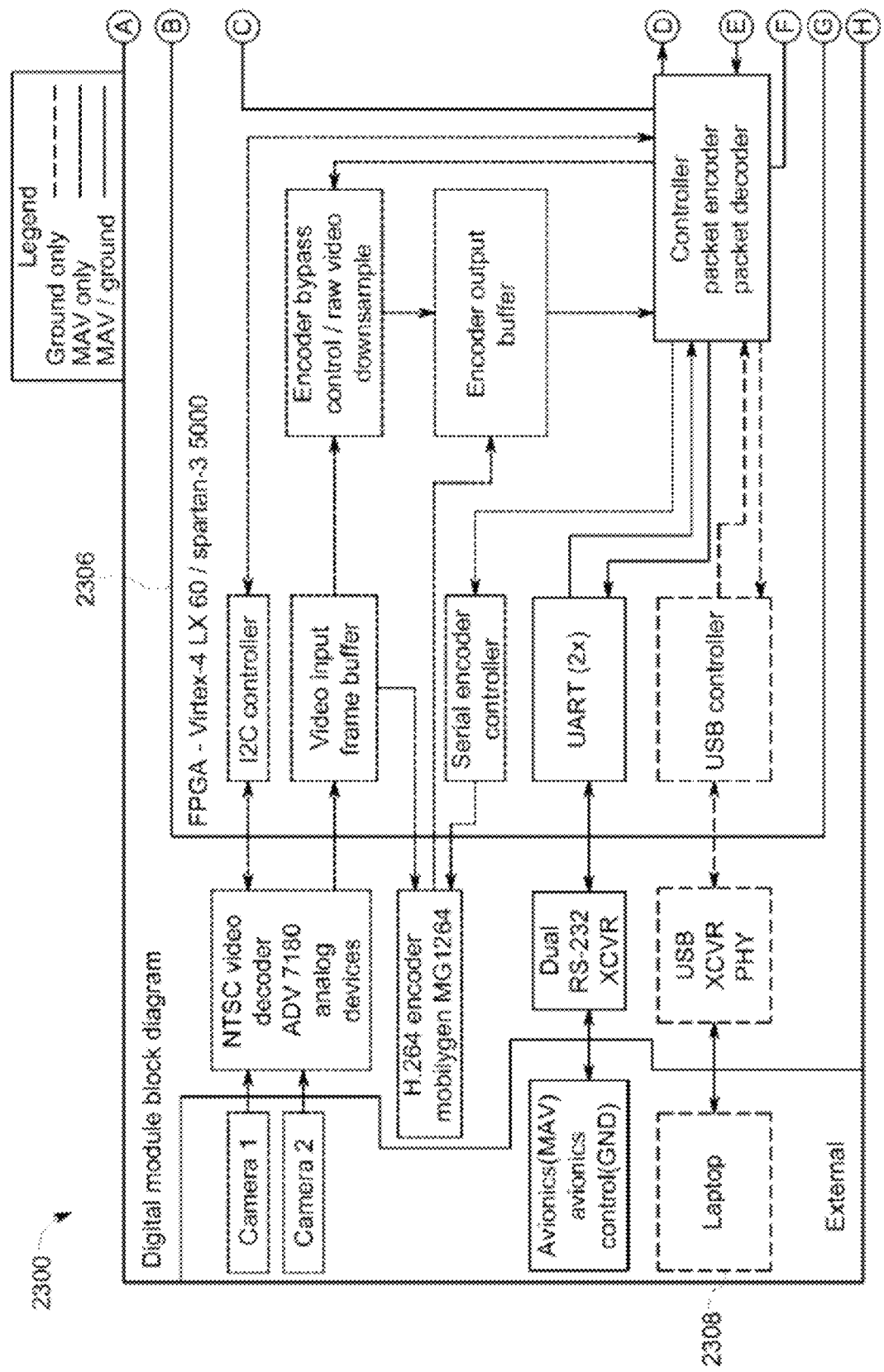
Figure 23C:
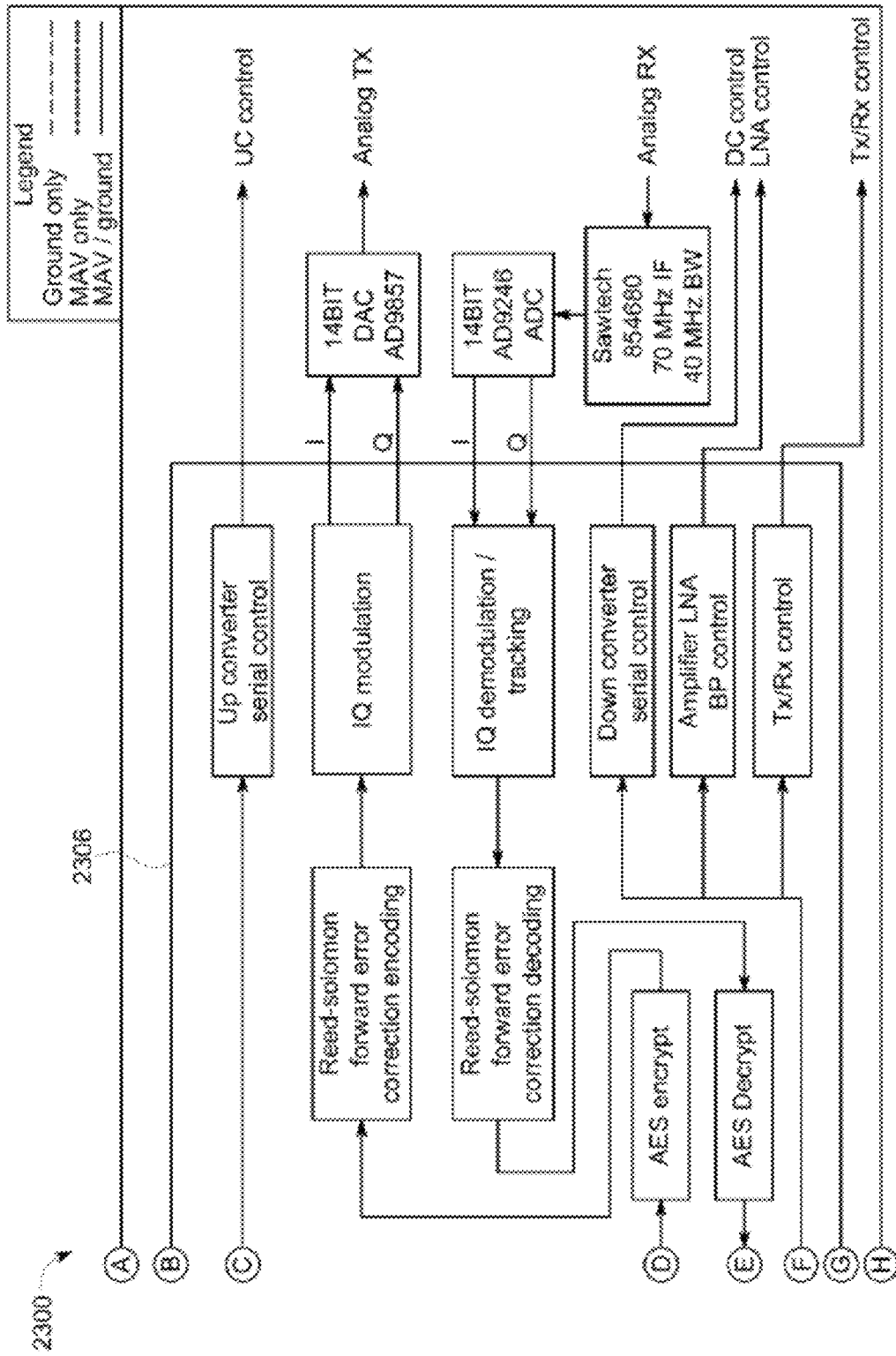
Figure 23D:
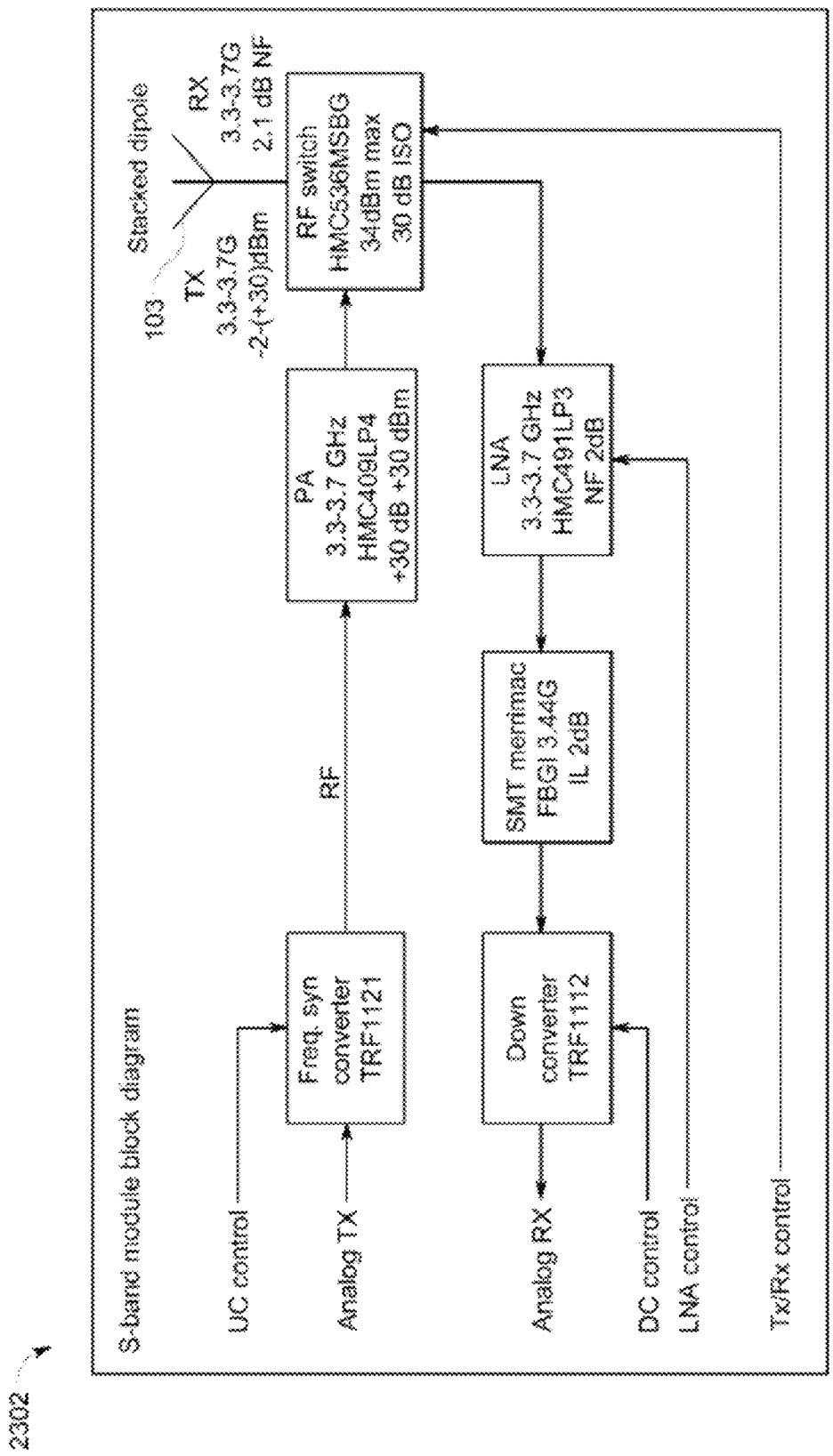
Figure 23E:
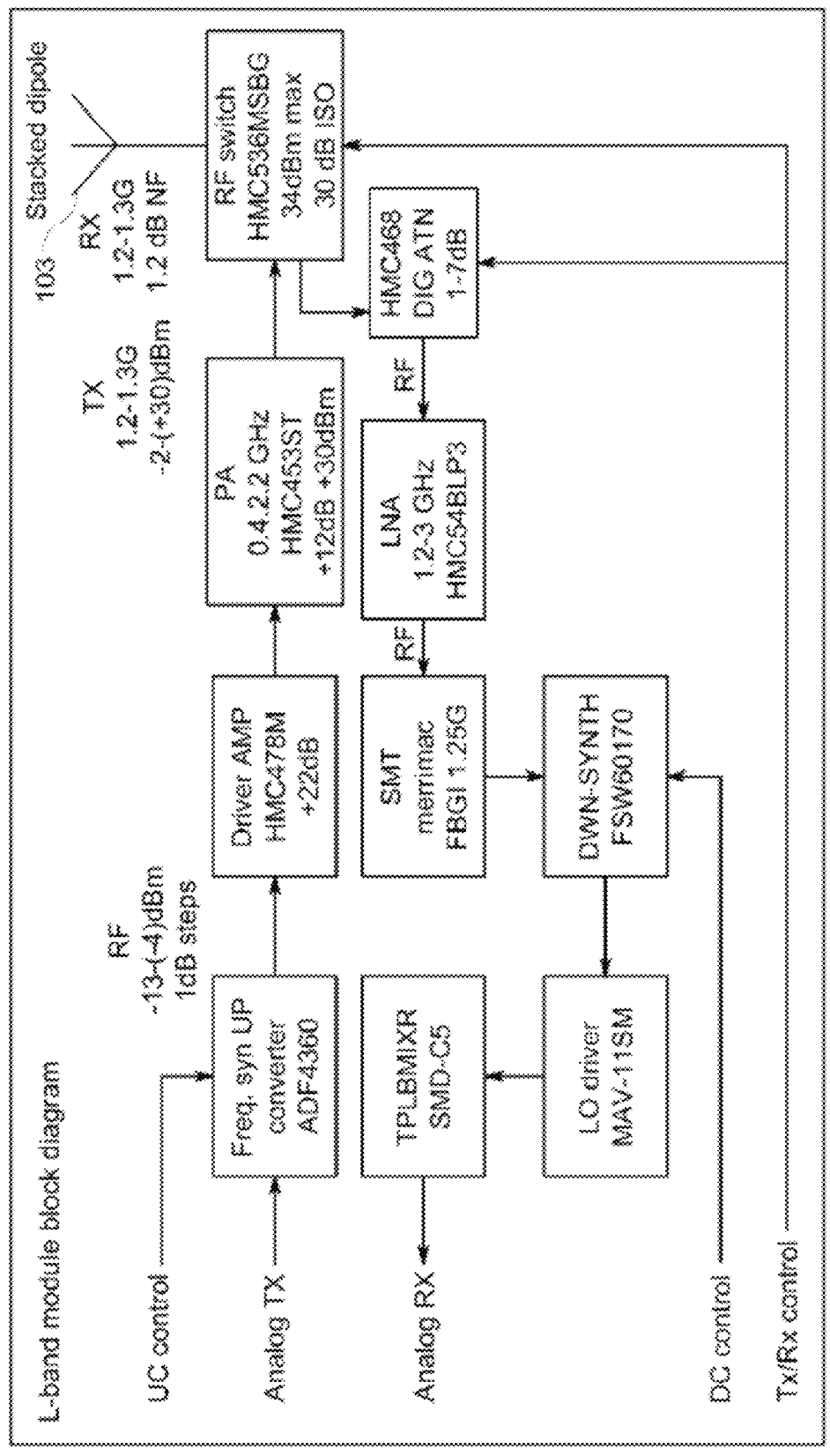

FIG. 22 illustrates a flowchart of one embodiment of a method 2200 for identifying route-related hazards. The method may be practiced by one or more embodiments of the systems described herein. At 2202, image data is obtained using one or more sensor package units. As described above, the portable sensor package units may be coupled to or otherwise disposed onboard one or more mobile platforms moving outside of a vehicle. For example, the mobile platform may move ahead of the vehicle along a direction of travel to capture images and/or video of portions of the route being traveled by the vehicle ahead of the vehicle.

At 2204, the image data is communicated to the transportation system receiver. For example, the image data can be wirelessly communicated from the mobile platform to the transportation system receiver disposed onboard the vehicle. The image data can be communicated as the image data is obtained, or may be communicated responsive to the vehicle and/or the mobile platform entering into or leaving a designated area, such as a geo-fence.

At 2206, the image data is examined for one or more purposes, such as to control or limit control of the vehicle, to control operation of the sensor package unit, to identify damage to the vehicle, the route ahead of the vehicle, or the like, and/or to identify obstacles in the way of the vehicle. For example, if the sensor package unit is disposed onboard a mobile platform moving ahead of the vehicle, then the image data can be analyzed to determine whether a hazard exists between ahead of the vehicle An image analysis system can examine the image data and, if it is determined that one or more hazards are disposed ahead of the vehicle, then the image analysis system can generate a warning signal that is communicated to the control unit of the vehicle. This warning signal can be received by the control unit and, responsive to receipt of this control signal, the control unit can prevent movement of the vehicle. For example, the control unit may disregard movement of controls by an onboard operator to move the vehicle, the control unit may engage brakes and/or disengage a propulsion system of the vehicle (e.g., turn off or otherwise deactivate an engine, motor, or another propulsion-generating component of the vehicle). In one aspect, the image analysis system can examine the image data to determine if the route is damaged (e.g., the rails on which a vehicle is traveling are broken, bent, or otherwise damaged), if obstacles are on the route ahead of the vehicle (e.g., another vehicle or object on the route), or the like.

In one embodiment, a system (e.g., an aerial sensor package system) includes a first mobile platform, a first sensor package unit, and one or more image analysis processors. The first mobile platform can be disposed onboard a non-aerial vehicle as the non-aerial vehicle moves along a route. The first mobile platform also can move above the route during movement of the vehicle along the route. The first sensor package unit can be disposed onboard the first mobile platform and to generate first image data during flight of the first mobile platform. The one or more image analysis processors can examine the first image data and to identify a hazard disposed ahead of the non-aerial vehicle along a direction of travel of the non-aerial vehicle based on the first image data.

In one aspect, the first sensor package unit can generate the first image data representative of a segment of the route disposed ahead of the non-aerial vehicle and the one or more image analysis processors can examine the segment of the route based on the first image data. In one aspect, the one or more image analysis processors can be disposed onboard the non-aerial vehicle and the first mobile platform can wirelessly communicate the first image data to the one or more image analysis processors during flight of the first mobile platform off of the non-aerial vehicle.

In one aspect, the first sensor package unit is a forward-facing sensor package unit of the first mobile platform that generates the first image data representative of an area ahead of the first mobile platform along a direction of travel of the first mobile platform. The system can include one or more of a downward-facing sensor package unit that are disposed onboard the first mobile platform and oriented in a downward direction to generate second image data representative of a portion of the route that is beneath the first mobile platform or a rearward-facing sensor package unit can be disposed onboard the first mobile platform and oriented in a rearward direction to generate third image data representative of a portion of the route that is between the first mobile platform and the non-aerial vehicle.

In one aspect, the first mobile platform can communicate one or more of the second image data or the third image data to the one or more image analysis processors during flight of the first mobile platform. The one or more image analysis processors can examine the one or more of the second image data or the third image data to identify the hazard. In one aspect, the one or more image analysis processors can receive the first image data generated by the first sensor package unit during flight of the first mobile platform and to identify at least one of a broken component of the route or an obstacle on the route based on the first image data. In one aspect, the system also includes a control unit can control the flight of the first mobile platform. The control unit can autonomously prevent the first mobile platform from moving outside of a three-dimensional movement envelope disposed ahead of the non-aerial vehicle during the movement of the non-aerial vehicle.

In one aspect, the system also includes a second mobile platform and a third mobile platform, where each of the first mobile platform, the second mobile platform, and the third mobile platform can dock on the non-aerial vehicle to be charged by and travel with the non-aerial vehicle during movement of the non-aerial vehicle. During a time period that the first mobile platform is moving off of the non-aerial vehicle, the second mobile platform can be charged and landed on the non-mobile platform and the third mobile platform can be landed on and be in the process of being charged by the non-mobile platform.

In one aspect, the non-aerial vehicle is a rail vehicle, and the route is a track on which the rail vehicle can travel. The one or more image analysis processors can be disposed onboard the rail vehicle and the first mobile platform can wirelessly communicate the first image data to the one or more image analysis processors during flight of the first mobile platform off of the rail vehicle. The one or more image analysis processors also can receive the first image data generated by the first sensor package unit during flight of the first mobile platform and to identify at least one of a broken component of the track or an obstacle on the track based on comparing the first image data to a benchmark visual profile of the track. In one aspect, the one or more image analysis processors are disposed off-board the first mobile platform, and the system includes a communication device that is disposed onboard the first mobile platform to wirelessly communicate the first image data to the one or more image analysis processors. The communication device can include one or more communication processors that can communicate the first image data using one or more of L-band communication or S-band communication.

In another embodiment, a method (e.g., a method for identifying route-related hazards) includes generating first image data from a first sensor package unit disposed onboard a first mobile platform that can to land on a non-aerial vehicle during movement of the non-aerial vehicle along a route. The first image data can be generated during flight of the first mobile platform above the route being traveled by the non-aerial vehicle. The method also can include examining (using one or more image analysis processors) the first image data to identify a hazard disposed ahead of the non-aerial vehicle along a direction of travel of the non-aerial vehicle based on the first image data.

In one aspect, the first image data represents a segment of the route disposed ahead of the non-aerial vehicle and the hazard is identified by the one or more image analysis processors by examining the segment of the route based on the first image data. In one aspect, the method also can include wirelessly communicating the first image data from the first mobile platform to the one or more image analysis processors during flight of the first mobile platform off of the non-aerial vehicle. In one aspect, the first image data represents of an area ahead of the first mobile platform along a direction of travel of the first mobile platform, and the method also can include one or more of generating second image data from a downward-facing sensor package unit disposed onboard the first mobile platform and representative of a portion of the route that is beneath the first mobile platform and/or generating third image data from a rearward-facing sensor package unit disposed onboard the first mobile platform and representative of a portion of the route that is between the first mobile platform and the non-aerial vehicle. In one aspect, the method also can include communicating one or more of the second image data or the third image data to the one or more image analysis processors during flight of the first mobile platform, and examining (using the one or more image analysis processors) the one or more of the second image data or the third image data to identify the hazard.

In one aspect, the hazard is identified by the one or more image analysis processors as at least one of a broken component of the route or an obstacle on the route based on the first image data. In one aspect, the method also can include controlling the flight of the first mobile platform by autonomously preventing the first mobile platform from moving outside of a three dimensional movement envelope disposed ahead of the non-aerial vehicle during the movement of the non-aerial vehicle. In one aspect, the non-aerial vehicle is a rail vehicle, the route is a track on which the rail vehicle can travel, and the one or more image analysis processors are disposed onboard the rail vehicle. The method can include wirelessly communicating the first image data to the one or more image analysis processors during flight of the first mobile platform off of the rail vehicle, receiving the first image data generated by the first sensor package unit during flight of the first mobile platform, and identifying at least one of a broken component of the track or an obstacle on the track based on comparing the first image data to a benchmark visual profile of the track.

In another embodiment, another system (e.g., another sensor package system) includes a first mobile platform that can land and dock to a non-aerial vehicle as the non-aerial vehicle moves along a route. The first mobile platform can move off of the non-aerial vehicle and move ahead of the non-aerial vehicle along a direction of travel of the non-aerial vehicle along the route. The system also can include a first sensor package unit that can be disposed onboard the first mobile platform and to generate first image data representative of a portion of the route ahead of the non-aerial vehicle during movement of the non-aerial vehicle along the route. The system can include a second mobile platform that can land and dock to the non-aerial vehicle as the non-aerial vehicle moves along a route. The second mobile platform can move off of the non-aerial vehicle and move ahead of the non-aerial vehicle along the direction of travel of the non-aerial vehicle along the route. A second sensor package unit that is disposed onboard the second mobile platform and to generate second image data representative of the portion of the route ahead of the non-aerial vehicle during movement of the non-aerial vehicle along the route can be included in the system. The system can include one or more image analysis processors disposed onboard the non-aerial vehicle and to receive the first image data and the second image data. The one or more image analysis processors can identify a hazard along the route ahead of the non-aerial vehicle.

In one aspect, the one or more image analysis processors can generate a warning signal to notify an operator of the non-aerial vehicle of the hazard and/or automatically control movement of the non-aerial vehicle responsive to the hazard being identified. In one aspect, only one of the first mobile platform or the second mobile platform flies off of the non-aerial vehicle at a time. In one aspect, the system also can include a control unit that can control flight of the first mobile platform and the second mobile platform. The control unit also can prevent the first mobile platform and the second mobile platform from moving outside of a three-dimensional movement envelope defined ahead of the non-aerial vehicle. In one aspect, the control unit can change a size of the movement envelope based on one or more of a speed of the non-aerial vehicle, a coefficient of friction between the route and the non-aerial vehicle, a grade of the route, and/or a radius of curvature of the route.

In one aspect, the non-aerial vehicle is a rail vehicle, and the route is a track on which the rail vehicle can travel. The one or more image analysis processors can be disposed onboard the rail vehicle and one or more of the first mobile platform or the second mobile platform can wirelessly communicate one or more of the first image data or the second image data to the one or more image analysis processors during flight of the one or more of the first mobile platform or the second mobile platform off of the rail vehicle. The one or more image analysis processors can receive the one or more of the first image data or the second image data generated by one or more of the first sensor package unit or the second sensor package unit during flight of the one or more of the first mobile platform or the second mobile platform and to identify at least one of a broken component of the track or an obstacle on the track based on comparing the one or more of the first image data or the second image data to a benchmark visual profile of the track.

One or more embodiments of the inventive subject matter described herein relate to a vehicle control system, and to associated methods of vehicle control. This "holistic inspection system" may obtain and use information from multiple sources to allow the vehicle control system to operate in a determined manner. While several examples of the inventive subject matter are described in terms of rail vehicles, not all embodiments of the inventive subject matter are limited to rail vehicles. At least some of the inventive subject matter may be used in connection with other vehicles, such as mining equipment, automobiles, marine vessels, airplanes, over the road trucks, or the like. And, where appropriate, the term track may be interchanged with path, road, route, or the like as may be indicated by language or context. Further, the term track (as well as path, road, route, etc.) may include specific segments of such, and further may include features that form a part of the track. For example, reference may be made to a bridge or other infrastructure that forms part of the route.

By having route detection (rail and track geometry) mounted on a powered vehicle, with sensors mounted on each car mechanically or logically coupled to the powered vehicle and communicating therewith, the powered vehicle may be "aware" of an operational change, deviation or failure on either or both of the track or the coupled car component, and a vehicle control system of the vehicle can responsively initiate a new operating mode in which the powered vehicle changes its speed, direction, or some other operating parameter. In addition, the track and vehicle system status detection may be more continuous, and less discrete or segmented (either by time or by space, or by both time and space). And, analysis of historical data may provide prognostic information relating to a particular vehicle operating at a particular track location. As used herein, the term continuous means generally without significant interruption. The term discrete means confined to a location/geography or to a period of time. For example, discrete examination of a route may refer to a measurement or other examination of the route that occurs during a finite time period that is separated (in terms of time and/or location) from other discrete examinations by a significantly longer period of time than the finite time period. In contrast, continuous examination may refer to a measurement or other examination of the route that extends over a longer period of time (e.g., during an entire trip of a vehicle system from a starting location to a final destination location of the trip), that is frequently repeated, or the like. In one embodiment, discrete examinations of the route may be separated in time and/or location such that the condition of the route may significantly change between the discrete examinations. For example, a first discrete examination of the route may not identify any crack, pitting, or the like, of the route, but a subsequent, second discrete examination of the route may identify one or more cracks, pits, or the like, at the same location along the route. In contrast, a continuous examination of the route may be frequently repeated and/or non-stop such that the changing condition of the route is detected as the route condition is changing (e.g., the examination may witness the damage to the route).

In one embodiment, a system includes route examination equipment and a controller. The route examination equipment can obtain a route parameter indicative of a condition of a route over which a vehicle system travels. The controller receives the route parameter, and examines the route parameter to determine the condition of the route. The controller controls at least one operational aspect of the vehicle system in response to the determined condition of the route.

The route examination equipment can include one or both of a stationary wayside unit and a mobile route inspection unit. Suitable stationary wayside units may include one or more of a video (visible light) sensor unit, an infrared sensor unit, and an electrical current sensor. The electrical current sensor can determine if an electrical break or an electrical short has occurred in a monitored segment of the route. If the vehicle system is one of a plurality of like vehicle systems, and the mobile route inspection unit includes an inspection system mounted on another, second vehicle system of the plurality of vehicle systems operating over the segment of the route prior to the first vehicle system then the system can use data for a route segment even if it was inspected by a different vehicle system's equipment. The system can, for example, organize the inspection results by chronology so as to present a trend over time and then can use that trend information predictively. Additionally or alternatively, the system can use a data set from a particular period, and then refer to a table (or the like) to determine what the expected degradation rate would be from the time of the data set until the time the vehicle is expected to travel over the corresponding segment.

Other suitable mobile route inspection units may include one or more of a drone or unmanned vehicle, an inspection system secured to the vehicle system at it travels over a segment of the route, or an inspection system mounted on an inspection vehicle having the primary purpose of inspecting the route. A primarily purposed inspection vehicle may include a Hi-Rail vehicle (with respect to rail usage) having gel-filled ultrasound wheels. A mounted inspection system may be secured to (again, with reference to rail usage) the locomotive and/or one or more of the rail cars. For on-road vehicles, the mounted inspection system can be secured to automobiles, tractor-trailers, busses, and the like.

Where the route parameters are collected by a drone, the drone can obtain images of the route using one or more of visible light video, infrared, Light Detection and Ranging (Lidar), ultrasound, and radar. Suitable drones can include an aerial drone or a surface vehicle. If the drone is a surface vehicle drone it may be autonomous or semi-autonomous as it travels over the segment of the route. Other suitable surface drones may be remotely piloted.

The stationary wayside unit may provide substantially continuous signals indicating the condition of the route, while the mobile route inspection unit may provide substantially periodic signals indicating the condition of the route. To be clear, the signal from the mobile unit may be continuous in its operation, but it may pass over a particular geography periodically. The controller can determine the condition of the route based at least in part on both the substantially continuous signals and on the substantially periodic signals. And, to do so, it may need to pull information from different data sets so that it can match data for a particular route segment. And, as mentioned, it may need to organize the data for a given segment based on the time stamp.

With regard to the at least one operational aspect of the vehicle system, in one embodiment the operational aspect is vehicle system speed. The controller can control the vehicle system speed over the route, and particularly the route segments, based on the determined condition relative to a determined threshold value for that condition. If the condition indicates the route is impassible (e.g., for a rockslide or a washout) the controlled vehicle system speed may be zero to stop the vehicle system prior to the vehicle system arriving at a segment of the route. Of note, the signal to stop would not be expected to be applied upon the mere identification of the route hazard. The vehicle system may still be many miles away from the segment in question. It may be slowed, it may be re-routed, or it may be slowed to a stop based on the stopping distance for a particular vehicle type. Additional messages, such as to initiate a fix of the route damage (e.g., repair a broken rail, fill a pot hole, etc.) may be generated and sent to the appropriate agency to remedy the situation. As noted, in one embodiment, the at least one operational aspect of the vehicle system is the route, and the controller can control the vehicle system to change at least a portion of the route from a first route portion to a second route portion, if the first route portion has a segment that has the determined condition below a determined threshold value and if the second route portion does not include the segment with the determined condition. In another embodiment, the operational aspect may be to urge the vehicle relatively left, right, up or down compared to an otherwise unaltered path.

Expanding on the determined condition, suitable conditions that may require the controller to respond may include one or more of a broken rail if the vehicle system is a locomotive, a rockslide or mudslide over the route, a washout of the route, a snow drift over the route, pitting, potholes downed power lines, obstacles in an upcoming crossing, loose ties, missing ballast, sinkholes, fissures, heavy fog, ice, and the like.

Where the route examination equipment is a drone, and the drone can switch operating modes, the switch is to shift from a first operating mode of identifying the segment of the route having a determined condition to a second operating mode where the drone can signal a location of the segment, signal a type of determined condition, signal a location of the route examination equipment, signal information about the segment of the route, perform additional sensing tests or procedures that are different from those used in the identifying of the segment, and control the route examination equipment movement. Controlling the route examination equipment movement may include one or more of the drone hovering for a determined period proximate to the segment, landing proximate to the segment, parking the route proximate to the segment, changing positions to obtain additional perspectives of the segment, and obtaining higher definition or closer images of the segment. During operation, the system can obtain one or more route parameters indicative of a condition of a segment of a route over which a vehicle system travels; determine the condition of the segment of the route based on the one or more route parameters; and control at least one operational aspect of the vehicle system in response to the determined condition of the route. Controlling at least one operational aspect of the vehicle system may include, for example, slowing, stopping or rerouting the vehicle system in response to the condition of the route segment being below a determined threshold prior to or during the vehicle system traversing the segment. In one embodiment, two or more route parameters may be used. And, in one embodiment, vehicle operating parameters indicating a condition of the vehicle systems may be combined with the condition of the route to further allow the controller to control the operation of the vehicle system.

Additionally or alternatively, in one embodiment, the system can obtain a status of the vehicle system, and can control the operational aspect of the vehicle system in response to both the determined condition of the route and to the status of the vehicle system. For example, a vehicle with new tires may not be instructed to slow but a vehicle with worn tires may be instructed to slow when approaching a stretch of road that has an indication of a certain amount of snow or ice relative to a threshold level of snow or ice (using an on-road example). Or, a passenger car might be instructed differently than a tractor-trailer rig under a heavy load. Additional stopping distance or time might be needed, different speed limits might be in play, and so on.

Figure 25:
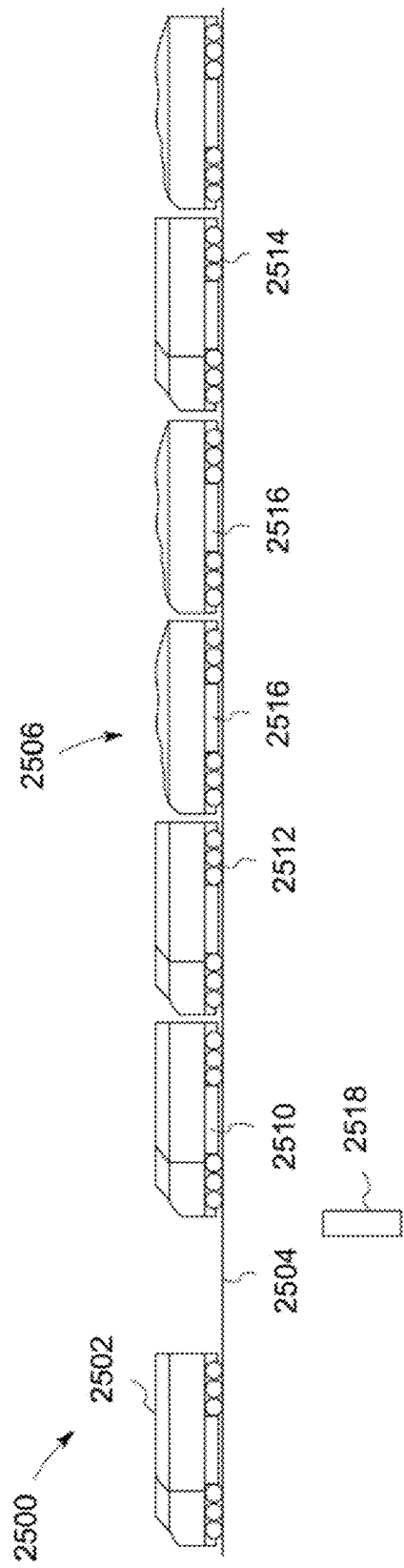
FIG. 25 illustrates one embodiment of an examination system.

With reference to FIG. 25, a schematic illustration of an embodiment of an examination system 2500 is shown. The system includes a test vehicle 2502 (e.g., the mobile platform 174 or another vehicle 128) disposed on a segment of route 2504 leading a vehicle system 2506 (e.g., the vehicle 128). The route can be a track, road, or the like. The test vehicle can represent a rail test vehicle and the vehicle system can represent a train. Optionally, the vehicle may be another type of vehicle, the track can be another type of route, and the train can represent a vehicle system formed from two or more vehicles traveling together along the route. The vehicle system includes a lead vehicle 2510 and a trail vehicle 2512 in consist, and a remote vehicle 2514 operating under a distributed power system, such as Locotrol Distributed Power available from GE Transportation. Between the trail vehicle and the remote vehicle are a plurality of cars 2516. The vehicles and cars can represent locomotives and rail cars, but optionally can represent other types of vehicles. The vehicles 2512, 2514 may be referred to as propulsion-generating vehicles and the cars 2516 may be referred to as non-propulsion-generating vehicles. A wayside unit 2518 is disposed proximate to the route. The wayside unit is one of a plurality of such units (not shown) that are dispersed periodically along the route. A drone that can travel down the route is not shown. At least the lead vehicle has communication equipment that allows for data transmission with one or more other equipment sets off-board that vehicle. Suitable offboard equipment may include, as examples, cellular towers, Wi-Fi, wide area network (WAN) and Bluetooth enabled devices, communication satellites (e.g., low Earth orbiting or "LEO" satellites), other vehicles, and the like. These communication devices may then relay information to other vehicles or to a back office location. The information that is communicated may be in real time, near real time, or periodic. Periodic communications may take the form of "when available" uploads, for data storage devices that upload to a data repository when a communication pathway is opened to them. Also included are manual uploads, and the like, where the upload is accomplished by downloading the information to a USB drive or a computing device (smart phone, laptop, tablet and the like), and from that device communicating the information to the repository.

With regard to the test vehicle, the test vehicle may be run over the route at a certain frequency or in response to certain trigger conditions. Examination equipment 2700 (shown in FIG. 27) onboard the test vehicle includes sensors that measure one or more parameters. The parameters can include route parameters, structure parameters, and/or environmental parameters. The route parameters may include level, grade, condition, spalling, gauge spread, and other forms of damage to the route. Structure parameters may further include information about the route bed and ballast, joints, the health of ties or sleepers, fasteners, switches, crossings, and the sub-grade. Environmental parameters may include information relating to proximate surroundings (such as brush or trees), or other such conditions on or near the route, grease or oil, leaves, snow and ice, water (particularly standing or flowing water on the tracks), sand or dirt build up, and the like.

The test vehicle may be land based on rails (as in the illustrated embodiment), but may be a hi-rail vehicle, may travel alongside the route (that is, wheeled), or may be airborne in the form of a drone, for example. The test vehicle may be a self-propelled vehicle, or the test vehicle may be manually run along the route such as, for example, the Sperry B-Scan Single Rail Walking Stick (available from Sperry Rail Service, a Rockwood Company) or pulled by a powered vehicle. The examination equipment 300 onboard the test vehicle may use video, laser, x-ray, electric induction, and/or ultrasonics to test the route or a catenary line for faults, defects, wear, damage, or other conditions. For ease of discussion, all references to route will include a reference to catenary lines as appropriate. The test vehicle may include a location device (such as a global positioning system receiver) so that the segment of the route being tested at a discrete point in time and location can result in a route profile.

The locomotive may include a location device and sensors that detect operational information from the locomotive. In such a way, for example, an impact sensor on the locomotive may record an impact event at a known time and location. This may indicate, among other things, a fault, defect, wear or damage (or another condition) of the track. Alternatively, the detected event may be associated with, for example, a wheel and not the track. A wheel with a flat spot, or that is out of alignment, or that has some other defect associated with it may be identified by sensors on board the locomotive. The locomotive may include the communication device that allows such information to be communicated to a back office, and may include a controller that may analyze the information and may suggest to the locomotive operator or may directly control the operation of the locomotive in response to an analysis of the information.

The rail car may include sensors that, like the locomotive, detect events associated with the track, a catenary line, the rail car, or both. Further, communication devices may be mounted on or near the rail car sensors. In one embodiment, these communication devices may be powerful enough to communicate over a distance and directly port sensor data to an off-board receiver. In another embodiment, the rail car communication devices are able to feed data to one or more locomotives. The communication feed through may be wired (for example, the Ethernet over multiple unit (eMU) product from GE Transportation) or wireless. The locomotive may then store and/or transmit the data as desired.

The wayside detectors may include sensors that measure impact force, weight, weight distribution and the like for the passing train. Further, other sensors (e.g., infrared sensors) may track the bearings health and/or brake health, and the health and status of like propulsion components. In one example, a locked axle for an AC combo may heat up and the heat may be detected by a wayside monitor.

Figure 26:
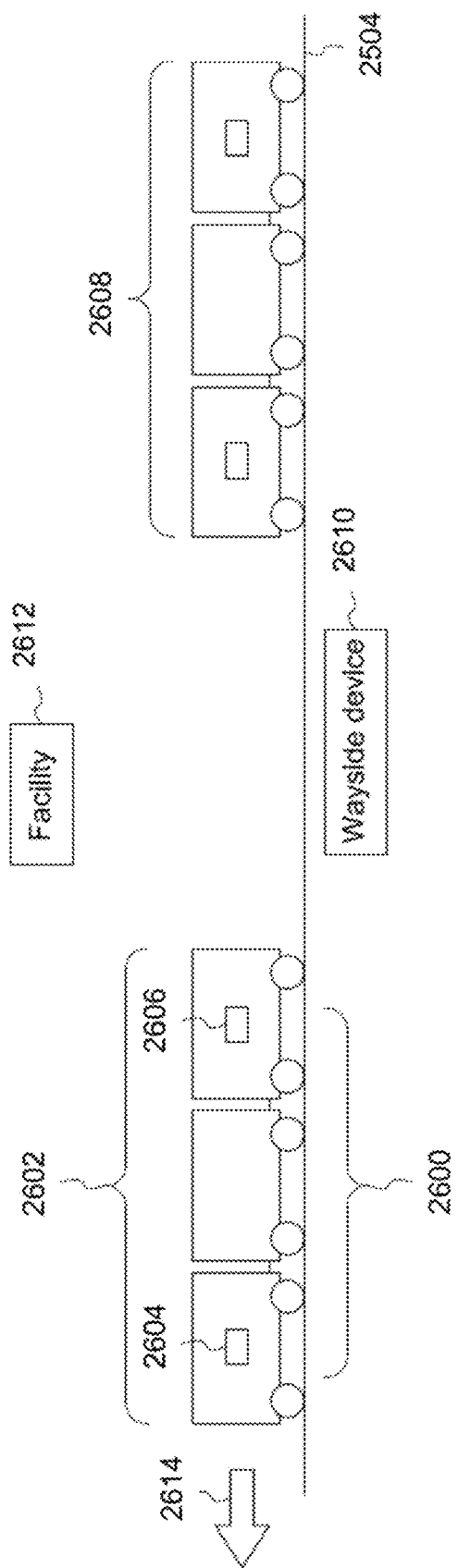
FIG. 26 illustrates a segment of track occupied by a first train set and a trail vehicle that has an impact sensor.

With reference to FIG. 26, a segment of track 2600 is occupied by a first train set 2602 that includes a lead vehicle having an inductance based broken rail detection system 2604 and a trail vehicle that has an impact sensor 2606 that can sense the health of the rail tracks over which it runs. A second train set 2608 is traveling on a different portion of the same track as the segment with the first train set. A wayside device 2610 is disposed proximate to the track. A back office facility 2612 is remote from the first train set, the second train set and the wayside device.

During operation, the broken rail detection system and the impact sensor can sense discontinuities in the track and/or in the wheels (e.g., by sensing or measuring accelerations in one or more directions with an accelerometer). That information is supplied to the locomotive powering the first train set (not shown), and is reported to the facility. The information from the wayside notes the health of the wheels and combos of the first train set as it passes the wayside device. The wayside device reports that information to the facility. There may be a period of time and/or distance prior to which the health of the wheels and combos of the first train set are not monitored by a wayside device. This may be due to the spacing of the wayside devices relative to each other along the route. Of note, just as the wayside devices may provide health information at discrete distances, if the route is checked by rail test vehicles periodically such health information is provided at discrete times. Further, the accuracy and reliability of the periodic rail test vehicle will diminish and degrade over time.

The locomotive, or powered vehicle, may be informed of the information from onboard sensors, as well as the historic data about the upcoming track from a rail test vehicle from one or more previous surveys of the track segment, and further with information from the wayside device or devices about the track segment and/or the wheel and/or combo health of the rail cars coupled to the locomotive. With this information, a controller in the locomotive may alter the operation of the locomotive in response to encountering a section of track in which there is a concern about the health or quality of the track, or in response to the health of a wheel or combo on a rail car in the train powered by the locomotive.

In one embodiment, the train may be traveling along the route in a direction 2614 according to a trip plan that designates operational settings of the train as a function of one or more of distance along the route or time. For example, the trip plan may dictate different speeds, throttle positions, brake settings, etc., for the train at different locations along the route. A locomotive pulling the first train set illustrated in FIG. 26 communicates with the facility and downloads data (learns) to the effect (for example) that the three previous rail test cars passing through a curve in an upcoming rail section detected that there were signs of the beginnings of cracks in the rails. The rails were still "in spec" when tested, but just barely, and further, there had been heavy traffic over that segment in the previous days since the last test. Further, the last wayside device noted rather severe flat spots on a damaged rail car towards the end of the mile-long first train set. The locomotive controller may then alter the trip plan in response to the information received from the various information sources. For example, the locomotive may slow down the entire first train set to navigate the curve in the track segment, and when the damaged rail car is set to enter the curve the locomotive may slow the first train set down to an even slower speed. The impact from the flat wheel spots at the slower speed may have a correspondingly lower chance of damaging the track at the curve, or of breaking either the track or the wheel set. After the first train set has cleared the curve and the track health is improved relative to the curve the locomotive may accelerate back to normal speed or to a third speed that is determined to be an efficient speed based on the health of the damaged rail car's wheel and the health of the track.

Using a different example, the combination of discrete information sources (geographically discrete and temporally discrete) with continuous monitoring by an on-board rail health monitor and/or broken rail detector allows for the controller in the locomotive to provide real time control over the speed and operation of the train. In one embodiment, information from a wayside detector can inform a locomotive that there is a problem or potential problem with a wheel and/or combo. The locomotive may then switch operating modes based on that information. One potential operating mode involves slowing or stopping the train. Another potential operating mode involves monitoring the train set for indications that the wheel and/or combo are exhibiting the problem. For example, if a wayside detector indicates that there is a hot axle, the locomotive can monitor the train for increased drag. If an axle seizes up, the increased resistance (or increased coupler force if there is a coupler sensor) can be detected as increased drag and an on-board the rail car sensor can alert the locomotive controller. The controller can then implement a determined action in response to detecting the increased drag.

Suitable other operating modes may include the use or prevention of the use of adhesion modifiers. Adhesion modifiers may be materials applied to a section of the track, such as lubricants or traction enhancers. Naturally, the lubricants may reduce friction and grip, while the traction enhancers increase it. Suitable traction enhancers may include blasted air (under defined conditions) as well as sanding and other traction enhancing techniques. Yet another operating mode may include engaging or disabling a dynamic weight management (DWM) system. The DWM system may include one or more motors that lift or drop (e.g., relative to an upper surface of a route being traveled upon) one or more axles to affect the weight distribution of a vehicle or vehicle system. And, another operating mode may reduce or increase wheel torque, may engage or prevent one or the other of dynamic braking or air braking, or may control the rate at which a vehicle may change its rate of acceleration or deceleration (for locomotives, that may be the rate at which notch levels may be changed).

In one embodiment, the combination of information from the plurality of discrete sources and the continuous source(s) is used to reduce or prevent derailment due to a broken wheel. In one embodiment, the combination of information from the plurality of discrete sources and the continuous source(s) is used to prevent derailment due to a locked axle. In one embodiment, the combination of information from the plurality of discrete sources and the continuous source(s) is used to prevent derailment due to a broken rail. In various embodiments, other sources of information may provide additional information. For example, weather services may provide data about the current, previous, or upcoming weather events.

In other contemplated embodiments, logically coupled or remote controlled vehicles may be used rather than locomotives. Logically coupled groups of vehicles include those that are not mechanically coupled (as are locomotives, multi-unit over-the-road trucks, and the like) but rather have a control system that operates the vehicle (speed, direction, and the like) relative to another vehicle that is nearby or relative to a stationary object. In that manner, a lead vehicle may have a human operator with a trail vehicle that is otherwise driverless and is controlled by the lead vehicle so that it, for example, follows behind and mirrors the movement and speed of the lead vehicle.

Figure 27:
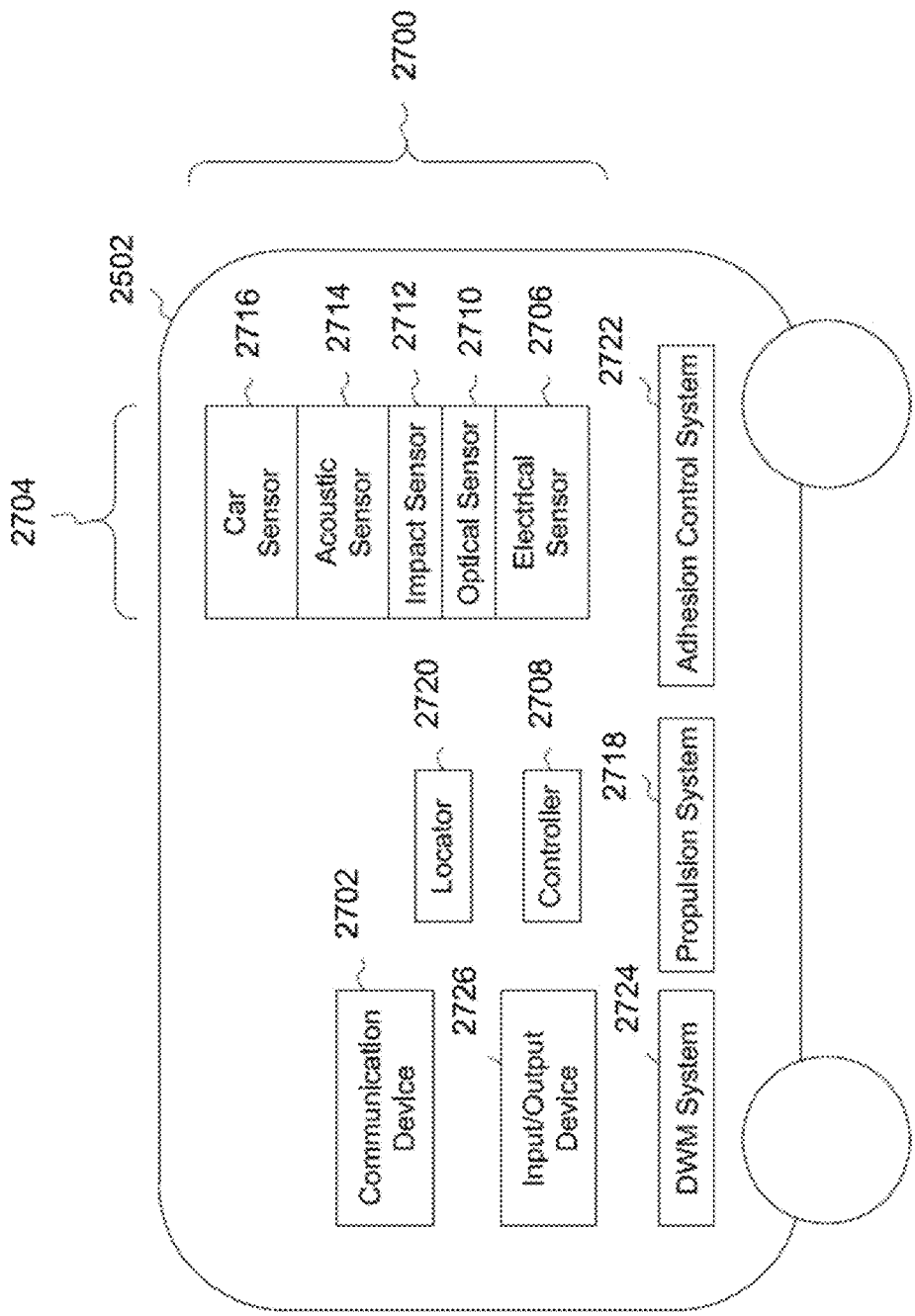
FIG. 27 includes a schematic illustration of an examination system according to one embodiment.

FIG. 27 includes a schematic illustration of an examination system 2700 according to one embodiment. The examination system 2700 is shown as being disposed onboard the test vehicle, but optionally may be disposed onboard another vehicle and/or may be distributed among two or more vehicles in the vehicle system 2502 and/or the vehicle system 2506 shown in FIG. 25. The system 2700 includes communication equipment 2702 ("Communication Device" in FIG. 27) that allows for data transmission with one or more other equipment sets off-board that vehicle. The communication equipment 2702 can represent transceiving circuitry, such as modems, radios, antennas, or the like, for communicating data signals with off-board locations, such as other vehicles in the same vehicle system, other vehicle systems, or other off-board locations. The communication equipment can communicate the data signals to report the parameters of the route as measured by the examination system. The communication equipment can communicate the data signals in real time, near real time, or periodically.

Examination equipment 2704 can include one or more electrical sensors 2706 that measure one or more electrical characteristics of the route and/or catenary as parameters of the route and/or catenary. The electrical sensor may be referred to as a broken rail monitor because the electrical sensor generates data representative of whether the rail of a route is broken. The electrical sensors 2706 can include conductive and/or magnetic bodies such as plates, coils, brushes, or the like, that inject an electrical signal into the route (or a portion thereof) and that measure one or more electrical characteristics of the route in response thereto, such as voltages or currents conducted through the route, impedances or resistances of the route, etc. Optionally, the electrical sensors 2706 can include conductive and/or magnetic bodies that generate a magnetic field across, though, or around at least part of the route and that sense one or more electrical characteristics of the route in response thereto, such as induced voltages, induced currents, or the like, conducted in the route.

In one aspect, the electrical sensor 2706 and/or a controller 2708 of the examination system 2700 can determine structure parameters and/or environmental parameters of the route based on the electrical characteristics that are measured. For example, depending on the voltage, current, resistance, impedance, or the like, that is measured, the route bed and/or ballast beneath the route may be determined to have water, ice, or other conductive materials (with the voltage or current increasing and the resistance or impedance decreasing due to the presence of water or ice and the voltage or current decreasing and the resistance or impedance increasing due to the absence of water or ice) and/or damage to joints, ties, sleepers, fasteners, switches, and crossings can be identified (with the voltage or current increasing and the resistance or impedance decreasing for less damage and the voltage or current decreasing and the resistance or impedance increasing due to the increasing damage). The examination equipment 2704 can include one or more optical sensors 2710 that optically detect one or more characteristics of the route and/or catenary as parameters of the route and/or catenary. The optical sensor may be referred to as a broken rail monitor because the optical sensor generates data representative of whether the rail of a route is broken. The optical sensor 2710 can include one or more cameras that obtain images or videos of the route, LIDAR (light generating devices such as lasers and light sensitive sensors such as photodetectors) that measure reflections of light off various portions of the route, thermographic cameras that obtain images or videos representative of thermal energy emanating from the route or catenary, etc. Optionally, the optical sensor 2710 can include one or more x-ray emitters and/or detectors that generate radiation toward the route and/or the areas around the route and detect reflections of the radiation off of the route and/or other areas. These reflections can be representative of the route and/or damage to the route.

The optical sensor 2710 can represent hardware circuitry that includes and/or is connected with one or more processors (e.g., microprocessors, field programmable gate arrays, integrated circuits, or other electronic logic-based devices) that examine the data measured by the optical sensor 2710 to generate parameters of the route. For example, the optical sensor 2710 can examine the images, videos, reflections of light, etc., to determine parameters such as geometries of the route (e.g., curvature of one or more rails, upward or downward bends in one or more rails, grade of the route, etc.), damage to the route (e.g., cracks, pits, breaks, holes, etc. in the route), a type of the route (e.g., a track, a road, etc.), or other information about the route. Alternatively, the optical sensor 2710 may obtain the images, videos, reflections, etc., and report this data to the controller 2708, which examines the data to determine the parameters of the route. In one aspect, the optical sensor and/or the controller can determine route parameters, structure parameters, and/or environmental parameters of the route using the optical data that is obtained by the optical sensor.

The examination equipment 2704 can include one or more impact sensors 2712 that detect impacts of the vehicle during movement along the route. The impact sensor may be referred to as a broken rail monitor because the impact sensor generates data representative of whether the rail of a route is broken. Optionally, the impact sensor may be referred to as an asset health monitor because the impact sensor generates data representative of the condition of the vehicle or vehicle system. The impact sensor 2712 can represent an accelerometer that generates data representative of accelerations of the vehicle, such as those accelerations that can occur when one or more wheels of the vehicle travel over a damaged portion of the route, wheels travel over a gap between neighboring sections of the route, a wheel of the vehicle has a flat spot, a wheel is not aligned with the route (e.g., with a rail of the route), or a wheel has some other defect associated with it, etc. The impact sensor 2712 can represent hardware circuitry that includes and/or is connected with one or more processors (e.g., microprocessors, field programmable gate arrays, integrated circuits, or other electronic logic-based devices) that examine the accelerations measured by the impact sensor 2712 to generate parameters of the route. For example, the impact sensor 2712 can examine the accelerations to determine whether the vehicle traveled over a gap in the route, such as may occur when the route is broken into two or more neighboring sections. Alternatively, the impact sensor 2712 may measure the accelerations and report the accelerations to the controller 2708, which examines the accelerations to determine the parameters of the route.

The examination equipment can include one or more acoustic sensors 2714 that detect sounds generated during movement of the vehicle along the route. The acoustic sensor may be referred to as a broken rail monitor because the acoustic sensor generates data representative of whether the rail of a route is broken. In one embodiment, the acoustic sensor includes one or more ultrasound or ultrasonic transducers that emit ultrasound waves or other acoustic waves toward the route and detect echoes or other reflections of the waves off the route and/or locations near the route (e.g., the surface beneath the route, objects or debris on top of the route, etc.). The detected echoes or reflections represent acoustic data of the route, which may be used to determine parameters of the route. Optionally, the acoustic sensor can represent an acoustic pick up device, such as a microphone, that generates data representative of sounds generated by the vehicle traveling over the route. Sounds may be generated when one or more wheels of the vehicle travel over a damaged portion of the route, a gap between neighboring sections of the route, etc. The acoustic sensor can represent hardware circuitry that includes and/or is connected with one or more processors (e.g., microprocessors, field programmable gate arrays, integrated circuits, or other electronic logic-based devices) that examine the sounds detected by the acoustic sensor to generate parameters of the route. For example, the acoustic sensor can examine the sounds to determine whether the vehicle traveled over a gap in the route, such as may occur when the route is broken into two or more neighboring sections. Alternatively, the acoustic sensor may detect the sounds and report the sounds to the controller, which examines the sounds to determine the parameters of the route. The acoustic sensor and/or controller can determine route parameters, structure parameters, and/or environmental parameters from the sounds that are detected. For example, the echoes that are detected by the acoustic sensor may be examined to identify cracks, pits, or other damage to the route. These echoes may represent areas inside the route that are damaged, which may not be visible from outside of the route. Optionally, designated sounds and/or sounds having one or more designated frequencies may indicate damage to the route that indicates changes in the level, grade, condition, grade, or the like of the route, changes in the route bed or ballast, damage to joints, damage to ties or sleepers, damage to fasteners, damage to or improperly functioning switches, improperly functioning crossings, changes to the sub-grade, the presence of brush or trees near the route (e.g., when the vehicle contacts the brush or trees), travel of wheels over segments of the route having grease or oil disposed on the route, the presence of leaves of the route, the presence of snow, ice, or water on the route, sand or dirt build up on the route, and the like.

The examination equipment 2704 can include one or more car sensors 2716 that detect characteristics of the test vehicle or another vehicle in the same vehicle system. The car sensor may be referred to as an asset health monitor because the car sensor generates data representative of the health of the vehicle or vehicle system. The car sensor can include one or more speed sensors (e.g., tachometers), accelerometers, thermal sensors (e.g., infrared sensors that detect heat given off of bearings, axles, wheels, or the like), or other sensors that detect characteristics of the vehicle. The car sensor and/or controller can determine car parameters of the test vehicle and/or another vehicle in the vehicle consist. For example, the speeds that are detected by the car sensor may be rotational speeds of one or more wheels of the vehicle, and can be used to measure wheel creep or other characteristics representative of adhesion between the wheels and the route. The car sensor can measure accelerations of the vehicle to determine impacts of the vehicle on the route and/or with another vehicle in order to determine how much force is imparted on the vehicle and/or route. The car sensor can measure temperatures of bearings, axles, wheels, or the like, in order to determine if the bearings, axles, wheels, or the like, are overheating (and possibly indicative of a stuck axle or wheel). While the test vehicle is illustrated as including wheels for land-based travel, as described above, the test vehicle optionally may travel on land using other components, may fly alongside or above the route (e.g., as an aerial vehicle), or the like. The test vehicle may include a propulsion system 2718 that performs work to propel the test vehicle. The propulsion system can represent one or more engines, alternators, generators, batteries, capacitors, motors, or the like, that generate and/or receive energy (e.g., electric current) in order to power vehicle and propel the vehicle along the route. Alternatively, the test vehicle may not include the propulsion system. For example, the test vehicle may be pulled and/or pushed along the route by one or more other vehicles having propulsion systems, or may be manually pulled and/or pushed along the route.

While the preceding description focuses on the sensors onboard the test vehicle examining the route, optionally, one or more of the sensors may examine a catenary from which the test vehicle or the vehicle system that includes the test vehicle obtains electric current (e.g., for powering the vehicle system). For example, the electrical sensor may sense the current supplied from the catenary in order to identify surges or drops in the current (which may be indicative of damage to the catenary or equipment onboard the vehicle that receives current from the catenary). As another example, the optical sensor may obtain images of the catenary, videos of the catenary, or x-ray reflections off of the catenary in order to identify damage to the catenary.

The test vehicle includes a location device 2720 ("Locator" in FIG. 27) that determines locations of the test vehicle or the vehicle system along the route at one or more times. The location device optionally may be disposed onboard another vehicle of the vehicle system that includes the test vehicle. The location device can include a global positioning system receiver, a wireless antenna, a reader that communicates with roadside transponders, or the like. Based on signals received from one or more off-board sources (e.g., satellites, cellular signals from cellular towers, wireless signals from transponders, etc.), the location device can determine the location of the location device (and, consequently, the test vehicle or vehicle system). Optionally, the location device can represent hardware circuitry that includes and/or is connected with one or more processors (e.g., microprocessors, field programmable gate arrays, integrated circuits, or other electronic logic-based devices) and/or a speed sensor (e.g., a tachometer). The location device can determine the location of the test vehicle or vehicle system by integrating speeds measured by the speed sensor over time from a previously known or determined location in order to determine a current location of the test vehicle and/or vehicle system. The controller of the test vehicle represents hardware circuitry that includes and/or is connected with one or more processors (e.g., microprocessors, field programmable gate arrays, integrated circuits, or other electronic logic-based devices) that may examine the data measured by the examination equipment 2704 to determine parameters of the route (e.g., route parameters, environmental parameters, structure parameters, etc.). Optionally, the examination equipment may determine one or more of these parameters. The controller may communicate with an input/output device 2726 and/or the propulsion system to control movement of the test vehicle and/or vehicle system (that includes the test vehicle) based on the parameters that are determined. For example, the controller may automatically change operation of the propulsion system to stop or slow movement of the vehicle system responsive to determining that a parameter indicates damage to the route, damage to the vehicle (e.g., damage to a wheel), debris on the route, or other unsafe operating conditions. Alternatively, the input/output device can represent one or more displays, touchscreens, speakers, or the like, that the controller can cause to present instructions or warnings to an operator of the vehicle system. The controller may cause the instructions or warnings to be displayed to cause the operator to change operation of the vehicle or vehicle system in response to determining that one or more of the parameters indicates an unsafe operating condition. The input/output device optionally can represent one or more input devices, such as levers, buttons, touchscreens, keyboards, steering wheels, or the like, for receiving input into the controller from an operator of the vehicle system.

In one embodiment, responsive to determining that a parameter indicates damage or deteriorating conditions of the route, the controller may communicate a warning signal to an off-board location, such as the facility 2612 shown in FIG. 26. This warning signal may report the parameter that is indicative of the route damage or deteriorating condition, and the location at which the damage or deteriorating condition is identified. The deteriorating condition may include debris on the route, shifted or decreased ballast material beneath the route, overgrown vegetation on the route, damage to the route, a change in geometry of the route (e.g., one or more rails have become bent or otherwise changed such that the shape of one segment of the route is different from a remainder of the route), etc. The warning signal may be communicated automatically responsive to determining the parameter, and may cause the off-board location to automatically schedule additional inspection, maintenance, or repair of the corresponding portion of the route. In one embodiment, communication of the warning signal may cause the off-board location to change the schedules of one or more other vehicle systems. For example, the off-board location may change the schedule of other vehicle systems to cause the vehicle systems to travel more slowly or to avoid the location with which the parameter is associated. Optionally, the warning signal may be broadcast or transmitted by the communication device to one or more other vehicles to warn the vehicles, without being first communicated to the off-board location. In one example of operation of the test vehicle, the vehicle can operate as a self-aware vehicle that continuously monitors itself and/or the route during movement of the vehicle or vehicle system along the route. Some known rail safety systems and methods consist of visual inspections of a track (e.g., hi-rail systems) and cars (e.g., such as visual inspections that occur in rail yards) combined with periodic inspections of the track and inspection of the cars by stationary wayside units. One significant drawback with these known systems and methods is that the inspections of the route and vehicles are discrete in time and space. With respect to time, the track and/or cars may only be inspected periodically, such as every three weeks, every six months, and the like. Between these discrete times, the track and/or cars are not inspected. With respect to location, the cars may be inspected as the cars move past stationary wayside units disposed at fixed locations and/or portions of the track that are near stationary wayside units may be inspected by the units, but between these locations of the wayside units, the track and/or cars are not inspected.

The examination system described herein can operate using the test vehicle as a hub (e.g., a computer center) that is equipped with broken route inspection equipment (e.g., the examination system 2700) for detecting damage or deteriorating conditions of the route during movement of the test vehicle. The parameters of the route that are generated by the examination system can be used to identify damaged sections of the route or sections of the route that require repair or maintenance. Optionally, the controller of the test vehicle can examine both the parameters provided by the examination system and historical parameters of the route. The historical parameters of the route can include the parameters determined from data measured by the examination system onboard the test vehicle and/or one or more other test vehicles during a previous time or trip. For example, the historical parameters may represent the condition or damage of the route as previously measured by the same or a different examination system. The historical parameters may be communicated from an offboard location, such as the facility 2612 shown in FIG. 26, and based on the data measured by and provided from the examination systems onboard the same and/or different vehicles. The examination system onboard a test vehicle can use a combination of the currently determined parameters (e.g., the parameters determined by the examination system onboard the test vehicle during movement of the test vehicle) and previously determined parameters (e.g., the parameters determined by the examination system onboard the same test vehicle or another test vehicle during a previous traversal over the same route or section of the route and/or parameters previously determined by one or more wayside units) to control operation of the vehicle system. As one example, if previously determined parameters indicate that damage to a segment of the route is increasing (e.g., a size of a crack in the rail is increasing), but is not yet sufficiently severe to cause the vehicle system to avoid the segment of the route, to warn other vehicle systems of the damage, or to request inspection, repair, and/or maintenance of the route, then the controller may activate one or more of the examination equipment (e.g., where not all of the examination equipment is constantly activated) for continuous monitoring of the parameters of the route during movement over the same segment of the route.

The examination system onboard a test vehicle can use a combination of the currently determined parameters of the vehicle and previously determined parameters of the vehicle to control operation of the vehicle system. As one example, if a warm or hot bearing is detected by a wayside unit on a particular car in a vehicle system, then the examination system can direct the car sensor 2716 onboard that car to measure the temperature of the bearing more frequently and/or at a finer resolution in order to ensure that the bearing temperature does not increase exponentially between wayside units.

The vehicle system that includes the test vehicle optionally may include an adhesion control system 2722. Although the adhesion control system is shown in FIG. 27 as being onboard the test vehicle, optionally, the adhesion control system may be disposed onboard another vehicle of the same vehicle system. The adhesion control system represents one or more components that apply one or more adhesion-modifying substances to the route in order to change adhesion between the vehicle system (or a portion thereof) and the route. The adhesion control system can include one or more sprayers or other application devices that apply the adhesion-modifying substances and/or one or more tanks that hold the adhesion-modifying substances. The adhesion-modifying substances can include air, lubricants, sand, or the like. The controller may direct the adhesion control system as to when to apply the adhesion-modifying substances, which adhesion-modifying substances to apply, and how much of the adhesion-modifying substances are to be applied. Based on the parameters of the route and/or vehicle that are determined by the system 2700, the operating mode of the controller may change to use or prevent the use of adhesion-modifying substances. If the parameters indicate that wheels of the vehicle system are slipping relative to the route, then the controller may prevent the adhesion control system from applying substances that reduce adhesion of the wheels to the route or may direct the adhesion control system to apply one or more substances that increase adhesion. If the parameters indicate that debris or other substances are on the route, then the controller may direct the adhesion control system to apply one or more substances that remove the debris (e.g., by directing air across the route).

The vehicle system that includes the test vehicle optionally may include a DWM system 2724, described above. Although the DWM system is shown in FIG. 27 as being onboard the test vehicle, optionally, the DWM system may be disposed onboard another vehicle of the same vehicle system. The DWM system includes one or more motors, gears, and the like, that are interconnected with axles of the vehicle on which the DWM system is disposed and may lift or drop one or more axles (relative to the route). The raising or lowering of axles can change the weight distribution of the vehicle or vehicle system on the route. Based on the parameters of the route and/or vehicle that are determined by the system 2700, the operating mode of the controller may change to raise or lower one or more axles of the vehicle system. If the parameters indicate that significant impact forces are being caused by wheels of the vehicle system, then the controller may direct the DWM system to raise those axles relative to the route or to lower multiple axles toward the route (and thereby reduce the force imparted by any single axle).

The controller may examine the parameters determined from the discrete sources (e.g., the manual and/or wayside unit inspection of the vehicle and/or route) to determine when to begin monitoring parameters of the vehicle and/or route using one or more continuous sources. For example, responsive to determining that a parameter of the vehicle or route (as determined from a wayside unit) indicates potential damage or deteriorating health (e.g., a damaged or bent rail, a hot bearing, etc.), the controller may direct the examination equipment 2704 to begin continually monitoring parameters of the vehicle and/or route. The continuous monitoring may be for purposes of confirming the potential damage, identifying deteriorating health (changes in damage over time), quantifying or characterizing a nature or aspect of the damage, determining information relevant to vehicle control based on detected damage, etc. With respect to the route, this can involve the controller directing the examination equipment to continually measure data and determine parameters of the route during travel over a segment of the route associated with a parameter determined by a discrete source that indicates damage or a deteriorating condition of the route. The controller may stop the continual examination of the route and/or vehicle responsive to exiting a segment of the route identified by a discrete source as being problematic, responsive to receiving one or more additional parameters from a discrete source indicating that another segment of the route is not problematic, or once the parameter of the vehicle is identified as no longer indicating a problem with the vehicle. The discrete sources of route parameters and/or vehicle parameters can include the wayside units, results of a manual inspection, or the like. In one embodiment, a weather service may provide data about the current, previous, or upcoming weather events as a discrete source of route parameters.

In one embodiment, the controller may use a combination of parameters from one or more discrete sources and one or more continuous sources to identify a broken wheel, locked axle, broken rail, or the like. For example, the parameters of the vehicle obtained from one or more wayside units may indicate that a wheel has a relatively small crack, flat spot, or other minor damage. The parameters may not be significant enough to cause the vehicle system to stop moving along the route. The controller may receive these parameters and then begin continually monitoring the wheel using one or more sensors of the examination equipment. The continually monitored parameter or parameters of the wheel may identify a decreasing trend in the health of the wheel. For example, the parameter that is continually monitored by the examination equipment may demonstrate that the crack is growing in size, that the flat spot is growing in size, or that other damage to the wheel is getting worse with respect to time. The controller can examine the changes in the continually monitored parameter(s) of the wheel with respect to time and, responsive to the changes exceeding one or more limits or approaching one or more limits, the controller can slow down or stop movement of the vehicle system before the wheel breaks, automatically request a change in the schedule of the vehicle system to obtain inspection and/or repair of the wheel, automatically request maintenance or repair of the wheel, etc. This can result in the wheel being continually monitored in response to the discrete source of information (e.g., the wayside unit) determining that the wheel may have a problem that otherwise would not prevent the vehicle system from proceeding. Due to the continual monitoring of the wheel, derailment of the vehicle system may be avoided prior to a subsequent discrete examination of the wheel. In another example, the parameters of the vehicle obtained from one or more wayside units may indicate that an axle may be at least partially stuck (e.g., the parameters may indicate elevated temperatures of bearings and/or a wheel connected with the axle). The controller may receive these parameters and then begin continually monitoring the axle using one or more sensors of the examination equipment. The continually monitored parameter or parameters of the axle may indicate an increasing temperature of the bearings. The controller can examine the changes in the continually monitored parameter(s) of the axle with respect to time and, responsive to the increasing temperatures exceeding one or more limits or approaching one or more limits, the controller can slow down or stop movement of the vehicle system before the axle locks up, automatically request a change in the schedule of the vehicle system to obtain inspection and/or repair of the axle, automatically request maintenance or repair of the axle, etc. This can result in the axle being continually monitored in response to the discrete source of information (e.g., the wayside unit) determining that the axle may have a problem that otherwise would not prevent the vehicle system from proceeding. Due to the continual monitoring of the axle, derailment of the vehicle system may be avoided prior to a subsequent discrete examination of the axle.

In another example, the parameters of the route obtained from one or more wayside units may indicate that a segment of the route is damaged (e.g., the parameters may indicate cracks in the route). The controller may receive these parameters prior to travel over the route segment and begin continually monitoring the route using one or more sensors of the examination equipment. The continually monitored parameter or parameters of the route may indicate increasing damage to the route. The controller can examine the changes in the continually monitored parameter(s) of the route and, responsive to the increasing damage exceeding one or more limits or approaching one or more limits, the controller can slow down or stop movement of the vehicle system before the route is impossible to be traveled upon (e.g., a rail breaks), automatically request a change in the schedule of the vehicle system to avoid traveling over the route segment, automatically request maintenance or repair of the route segment, etc. This can result in the route being continually monitored in response to the discrete source of information (e.g., the wayside unit) determining that the route is at least partially damaged (but still able to be traveled upon). Due to the continual monitoring of the route, derailment of the vehicle system may be avoided prior to a subsequent discrete examination of the route.

Figure 28:
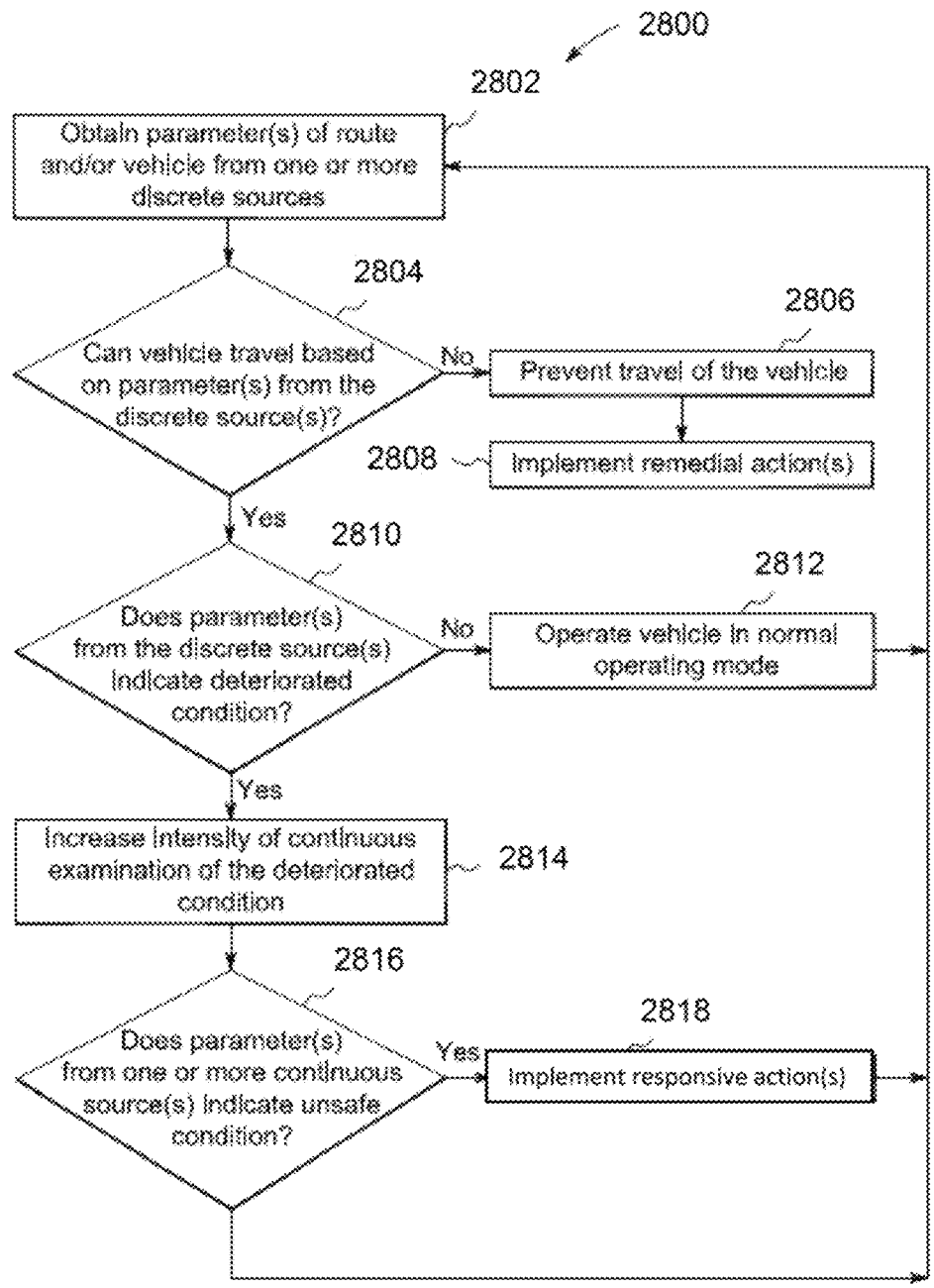
FIG. 28 illustrates a flowchart of one embodiment of a method for examining a vehicle and/or route.

FIG. 28 illustrates a flowchart of one embodiment of a method 2800 for examining a vehicle and/or route. The method 2800 may be performed by one or more embodiments of the vehicle systems, vehicles, and examination systems described herein. In one embodiment, the method 2800 may represent or be used to generate a software program that directs at least some operations of the controller and/or examination system described herein.

At 2802, one or more parameters of a route and/or vehicle are obtained from one or more discrete sources. The route and/or vehicle parameters may be obtained from a wayside unit, from a manual inspection, or another type of inspection of the route and/or vehicle that is not continuous in time and/or is not continuous in location. For example, the parameters may result from the periodic examination of the route and/or vehicle and/or from examination of the route and/or vehicle in a single location (but not other locations).

At 2804, a determination is made as to whether the parameter obtained from the discrete source indicates that the vehicle should not travel along the route. For example, the obtained parameter may indicate that the damage to the route and/or vehicle is so severe that the vehicle cannot safely proceed with travelling beyond the location where the discrete examination of the route or vehicle occurred. As a result, flow of the method 2800 can proceed toward 2806. On the other hand, if the parameter from the discrete source indicates that continued travel of the vehicle is safe the flow of the method 2800 can proceed toward 2810.

At 2806, travel of the vehicle is prevented. This system might cooperate with an existing vehicle control overlay, such as a positive train control (PTC) system. In one embodiment, the controller of the vehicle or vehicle system may prevent further movement of the vehicle or vehicle system over the portion of the route that is too badly damaged to safely travel over (as opposed to the PTC system that determines if the route is occupied with a preceding vehicle). At 2808, one or more responsive actions can be implemented. These actions alternatively can be referred to as control actions, and may include slowing or stopping movement of the vehicle system, automatically requesting inspection, maintenance, or repair of the vehicle system and/or route, communicating with an off-board location of the location of the damaged route and/or vehicle, communicating warnings to other vehicle systems of the damaged route, etc. Flow of the method 2800 may terminate or return toward 2802. In an alternative embodiment, an existing PTC system may be the mechanism engaged so as to slow or stop the vehicle.

At 2810, a determination is made as to whether the parameter from the discrete source indicates a deteriorated condition of the route and/or vehicle. The parameter may indicate a deteriorated condition of the route and/or vehicle when the route and/or vehicle are damaged, but not damaged so significantly that travel is not possible over the route. For example, such a parameter can indicate damage, but not a break, in the route; a bearing with an increased temperature but with an axle that is still able to rotate; a wheel having a non-circular segment along the outer perimeter of the wheel, but not yet a flat spot, etc. The parameter may not indicate a deteriorated condition of the route and/or vehicle when the route and/or vehicle are not damaged. If the parameter does not indicate a deteriorated condition, then flow of the method 2800 can proceed toward 2812. If the parameter indicates a deteriorated condition, then flow of the method 2800 can proceed toward 2814.

At 2812, the vehicle can operate in a normal operating mode. In one embodiment, the normal operating mode includes the examination equipment not continually examining the route and/or vehicle. For example, one or more of the sensors may deactivate and not collect data representative of parameters of the route and/or vehicle. Flow of the method 2800 can return toward 2802 where additional parameters of the vehicle and/or route are obtained from another discrete source. This can involve the vehicle traveling to another location of a wayside unit or receiving additional information from a manual inspection of the vehicle and/or route.

At 2814, the examination system can increase an intensity at which continuous examination of a deteriorated condition is performed during a continuous operating mode. In one example, if no continuous examining of the route and/or vehicle is being performed prior to 2814, then at 2814, continuous examining may begin in a continuous operating mode. In another example, if at least some continuous examining of the route and/or vehicle is being performed prior to 2814, then at 2814, the intensity at which this continuous examination is occurring is increased. The intensity can be increased by increasing a frequency at which data is measured, by activating and using additional sensors to monitor the route and/or vehicle, by increasing a resolution of the data being measured, etc.

The continuous operating mode can include one or more examination equipment continually monitoring parameters of the vehicle and/or route. The continuous monitoring can include obtaining additional data of the condition or state of the vehicle and/or route from continuous sources (e.g., sources onboard the vehicle) between the discrete sources obtaining the data of the condition or state of the vehicle. Alternatively, the continuous monitoring can include obtaining several data points (or measurements of data) during movement of the vehicle over the route. Alternatively, the continuous monitoring can mean obtaining data representative of conditions of the route and/or vehicle from one or more sensors disposed onboard the vehicle.

At 2816, the parameter obtained from the continuous sources is examined to determine if the parameter indicates an unsafe condition. The unsafe condition may indicate increasing severity or magnitude in damage to the route and/or vehicle, as identified by the continuous monitoring of the route and/or vehicle. For example, such a parameter can indicate increasing damage in the route as the vehicle progresses along the route; a bearing with increasing temperature; a wheel having the non-circular segment that is becoming more flat, etc. If the parameter indicates an unsafe condition, such as worsening damage of the vehicle and/or route, then flow of the method 2800 can proceed toward 2818. Otherwise, flow of the method 2800 can return toward 2802.

At 2818, one or more control actions (e.g., responsive actions) can be implemented. These control actions can include slowing or stopping movement of the vehicle system, automatically requesting inspection, maintenance, or repair of the vehicle system and/or route, communicating with an off-board location of the location of the damaged route and/or vehicle, communicating warnings to other vehicle systems of the damaged route, etc. Flow of the method 2800 may terminate or return toward 2802.

In one embodiment, a system (e.g., an examination system) includes a controller that is operable to receive information from a plurality of discrete information sources and from a continuous information source on-board a vehicle system. The controller also is operable to control one or both of speed and operation of the vehicle system based on the information received from the discrete information sources and the continuous information source.

In one embodiment, a system (e.g., an examination system) includes a controller and examination equipment. The controller is configured to obtain one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The discrete examinations of the one or more of the route or the vehicle system are separated from each other by one or more of location or time. The controller also is configured to examine the one or more of the route parameter or the vehicle parameter to determine whether the one or more of the route or the vehicle system is damaged. The examination equipment is configured to continually monitor the one or more of the route or the vehicle system responsive to determining that the one or more of the route or the vehicle is damaged.

In one aspect, the controller is operable to receive at least a portion of the one or more of the route parameter or the vehicle parameter from a stationary wayside unit disposed alongside the route being traveled by the vehicle system.

In one aspect, the controller is operable to receive the at least the portion of the one or more of the route parameter or the vehicle parameter from the wayside unit that includes information relating to whether there is a problem or potential problem with a wheel of the vehicle system. In one aspect, the controller is operable to switch operating modes of the vehicle system based on at least one of the one or more of the route parameter or the vehicle parameter from the discrete examinations or information communicated from the examination equipment from continually monitoring the one or more of the route or the vehicle system.

In one aspect, at least one of the operating modes comprises the controller slowing or stopping movement of the vehicle system. In one aspect, at least one of the operating modes comprises the controller monitoring the vehicle system for one or more indications that a wheel is exhibiting a problem with the vehicle system. In one aspect, the controller is operable to receive the one or more of the route parameter or the vehicle parameter as information that is one or both of geographically discrete or temporally discrete. In one aspect, the examination equipment includes one or more of an asset health monitor or a broken rail detector.

In one aspect, the controller is configured to prevent or reduce a probability of occurrence of a derailment of the vehicle system due to at least one of a broken wheel, a locked axle, or a broken rail based on the one or more of the route parameter or the vehicle parameter received from the discrete examinations and information received from the examination equipment relative to the controller not receiving the one or more of the route parameter or the vehicle parameter and the information from the examination equipment.

In another embodiment, a method (e.g., for examining a route and/or vehicle system) includes obtaining one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The discrete examinations of the one or more of the route or the vehicle system are separated from each other by one or more of location or time. The method also includes examining the one or more of the route parameter or the vehicle parameter to determine whether the one or more of the route or the vehicle system is damaged and, responsive to determining that the one or more of the route or the vehicle is damaged, continually monitoring the one or more of the route or the vehicle system.

In one aspect, the one or more of the route parameter or the vehicle parameter is obtained from a stationary wayside unit disposed along the route. In one aspect, continually monitoring the one or more of the route or the vehicle system includes continually monitoring the one or more of the route parameter or the vehicle parameter from examination equipment disposed onboard the vehicle system. In one aspect, continually monitoring the one or more of the route or the vehicle system occurs between plural discrete examinations of the one or more of the route or the vehicle system.

In one aspect, the plural discrete examinations of the one or more of the route or the vehicle system one or more of occur during different, non-overlapping time periods or occur at different locations, with the continually monitoring of the one or more of the route or the vehicle system occurring one or more of between the different, non-overlapping time periods or between the different locations.

In one aspect, the method also includes implementing a control action responsive to determining that the one or more of the route or the vehicle system is damaged based on continually monitoring the one or more of the route or the vehicle system. The control action includes one or more of automatically slowing or stopping movement of the vehicle system, automatically requesting inspection, repair, or maintenance of the one or more of the route or the vehicle system, applying an adhesion-modifying substance to the route, preventing application of the adhesion-modifying substance to the route, lifting one or more axles of the vehicle system away from the route, or lowering the one or more axles of the vehicle system toward the route.

In one aspect, both the route parameter and the vehicle parameter are obtained from the discrete examinations of the route and the vehicle system, respectively. The route parameter and the vehicle parameter can be examined to determine whether the route or the vehicle system is damaged, respectively. The one or more of the route or the vehicle system can be continually monitored, responsive to the determining damage of the one or more of the route or the vehicle, to at least one of confirm or quantify the damage. The method also can include controlling the vehicle system responsive to the damage that is at least one of confirmed or quantified.

In one aspect, at least one of the route parameter or the vehicle parameter is obtained from a stationary wayside unit disposed along the route. Continually monitoring the one or more of the route or the vehicle system can include continually monitoring the one or more of the route parameter or the vehicle parameter from examination equipment disposed onboard the vehicle system.

In one embodiment, a system (e.g., an examination system) includes one or more processors and examination equipment. The one or more processors are configured to obtain one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The one or more processors also are configured to examine the one or more of the route parameter or the vehicle parameter to determine whether the one or more of the route or the vehicle system is damaged. The examination equipment is configured to continually monitor the one or more of the route or the vehicle system responsive to the one or more processors determining that the one or more of the route or the vehicle system is damaged based on the one or more of the route parameter or the vehicle parameter.

In one aspect, the one or more processors are configured to receive the one or more of the route parameter or the vehicle parameter from a stationary wayside unit disposed along the route. In one aspect, the examination equipment is configured to be disposed onboard the vehicle system and to continually monitor the one or more of the route or the vehicle system during movement of the vehicle system.

In one aspect, the examination equipment includes one or more of a car sensor configured to measure a temperature of the vehicle system, an acoustic sensor configured to measure one or more ultrasound echoes or sounds of the vehicle system or the route, an impact sensor configured to measure one or more accelerations of the vehicle system, an optical sensor configured to one or more of obtain an image or video of the route or measure geometry of the route, or an electrical sensor configured to measure one or more electrical characteristics of the route. In one aspect, the examination equipment is configured to continually monitor the one or more of the route or the vehicle system between plural discrete examinations of the one or more of the route or the vehicle system.

In one aspect, both the route parameter and the vehicle parameter are obtained from the discrete examinations of the route and the vehicle system, respectively. The route parameter and the vehicle parameter can be examined to determine whether the route or the vehicle system is damaged, respectively. The examination equipment can continually monitor the one or more of the route or the vehicle system responsive to the determining damage of the one or more of the route or the vehicle to at least one of confirm or quantify the damage. The one or more processors can be configured to control the vehicle system responsive to the damage that is at least one of confirmed or quantified. In one embodiment, the one or more processors are configured to receive at least one of the route parameter or the vehicle parameter from a stationary wayside unit disposed along the route. The examination equipment is configured to be disposed onboard the vehicle system.

Various embodiments of the sensor systems, analysis systems, platforms, communication systems, etc., described above can be used in different combinations to provide systems and methods that remotely monitor conditions or states of a transportation network to safely operate vehicles traveling therein. In one example embodiment, a system includes one or more of the mobile platforms 174 that move under remote control and/or under autonomous control over, around, or otherwise near routes of a transportation network. The system also includes one or more of the sensor packages, sensor units, and/or sensor package systems 100, 102, 104, 176, 300, 500, 1100 at least partially disposed on the mobile platforms 174. As described above, these sensor packages, sensor units, and/or sensor package systems obtain information relating to the transportation network, such as one or more components (e.g., routes, tracks, switches, gates, other vehicles, etc.) of the transportation network. For example, the sensor packages, sensor units, and/or sensor package systems can sense information indicative of a state or condition of a route or track (e.g., to determine if the route or track is damaged or bent), a state or condition of a switch at an intersection between two or more routes (e.g., to determine if the switch is damaged and/or which routes are connected by the switch), a state or condition of a gate (e.g., to determine if the gate is up to allow vehicles to travel along a route over which the gate extends or if the gate is down to prevent vehicles from traveling along the route), and/or a state or condition of another vehicle (e.g., to determine a location of the other vehicle, to determine a direction of movement of the other vehicle, etc.).

The sensor package, sensor unit, and/or sensor package system communicates the information sensed about the component as an output signal that is communicated to one or more of the back-end systems described herein for analysis. For example, the sensor package, sensor unit, and/or sensor package system can communicate data representative of the state, condition, or health of the component to one or more of the image analysis systems, controllers, processors, computing devices, etc., described herein. These systems, controllers, processors, computing devices, etc., optionally can be referred to as processors.

The processors receive the information obtained by the sensor package and to analyze the information in combination with other information that is not obtained from the sensor package. One or more other sensor packages may provide data representative of the state, condition, and/or health of the component. For example, a global positioning system receiver onboard a vehicle may report the location of the vehicle. A sensor having a thermometer may communicate an ambient temperature. A beacon may send (e.g., broadcast) a signal representative of a location of another vehicle or object. A route inspection system may send a signal indicative of a damaged or potentially damaged section of the route.

In one example, the processors display information relating to a status, a condition, and/or a state of health of the component of the transportation network based on the data obtained or provided by the sensor package, and optionally based on the other information that is not obtained from the same sensor package. Other systems or sensors also may send the information not obtained by the sensor package. An output can be generated by the processors based on the information obtained by the sensor package and the information that is not obtained from or via the sensor package. This output can be a data signal that indicates a status, condition, and/or state of health of a component of the transportation network. For example, the processors may generate and communicate a control signal to the display device that directs the display device to visually present an indicium or indicia indicative of the status, the condition, and/or the state of health of the component of the transportation network. The processors can direct the display device to display a map and icons indicating a location of the component on the map.

In another example, the processors initiate an action to change an operational state of the component based on the data obtained or provided by the sensor package, and optionally based on the other information that is not obtained from the same sensor package. For example, the processors may generate and communicate a control signal (based on the other information that is not obtained from the same sensor package) to a propulsion system or controller of a vehicle to direct the vehicle to slow or stop movement, to direct the vehicle to change which route is being traveled upon, to increase the speed of the vehicle, etc. The processors may generate and communicate the control signal (based on the other information that is not obtained from the same sensor package) to a switch to change which routes are connected by the switch. The processors may generate and communicate the control signal (based on the other information that is not obtained from the same sensor package) to a gate to raise or lower the gate (e.g., to prevent or allow a vehicle to travel onto a section of the route).

In another example, the processors identify a hazard to one or more vehicles traveling within the transportation network based on the data obtained or provided by the sensor package, and optionally based on the other information that is not obtained from the same sensor package. For example, the processors may determine that a section of the route ahead of the current location of a vehicle is damaged (e.g., broken or bent), as described above.

In another example, the processors collect the information relating to the component based on the data obtained or provided by the sensor package, and optionally based on the other information that is not obtained from the same sensor package. For example, the processors may store the information obtained by the sensor package, and optionally the other information, in one or more memory devices.

The component is not communicatively coupled to an information network to which the processors also are connected in one embodiment. For example, the processors and the mobile platform may be able to communicate with each other via one or more computer networks (e.g., publicly available and/or proprietary wired and/or wireless computer networks), while the mobile platform does not or is unable to communicate with the component via the one or more computer networks. The mobile platform can communicate the information or data relating to the status, condition, and/or health of the component to the processors via the one or more computer networks, but be unable to provide this same information to the component.

In one embodiment, the processors can obtain video and/or image data from the sensor package, and can obtain the other information (e.g., that is not from the sensor package) from one or more of a route planning system, a vehicle controller, a wayside device, and/or a satellite. The route planning system can be an off-board system that plans the movements of multiple vehicles in the transportation network. The route planning system optionally determines a volume (e.g., amount) and/or velocity of the vehicles based at least in part on the information obtained from the sensor package. Optionally, the route planning system can map (e.g., track) the locations of the vehicles and may remotely control movements of the vehicles in the transportation network. Based on the information provided by the sensor package, the route planning system may change schedules and/or movements of one or more vehicles to route the vehicles around (and not through) a hazard identified by the processors and/or to stop movement of a vehicle toward the hazard. The satellite can operate as another sensor package by monitoring a portion of the transportation network, such as images or videos of the transportation network, locations of components in the transportation network, etc.

In another example, the processors can initiate the action to change the operational state of the component by activating a switch to change a pathway defined by rail tracks on which a vehicle is moving. For example, responsive to identifying a damaged section of a track and/or another hazard, the processors can autonomously communicate a control signal to a switch that causes the switch to change which tracks are connected with each other. This can cause the vehicle to move onto another track that does not include the damaged section of the track or other hazard. Optionally, the processors can initiate the action to change the operational state of the component by activating a signal light to change a traffic flow pattern in the transportation network. This can cause the vehicle or vehicles traveling in the transportation network to move away from or not travel over the hazard. Optionally, the processors can initiate the action to change the operational state of the component by opening a closed gate or closing an open gate. Opening the closed gate can direct vehicles to travel onto a track or route that does not include the hazard (whereas the vehicles may otherwise not be able to travel onto this track or route). Closing the open gate can prevent vehicles from traveling onto a track or route that includes the hazard (whereas the vehicles would otherwise be able to travel onto this track or route). Optionally, the processors can initiate the action to change the operational state of the component by directing or causing one or more vehicles to dump bulk materials from the vehicles. For example, some vehicles may carry bulk materials such as rock, water, grain, coal, etc. Responsive to determining that an upcoming segment of a route includes a hazard, the processors may autonomously direct one or more vehicles heading toward the hazard segment to drop at least part of the materials. For example, the processors may send a control signal to a controller of the vehicle that directs the controller to open a valve, gate, or the like, to release at least some of the bulk material carried by the vehicle.

As described above, one or more components of the transportation network may not be communicatively coupled with a computer network (also referred to as an information network). For example, routes (e.g., tracks), gates, switches, signals, etc., may not be communicatively coupled with one or more networks. The mobile platform can collect information about the components (as described above) and provide this information to the processors. The processors can use this information to determine hazards in the transportation network, also as described above. The processors can communicate instructions back to the mobile platform, which can communicate the instructions to the component. For example, responsive to identifying a damaged section of a track and/or another hazard, the processors can autonomously communicate a control signal to the mobile platform, which relays or forwards the control signal to a switch. The control signal can cause the switch to change which tracks are connected with each other, as described above. As another example, the processors can communicate a control signal to the mobile platform, which sends the same control signal to a signal light. The control signal can direct the signal light to change a traffic flow pattern in the transportation network, as described above.

In one example, the mobile platform may operate as a go-between multiple vehicles in the transportation network. For example, a first vehicle may communicate information to the mobile platform flying off the first vehicle. The mobile platform may forward, relay, or otherwise send this information to another, different vehicle. This can allow for multiple vehicles that are otherwise unable to communicate with each other to share or communicate information.

One or more embodiments of the inventive subject matter described herein relate to a vehicle control system, and to associated methods of vehicle control. This "holistic inspection system" may obtain and use information from multiple sources to allow the vehicle control system to operate in a determined manner. While several examples of the inventive subject matter are described in terms of rail vehicles, not all embodiments of the inventive subject matter are limited to rail vehicles. At least some of the inventive subject matter may be used in connection with other vehicles, such as mining equipment, automobiles, marine vessels, airplanes, over the road trucks, or the like. And, where appropriate, the term track may be interchanged with path, road, route, or the like as may be indicated by language or context. Further, the term track (as well as path, road, route, etc.) may include specific segments of such, and further may include features that form a part of the track. For example, reference may be made to a bridge or other infrastructure that forms part of the route.

By having route detection (rail and track geometry) mounted on a powered vehicle, with sensors mounted on each car mechanically or logically coupled to the powered vehicle and communicating therewith, the powered vehicle may be "aware" of an operational change, deviation or failure on either or both of the track or the coupled car component, and a vehicle control system of the vehicle can responsively initiate a new operating mode in which the powered vehicle changes its speed, direction, or some other operating parameter. In addition, the track and vehicle system status detection may be more continuous, and less discrete or segmented (either by time or by space, or by both time and space). And, analysis of historical data may provide prognostic information relating to a particular vehicle operating at a particular track location.

As used herein, the term continuous means generally without significant interruption. The term discrete means confined to a location/geography or to a period of time. For example, discrete examination of a route may refer to a measurement or other examination of the route that occurs during a finite time period that is separated (in terms of time and/or location) from other discrete examinations by a significantly longer period of time than the finite time period. In contrast, continuous examination may refer to a measurement or other examination of the route that extends over a longer period of time (e.g., during an entire trip of a vehicle system from a starting location to a final destination location of the trip), that is frequently repeated, or the like. In one embodiment, discrete examinations of the route may be separated in time and/or location such that the condition of the route may significantly change between the discrete examinations. For example, a first discrete examination of the route may not identify any crack, pitting, or the like, of the route, but a subsequent, second discrete examination of the route may identify one or more cracks, pits, or the like, at the same location along the route. In contrast, a continuous examination of the route may be frequently repeated and/or non-stop such that the changing condition of the route is detected as the route condition is changing (e.g., the examination may witness the damage to the route).

In one embodiment, a system includes route examination equipment and a controller. The route examination equipment can obtain a route parameter indicative of a condition of a route over which a vehicle system travels. The controller receives the route parameter, and examines the route parameter to determine the condition of the route. The controller controls at least one operational aspect of the vehicle system in response to the determined condition of the route.

The route examination equipment can include one or both of a stationary wayside unit and a mobile route inspection unit. Suitable stationary wayside units may include one or more of a video (visible light) sensor unit, an infrared sensor unit, and an electrical current sensor. The electrical current sensor can determine if an electrical break or an electrical short has occurred in a monitored segment of the route.

If the vehicle system is one of a plurality of like vehicle systems, and the mobile route inspection unit includes an inspection system mounted on another, second vehicle system of the plurality of vehicle systems operating over the segment of the route prior to the first vehicle system then the system can use data for a route segment even if it was inspected by a different vehicle system's equipment. The system can, for example, organize the inspection results by chronology so as to present a trend over time and then can use that trend information predictively. Additionally or alternatively, the system can use a data set from a particular period, and then refer to a table (or the like) to determine what the expected degradation rate would be from the time of the data set until the time the vehicle is expected to travel over the corresponding segment.

Other suitable mobile route inspection units may include one or more of a drone or unmanned vehicle, an inspection system secured to the vehicle system as it travels over a segment of the route, or an inspection system mounted on an inspection vehicle having the primary purpose of inspecting the route. A primarily purposed inspection vehicle may include a Hi-Rail vehicle (with respect to rail usage) having gel-filled ultrasound wheels. A mounted inspection system may be secured to (again, with reference to rail usage) the locomotive and/or one or more of the rail cars. For on-road vehicles, the mounted inspection system can be secured to automobiles, tractor-trailers, busses, and the like.

Where the route parameters are collected by a drone, the drone can obtain images of the route using one or more of visible light video, infrared, Light Detection and Ranging (Lidar), ultrasound, and radar. Suitable drones can include an aerial drone or a surface vehicle. If the drone is a surface vehicle drone it may be autonomous or semi-autonomous as it travels over the segment of the route. Other suitable surface drones may be remotely piloted.

The stationary wayside unit may provide substantially continuous signals indicating the condition of the route, while the mobile route inspection unit may provide substantially periodic signals indicating the condition of the route. To be clear, the signal from the mobile unit may be continuous in its operation, but it may pass over a particular geography periodically. The controller can determine the condition of the route based at least in part on both the substantially continuous signals and on the substantially periodic signals. And, to do so, it may need to pull information from different data sets so that it can match data for a particular route segment. And, as mentioned, it may need to organize the data for a given segment based on the time stamp.

With regard to the at least one operational aspect of the vehicle system, in one embodiment the operational aspect is vehicle system speed. The controller can control the vehicle system speed over the route, and particularly the route segments, based on the determined condition relative to a determined threshold value for that condition. If the condition indicates the route is impassible (e.g., for a rockslide or a washout) the controlled vehicle system speed may be zero to stop the vehicle system prior to the vehicle system arriving at a segment of the route. Of note, the signal to stop would not be expected to be applied upon the mere identification of the route hazard. The vehicle system may still be many miles away from the segment in question. It may be slowed, it may be re-routed, or it may be slowed to a stop based on the stopping distance for a particular vehicle type. Additional messages, such as to initiate a fix of the route damage (e.g., repair a broken rail, fill a pot hole, etc.) may be generated and sent to the appropriate agency to remedy the situation. As noted, in one embodiment, the at least one operational aspect of the vehicle system is the route, and the controller can control the vehicle system to change at least a portion of the route from a first route portion to a second route portion, if the first route portion has a segment that has the determined condition below a determined threshold value and if the second route portion does not include the segment with the determined condition. In another embodiment, the operational aspect may be to urge the vehicle relatively left, right, up or down compared to an otherwise unaltered path.

Expanding on the determined condition, suitable conditions that may require the controller to respond may include one or more of a broken rail if the vehicle system is a locomotive, a rockslide or mudslide over the route, a washout of the route, a snow drift over the route, pitting, potholes downed power lines, obstacles in an upcoming crossing, loose ties, missing ballast, sinkholes, fissures, heavy fog, ice, and the like.

Where the route examination equipment is a drone, and the drone can switch operating modes, the switch is to shift from a first operating mode of identifying the segment of the route having a determined condition to a second operating mode where the drone can signal a location of the segment, signal a type of determined condition, signal a location of the route examination equipment, signal information about the segment of the route, perform additional sensing tests or procedures that are different from those used in the identifying of the segment, and control the route examination equipment movement. Controlling the route examination equipment movement may include one or more of the drone hovering for a determined period proximate to the segment, landing proximate to the segment, parking the route proximate to the segment, changing positions to obtain additional perspectives of the segment, and obtaining higher definition or closer images of the segment.

During operation, the system can obtain one or more route parameters indicative of a condition of a segment of a route over which a vehicle system travels; determine the condition of the segment of the route based on the one or more route parameters; and control at least one operational aspect of the vehicle system in response to the determined condition of the route. Controlling at least one operational aspect of the vehicle system may include, for example, slowing, stopping or rerouting the vehicle system in response to the condition of the route segment being below a determined threshold prior to or during the vehicle system traversing the segment. In one embodiment, two or more route parameters may be used. And, in one embodiment, vehicle operating parameters indicating a condition of the vehicle systems may be combined with the condition of the route to further allow the controller to control the operation of the vehicle system.

Additionally or alternatively, in one embodiment, the system can obtain a status of the vehicle system, and can control the operational aspect of the vehicle system in response to both the determined condition of the route and to the status of the vehicle system. For example, a vehicle with new tires may not be instructed to slow but a vehicle with worn tires may be instructed to slow when approaching a stretch of road that has an indication of a certain amount of snow or ice relative to a threshold level of snow or ice (using an on-road example). Or, a passenger car might be instructed differently than a tractor-trailer rig under a heavy load. Additional stopping distance or time might be needed, different speed limits might be in play, and so on.

Figure 29:
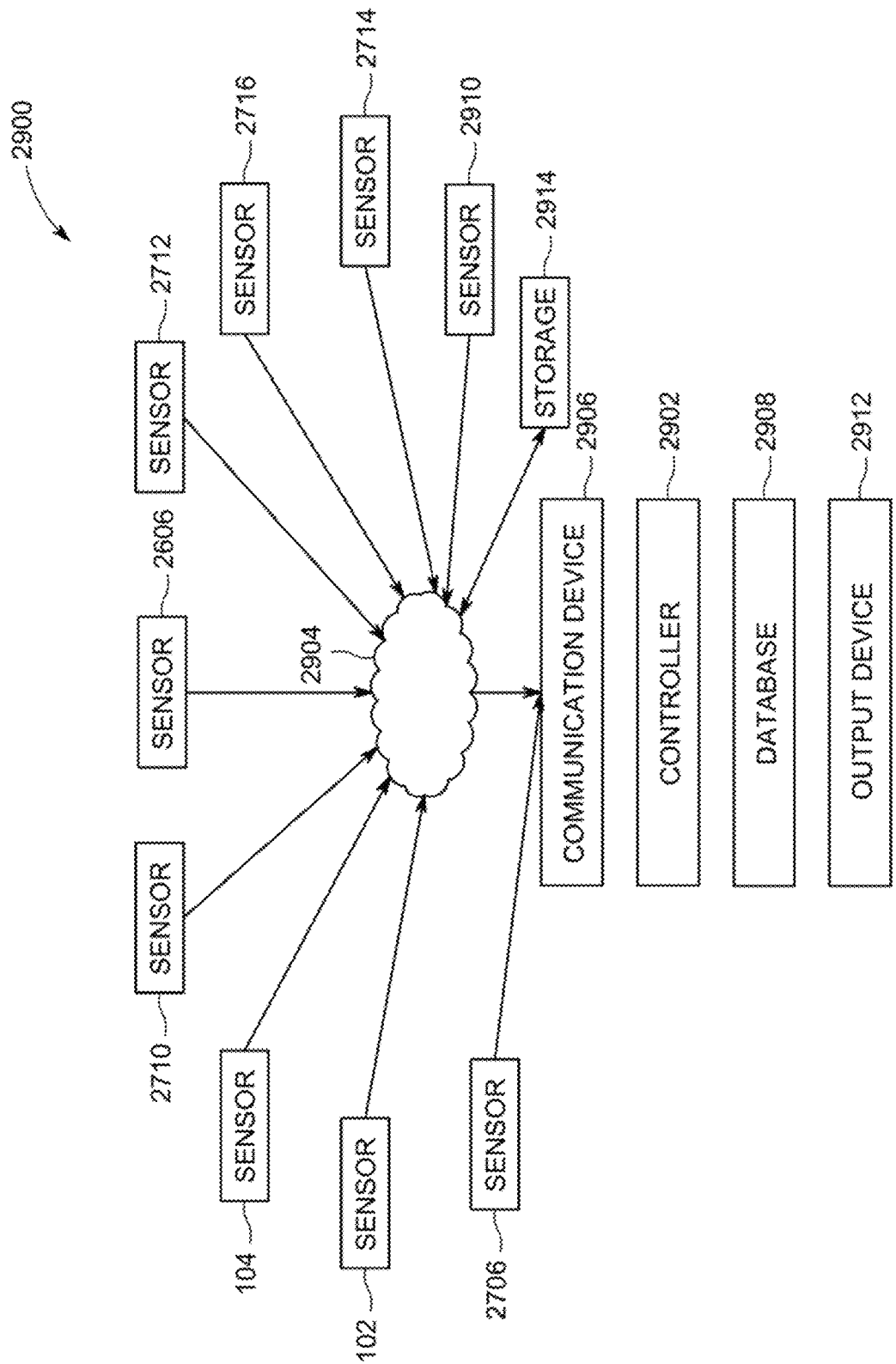
FIG. 29 illustrates one embodiment of a comprehensive analytic and prognostic system.

FIG. 29 illustrates one embodiment of a comprehensive analytic and prognostic system 2900. The system 2900 includes a controller 2902, which represents hardware circuitry that includes and/or is connected with one or more processors (e.g., one or more microprocessors, field programmable gate arrays, and/or integrated circuits) that perform the operations described below. The controller 2902 receives data from different types of sensors, such images from the sensor package unit 102, images from the sensor package 104, images from the optical sensor 2710, impact or acceleration data from the impact sensor 2606, 2712, speeds measured by the car sensor 2716, accelerations measured by the car sensor 2716, temperatures measured by the car sensor 2716, sounds measured by the acoustic sensor 2714, electrical characteristics measured by the electrical sensor 2706, or the like. The controller 2902 can receive the sensor data via wired and/or wireless connections with the sensors, and/or via one or more networks 2904. In one embodiment, the network 2904 can include or represent a direct connection between one or more sensors and the controller 2902 without other data being communicated in the network 2904 or without communication between other devices occurring via the network 2904. The sensor 2706 is shown as directly communicating with the controller 2902 via a communication device 2906 of the system 2900 (which represents hardware transceiving circuitry, as described herein) and the other sensors are shown communicating with the communication device 2906 via the network 2904. Optionally, one or more of the other sensors may directly communicate with the communication device 2906 and/or the sensor 2706 communicates with the communication device 2906 via the network 2904. The controller 2902 can store at least some of the received sensor data in one or more computer readable media 2908 ("Database" in FIG. 29), such as one or more computer hard drives, optical drives, servers, or the like.

One or more other sensors 2910 can be sources of data or information to the controller 2902. The sensor 2910 can represent a source of data such as data generated by walking inspection of a route. Optionally, the sensor 2910 can represent an inspection car, a hi-rail car, a vehicle mounted sensor system, a weather satellite providing data indicative of current and/or forecasted weather conditions, an emergency communication system providing data indicative of emergency situations, another proximate vehicle, a satellite providing satellite imagery, a personal mobile device (such as a smart phone), a wayside device, and/or an operational control system. For walking inspections, an individual may manually enter information into the sensor 2910 (remotely and on the spot, or later at a data upload), such as into a computing device or computer that communicates the information to the controller 2902. Alternatively, the individual may have an inspection device with sensors 2910 that collect the data and upload the data to the communication device 2906 (such as via a network 2904, e.g., a cellular network).

Optionally, one or more of the sensors that provide sensor data to the controller 2902 can be a publicly available source of information. For example, the sensor 2910 can represent a publicly accessible database of weather conditions, vehicle derailments (e.g., as maintained by the Federal Railroad Administration of the U.S. Department of Transportation), traffic patterns, or the like. The sensor 2910 can communicate and/or the controller 2902 can obtain the data from the sensor 2910 directly and/or at least partially via the network 2904.

The data provided to the controller 2902 from the sensors can include images (still or video); time, date, and/or location information; on-site test results; distance measurements (e.g., a laser range finder); surface measurements (of a rail or road surface); such as roughness, wear, spalling, and the like; substrate measurements such as ballast or shoulder condition; moisture content and drainage; and the like. The controller 2902 can synthesize the data by combining or grouping the data associated with the same component or portion of a transportation system. For example, the portions of the data from different sensors or sources that represent measurements of the same segment (e.g., ten meter segment) of a route can be grouped together, the portions of the data from different sensors or sources that represent measurements of the same bridge can be grouped together, the portions of the data from different sensors or sources that represent measurements of the same tunnel can be grouped together, etc.

In one embodiment, one or more of the sensors that provide sensor data to or obtain sensor data for the controller 2902 can be a third-party sensor. For example, the sensors 2606, 2706, 2710 may be owned or manufactured by the same company, user, or other entity that operates the controller 2902 to analyze the sensor data. One or more other sensors (e.g., the sensor 104) may be a sensor that is owned or manufactured by another company, user, or other entity. This third-party sensor can be a sensor that obtains sensor data for a variety of entities, such as a sensor that obtains sensor data of weather conditions and provides this data for many different companies, persons, etc. The controller 2902 can obtain sensor data from sensors owned by the same company, as well as from third party sensors, to examine or analyze the condition of the transportation system, as described herein.

In one embodiment, at least some of the sensor data provided by one or more of the sensors can be stored in an online or cloud storage device 2914 ("Storage" in FIG. 29). This storage device 2914 represents one or more computer readable media, such as one or more computer hard drives, optical drives, servers, or the like, that are accessible via one or more connections to the network 2904. The storage device 2914 may not be co-located with the controller 2902 and/or an output device 2912 of the system 2900 (described below), but may be disposed in another room of the same building or structure as the controller 2902 and/or output device 2912, may be disposed in another building or structure but the same zip code as the controller 2902 and/or output device 2912, may be disposed in another zip code than the controller 2902 and/or output device 2912, may be disposed in another city or town than the controller 2902 and/or output device 2912, may be disposed in another state than the controller 2902 and/or output device 2912, may be disposed in another country than the controller 2902 and/or output device 2912, and/or may be disposed in another continent than the controller 2902 and/or output device 2912. One or more of the sensors can communicate the sensor data to the storage device 2914 at least partially via the network 2904, and the controller 2902 can obtain or otherwise access the sensor data at least partially via the network 2904.

The storage device 2914 can stitch together related sensor data obtained from the sensors. Stitching together the sensor data can involve combining or otherwise grouping together the data that relates to or represents the same or interconnected portions of the transportation system. For example, a first sensor 104 on a first sensor package unit 104 can obtain images of a ten meter segment of a route and a different, second sensor 104 on a different, second sensor package 104 can obtain data indicative of infrared emissions from the same ten meter segment of the route and/or another segment of the route that at least partially overlaps the ten meter segment of the route. The storage device 2914 can include hardware circuitry that includes and/or is connected with one or more processors (e.g., one or more microprocessors, field programmable gate arrays, and/or integrated circuits) that determine that the data from the first and second sensors relate to the same segment of the route (such as based on identifying data or location data communicated by the first and second sensors). The storage device 2914 can then store the data from the first and second sensors together, and/or can store additional data with the sensor data that associates the sensor data from the first and second sensors with each other. The controller 2902 can then obtain the sensor data from the first and second sensors by requesting the sensor data for that segment of the route.

Optionally, stitching together the sensor data can involve combining or otherwise grouping together the data that relates to connected portions of the transportation system. For example, a third sensor 104 on a third sensor package unit 104 can obtain images of a first segment of a route extending from a first milepost to a second milepost and a different, fourth sensor 104 on a different, fourth sensor package 104 can obtain data indicative of images or infrared emissions from a second segment of the same route extending from the second milepost to a third milepost. The storage device 2914 determine that the data from the third and fourth sensors relate to neighboring or adjacent segments of the route (such as based on identifying data or location data communicated by the third and fourth sensors). The storage device 2914 can then store the data from the third and fourth sensors together, and/or can store additional data with the sensor data that associates the sensor data from the third and fourth sensors with each other. The controller 2902 can then obtain the sensor data from the third and fourth sensors by requesting the sensor data for the first and second segments of the route.

The controller 2902 can use sensor data from different sensors to improve the accuracy of one or more conclusions or determinations made based on the sensor data. For example, the controller 2902 can receive location of equipment from a global positioning receiver. The locations determined by global positioning receivers can have errors due to inaccurate time-keeping in the receiver clocks, atmospheric disturbances, fewer satellites from which positioning signals are received, etc. In a location where several routes are near each other (e.g., within a vehicle yard, such as a rail yard), the controller may not be able to identify which route is occupied by a vehicle based only on sensor data from a global positioning receiver on the vehicle. The controller 2902 can examine sensor data from another source, such as the sensor 104 on the sensor package unit 102 flying above the vehicle, to exactly determine which route is occupied by the vehicle.

The controller 2902 optionally can dictate or otherwise control when one or more of the sensors obtain and/or provide the sensor data. Some sensor data can be more accurate or representative of the state or condition of the transportation system components during certain specified conditions. For example, images of a route obtained by the sensor 104 on the mobile sensor package 102 may be more accurate or clear during times that no vehicle is traveling on the route, as the movement of vehicles on the route can block or occlude the sensor 104 from obtaining images of the route. Some examinations of a route may rely on movement or presence of a vehicle on the route. For example, sensor data indicative of the condition of a route may be more accurate of the condition of the route when a vehicle system is moving on the route (e.g., so that the controller 2902 can determine whether the route is able to withstand the weight of the vehicle system within prescribed limits). As another example, images or video of a gate may need to be captured when the gate is in operation, such as when a vehicle is moving by the gate (to cause the gate to open or close). The controller 2902 can generate and communicate control signals to the sensors (e.g., directly or at least partially via the network 2904) to control when the sensors obtain the sensor data. For example, the controller 2902 can refer to a schedule of vehicle movements (e.g., stored in the database 2908 and/or storage device 2914) and/or locations of vehicle systems as reported by the controllers on the vehicle systems, wayside devices, sensors (e.g., global positioning system receivers), etc. to determine when the vehicle systems are traveling on or over various segments of the routes. The controller 2902 can generate and send the control signals to the sensors to direct the sensors to obtain the sensor data when the vehicles are not blocking view of the route, when the vehicles are on the route, or the like, depending on the type of sensor data to be obtained.

Some sensors optionally can be controlled by the controller 2902 to obtain sensor data in order to reduce or eliminate the presence of other vehicles or systems that occupy portions of routes in the transportation system. For example, some vehicle systems may transport dangerous cargo, such as hazardous materials. Legal and/or regulatory requirements can dictate that these dangerous cargo vehicle systems be escorted by one or more other vehicles traveling ahead of the dangerous cargo vehicle systems. For example, a HAZMAT train carrying flammable or explosive chemicals or materials may need to have another locomotive, high-rail vehicle, or the like, travel on the same track ahead of the HAZMAT train to ensure that the track is clear of obstructions. Instead of occupying additional space on the track (or route) with another train (or other vehicle) traveling ahead of the dangerous cargo vehicle system, the controller 2902 (or another controller described herein) can command the sensor package unit 102 to fly ahead of the dangerous cargo vehicle system. The controller also can command the sensor package unit 102 to obtain additional sensor data (e.g., images or video) of locations ahead of the dangerous cargo vehicle system and report this sensor data to the vehicle system controller or the controller that commands the sensor package unit 102. This sensor data can be used by one or more of the controllers to identify obstructions on the route ahead of the dangerous cargo vehicle system and automatically stop or slow movement of the dangerous cargo vehicle system responsive to identifying the obstruction(s).

Optionally, one or more of the controllers described herein (e.g., the controller 2902 and/or the controller 107) can direct the sensor package unit 102 to fly ahead of a vehicle system to obtain one or more images and/or video for activating an emergency response. For example, the sensor package unit 104 can fly ahead of a vehicle system traveling along a route and obtain images and/or video of locations several kilometers ahead of the vehicle system. The images and/or video can be analyzed (e.g., onboard the unit 104 and/or at an off-board location, as described herein) to determine if one or more emergency situations occur ahead of the vehicle system. For example, the images and/or video can be examined to determine if livestock, people, other vehicles, etc., are blocking the route. As another example, the images and/or video can be examined to determine if a group of people have gathered at or near the route ahead of the vehicle system. Such a gathering in a remote location can indicate that the people may be planning to rob or vandalize the vehicle system. Responsive to identifying one or more emergency situations, the controller can generate and send a communication to law enforcement, the vehicle system, or elsewhere to implement one or more responsive actions. For example, law enforcement may be called to the location to remove the people, the vehicle system may be automatically slowed or stopped before reaching the location of the emergency situation, a switch may be activated to cause the vehicle system to travel on another route, etc.

The controller 2902 can determine a health score or value for the same segment of the transportation system (e.g., the route segment, the bridge, the tunnel, etc.) based on the related data that are grouped together. The controller 2902 can determine health scores for other segments of the transportation system to provide a holistic view of the transportation system. Larger health scores can be assigned by the controller 2902 to segments of the transportation system having data that indicates little or no damage, while lower health scores can be assigned by the controller 2902 to segments of the transportation system having greater or significant damage.

For example, if images of a section of a track provided by a first camera, infrared data of the same section of the track as sensed by a second camera, and electrical characteristics of the same section of the track as sensed by another sensor do not indicate any damage to the section of track, then the controller 2902 can provide that section of track with a large health score, such as five out of five, ten out of ten, etc. But, if infrared data of another section of the track indicate damage (but the images and electrical characteristics do not indicate damage), then the controller 2902 can assign a lower health score to that section of track (e.g., three out of five, seven out of ten, etc.). If images, infrared data, and electrical characteristics of another section of track all indicate damage, then the controller 2902 can assign an even lower health score to the section of track (e.g., zero or one out of five, ten, etc.).

The controller 2902 can obtain information operational characteristics of one or more vehicles or vehicle systems as sensor data that is used to determine health scores or values for the transportation system. In one embodiments, the operational characteristics include application of friction modifying substances from the adhesion control system 2722. Applying some friction modifying substances (e.g., sand) to a route can degrade the condition of the portion of the route that receives the substances. The controller 2708 onboard the vehicle or vehicle system that applies the substance onto the route can communication the location where the substance was applied to the route to the controller 2902 directly, via the network 2904, and/or via the cloud storage device 2914. The controller 2902 of the system 2900 can incorporate this information as sensor data indicating a decrease in the condition of the route at the corresponding location. For example, the controller 2902 can decrease the health score of the route at the location where the friction modifying substance was applied.

Another example of operational characteristics that can be used by the controller 2902 as sensor data includes vehicle forces and movement data. The controller onboard a vehicle or vehicle system can determine inter-vehicle forces, accelerations, decelerations, or the like, based on movements of the vehicle or vehicle system. Optionally, the vehicle or vehicle system can include an energy management system that determines this information. The energy management system can be hardware circuitry that includes and/or is connected with one or more processors (e.g., one or more microprocessors, field programmable gate arrays, and/or integrated circuits). The energy management system can determine operational settings for the vehicle system (e.g., throttle settings, brake settings, accelerations, decelerations, speeds, etc.) that cause the vehicle system to travel in a more fuel-efficient manner and/or cause the vehicle system to reduce the amount of generated emissions relative to traveling at other operational settings (e.g., relative to traveling at the speed limit of the routes). One example of such an energy management system is the TRIP OPTIMIZER system provided by General Electric Company. The vehicle controller and/or energy management system can determine accelerations of the vehicles, decelerations of the vehicles, and/or forces between vehicles in the vehicle system due to route grades, vehicle speeds, route curvatures, etc. These accelerations, decelerations, and/or forces can be communicated to the controller 2902 of the system 2900 as sensor data. The controller 2902 can determine that accelerations, decelerations, and/or increased inter-vehicle forces at various locations along the routes in the transportation system can degrade the condition of the routes at those locations. The controller 2902 can change (e.g., reduce) the health score of the routes at those locations based on the accelerations, decelerations, and/or forces obtained from the vehicle systems.

In one embodiment, the controller 2902 can determine the health score by weighing data from different sensors or sources differently. For example, image data from a camera may be weighed more heavily in determining the health score for a section of a road then infrared data from an infrared sensor. The weighting of different sensor data by the controller 2902 can be based on the validity and reliability of the sensor data, and can change over time. For example, newly obtained sensor information may be weighted by the controller 2902 in determining a health score higher than older sensor information. As another example, sensor data from a specific purpose inspection vehicle (e.g., an ultrasound enabled track test vehicle) may be weighted heavier by the controller 2902 than sensor data from a visual inspection.

Optionally, the controller 2902 can weigh different sensor data differently based on a query provided to the controller 2902 (e.g., from a user inputting the query using a keyboard, touchscreen, microphone, or other input device). The query can specify a specific or designated type of damage to a route (e.g., thermal cycle induced spalling). The controller 2902 can reduce the weight assigned to sensor data that does not test for spalling and/or increase the weight assigned to sensor data that does test for spalling. Sensor data may test for a type of damage when the sensor data changes in the presence of the type of damage. Sensor data may not test for a type of damage when the sensor data does not change in the presence of the type of damage.

Figure 30:
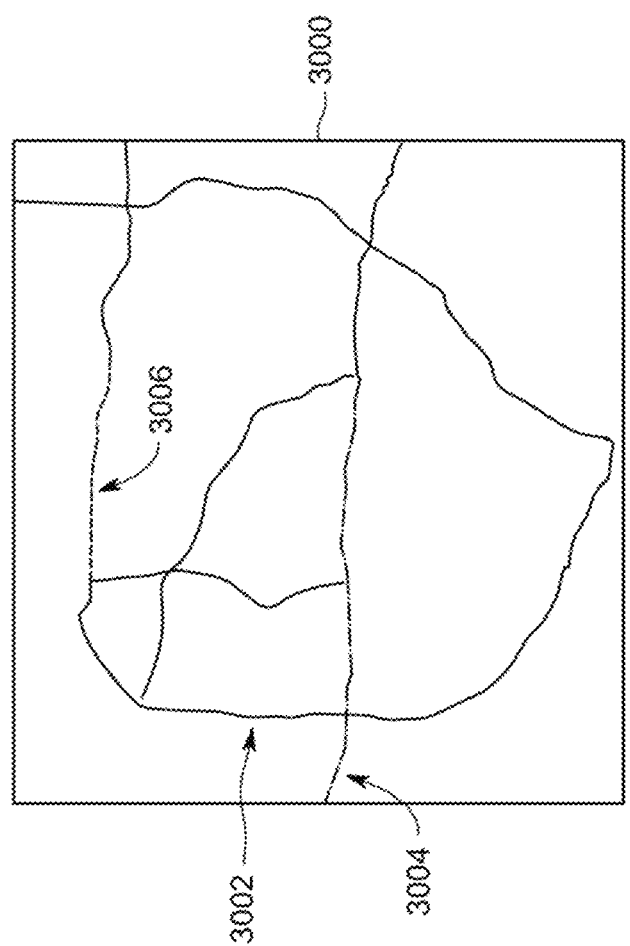
FIG. 30 illustrates one example of a health score presentation.

The controller 2902 can generate a control signal for presentation on the output device 2912, such as an electronic display, mobile phone, or the like. The presentation can indicate the health scores for different segments of the transportation system. FIG. 30 illustrates one example of a health score presentation 3000. The presentation 3000 can be created by the output device 2912 based on the control signal received from the controller 2902, which indicates health scores for different segments of routes in a transportation system. The example presentation 3000 is a map with different segments 3002, 3004, 3006 of routes shown differently, such as in different colors, using different lines, etc. The different segments 3002, 3004, 3006 appear are presented differently to indicate the different health scores of the segments 3002, 3004, 3006. For example, the segments 3002 may be shown using a first color (e.g., green) or a solid line to indicate higher health scores, the segments 3004 may be shown using a different, second color (e.g., red) or a first dashed line to indicate low health scores, and the segments 3006 may be shown using a different, third color (e.g., yellow) or a different, second dashed line to indicate medium health scores.

The presentation 3000 can be used to inform an operator or user of segments of the routes in the transportation system to avoid traveling over or to slow down during travel over. Optionally, the health scores for one or more segments of the routes can be communicated to a controller onboard a vehicle system. The controller can then automatically change which routes the vehicle system travels over or automatically slow down during travel over one or more of the route segments based on the health scores.

In one embodiment, the sensor data can be used by the controller 2902 to create a digital twin of one or more routes or other equipment (e.g., wayside devices, gates, tunnels, bridges, etc.). The digital twin is a computerized representation of the route or equipment that is formed based at least in part on the sensor data. The controller 2902 can prognostically project the health score of one or more segments of routes in a forward direction based on the digital twin. The controller 2902 can examine data from the sensors and/or previous health scores of the routes to predict future states or health scores of the routes. For example, the controller 2902 can examine the sensor data from one or many sensors and/or previous health scores for a route segment. The controller 2902 can determine how rapidly the route segment is deteriorating based on the sensor data and/or previous health scores. The controller 2902 can then determine the future condition of the route segment based on how rapidly the route segment is deteriorating. For example, for a first route segment having sensor data and/or health scores showing minor or no changes in the condition of the first route segment, the controller 2902 can determine that the future state of the first route segment will change very little, if at all. But, the controller 2902 can determine that, for a different, second route segment having sensor data and/or health scores showing rapid changes in the condition of the first route segment, the controller 2902 can determine that the future state of the second route segment continue to rapidly deteriorate. The controller 2902 can present the predicted future states or health scores as the presentation 3000 or in another manner. The predicted states or health scores can be presented as a trendline representation or at a time selected by a user.

The controller 2902 can present additional information on the output device 2912. For example, the controller 2902 can direct the output device 2912 to display the current state of a route, the state of the route as of a last inspection, the date of the last inspection, the time gap between the last actual inspection and the current time, the type of inspections that have been performed, the time of the inspections, the anticipated time until the state of health declines below a threshold health level, and other information associated with the route. Such additional information may include events of consequence (increased traffic on holidays), historical travel patterns and travel volumes, consequences to traffic closure due to failure or to scheduled maintenance, expected times to complete various types of maintenance, available resources for conducting maintenance, and the like. The depiction may be of the inspected object, whether a point on a road, a section of track, or a bridge or other infrastructure. That depiction may be a two-dimensional image, or may be three-dimensional rendered representation based in part on images taken from the mobile platform or from another data acquisition platform. Areas of interest (such as failure points, wear, fatigue, rust, cracks, and the like) may be highlighted on the depiction of the object (e.g., the three-dimensional rendering). These highlights may be coded by color or another symbol. For example, cracks may be flashing red while rust spots have arrows pointing to them. Where painted or coated road markings are available, the wear condition of the paint may be illustrated with matching color when the paint is of good repair, but may switch to another color when the paint is missing or worn.

Optionally, the controller 2902 can generate the control signal for communication to the output device 2912 to present other information to a user. For example, the controller 2902 can automatically direct the output device 2912 to present a configurable dashboard that includes one or more of a map of routes with an overlay system that shows sensor data or information based on the sensor data, an augmented reality image that depicts information based on the sensor data (e.g., shows a portion of an actual image of a rail as red due to the sensor damage indicating damage to that portion of the rail), a video of a selected location, time stamps representative of when the displayed sensor data was obtained, trending and prognostic data, equipment location, types of equipment, operational information for a transportation network such as volume or velocity, weather conditions, maintenance crew locations, and the like. Optionally, the controller 2902 can direct the output device 2912 to present this information in response to a user selection of one or more of a time, location, query type, or other constraint.

The system 2900 optionally can obtain sensor data from one or more of the sensors to examine or inspect equipment or assets other than vehicles and routes. For example, the system 2900 can obtain sensor data indicative of bridges, tunnels, or the like, for inspecting the health or condition of these assets. As another example, the system 2900 can use one or more of the sensors to obtain sensor data of non-transportation equipment or assets. The controller 2902 can direct the sensor package unit 102 to fly over or along routes to obtain one or more images and/or video of the routes. Non-transportation equipment and assets (e.g., communication or cellular towers, buildings, crop fields, etc.) may appear in one or more of the images and/or video. As one example, the sensor 104 can obtain video of crops in the background of video of a track. The images and/or video of the non-transportation equipment and/or assets can be examined to determine the state or condition of the equipment and/or assets. For example, the video or images of the track which also shows a field of crops can be examined to determine the condition of the track, as well as or to determine the state of the crops (e.g., in need of water, not yet ready for harvesting, ready for harvesting, amount of crop yield, etc.). This can avoid the need for sending additional sensors to the location of the non-transportation equipment and/or assets to obtain sensor data about the non-transportation equipment and/or assets.

In one embodiment, a system includes a mobile platform configured to move under remote control or under autonomous control, a sensor package supported by the mobile platform and configured to obtain information relating to a component of a transportation network, and one or more processors configured to receive the information obtained by the sensor package and to analyze the information in combination with other information that is not obtained from the sensor package. The one or more processors also are configured to generate an output that at least one of displays information relating to one or more of a status, a condition, or a state of health of the component of the transportation network; initiates an action to change an operational state of the component; identifies a hazard to one or more vehicles traveling within the transportation network; and/or collects the information relating to the component. The component is not communicatively coupled to an information network and the mobile platform provides the information that is obtained by the sensor package to the information network in one embodiment.

Optionally, the one or more processors can be configured to generate an output, based on the information obtained by the sensor package analyzed in combination with the other information, that identifies a hazard to one or more vehicles traveling within the transportation network, that initiates an action to change an operational state of the component responsive to the identified hazard, and that initiates a control signal for controlling the one or more vehicles responsive to the identified hazard. For example, responsive to the one or more processors receiving the information obtained by the sensor package and analyzing the information in combination with other information that is not obtained from the sensor package, the one or more processors can identify a damaged route segment, a damaged switch at an intersection between routes, a damaged gate, a damaged signal, a damaged or an immobile vehicle ahead on a route, etc. The one or more processors can then generate and communicate a control signal to control a vehicle headed toward the hazard (e.g., to automatically slow, stop, and/or change a direction of movement of the vehicle heading toward the hazard, or to instruct an operator of that vehicle to slow, stop, or change a direction of movement of the vehicle) based on the identification of the hazard. The one or more processors also can generate another control signal (or use the same control signal) and communicate the control signal to a component of the transportation network, such as a signal, gate, switch, etc. This control signal can help in preventing the vehicle heading toward the hazard from reaching the hazard, such as by changing a color or other state of a signal (e.g., changing from a green light to a red light), by lowering a gate (e.g., to prevent passage of the vehicle on a route toward the hazard), by changing which routes are connected by a switch (e.g., to cause the vehicle to move onto another route that does not include the hazard), etc.

Optionally, the information relating to the component of the transportation network is one or more of a condition or a state of health of the component.

Optionally, the system also includes a control unit configured to control a path of travel of the mobile platform.

Optionally, the control unit is configured to autonomously prevent the mobile platform from moving outside of a determined multi-dimensional movement envelope or from moving into a restricted airspace.

Optionally, the control unit is further configured to respond to a signal from a beacon to avoid controlling the mobile platform into a collision with an object operably coupled with the beacon.

Optionally, the control unit is further configured to control the mobile platform to move to a safe position or operating mode in response to the mobile platform being located within a defined distance of a beacon or being located outside of the movement envelope.

Optionally, the control unit is further configured to communicate with an air traffic control system prior to controlling the mobile platform from moving from within the movement envelope to commercial airspace.

Optionally, the information obtained from the sensor package is video or image data. The other information that is not obtained from the sensor package can be obtained from one or more of a route planning system that is configured to map or control vehicles traveling through at least part of the transportation network, a vehicle controller that is configured to control the operation of at least one vehicle, a wayside device that is configured to monitor a segment of the transportation network, and/or a satellite that is configured to monitor the segment of the transportation network.

Optionally, the route planning system determines at least one of volume and velocity of the vehicles based at least in part on the information obtained from the sensor package.

Optionally, the one or more processors are configured to determine that the hazard exists on a route of the transportation network and the route planning system responds to the hazard being determined by the one or more processors re-routing one or more vehicles traveling through the transportation network to avoid collision with the hazard that is determined.

Optionally, the one or more processors are configured to determine that the hazard exists on a route of the transportation network and the vehicle controller responds to the hazard by at least one of re-routing the at least one vehicle through the transportation network to avoid collision with the hazard that is determined, or by stopping the vehicle to avoid collision with the hazard that is determined.

Optionally, the one or more processors are configured to direct an output device to display the information relating to the one or more of the status, the condition, or the state of health of the component of the transportation network. The information that is displayed can include a map and icons indicating a location of the component on the map.

Optionally, the one or more processors are configured to initiate the action to change the operational state of the component by one or more of, activating a switch to change a pathway defined by rail tracks, activating a signal light to change a traffic flow pattern in the transportation network, opening a closed gate, closing an open gate, and/or dumping bulk materials from one or more vehicles.

Optionally, the one or more processors are configured to collect the information relating to the component, and the mobile platform can provide instructions or information to the component.

Optionally, the mobile platform is further configured to communicate with two or more of a plurality of vehicles traveling through the transportation network, and the two or more vehicles communicate with each other through the mobile platform.

Optionally, the transportation network is a railroad having one or more tracks and the one or more vehicles are one or more rail vehicles, and the one or more processors are configured to be disposed onboard at least one of the rail vehicles. The one or more processors also can be configured to identify at least one of a broken component of the one or more tracks or an obstacle on the one or more tracks based on the information relating to the component.

In one embodiment, a method includes controlling movement of a mobile platform having a sensor package supported thereon. The sensor package is configured to obtain information relating to a component of a transportation network. The method also includes analyzing the information relating to the component of the transportation network and obtained by the sensor package. The information relates to the component analyzed in combination with other information that is not obtained from the sensor package. The method also includes generating an output that at least one of displays information relating to one or more of a status, a condition, or a state of health of the component of the transportation network; initiates an action to change an operational state of the component; identifies a hazard to one or more vehicles traveling within the transportation network; and/or collects the information relating to the component. The component is not communicatively coupled to an information network, and the mobile platform provides the information that is obtained by the sensor package to the information network in one embodiment.

Optionally, the information relating to the component of the transportation network is one or more of a condition or a state of health of the component.

In one embodiment, a system includes a mobile platform configured to move off-board of a vehicle moving along one or more routes of a transportation network. The mobile platform includes a sensor package configured to sense information and output data indicative of a state of a component of the transportation network. The system also includes one or more processors configured to receive the data that is output from the sensor package. The one or more processors are configured to identify a hazard to the vehicle based on the data that is output. The one or more processors are configured to generate an autonomous control signal that changes movement of the vehicle responsive to the hazard being identified.

Optionally, the one or more processors are configured to identify the hazard as a damaged segment of a route of the one or more routes on which the vehicle is traveling, and the one or more processors are configured to generate the autonomous control signal to one or more of remotely change a state of a switch in the transportation network located at an intersection between the route on which the vehicle is traveling and at least one additional route of the one or more routes, or remotely direct the vehicle to slow or stop movement.

Certain embodiments of the present disclosure provide a locomotive control system that includes a locomotive controller that is configured to control the operation of at least one locomotive, a mobile platform configured to move under remote control or under autonomous control, a sensor package supported by the mobile platform and configured to obtain information relating to a component of a railroad, and one or more processors configured to receive the information obtained by the sensor package and to analyze the information in combination with other information that is not obtained from the sensor package, and to generate an output that at least one of: displays information relating to one or more of a status, a condition, or a state of health of the component of the railroad, initiates an action to change an operational state of the component, identifies a hazard to the at least one locomotive within the railroad, or collects the information relating to the component. The component is not communicatively coupled to an information network, and the mobile platform provides the information that is obtained by the sensor package to the information network. The other information that is not obtained from the sensor package is obtained from the locomotive controller.

The information relating to the component of the railroad may be one or more of a condition or a state of health of the component.

In at least one embodiment, a control unit is configured to control a path of travel of the mobile platform. The control unit is configured to autonomously prevent the mobile platform from moving outside of a determined multi-dimensional movement envelope or from moving into a restricted airspace. In at least one embodiment, the control unit may be further configured to control the mobile platform to move to a safe position or operating mode in response to the mobile platform being located within a defined distance of a beacon or being located outside of the determined multi-dimensional movement envelope. The control unit may be further configured to communicate with an air traffic control system prior to controlling the mobile platform from moving from within the determined multi-dimensional movement envelope to commercial airspace. The control unit may be further configured to respond to a signal from a beacon to avoid controlling the mobile platform into a collision with an object operably coupled with the beacon.

The information obtained from the sensor package may be video or image data. The other information that is not obtained from the sensor package may be further obtained from one or more of: a route planning system that is configured to map or control locomotives traveling through at least part of the railroad, a wayside device that is configured to monitor a segment of the railroad, or a satellite that is configured to monitor the segment of the railroad. In at least one embodiment, the route planning system determines at least one of volume and velocity of the locomotives based at least in part on the information obtained from the sensor package.

The one or more processors may be configured to determine that the hazard exists on a route of the railroad and the route planning system responds to the hazard being determined by the one or more processors re-routing the locomotives traveling through the railroad to avoid collision with the hazard that is determined.

The one or more processors may be configured to determine that the hazard exists on a route of the railroad and the locomotive controller responds to the hazard by at least one of re-routing the at least one locomotive through the railroad to avoid collision with the hazard that is determined, or by stopping the at least one locomotive to avoid collision with the hazard that is determined.

The one or more processors may be configured to direct an output device to display the information relating to the one or more of the status, the condition, or the state of health of the component of the railroad, the information that is displayed including a map and icons indicating a location of the component on the map.

In at least one embodiment, the one or more processors are configured to initiate the action to change the operational state of the component by one or more of: activating a switch to change a pathway defined by rail tracks, activating a signal light to change a traffic flow pattern in the railroad, opening a closed gate, closing an open gate, or dumping bulk materials from one or more locomotives.

The one or more processors may be configured to collect the information relating to the component, and the mobile platform may provide instructions or information to the component. In at least one embodiment, the mobile platform is further configured to communicate with two or more of a plurality of locomotives traveling through the railroad, and the two or more locomotives communicate with each other through the mobile platform.

The one or more processors may be configured to be disposed onboard the at least one locomotive. The one or more processors may also be configured to identify at least one of a broken component of one or more tracks of the railroad or an obstacle on the one or more tracks based on the information relating to the component.

In at least one embodiment, the locomotive control system includes a mission optimizer on board the at least one locomotive and configured to determine a trip plan for a trip of the at least one locomotive, such as described in U.S. patent application Ser. No. 11/750,716, which has been incorporated by reference in its entirety. The trip plan includes at least one of plural speed settings, plural power settings, or plural throttle settings as a function of at least one of time or distance of the at least one locomotive along a route of the trip, based on information of the at least one locomotive and information of the route. The mission optimizer is configured to determine the trip plan before the at least one locomotive commences a trip along the route. The mission optimizer is further configured to output signals representative of the at least one of plural speed settings, plural power settings, or plural throttle settings for control of an engine system of the at least one locomotive along the route. The locomotive control system may also include a sensor (such as sensor(s) shown in FIG. 3 of U.S. patent application Ser. No. 11/750,716) on board the at least one locomotive configured to collect operational data of the at least one locomotive. The operational data includes data of at least one of tractive effort or emissions actually generated by the at least one locomotive as the at least one locomotive travels along the route. A communication system (such as the communication systems shown in FIGS. 3 and 12 of U.S. patent application Ser. No. 11/750,716) may be on board the at least one locomotive configured to communicate the operational data to the mission optimizer. The mission optimizer is configured to change the signals representative of the at least one of plural speed settings, plural power settings, or plural throttle settings that are output from the mission optimizer as the at least one locomotive travels along the route, based in part on the data of the at least one of tractive effort or emissions actually generated by the at least one locomotive.

The mission optimizer may be configured to re-determine, at a point along the route, the trip plan based on the information of the at least one locomotive and the information of the route and the operational data, and may include a converter (such as the converter shown in FIG. 12 of U.S. application Ser. No. 11/750,716) coupled to the mission optimizer and the communication system. The converter is configured to convert the signals that are output from the mission optimizer to electrical signals for controlling the engine system of the at least one locomotive. A master controller (such as the master controller shown in FIG. 11 of U.S. application Ser. No. 11/750,716) may be coupled to the converter and the at least one locomotive for controlling the engine system of the at least one locomotive. The master controller includes at least one switch (such as the switching device shown in FIG. 13 of U.S. application Ser. No. 11/750,716) operable by an operator of the at least one locomotive. The at least one of plural speed settings, plural power settings, or plural throttle settings are determined in part based on minimizing fuel consumption, time, considerations, and emissions output.

Certain embodiments of the present disclosure provide a locomotive control method comprising: controlling movement of a mobile platform having a sensor package supported thereon, the sensor package configured to obtain information relating to a component of a railroad; analyzing the information relating to the component of the railroad and obtained by the sensor package, the information relating to the component analyzed in combination with other information that is not obtained from the sensor package; and generating an output that at least one of: displays information relating to one or more of a status, a condition, or a state of health of the component of the railroad, initiates an action to change an operational state of the component, identifies a hazard to one or more locomotives traveling within the railroad, or collects the information relating to the component, wherein the component is not communicatively coupled to an information network, and the mobile platform provides the information that is obtained by the sensor package to the information network.

Certain embodiments of the present disclosure provide a locomotive control system comprising: a mobile platform configured to move off-board of a locomotive moving along one or more routes of a railroad, the mobile platform including a sensor package configured to sense information and output data indicative of a state of a component of the railroad; and one or more processors configured to receive the data that is output from the sensor package, the one or more processors configured to identify a hazard to the locomotive based on the data that is output, wherein the one or more processors are configured to generate an autonomous control signal that changes movement of the locomotive responsive to the hazard being identified.

Vehicle communication systems may integrate vehicle components and interfaces with applications that communicate with the vehicle components via the interfaces. For example, a vehicle may include an engine monitoring application to communicate with an engine system via an engine sensor interface. When these vehicle components become obsolete, code may need to be rewritten for communication between new components, interfaces, and applications, thereby increasing development and deployment costs. Further, such code may not be portable, modular, and/or reusable when the vehicle components, interfaces, and/or applications are integrated.

Implementations described herein include a vehicle communication system that permits reuse of code and automatic management of communications between vehicle components and applications via interfaces. The applications, interfaces, and other components of the vehicle communication system (e.g., code associated with these components) may be modular (e.g., separate) to permit code reuse, code portability, and code flexibility in a hardware-agnostic communication system. Furthermore, implementations described herein may permit communication between an application and an interface based on compatibility between the application and the interface. As a result, fewer errors occur during communication, and time is saved due to code reuse. Further, implementations described herein provide a scalable communication architecture, automatic configuration of communications between applications and interfaces, flexible use for different vehicle components and component configurations, and functionality across multiple operating systems. Further, implementations described herein improve the security of vehicle communications. For example, implementations described herein may prevent an application from controlling or monitoring a vehicle component to which the application has not been granted permission to access (e.g., prevent an engine monitoring application from controlling or monitoring a brake system).

Figure 31:
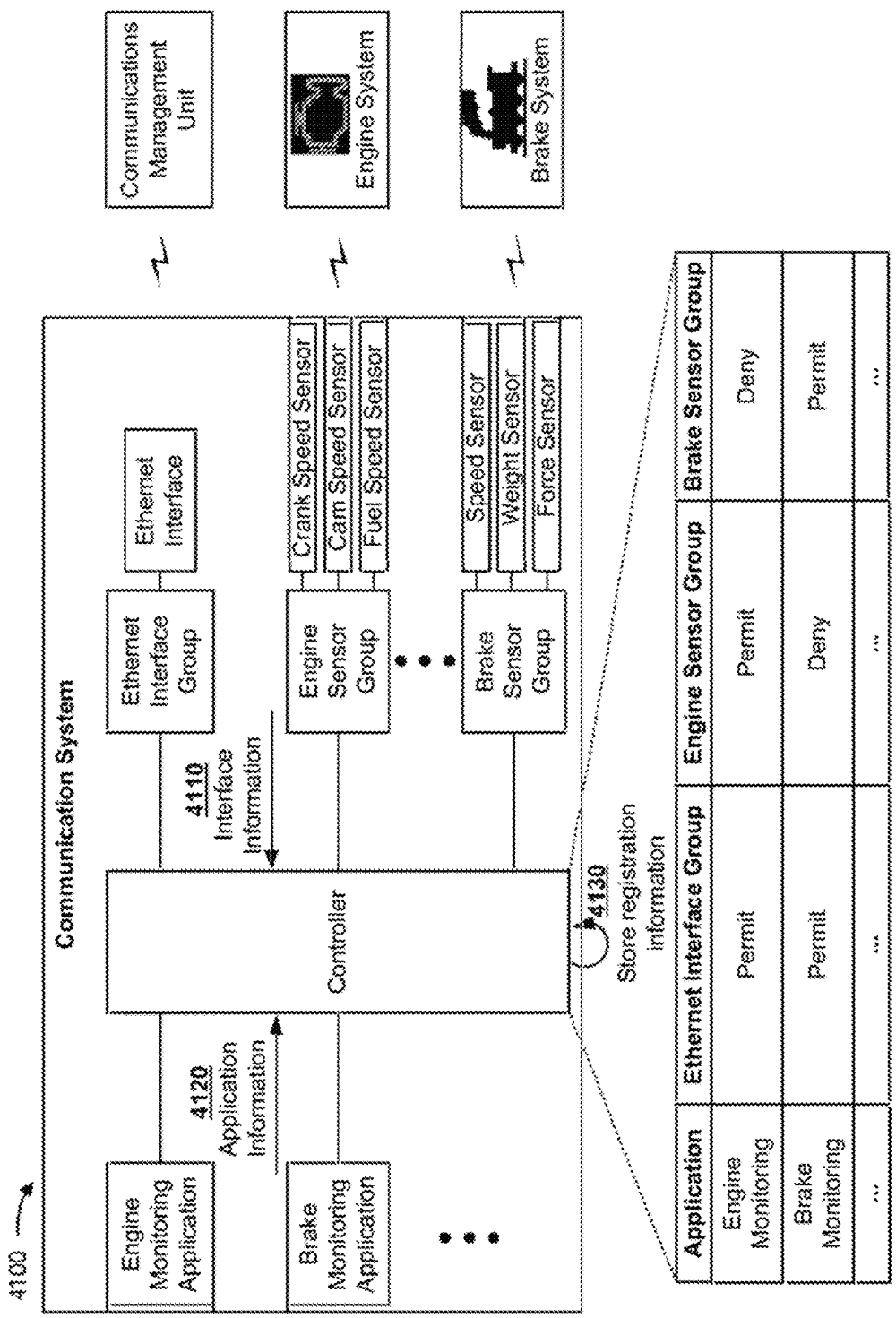
FIG. 31 is a diagram of an overview of an example implementation described herein that includes a communication system in accordance with an embodiment.
Figure 32:
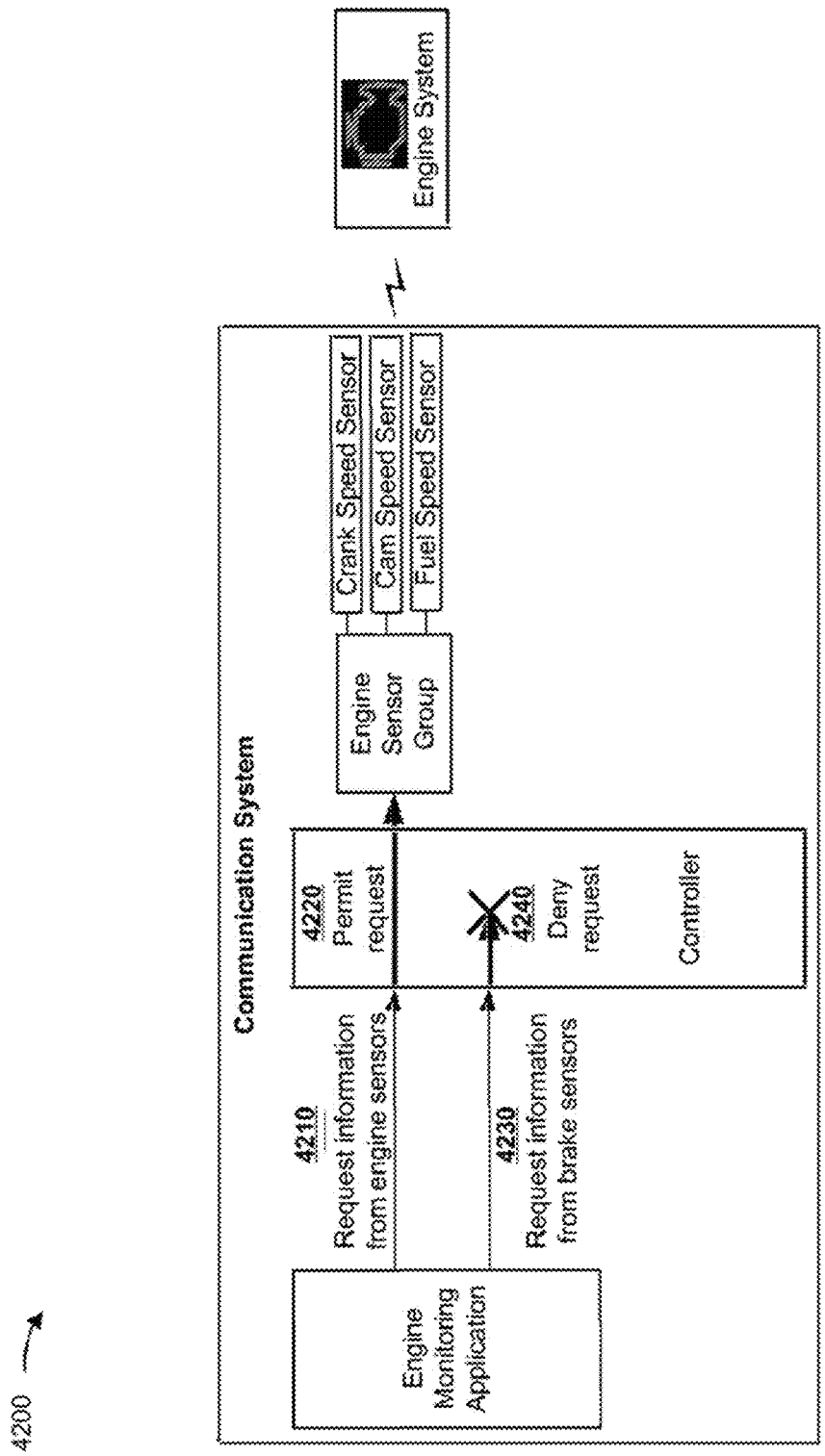
FIG. 32 is a diagram of an overview of an example implementation described herein that includes a communication system in accordance with an embodiment.
Figure 33:
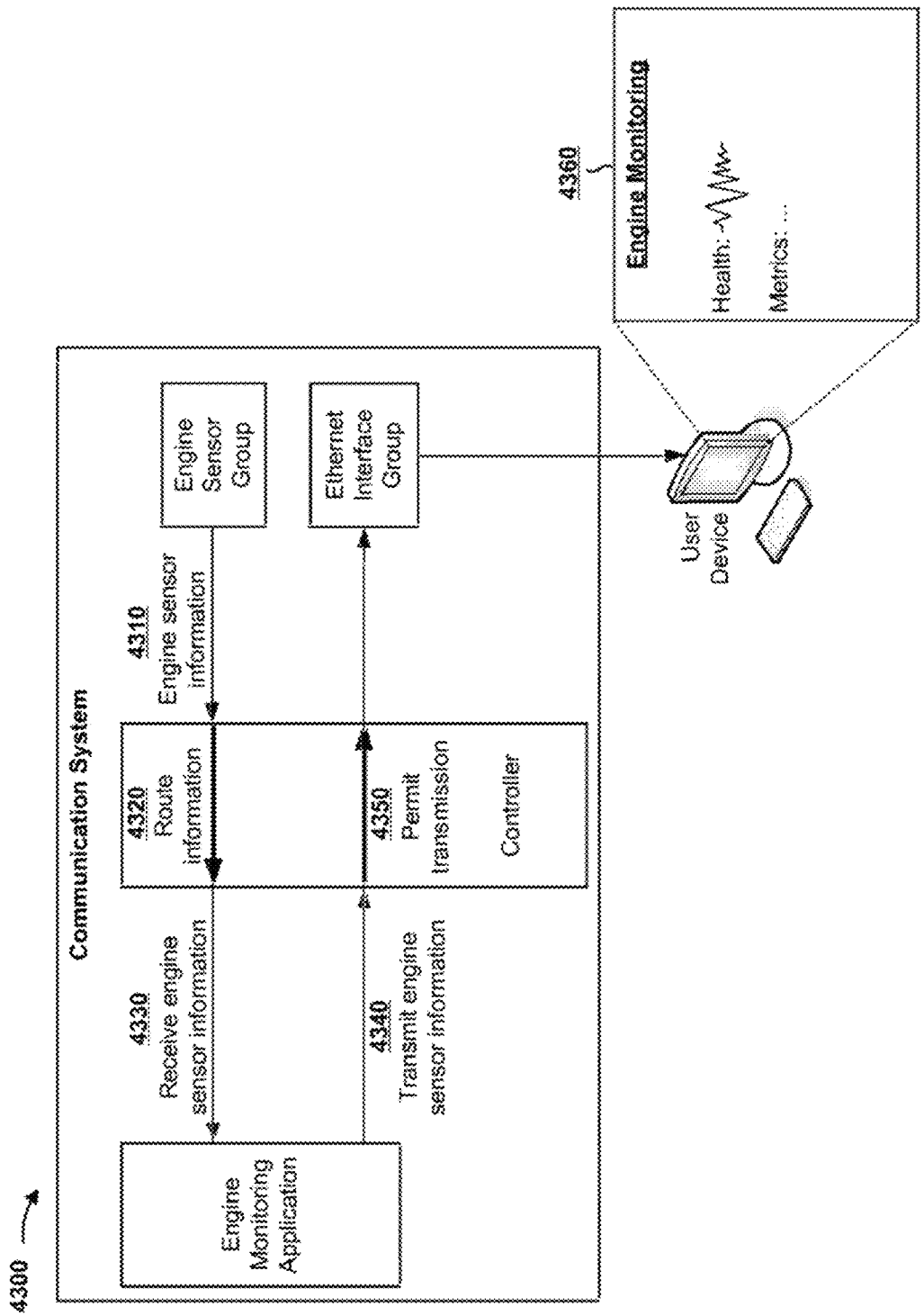
FIG. 33 is a diagram of an overview of an example implementation described herein that includes a communication system in accordance with an embodiment.

FIGS. 31, 32, and 33 are diagrams of an overview of example implementations 4100, 4200, and 4300 described herein. As shown in 31 FIG. 31, a communication system of a vehicle may include multiple components, such as a controller, one or more applications, and one or more interface groups associated with one or more interfaces. For example, the communication system shown in 31 FIG. 31 includes an engine monitoring application, a brake monitoring application, an Ethernet interface group associated with an Ethernet interface, an engine sensor group associated with a crank speed sensor, a cam speed sensor, and a fuel speed sensor, and a brake sensor group associated with a speed sensor, a weight sensor, and a force sensor. The communication system may implement these components as modular components, such that the communication system can be customized and scalable to coordinate communication between different applications, interface groups, interfaces, and vehicle components.

As shown by reference number 4110, the controller may receive interface information from one or more interfaces associated with the communication system. For example, the controller may receive interface information from the Ethernet interface group, the engine sensor group, and the brake sensor group. In some implementations, the interface information may include an interface identifier, compatibility information (e.g., a format for information capable of being transmitted via and/or received from the interface), information that identifies a vehicle component for which the interface provides communication capability, or the like. In some implementations, the interface information may include access permission information identifying which applications are allowed to communicate with particular vehicle components via the interface(s). As an example, the interface information may include access permission information indicating that an engine monitoring application is allowed to communicate with an engine system via the engine sensor group, but is not allowed to communicate with a brake system via the brake sensor group.

As shown by reference number 4120, the controller may receive application information from one or more applications for monitoring or controlling the vehicle components via the interface(s). For example, the controller may receive the application information from an engine monitoring application, a brake monitoring application, and/or another type of application associated with the vehicle. In some implementations, the application information may include an application identifier and/or compatibility information (e.g., types of interfaces with which the application is compatible, a format for information that the application is able to receive and transmit, and/or other compatibility information).

As shown by reference number 4130, the controller may store registration information that identifies applications and interfaces via which the applications are permitted to communicate. In some implementations, the registration information may be based on compatibility information and/or access permission information. For example, the registration information may indicate that a particular application may communicate via a particular interface when the particular application is compatible with the particular interface and when the access permission information indicates that the particular application is allowed to communicate via the particular interface.

As an example, assume that the engine monitoring application is compatible with the Ethernet interface group and the engine sensor group, but is not compatible with the brake sensor group. Further, assume that the engine monitoring application is allowed to communicate via the Ethernet interface group and the engine sensor group, but not via the brake sensor group (e.g., based on the access permission information). Thus, as shown in 31 FIG. 31, the controller may store registration information indicating that the engine monitoring application is permitted to communicate via the Ethernet interface group and the engine sensor group, but is not permitted to communicate via the brake sensor group. Similarly, the controller may store registration information indicating that the brake monitoring application is permitted to communicate via the Ethernet interface group and the brake sensor group, but is not permitted to communicate via the engine sensor group.

As shown in FIG. 32, and by reference number 4210, assume that the engine monitoring application requests information from engine sensors. As shown by reference number 4220, the controller may permit this request because the registration information indicates that the engine monitoring application is permitted to communicate via the engine sensor group, and may permit the engine monitoring application to access the engine sensor group. As shown by reference number 4230, assume that the engine monitoring application also requests information from brake sensors. As shown by reference number 4240, the controller may deny this request because the registration information indicates that the engine monitoring application is not permitted to communicate via the brake sensor group.

As shown in FIG. 33, and by reference number 4310, the engine sensor group may output engine sensor information. For example, the engine sensor group may output engine sensor information based on the controller permitting the request for the engine sensor information. As shown by reference number 4320, the controller may route the engine sensor information to the engine monitoring application. As shown by reference number 4330, the engine monitoring application may receive the engine sensor information. As shown by reference number 4340, the engine monitoring application may request to transmit the engine sensor information, via the Ethernet interface group, to a user device. As shown by reference number 4350, the controller may permit this transmission because the registration information indicates that the engine monitoring application is compatible with the Ethernet interface group and is allowed to communicate via the Ethernet interface group. As shown by reference number 4360, the user device may receive and display the engine sensor information (e.g., in an engine monitoring application of the user device). In some implementations, the user device may be used to monitor the engine and/or control the engine based on the received engine sensor information.

In this way, the controller may manage communications between applications and vehicle components via one or more interfaces. The controller may store registration information indicating whether a particular application may communicate with a particular vehicle component via a particular interface based on the compatibility between the application and the interface and/or based on access permission information. As a result, errors in communication between applications and interfaces may be reduced, and security policies may be implemented and/or updated without the need to update the underlying code within an application and/or the communication system. Further, communications between an application and an updated or new vehicle component may occur without the need to rewrite code and/or redeploy the application. Similarly, communications between an updated or new application and a vehicle component may occur without the need to update the vehicle component.

Furthermore, by utilizing modular components, the communication system can be easily modified to add a new application (e.g., to permit an application to communicate via one or more interfaces and/or interface groups), to remove an application (e.g., to prevent an application from communicating via one or more interfaces and/or interface groups), or to modify applications (e.g., to modify interface groups and/or interfaces via which an application is permitted to communicate). Similarly, the communication system can be easily modified to add a new interface and/or an interface group, to remove an interface and/or an interface group, or to modify an interface and/or an interface group. In this way, when vehicle components are added, removed, or modified, the communication system can be easily modified to support such changes to the vehicle components.

As indicated above, FIGS. 31, 32, and 33 are provided merely as examples. Other examples are possible and may differ from what was described with regard to FIGS. 31, 32, and 33.

Figure 34:
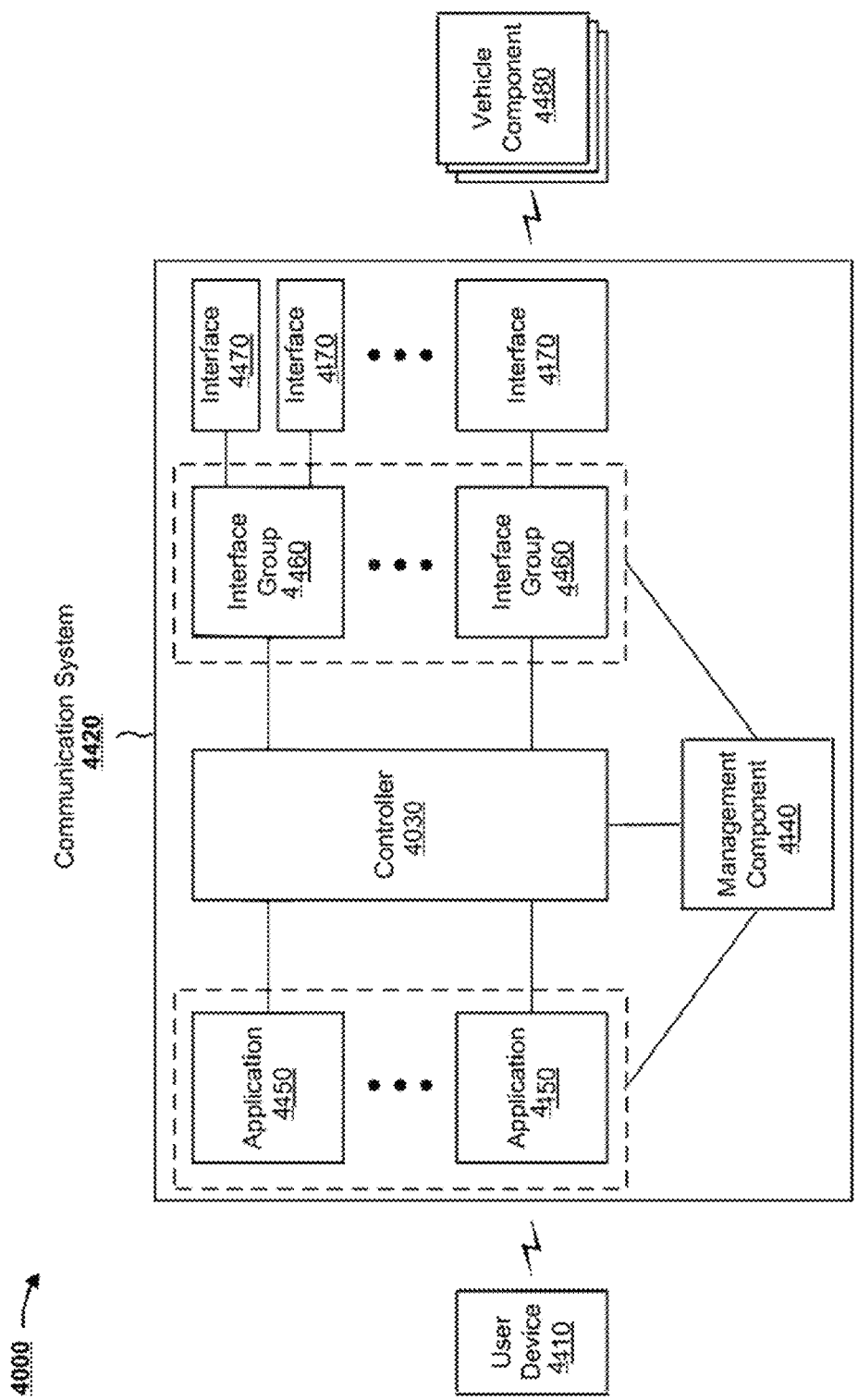
FIG. 34 is a diagram of an example environment in which systems and/or methods, described herein, may be implemented.

FIG. 34 is a diagram of an example of an environment 4400 in which systems and/or methods, described herein, may be implemented. As shown in FIG. 34, the environment 4400 may include a user device 4410, a communication system 4420, a controller 4430, a management component 4440, an application 4450, an interface group 4460, an interface 4470, and a vehicle component 480. Devices of the environment 4400 may interconnect via wired connections, wireless connections, or a combination of wired and wireless connections.

User device 4410 includes one or more devices capable of communicating with communication system 4420. For example, user device 4410 may include an on-board vehicle computer, a desktop computer, a laptop computer, a server device, a mobile phone, or the like. In some implementations, user device 4410 may provide application information to install and/or register application 4450 with communication system 4420. Additionally, or alternatively, user device 4410 may execute application 4450 to send information to or receive information from vehicle component 4480. In some implementations, user device 4410 may be integrated into a vehicle and/or used to monitor or control one or more vehicle components 4480.

Communication system 4420 includes one or more devices capable of facilitating communication between one or more applications 4450 and one or more vehicle components 4480 via one or more interfaces 4470. For example, communication system 4420 may include one or more processors, an assimilator card, an integrated circuit, or the like. In some implementations, communication system 4420 includes a processor implemented in hardware, firmware, or a combination of hardware and software. For example, the processor may include a central processing unit (CPU), a graphics processing unit (GPU), an accelerated processing unit (APU)), a microprocessor, a microcontroller, and/or any processing component (e.g., a field-programmable gate array (FPGA) and/or an application-specific integrated circuit (ASIC)) that interprets and/or executes instructions.

Additionally, or alternatively, communication system 4420 may include a memory, such as a random access memory (RAM), a read only memory (ROM), and/or another type of dynamic or static storage device (e.g., a flash memory, a magnetic memory, and/or an optical memory) that stores information and/or instructions for use by a processor. Additionally, or alternatively, communication system 4420 may include one or more storage components, one or more input components, one or more output components, and/or one or more communication interfaces.

Communication system 4420 may perform one or more processes described herein. Communication system 4420 may perform these processes in response to a processor executing software instructions stored by a non-transitory computer-readable medium, such as a memory and/or a storage component. A computer-readable medium is defined herein as a non-transitory memory device. A memory device includes memory space within a single physical storage device or memory space spread across multiple physical storage devices. Software instructions may be read into the memory and/or the storage component from another computer-readable medium or from another device via a communication interface. When executed, software instructions stored in the memory and/or the storage component may cause the processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

As shown, communication system 4420 may include controller 4430, management component 4440, application 4450, interface group 4460, and/or interface 4470. In some implementations, one or more of these components may be integrated into communication system 4420. In some implementations, one or more of these components may be external to communication system 4420. In some implementations, components of communication system 4420 may communicate using an application programming interface (e.g., controller 4430 and application 4450, controller 4430 and interface group 4460, controller 4430 and interface 4470, or interface group 4460 and interface 4470).

Controller 4430 includes one or more components capable of facilitating communication between applications 4450 and interfaces 4470. For example, controller 430 may include an integrated circuit, one or more processors, or the like. In some implementations, controller 4430 may control and/or transfer communications between applications 4450 and interfaces 4470, as described in more detail elsewhere herein.

Management component 4440 includes one or more components capable of performing management functions for communications system 4420, such as resource management (e.g., management of memory and/or processing resources), boot management, or the like. For example, management component 4440 may include an integrated circuit, one or more processors, or the like. In some implementations, controller 4430 and management component 4440 may be integrated into a single component.

Application 4450 includes an application for receiving information from and/or sending information to vehicle component 4480. In some implementations, application 4450 may be used to monitor and/or control vehicle component 480. Additionally, or alternatively, application 4450 may receive input from user device 4410 for monitoring and/or controlling vehicle component 4480. In some implementations, application 4450 may output vehicle information to user device 410 based on information received from vehicle component 4480.

Interface group 4460 includes one or more components capable of facilitating communications between application 4450 and interface 4470. In some implementations, interface group 4460 may store information for communicating with one or more interfaces 4470. In some implementations, interface group 4460 may be configurable to permit communication between different types of interfaces 4470. Additionally, or alternatively, interface group 4460 may interface with, may activate, and/or may validate interfaces 4470.

Interface 4470 includes one or more components that provide an interface for communicating with vehicle component(s) 4480. For example, interface 4470 may include a serial interface (e.g., RS232 or RS422), a network interface (e.g., Ethernet interface, a coaxial interface), a wireless interface (e.g., cellular interface, such as a code division multiple access (CDMA) interface or a Global System of Mobile Communications (GSM) interface; a WiFi interface; a personal area network interface, such as an 802.15 interface), a controller area network (CAN) interface (e.g., a vehicle bus), a sensor interface, or the like. In some implementations, interface 4470 may be a device driver for vehicle component 4480.

Vehicle component 4480 includes one or more components of a vehicle. For example, a vehicle may include a locomotive, a railcar, a train, a mining vehicle, a marine vehicle, a land vehicle, a passenger vehicle, or the like. In some implementations, vehicle component 480 may include an engine, a boiler, a generator, a brake system (e.g., an air pump, a brake shoe, etc.), one or more lights, one or more valves, one or more actuators, or the like. Additionally, or alternatively, vehicle component 4480 may include one or more sensors, such as a position sensor, a speed sensor, an acceleration sensor, a temperature sensor, a pressure sensor, a weight sensor, or the like. In some implementations, vehicle component 4480 (e.g., a sensor of vehicle component 4480) may output information to application 4450 via interface 4470. Additionally, or alternatively, application 4450 may provide an instruction to an actuator of vehicle component 4480 to control vehicle component 4480.

The number and arrangement of devices and networks shown in FIG. 34 are provided as an example. In practice, there may be additional devices, fewer devices, different devices, or differently arranged devices than those shown in FIG. 34. Furthermore, two or more devices shown in FIG. 34 may be implemented within a single device, or a single device shown in FIG. 34 may be implemented as multiple, distributed devices. Additionally, or alternatively, a set of devices (e.g., one or more devices) of environment 4400 may perform one or more functions described as being performed by another set of devices of environment 4400. In some implementations, user device 4410, controller 4430, management component 4440, application 450, interface group 4460, interface 4470, and/or vehicle component 4480 may interact using pre-defined APIs.

Figure 35:
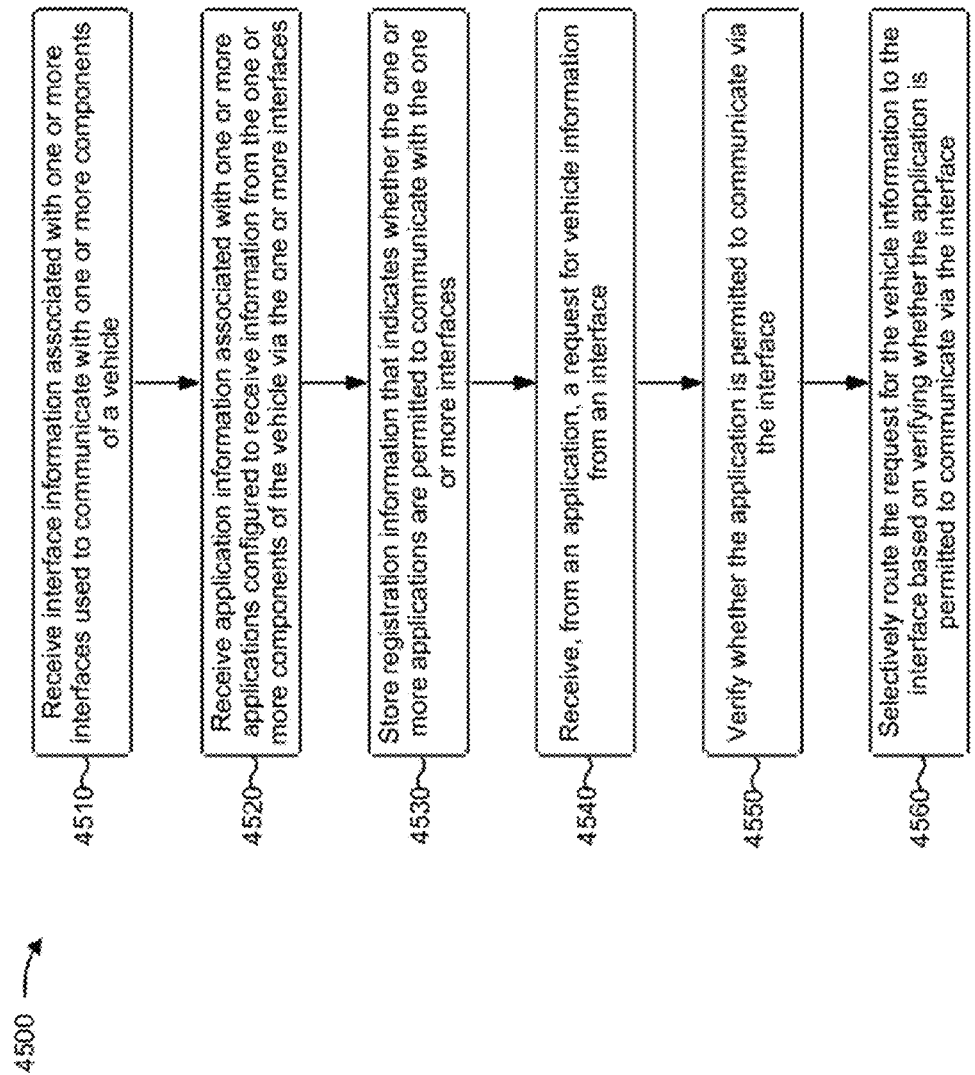
FIG. 35 is a flow chart of an example process for controlling or monitoring vehicle components using a communication system.

FIG. 35 is a flow chart of an example process 4500 for controlling or monitoring vehicle components using a communication system. In some implementations, one or more process blocks of FIG. 35 may be performed by communication system 4420. In some implementations, one or more process blocks of FIG. 35 may be performed by another device or a group of devices separate from or including communication system 420, such as user device 4410, controller 4430, management component 4440, application 4450, interface group 4460, interface 4470, and/or vehicle component 4480.

As shown in FIG. 35, process 4500 may include receiving interface information associated with one or more interfaces used to communicate with one or more components of a vehicle (block 510). For example, controller 4430 may receive interface information associated with interface 4470. The interface information may include information that permits communication with vehicle component 480 via interface 4470. For example, the interface information may include an interface identifier, an interface type identifier (e.g., information that indicates a type of interface 4470), interface compatibility information (e.g., a format for information capable of being transmitted via and/or received from interface 4470), information that identifies vehicle component(s) 480 for which interface 4470 provides communication capability, or the like.

In some implementations, the interface information may include access permission information that indicates whether application 4450 is allowed to communicate with vehicle component(s) 4480 via interface 4470. For example, the access permission information may indicate whether any applications 4450 are permitted to communicate with vehicle component(s) 4480 via interface 4470. As another example, the access permission information may identify one or more types of applications 4450 permitted to communicate with or prevented from communicating with vehicle component(s) 4480 via interface 4470. For example, the interface information may indicate that engine monitoring application types may communicate via engine sensor group interface types, but may not communicate via brake sensor group interface types. As another example, the access permission information may identify one or more particular applications 4450 permitted to communicate with or prevented from communicating with vehicle component(s) 4480 via interface 4470. As another example, the access permission information may identify one or more entities (e.g., application owners or creators) whose applications 4450 are permitted to communicate with or prevented from communicating with vehicle component(s) 4480 via interface 4470.

While some implementations are described herein in connection with interfaces 4470, some implementations may apply to interface groups 4460, which may include one or more interfaces 4470. For example, interface information may be received from an engine sensor group, a brake sensor group, a valve sensor group, or the like, and may indicate which application 4450 is allowed to communicate with vehicle component(s) 4480 via interface group 4460.

As further shown in FIG. 35, process 4500 may include receiving application information associated with one or more applications configured to receive information from the one or more components of the vehicle via the one or more interfaces (block 4520). For example, controller 4430 may receive application information associated with application 4450. In some implementations, the application information may include information for facilitating communication with application 4450. For example, the application information may indicate an application identifier, a type of application, an entity associated with the application (e.g., an application owner, an application creator), compatibility information (e.g., information that indicates a format for information capable of being received from and/or provided to application 4450), and/or other information regarding application 4450.

In some implementations, the application information may include information that identifies vehicle component(s) 4480, interface(s) 4470, and/or interface group(s) 4460 for which application 4450 is requesting permission to communicate. Additionally, or alternatively, the application information may include operating requirements of application 44450, such as memory access requirements, processing requirements, or the like. In some implementations, controller 4430 may not permit use of application 4450 (e.g., may not install application 4450) if the operating requirements of application 4450 do not comply with predefined criteria (e.g., memory and/or processor usage). In some implementations, controller 4430 may also provide an indication of a failure to install an application 4450 (e.g., to user device 4410). Additionally, or alternatively, controller 4430 may test communications between application 4450 and interface 4470. If communications fail, controller 4430 may remove and/or uninstall application 4450, and may provide an indication of the communication failure (e.g., to user device 4410).

As further shown in FIG. 35, process 4500 may include storing registration information that indicates whether the one or more applications are permitted to communicate with the one or more interfaces (block 4530). For example, controller 4430 may store registration information that indicates whether the one or more applications 4450 are permitted to communicate with one or more interfaces 4470. In some implementations, controller 4430 may use the application information and/or the interface information to determine the registration information. For example, controller 4430 may determine whether a particular application 4450 is permitted to communicate via a particular interface 4470 based on compatibility information (e.g., that indicates a compatibility between application 4450 and interface 4470 and/or interface group 4460) and/or based on access permission information. For example, controller 4430 may determine whether application 4450 is compatible with interface 4470 based on the format of data that application 4450 and interface 4470 are capable of transmitting and receiving. In some implementations, controller 4430 may store registration information indicating that an application 4450 may communicate via an interface 4470 when the application 4450 is compatible with the interface 4470 and when the access permission information indicates that the application 4450 is allowed to communicate via the interface 4470.

As an example, controller 4430 may determine whether application 4450 has permission to access interface 4470 based on the type of application 4450 and stored access permission information indicating the types of applications 4450 permitted to access interface 4470. As another example, controller 4430 may determine whether application 4450 has permission to access interface 4470 based on an identifier of application 4450 and stored access permission information indicating the application identifiers for applications 4450 permitted to access interface 4470. As another example, controller 4430 may determine whether application 4450 has permission to access interface 4470 based on an entity associated with application 4450 and stored access permission information identifying entities for applications 4450 permitted to access interface 4470. As another example, controller 4430 may determine whether application 4450 has permission to access interface 4470 based on a global indicator of whether any applications 4450 are permitted to access interface 4470.

In some implementations, controller 4430 may determine the registration information for one or more interfaces 4470 per application 4450. Additionally, or alternatively, controller 4430 may determine the registration information for multiple applications 4450. Additionally, or alternatively, controller 4430 may determine the registration information for an interface group 4460. In this case, if the registration information indicates that application 4450 is permitted to communicate with interface group 4460, then application 4450 may be permitted to communicate with all interfaces 4470 included in interface group 4460.

In some implementations, controller 4430 may store information that indicates a relationship between vehicle component 4480 and interface(s) 4470 (and/or interface groups 4460) for communicating with vehicle component 4480. Controller 4430 may use the stored relationship information to determine whether application 4450 is permitted to access vehicle component 4480 (e.g., via interface(s) 4470). For example, if application 4450 requests permission to access vehicle component 4480, then controller 4430 may determine interfaces 4470 used to communicate with vehicle component 4480, and may determine whether application 4450 is permitted to communicate with vehicle component 4480 based on whether application 4450 is permitted to communicate with interface 4470 associated with vehicle component 4480.

In some implementations, controller 4430 may store the registration information in a data structure that identifies application 4450 and whether to permit or deny communications between application 4450 and one or more interfaces 4470 identified by interface identifier(s). In some implementations, controller 4430 may store registration information as new applications 4450 are added (e.g., installed or requested to be installed) and/or as new application information is received. Additionally, or alternatively, controller 4430 may store registration information as new interfaces 4470 and/or interface groups 4460 are added (e.g., installed or requested to be installed) and/or as new interface information is received.

In some implementations, controller 4430 may load application information, may load interface information, and/or may store registration information upon boot-up. For example, executables for applications 4450, interface groups 4460, and/or interfaces 4470 may be stored by communication system 4420. Upon startup, management component 4440 may execute the executables to register applications 4450, interface groups 4460, and/or interfaces 4470. In some implementations, controller 4430 may store and/or replace executables and may reboot to reregister applications 4450, interface groups 4460, and/or interfaces 4470 when new applications 4450, interface groups 4460, and/or interfaces 4470 are installed or updated. In this way, controller 4430 may automatically configure communications between applications 4450 and interfaces 4470, may easily add new applications 4450 and interfaces 4470, and may easily update new applications 4450 and interfaces 4470. Furthermore, controller 4430 may conserve processing resources.

As further shown in FIG. 35, process 4500 may include receiving, from an application, a request for vehicle information from an interface (block 4540), and verifying whether the application is permitted to communicate via the interface (block 4550). For example, controller 4430 may receive a request for vehicle information from application 4450. In some implementations, controller 4430 may identify application 4450 from which the request is received (e.g., based on an identifier of the application 4450). Controller 4430 may identify an interface 4470 from which vehicle information is to be obtained. In some implementations, controller 4430 may identify the interface 4470 based on a type of vehicle information requested and the interface 4470 associated with the requested type of vehicle information. Additionally, or alternatively, the interface 4470 may be explicitly identified in the request. Additionally, or alternatively, an interface group 4460 and/or vehicle component 4480 may be identified in the request, and controller 4430 may identify interface 4470 based on the interface group 4460 and/or vehicle component 4480.

In some implementations, controller 4430 may verify whether the application 4450 is permitted to communicate with the interface 4470 based on the stored registration information. For example, controller 4430 may look up application 4450, using the registration information, to determine whether application 4450 has permission to access interface 4470.

As further shown in FIG. 35, process 4500 may include selectively routing the request for the vehicle information to the interface based on verifying whether the application is permitted to communicate via the interface (block 4560). For example, controller 4430 may provide the request to interface 4470 if application 4450 is permitted to access interface 4470 (e.g., based on the registration information). If application 4450 is not permitted to communicate with interface 4470, then controller 4430 may drop and/or discard the request. In some implementations, controller 4430 may notify application 4450 that the permission has been denied. In some implementations, controller 4430 may send the notification that the permission has been denied to user device 4410.

In some implementations, controller 4430 may receive a response, to the request, from interface 4470. Controller 4430 may provide the response to application 4450. In some implementations, controller 4430 may verify whether application 4450 is permitted to receive the response (e.g., based on the registration information). In this way, controller 4430 may provide additional security for communications between application 4450 and vehicle components 4480. As described herein, controller 4430 may increase security of communications between applications 4450 and vehicle components 4480 while providing a flexible, scalable architecture for communicating with vehicle components 4480.

In some implementations, application 4450 may use the response to monitor vehicle component 4480. For example, application 4450 may provide vehicle information for display (e.g., via user device 4410). The vehicle information may include information sensed by vehicle component 4480 and/or a sensor of vehicle component 4480, and may be used by an operator and/or by user device 4410 to control operation of vehicle component 4480. In some implementations, application 4450 may use the response to determine whether to control vehicle component 4480 and/or a manner in which vehicle component 4480 is to be controlled. For example, application 4450 may compare vehicle information to a threshold and/or a condition, and may control vehicle component 4480 when the threshold and/or condition is satisfied. In some implementations, application 4450 may control vehicle component 4480 by starting up vehicle component 4480, shutting down vehicle component 4480, restarting or rebooting vehicle component 4480, providing an instruction to vehicle component 4480 to modify an operating parameter of vehicle component 4480, or the like.

Although FIG. 35 shows example blocks of process 4500, in some implementations, process 4500 may include additional blocks, fewer blocks, different blocks, or differently arranged blocks than those depicted in FIG. 35. Additionally, or alternatively, two or more of the blocks of process 4500 may be performed in parallel.

As described above, a controller may manage communications between an application and a vehicle component via an interface. The controller may store registration information indicating whether a particular application may communicate with a particular vehicle component via a particular interface based on compatibility between the application and the interface and/or based on access permission information. In this way, as modular components (e.g., applications, interfaces, and/or interface groups) of the communication system are added, removed, or modified, the controller can maintain a high level of security for communications with vehicle components. Furthermore, errors in communication between applications and interfaces may be reduced, and access permission information may be implemented and/or updated without the need to update the underlying code for the application, the interface, or the vehicle component. Further, communications between an application and an updated vehicle component may occur without the need to rewrite and/or redeploy the application. Furthermore, implementations described herein may conserve computing resources via automatic configuration of communications between applications and interfaces.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the inventive subject matter described herein provide systems and methods that control a vehicle based on a performance, condition, or health state of a subsystem of the vehicle. The systems and methods described herein are not limited to any one subsystem, but rather can be utilized with various subsystems. For example, the subsystem may be a cooling subsystem, a propulsion subsystem, an HVAC subsystem, an electrical subsystem, or the like. The embodiments described herein determine a performance composite index (also referred to herein as performance index) for a designated subsystem of a vehicle. The performance index represents the health state or condition of the subsystem, and is based on performance of the subsystem. To determine a performance index of the subsystem, the systems and methods are configured to generate a digital twin of the subsystem for a trip of the vehicle, and then execute the digital twin with a physics-based simulation model of the subsystem.

For example, one or more embodiments are directed to utilizing current (e.g., real-time) vehicle data and/or historical vehicle data of a vehicle on a trip to evaluate the actual performance of the vehicle on the trip relative to simulated performance of the vehicle on the trip derived using a dynamic physics-based model. The actual monitored performance data is compared to simulated performance data generated via the physics-based model to predict the health or condition of a subsystem of the vehicle. In an embodiment, multiple physics-based models associated with different subsystems may be integrated within a modeling tool that is configured to predict vehicle capability for a given set of conditions or circumstances.

The digital twin is a numerical representation of the subsystem of the vehicle. In order to generate the digital twin for a subsystem, the systems and methods obtain operating parameters of the subsystem. At least some of the operating parameters may be received from sensors operably connected with the vehicle. The operating parameters may be indicative of a state of the subsystem of the vehicle. For example, the operating parameters may identify the subsystem and/or components thereof, may indicate usage or settings of the subsystem, may provide values of monitored parameters (e.g., vehicle temperatures or ambient temperatures), or the like. The systems and methods generate a digital twin for the subsystem using the operating parameters that are obtained and other information about the trip, such as environmental conditions experienced by the vehicle during the trip. The digital twin is executed in a physics-based model that is associated with the corresponding subsystem to produce the simulated performance data of the subsystem during the trip.

The systems and methods determine a performance composite index of the subsystem of the vehicle based on a calculated variance between the simulated performance data of the subsystem and actual performance data of the subsystem during the trip. The actual performance data is obtained from sensors onboard the vehicle and/or sensors disposed off-board but near the vehicle, such as sensors along the route. A low level of variance between the simulated performance data and the actual monitored performance data indicates a relatively high performance index (e.g., good or at least satisfactory health or condition) for the subsystem. For example, the simulated performance data may represent an output that is expected for a healthy subsystem that is functioning as designed. The subsystem of the vehicle has good or at least satisfactory health if the actual output is close to (e.g., within a designated variance threshold of) the simulated performance data. A high performance index may indicate that the subsystem is capable of performing an impending task with a very low likelihood that the subsystem will fail under a particular set of circumstances (e.g., environmental factors, load factors, distance of a trip, or the like). The high performance index may also indicate that the subsystem is working properly and does not need preventative maintenance.

Alternatively, a greater level of variance (e.g., that exceeds the designated variance threshold) between the simulated performance data and the actual monitored performance data indicates a relatively low performance index (e.g., poor or below satisfactory health) for the subsystem. The low performance index indicates that the subsystem is not performing as the subsystem is expected to perform based on the simulated performance data. The low performance index may indicate that the subsystem is unable to perform an impending task without maintenance. For example, a low performance index may indicate the subsystem could fail during an impeding task under a particular set of circumstances.

The performance index may be a quantitative and/or qualitative amount or value (e.g., a score). In an embodiment, the performance index is based on an amount of variation between the simulated performance data and the actual monitored performance data, and allows for ranking the subsystems and determining different degrees of good and poor health. For example, a first cooling system with a less than satisfactory performance index may be ranked as having better health than a second cooling system that also has a less than satisfactory performance index if the variance associated with the first cooling system is greater than the variance associated with the second cooling system. As a result, a vehicle having the first cooling system may be selected over a vehicle having the second cooling system for an impending task because the first cooling system has lower likelihood of failure during the impending task than the second cooling system.

The systems and methods may take various actions in response to determining the performance index of the subsystem of the vehicle. For example, the systems and methods may change or control actual operation of the subsystem during a trip based on the performance index. Thus, if the subsystem is determined to have a relatively poor performance index, the system and methods may apply a brake to stop or at least slow the movement of the vehicle, may prevent the vehicle from moving from a stationary position, or may limit the acceleration, speed, and/or distance traveled by the vehicle to reduce strain on the subsystem and/or prevent additional damage to the subsystem. Furthermore, the systems and method may change a task (e.g., switch or cancel a planned trip) of the vehicle to reduce the risk of failure during performance of the planned task. Furthermore, the systems and methods may activate an output device to notify an operator of the health score of the subsystem. The systems and methods may optionally automatically schedule preventative maintenance for the vehicle based on the health score. The systems and methods may predict a remaining life of the subsystem based in part on the performance index. The remaining life of the subsystem refers to an amount of time before the subsystem requires significant component replacement.

At least one technical effect of the subject matter described herein is the systems and methods can reduce the occurrence of subsystem damage and failure, which reduces downtime of the vehicle and also reduces the amount of money spent on repairs and replacement parts (e.g., relative to not determining a performance index as described herein). The reduced occurrence of subsystem failure can also improve vehicle network throughput by reducing the amount of debilitated vehicles that block the movement of other vehicles in the network. At least one technical effect identifies and isolates poor performing subsystems during without interfering with the operation of the vehicle. For example, scheduled maintenance is not required to determine the health (or performance condition) of the subsystems of a vehicle. At least one technical effect is the ability to predict a failure of the subsystem and to schedule preventative maintenance prior to such failure to avoid downtimes and blocked routes. Another technical effect is the ability to rank and schedule available vehicles in a fleet for various tasks (e.g., trips or missions) based on the determined performance index of the subsystems of the vehicles. Another technical effect is the ability to combine the performance index with degradation data to predict the remaining life of the subsystem (or components thereof). The execution of the digital twin on the physics-based simulation model can also be used to predict the performance of a subsystem of a vehicle across an entire operating range of the vehicle. The information gleaned can be used to improve vehicle design and vehicle control to increase efficiency, profits, and working lifetimes of the subsystems and components thereof.

Figure 36:
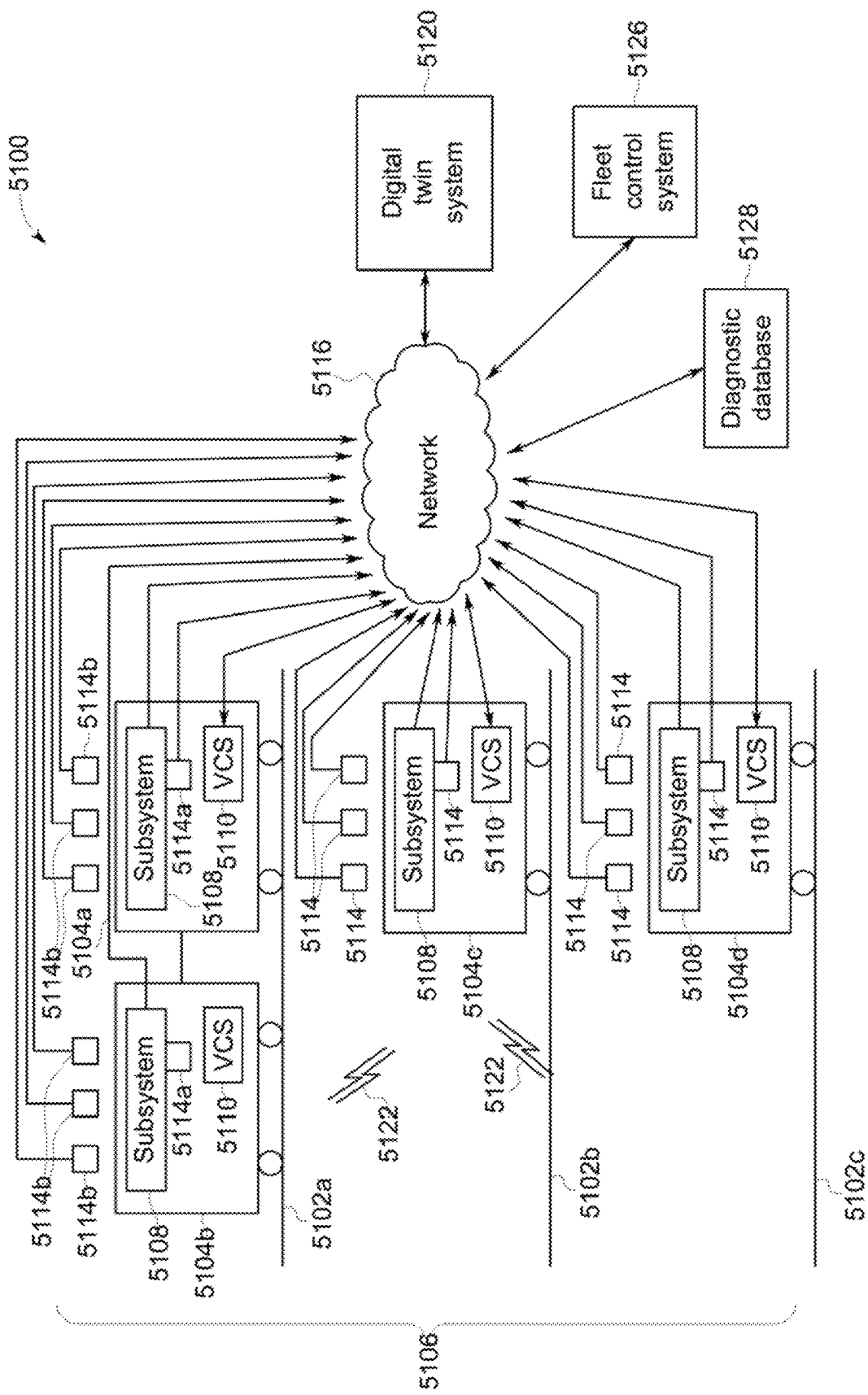
FIG. 36 illustrates one embodiment of a communication system that includes a vehicle fleet, a network, a digital twin system, a fleet control system, and a diagnostics database.

FIG. 36 illustrates one embodiment of a communication system 5100 that includes a vehicle fleet 5106, a network 5116, a digital twin system 5120, a fleet control system 5126, and a diagnostics database 5128. The illustrated vehicle fleet 5106 includes propulsion-generating vehicles 5104, which are referred to herein as vehicles 5104. Although not shown, the fleet 5106 may also include one or more non-propulsion-generating vehicles mechanically coupled to the vehicles 5104. Optionally, one or more of the vehicles 5104 of the fleet 5106 may be mechanically coupled with each other to travel together along a route 5102. In the illustrated embodiment, the fleet 5106 includes four vehicles 5104*a-d*. The vehicles 5104*a* and 5104*b* are mechanically coupled with each other and travel together along route 5102*a*. The vehicle 5104*c* travels along a route 5102*b*, and the vehicle 5104*d* travels along route 5102*c*. The number and arrangement of the vehicles 5104 of the fleet 5106 in FIG. 36 are provided as one example and are not intended as limitations on all embodiments of the subject matter described herein. For example, the fleet 5106 may have other numbers and arrangements of propulsion-generating vehicles in other embodiments. In one embodiment, the vehicles 5104*a-d* are locomotives that travel along rails. Alternatively, the vehicles 5104*a-d* may represent other vehicles, such as automobiles, rail vehicles, trucks, marine vessels, aerial drones, other aerial vehicles, or the like.

The vehicles 5104 each include a vehicle control system (VCS) 5110 disposed onboard the vehicles 5104. The vehicle control system 5110 can include hardware circuits or circuitry that include and/or are connected with one or more processors. The vehicle control system 5110 is configured to control movement of the vehicles 5104 based on received command signals. For example, the vehicle control system 5110 can control tractive effort and braking effort of the respective vehicle 5104. The vehicle control system 5110 receives the command signals from an onboard operator using an onboard input device (e.g., a touchscreen, keyboard, trackpad, microphone, or the like), a remote operator using an off-board input device, an energy management system that provides a trip plan, or the like. The vehicle control systems 5110 of the different vehicles 5104*a-d* can communicate with each other through establishment of a communication link 5122. For example, the vehicles 5104*a*, 5104*b* may communicate with the vehicle 5104*c* across the communication link 5122 in order to coordinate movements of the vehicles 5104*a-c*.

The vehicles 5104 each include multiple subsystems disposed onboard the vehicles 5104, although only one subsystem 5108 per vehicle 5104 is illustrated in FIG. 36.

Each subsystem has one or more specific functions for the vehicle 5104, such as to provide tractive effort, to maintain a temperature of propulsion components within a designated temperature range, to maintain a temperature of a passenger or cargo compartment within a designated temperature range, to provide electric current to power various electrical devices of the vehicle 5104, and the like. The subsystem 5108 may include multiple components specific to the subsystem 5108. Damage to one or more of the components may cause the subsystem 5108 to fail, which can require immediate maintenance and optionally may debilitate the vehicle 5104. Some of the various subsystems of the vehicles 5104 that may represent the illustrated subsystem 5108 are described in more detail with reference to FIG. 37.

The vehicles 5104 include one or more sensors 5114 operably connected with the vehicle control system 5110. The sensors 5114 are configured to monitor operating parameters of the vehicle 5104. The sensors 5114 may be disposed onboard the corresponding vehicle 5104 and/or off-board the vehicle 5104 but near the vehicle 5104 in order to monitor an operating parameter of the vehicle 5104. For example, in the illustrated embodiment, the vehicle 5104a includes a sensor 5114a disposed onboard the vehicle 5104a, and three sensors 5114b disposed off-board the vehicle 5104a, such as positioned along the route 5102a. The operating parameters monitored by the sensors 5114 may indicate a status of the vehicle 5104, such as whether the vehicle 5104 is moving or stationary, a speed of the vehicle 5104, a relative or absolute location of the vehicle 5104, a temperature of a specific component (e.g., engine, lubricant oil, manifold air, coolant), a throttle setting, a fuel input rate, a fuel supply, an electric current supply in a battery, or the like. At least some of the sensors 5114 may also monitor environmental conditions experienced by the vehicle 5104, such as ambient temperature, humidity, barometric pressure, altitude, wind, precipitation, and the like. The sensors 5114 are configured to provide data representing the values of the monitored operating parameters and environmental conditions to the vehicle control system 5110 of the respective vehicle 5104. For example, the sensors 5114 may transmit the data to the vehicle control system 5110 in status signals that are transmitted through a wired or wireless connection. The status signals may be sent periodically, upon request, or when the vehicle is in range of the sensor 5114.

The communication system 5100 also includes the diagnostic database 5128 which is disposed off-board the vehicles 5104 in the fleet 5106. The diagnostic database 5128 may represent or be contained within a digital memory device, such as a computer hard disc, a read only memory (ROM), a random access memory (RAM), an optical disc, a removable drive, etc. The diagnostic database 5128 is configured to obtain and store information about the fleet 5106. For example, the diagnostic database 5128 may store information about the identities of the vehicles 5104a-d in the fleet 5106, information about the routes 5102a-c traveled by the vehicles 5104, information about trips taken by the vehicles 5104 along the routes 5102, and the like, over a period of time. For example, the diagnostic database 5128 may receive and log at least some of the operating parameters and environmental conditions that are monitored by the sensors 5114. The operating parameters represent actual monitored performance data of the subsystems, and may include a coolant temperature, an oil temperature, a manifold air temperature, a tractive output (e.g., horsepower), an emissions output, a fuel consumption rate, and the like. Such information, including the performance data and the environmental conditions, is logged and associated with the identity of the vehicle 5104 and the date that the information was recorded. As described herein, the information stored in the diagnostic database 5128 may be used by the digital twin system 5120 to generate a digital twin for a subsystem of a vehicle. Additionally or alternatively, the information stored in the diagnostic database 5128 may be used to determine a performance index of a subsystem of a vehicle by comparing the actual performance data of a subsystem of a vehicle to simulated performance data of the digital twin of the subsystem.

The digital twin system 5120 is disposed off-board the vehicles 5104 of the fleet 5106. The digital twin system 5120 includes or represents one or more processors (e.g., microprocessors, field programmable gate arrays, application specific integrated circuits, multi-core processors, or other electronic circuitry) that implement instructions of a computer program by carrying out arithmetic, logical, control, and/or input/output operations specified by the instructions. The digital twin system 5120 is configured to receive operating parameters of a subsystem 5108 of one of the vehicles 5104, and generates a digital twin of the subsystem 5108 based on the operating parameters. The digital twin system 5120 may receive the operating parameters from the vehicle control system 5110 of the vehicle 5104, from the diagnostic database 5128, and/or from an operator input using an input device of the digital twin system 5120 (as described in more detail with reference to FIG. 38). The digital twin system 5120 may also determine a performance index of the subsystem 5108 of the vehicle 5104 based on simulated performance of the subsystem 5108 obtained from a designated model of the subsystem 5108. Optionally, the digital twin system 5120 may take a responsive action after determining the performance index of the subsystem 5108, such as by scheduling preventative maintenance for the vehicle 5104, limiting the movement of the vehicle 5104, notifying an operator using an output device, selecting a subsequent trip for the vehicle 5104, estimating a remaining life of the subsystem, or the like.

The fleet control system 5126 is disposed off-board the vehicles 5104 of the fleet 5106. The fleet control system 5126 includes or represents one or more processors (e.g., microprocessors, field programmable gate arrays, application specific integrated circuits, multi-core processors, or other electronic circuitry) that implement instructions of a computer program by carrying out arithmetic, logical, control, and/or input/output operations specified by the instructions. The fleet control system 5126 is configured to coordinate the movement of the vehicles 5104a-d of the fleet 5106 along the routes 5102a-c. For example, the fleet control system 5126 may select which tasks or trips are assigned to each of the vehicles 5104. The fleet control system 5126 may also determine trip schedules that are communicated to the vehicles 5104. The fleet control system 5126 may be located at a dispatch location.

The communication system 5100 includes a network 5116. The network 5116 is a website, a server, a computer, a cloud-service, or a computing device connected to the Internet. The network 5116 can be coupled to one or more devices via wired or wireless connectivity in which data communications are enabled between the network 5116 and at least one of a second network, a subnetwork of the network 5116, of a combination thereof. Multiple networks can be used with the communication system 5100 and data communication on networks can be selected based on application-specific criteria. The network 5116 can transmit/receive data communicated by one or more of the vehicles 5104 in the fleet 5106, the digital twin system 5120, the diagnostic database 5128, the fleet control system 5126, or a combination of two or more thereof. For example, the network 5116 may receive monitored operating parameters communicated by one or more of the vehicle control systems 5110, and transmits the operating parameters to the diagnostic database 5128. Additionally or alternatively, the network 5116 may receive a digital message including the performance index of various subsystems 5108 of the vehicles 5104 in the fleet 5106, and transmits the message to the fleet control system 5126 for the fleet control system 5126 to rank and/or select the vehicles 5104 for upcoming trips or tasks based on the performance index.

Although illustrated as separate and discrete components or devices, at least two of the digital twin system 5120, the fleet control system 5126, and the diagnostic database 5128 may be combined within a common device in an alternative embodiment. In another alternative embodiment, the digital twin system 5120, the fleet control system 5126, and/or the diagnostic database 5128 may be disposed onboard one of the vehicles 5104 instead of located remote from the vehicles 5104.

Figure 37:
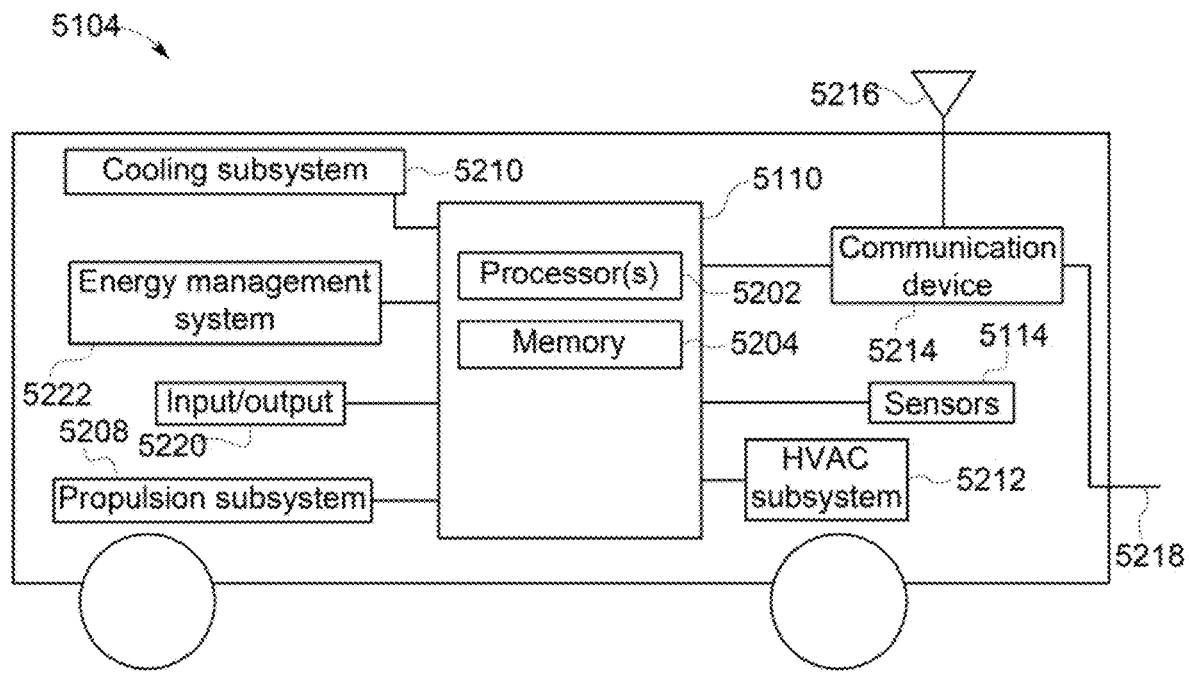
FIG. 37 is a schematic illustration of one of the vehicles of the vehicle fleet according to an embodiment.

FIG. 37 is a schematic illustration of one of the vehicles 5104 of the fleet 5106 (shown in FIG. 36) according to an embodiment. The vehicle control system 5110 controls operation of the vehicle 5104, and may include one or more processor(s) 5202 or other logic-based device(s) that perform operations based on instructions stored on a tangible and non-transitory computer readable storage medium or memory 5204. The memory 5204 may be a computer hard disc, read only memory, random access memory, optical disc, removable drive, etc. The vehicle control system 5110 may additionally or alternatively include one or more hard-wired devices that perform operations based on hard-wired logic of the devices. The vehicle control system 5110 may represent the hardware that operates based on software or hardwired instructions, the software that directs hardware to perform the operations, or a combination thereof.

The vehicle control system 5110 is operatively connected with multiple subsystems of the vehicle 5104. For example, the vehicle 5104 includes a propulsion subsystem 5208 that provides tractive effort and/or braking effort for the propulsion-generating vehicle 5104. The propulsion subsystem 5208 may include or represent one or more engines, motors, inverters, transformers, alternators, generators, brakes, batteries, turbines, fuel pumps, and the like, that operate to propel the vehicle 5104 and slow the vehicle 5104. The vehicle control system 5110 may generate control signals autonomously or based on manual input for controlling operation of the propulsion subsystem 5208. The control signals are transmitted to components of the propulsion subsystem 5208 to direct operations of the propulsion subsystem 5208. For example, the control signals may include tractive (e.g., notch) settings, braking settings, speed settings, or the like. Additionally or alternatively, the propulsion subsystem 5208 can include electric components that power motors to propel the vehicle 5104 using electric energy obtained from an onboard storage device (e.g., batteries) and/or from an off-board source (e.g., a catenary and/or electrified rail), such as transformers, converters, inverters, and the like.

The vehicle 5104 also includes a cooling subsystem 5210 that cools components of the propulsion subsystem 5208. For example, the cooling subsystem 5210 pumps fluid coolant (e.g., liquid coolant or air) through and/or around the one or more engines, inverters, transformers, motors, alternators, generators, brakes, batteries, or the like, in order to maintain the temperatures of these components sufficiently low to prevent damage to these or other components. The cooling subsystem 5210 may include one or more blowers (e.g., fans) that move air and/or pumps that move coolant fluids (e.g., water or other liquid coolant). The vehicle control system 5110 may monitor and/or control operation of the cooling subsystem 5210. For example, the vehicle control system 5110 may increase, decrease, or stop the flow of coolant through the cooling subsystem 5210 to affect the amount of heat absorbed by the coolant.

The vehicle 5104 also includes an HVAC subsystem 5212 that is configured to control a temperature within an operator compartment, a passenger compartment, and/or a cargo compartment of the vehicle 5104. The HVAC subsystem 5212 may include a radiator, an air-conditioner, a furnace, blowers, pumps, conduits, and the like. The HVAC subsystem 5212 may be controlled by the vehicle control system 5110 and/or a thermostat accessed by an operator and/or a passenger.

The propulsion subsystem 5208, the cooling subsystem 5210, and the HVAC subsystem 5212 shown in FIG. 37 are merely example subsystems within each vehicle 5104 of the fleet 5106. The vehicles 5104 of the fleet 5106 may include additional and/or different subsystems in other embodiments, such as an electrical subsystem, a regenerative braking subsystem, a wheel/axle suspension subsystem, and the like.

The vehicle control system 5110 is connected with a communication device 5214 in the vehicle 5104. The communication device 5214 can communicate with an off-board location, such as another vehicle 5104 in the fleet 5106, the fleet control system 5126 at a dispatch facility, the digital twin system 5120, the diagnostic database 5128, or the like. The communication device 5214 communicates via wired and/or wireless connections (e.g., via radio frequency). The communication device 5214 can include a wireless antenna 5216 and associated circuitry and software to communicate wirelessly. For example, the communication device 5214 may include a transceiver, or a discrete receiver and transmitter. Additionally or alternatively, the communication device 5214 may be connected via a cable 5218 to another vehicle 5104. For example, the cable 5218 may extend between the vehicle 5104a and the vehicle 5104b in FIG. 36. The cable 5218 may be a trainline, a multiple unit cable, an electronically-controlled pneumatic brake line, or the like. The communication device 5214 can be used to transmit a variety of information described herein, such as transmitting operating parameters of a subsystem of the vehicle 5104 remotely to one or more of the digital twin system 5120, the diagnostic database 5128, or the fleet control system 5126. For example, the operating parameters may be obtained or generated by sensors 5114 onboard the vehicle 5104 to reflect actual performance data during a trip, and the communication device 5214 communicates the operating parameters remotely for analysis of the vehicle subsystem performance.

The communication device 5214 is also configured to receive signals, such as command messages, which are forwarded to the vehicle control system 5110 for analysis. For example, the vehicle control system 5110 of the vehicle 5104 can examine received command messages to determine a directive and the source of the directive. The vehicle control system 5110 may autonomously implement the directive by creating control signals that are communicated to the propulsion subsystem 5208 or other subsystems. The vehicle control system 5110 may also present the directive to an operator on an input/output device 5220 to notify the operator of the directive and/or suggest manual implementation of the directive. The input/output device 5220 includes and/or represents one or more keyboards, throttles, switches, buttons, pedals, microphones, speakers, displays, touchscreens, and the like. The input/output device 5220 may be used by an operator to provide an operator input and/or monitor performance and/or a status of the vehicle 5104.

The vehicle control system 5110 is optionally connected with an energy management system 5222. The energy management system 5222 can include hardware circuits or circuitry that include and/or are connected with one or more processors. The energy management system 5222 may generate and/or retrieve a trip plan for a trip of the vehicle 5104. The trip plan may designate operational settings of the propulsion-generating vehicle 5104 as a function of one or more of time, location, or distance along a route for a trip. Movement of the vehicle 5104 according to the operational settings designated by the trip plan may reduce fuel consumed, total trip time, and/or emissions generated by the vehicle 5104 relative to the vehicle 5104 traveling according to manual control. The energy management system 5222 is optional.

Figure 38:
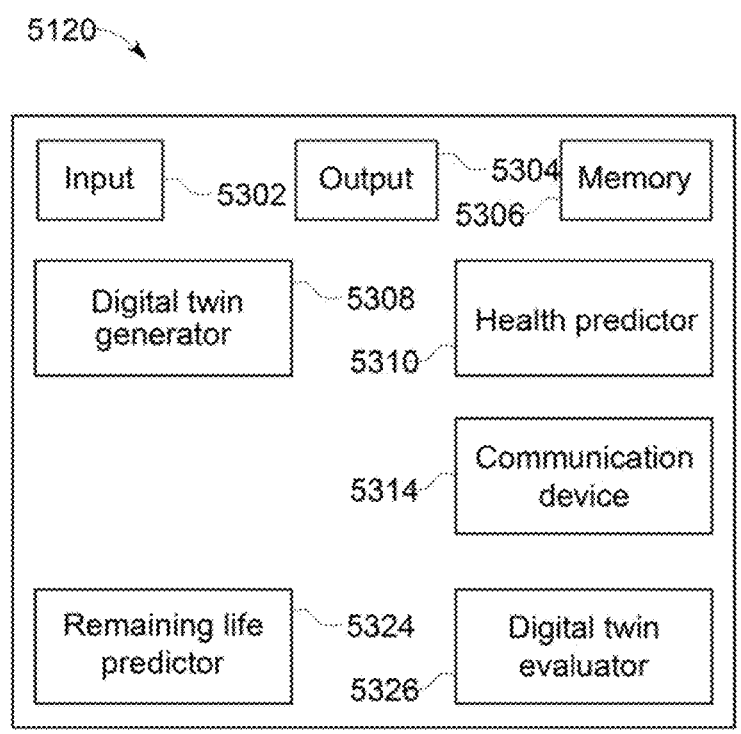
FIG. 38 illustrates a schematic illustration of the digital twin system in accordance with one embodiment.

FIG. 38 illustrates a schematic illustration of the digital twin system 5120 in accordance with one embodiment. The digital twin system 5120 includes an input device 5302 and an output device 5304 that allows an operator at the digital twin system 5120 to interact with the digital twin system 5120. For example, the input device 5302 may be a touchscreen, keyboard, electronic mouse, microphone, or the like, that receives a manual input from the operator. For example, the operator may use the input device 5302 to select a vehicle 5104, a subsystem of the vehicle 5104, a trip of the vehicle 5104, and/or a date and/or time of the trip, in order to generate a digital twin of the subsystem during the trip. The operator may also use the input device 5302 to input various operating parameters of the subsystem into the digital twin system 5120. The digital twin system 5120 can present information to the operator using the output device 5304, which can represent a display screen (e.g., a touchscreen or other screen), an audio speaker, printer, or the like. For example, the digital twin system 5120 can present the information about the subsystem of the vehicle 5104 that is selected for generating a digital twin, information about the digital twin, actual monitored performance data of the subsystem during the trip (as monitored by the sensors 5114), and/or simulated performance data of the subsystem during the trip (as generated by a designated model of the subsystem). The output device 5304 can also provide a performance index of the subsystem to the operator and suggest an additional action, such as scheduling preventative maintenance for the vehicle. Optionally, instead of two discrete devices, the input device 5302 and the output device 5304 may be integrated into a single device, such as a work station or computer having a touchscreen and a display.

The digital twin system 5120 also includes a communication device 5314, which allows the digital twin system 5120 to communicate with the vehicles 5104, the diagnostic database 5128, and/or the fleet control system 5126. The communication device 5314 may communicate with the vehicles 5104, database 5128, and/or fleet control system 5126 either directly, via direct wireless transmission, or indirectly over the network 5116. In an embodiment, the communication device 5314 is similar in structure and functionality as the communication device 5214 of the vehicle 5104, and therefore is not described in detail herein.

Figure 39:
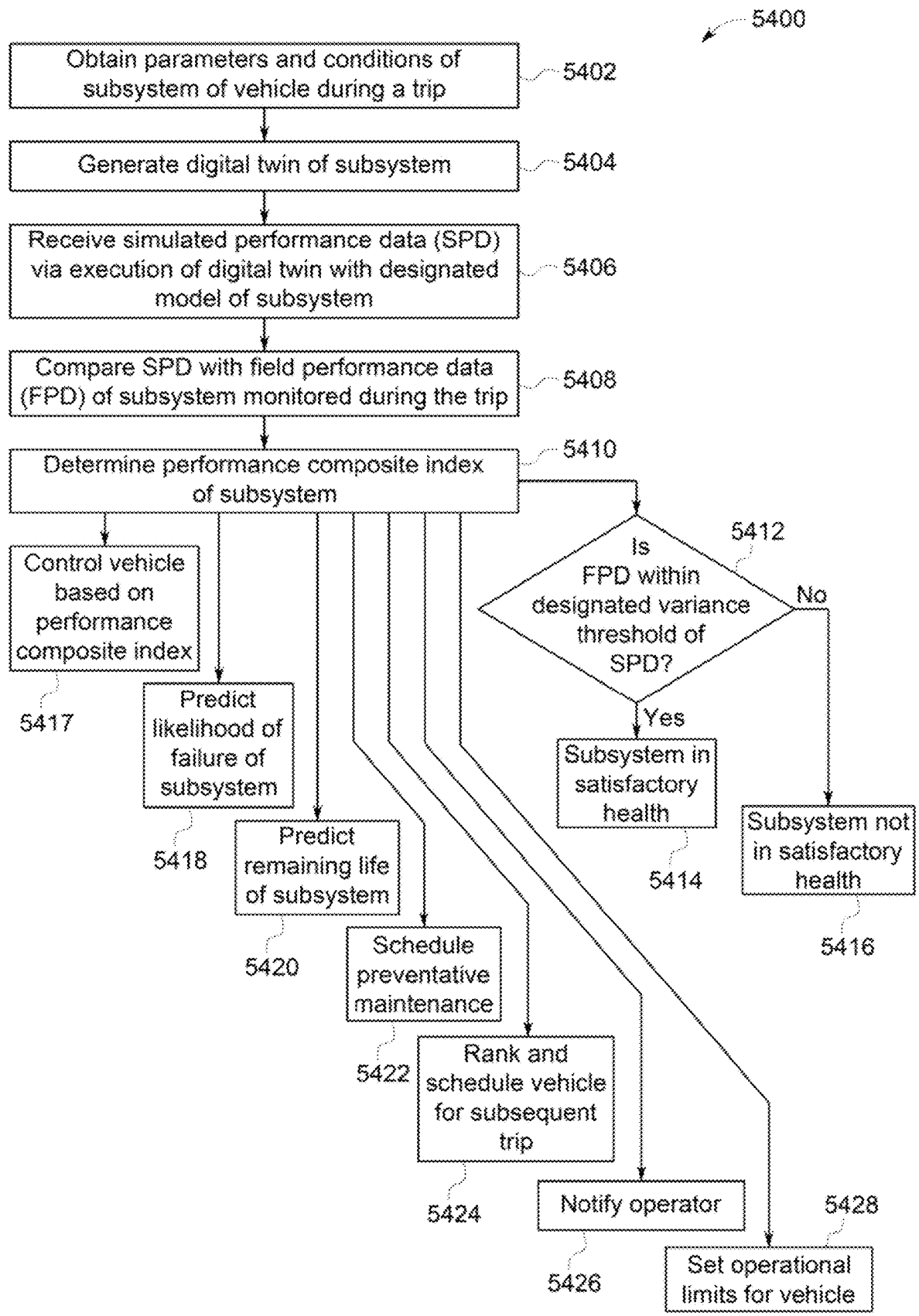
FIG. 39 is a flow chart of a method for determining a health of a vehicle subsystem according to an embodiment.

Although not explicitly identified in FIG. 38, the digital twin system 5120 includes one or more processors. For example, the digital twin generator 5308, the digital twin evaluator 5326, and the health predictor 5310 may each include or represent at least one processor that performs various functions described herein. For example, the one or more processors of the digital twin system 5120 may perform at least some of the steps of the method 400 for determining a health or performance condition of a vehicle subsystem that is shown in FIG. 39. The digital twin system 5120 further includes a digital memory 5306, which may represent a computer hard drive, random access memory, read-only memory, dynamic random access memory, an optical drive, or the like. The memory 5306 may store the program instructions that are carried out by the one or more processors of the digital twin system 5120. Additionally, the memory 5306 may store actual performance data (including operating parameters) and/or simulated performance data of the subsystems of the vehicles 5104. For example, in one embodiment, the digital twin system 5120 may be configured to request actual performance data and environmental conditions regarding a past trip of a vehicle from the diagnostic database 5128, and the digital twin system 5120 stores (at least temporarily) the information that is received in the memory 5306.

Additional reference is made to FIG. 39, which is a flow chart of a method 400 for controlling a vehicle based on a determined health or performance condition of a vehicle subsystem according to an embodiment. At least some of the steps of the method 400 are performed by one or more processors of the digital twin system 5120. At 402, operating parameters and environmental conditions of a subsystem of a vehicle during a trip are obtained. The digital twin system 5120 first receives an operator input selection of a specific subsystem of a specific vehicle 5104 of the fleet 5106. For example, the operator may select the cooling subsystem 5210 of the vehicle 5104*b* in order to determine the health of the cooling subsystem 5210. The operator may also select a specific trip or date in order to identify additional information that is used to generate the digital twin of the subsystem 5210.

Figure 40:
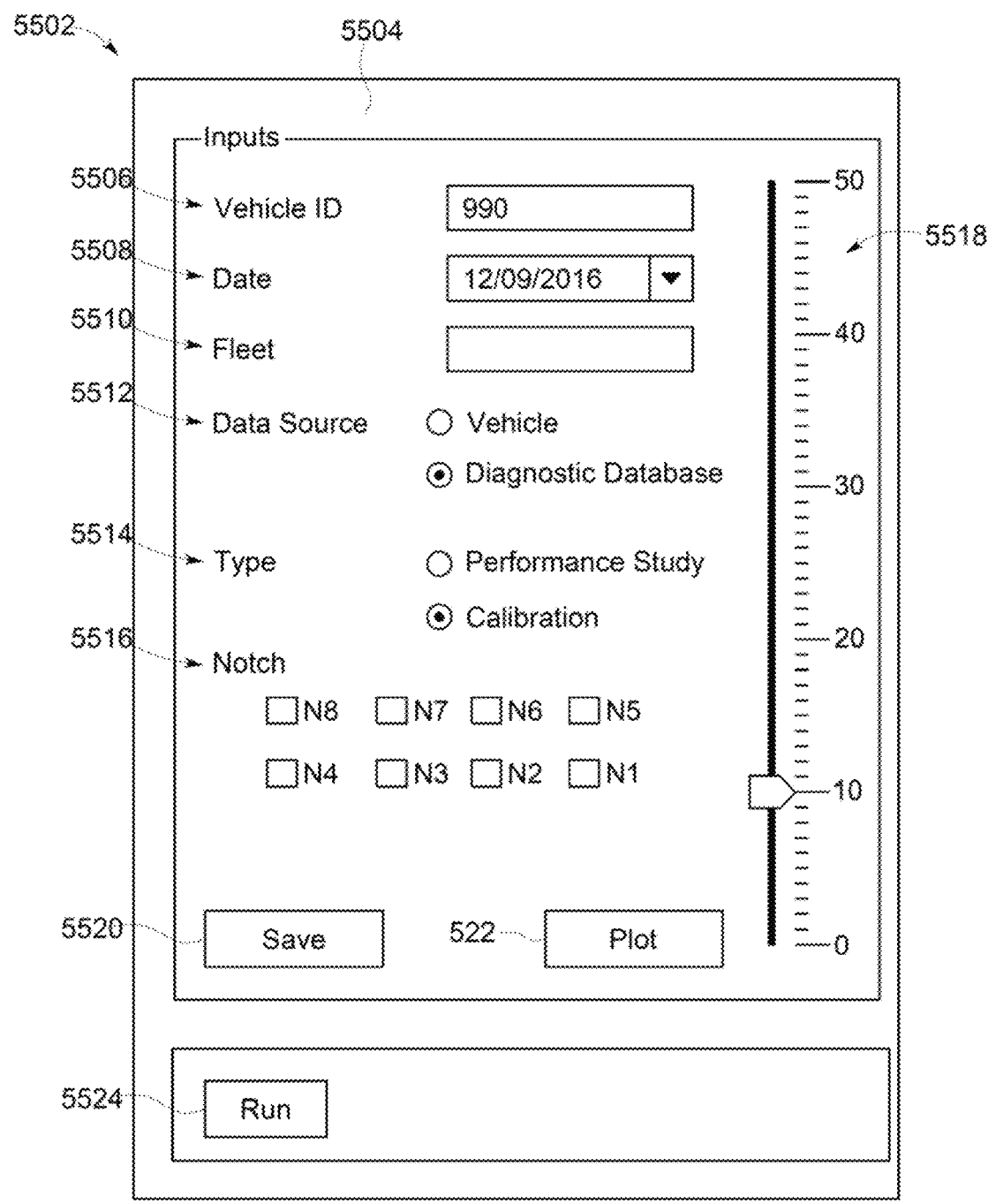
FIG. 40 illustrates a graphical user interface for the digital twin system for providing input information according to an embodiment.

For example, FIG. 40 shows a graphical user interface 502 for the digital twin system 5120 according to an embodiment. The graphical user interface 502 may be generated by the input device 5302 and the output device 5304. The graphical user interface 502 displays an input window 504 that prompts an operator to select various input information that is used to generate the digital twin. For example, the window 504 includes a Vehicle ID selection 506, a Date selection 508, a Fleet selection 510, a Data Source selection 512, a Type selection 514, a Notch selection 516, and a Data Point selection 518. The operator can select the vehicle by inputting a vehicle ID for the desired vehicle, which in the illustrated embodiment is "990," and can select the date and the fleet by filling out the corresponding selections 508, 510. The Data Source selection 512 is a choice between the Vehicle or the Diagnostic Database, and refers to the source of the parameters and environmental conditions. For example, the Vehicle may be selected to receive transient, current information from the vehicle that changes over time, while the Diagnostic Database may be selected to receive static information from a past trip. The Type selection 514 is a choice between a Performance Study and a Calibration. The Notch selection 516 is a choice of tractive engine settings, and ranges in integers from N1 through N8. The Data Point selection 518 refers to the number of data points to evaluate, and ranges from 0 to 50.

In general, a greater amount of data points may produce a more accurate digital twin simulation, as the expense of a greater amount of calculation time relative to a lesser amount of data points. Although not shown, the window 504 may also include an ability to select the specific subsystem of the vehicle. The window 504 also includes various buttons, including a Save button 520, a Plot button 522, and a Run button 524. The Run button 524 is selected to initiate a simulation, as described in more detail below.

Once the trip and/or date is known, the digital twin system 5120 can obtain operating parameters of the subsystem 5210 during the selected trip and environmental conditions experienced by the vehicle 5104b during the selected trip. The operating parameters and environmental conditions during the trip are monitored by the sensors 5114. If the selected trip is a current trip that is happening during the execution of the method 400, the operating parameters and environmental conditions may be received from the vehicle control system 5110 of the vehicle 5104b. If, on the other hand, the selected trip happened in the past, the operating parameters and environmental conditions are obtained from the diagnostic database 5128 which logs such information for the various vehicles 5104 of the fleet 5106. The operating parameters may include one or more of throttle settings, brake settings, speed settings, radiator fan speeds, pump speeds, coolant flow rates, cargo loads, route characteristics (e.g., terrain, slope, distance of trip, etc.), operating constraints (e.g., speed, noise, and/or emissions restrictions), and the like. The environmental conditions may include one or more of ambient temperature, barometric pressure, altitude, humidity, wind, precipitation, and the like, encountered by the vehicle 5104b during the trip.

At 404, a digital twin of the selected subsystem of the selected vehicle is generated for the trip. As shown in FIG. 38, the digital twin system 5120 includes a digital twin generator 5308 that is configured to generate the digital twin. The digital twin generator 5308 is composed of one or more processors of the digital twin system 5120. The digital twin is a numerical representation of the physical components of the subsystem of the vehicle on the specified date and trip. For example, the digital twin may be a numerical representation of the cooling subsystem 5210 of the vehicle 5104b. The digital twin generator 5308 can create the digital twin using the operating parameters and environmental conditions that are obtained, as well as other known information about the subsystem of the vehicle (e.g., type and capabilities of the components defining the subsystem). The digital twin may be derived using physics principles to determine an empirical linear dynamic model for the subsystem which relates operations of the subsystem to control settings, vehicle load, environmental conditions, and the like. For example, the digital twin of the cooling subsystem 5210 may relate engine oil temperature, engine coolant temperature, and manifold air temperature to parameters such as ambient temperature, air pressure, altitude, engine load, radiator fan speed, intercoolant fan speed, and the like.

In an embodiment, the digital twin generator 5308 creates the digital twin by transforming the obtained operating parameters and environmental conditions of the cooling subsystem 5210 of the vehicle 5104b using ordinary and partial differential equations. The differential equations may be entered into simulation software.

Although the digital twin generator 5308 is described above as generating a digital twin for the cooling subsystem 5210 of the vehicle 5104b, it is recognized that the digital twin generator 5308 is also configured to generate digital twins for other subsystems of the vehicle 5104b as well for subsystems of other vehicles 5104 in the fleet 5106. The generated digital twins may be stored, at least temporarily, in the memory 5306. The digital twin generator 5308 may also be configured to update and/or revise a previously generated digital twin based on updated or new information obtained.

At 406, simulated performance data is received via execution of the digital twin with a designated model of the subsystem. As shown in FIG. 38, the digital twin system 5120 includes a digital twin evaluator 5326 that is configured to evaluate (or execute) the digital twin in a designated model of the subsystem. Optionally, the digital twin evaluator 5326 may represent a discrete processor or set of processors relative to the digital twin generator 5308, or alternatively may represent merely an additional functionality of a shared processor or set of processors of the digital twin system 5120. The digital twin evaluator 5326 simulates an operation of the subsystem during the trip of the vehicle 5104 by evaluating the digital twin of the subsystem in a designated physics-based model of the subsystem.

The designated model of the subsystem may be one of multiple models associated with different subsystems of the vehicles 5104. For example, one model may be designated for the cooling subsystem 5210 and another model is designated for the propulsion subsystem 5208. The designated model is configured to run a simulation to model the expected performance of the subsystem during the trip when exposed to the same conditions that the vehicle 5104 was actually exposed to during the trip (e.g., for a completed trip). The designated model may be a software-based program that is installed as a package in a computer hardware device, incorporated as subroutines in an operating system, or contained in a stand-alone hardware device. For example, the designated model may be incorporated or installed within the digital twin system 5120 (e.g., as a component of the digital twin evaluator 5326). Alternatively, the model may be installed or incorporated within a separate computing device from the digital twin system 5120, and the digital twin evaluator 5326 accesses the model in the separate computing device. Alternatively, the sets of instructions in the software-based program of the simulation model may be hard-wired into the logic of a device, such as by being hard-wired logic formed in the hardware of the digital twin system 5120 or a separate computing device.

The designated model may be created or built using characteristic information about the subsystem, physics-based models, and/or historical data acquired by monitoring the particular subsystem or similar subsystems. The characteristic information may represent the types of components in the subsystem, including designated performance capabilities of the components. The physics-based models may represent numerical algorithms that simulate how the components of the subsystem operate. The historical data may be acquired over time by monitoring the same subsystem during previous trips and/or by monitoring different (but similar) subsystems during other trips.

In an embodiment, the designated model for the cooling subsystem 5210 incorporates a geographical model of the terrain along the route of the trip, a thermodynamic model of the engine, and a fluid dynamic model of the cooling subsystem. The geographical model of the terrain represents the characteristics of the route, such as the distance of the trip and the grade, slope, altitude, and the like of the route. The thermodynamic model represents how the engine reacts to different engine speeds and loads within the environment conditions experienced. The fluid dynamic model represents how the oil, coolant (e.g., water), and/or manifold air flows through the defined loops of the cooling subsystem.

The designated model may include a history-match aspect in which the current performance parameters of a simulated subsystem are compared to historical performance of similar subsystems of the same or similar vehicles, and adjustments are made to reasonably represent reality and to reduce noise variables. As used herein, a "similar subsystem" may have characteristics that are relevant for (e.g., meaningfully contribute to) the designated model of the subsystem that is used to evaluate a digital twin of a subsystem. For example, a subsystem that is similar to a cooling subsystem (or designated model thereof) on a first vehicle may be a cooling subsystem on a second vehicle that shares some relevant characteristics with the cooling subsystem on the first vehicle (e.g., same types of components, related operations, shared conditions experienced, etc.). The designated model may compare the digital twin of a specific subsystem with parameters and performance data of subsystems during previous trips with known outcomes (e.g., known coolant temperature increase due to heat absorbed from the engine). Based on similarities and/or differences with the previous trips of the same and/or similar subsystems exposed to the same and/or similar environmental conditions, the model can simulate (e.g., estimate or predict) performance of the subsystem during the selected trip. The model can be used to simulate performance of a subsystem during a past trip, during a current trip on which the vehicle is currently traveling, or during a future trip using forecasted parameters (e.g., cargo loads, tractive settings, etc.) and environmental conditions.

The execution of the digital twin of the subsystem with the designated model produces simulated performance data. The simulated performance data represents expected behavior or output of the subsystem during the trip when exposed to the given conditions. For example, the environmental conditions and operating parameters (e.g., cargo load, tractive settings, turbocharger speeds, etc.) may be considered as given inputs, and the simulated performance data is an output based on the given inputs. With reference to the cooling subsystem 5210, some of the simulated performance data may include an engine oil outlet temperature, an engine oil inlet temperature, an engine coolant (e.g., water) outlet temperature, and engine coolant inlet temperature, a manifold air (outlet) temperature, and the like. The simulated performance data for the cooling subsystem 5210 is not limited to the temperature parameters listed. Different subsystems may have different parameters representing the simulated performance data.

At 408 of the method 400, the simulated performance data is compared with field monitored performance data of the subsystem of the vehicle during the trip. For example, the same parameters represented as the simulated performance data may be monitored during the actual trip of the vehicle by the sensors 5114 to obtain the field performance data (which is also referred to herein as actual performance data). The field performance data may be obtained directly from the vehicle control system 5110 or from the diagnostic database 5128. As shown in FIG. 38, the digital twin system 5120 includes a health predictor 5310 that is configured to compare the simulated performance data to the field performance data to determine a performance composite index of the subsystem. The health predictor 5310 represents one or more processors of the digital twin system 5120.

Figure 41:
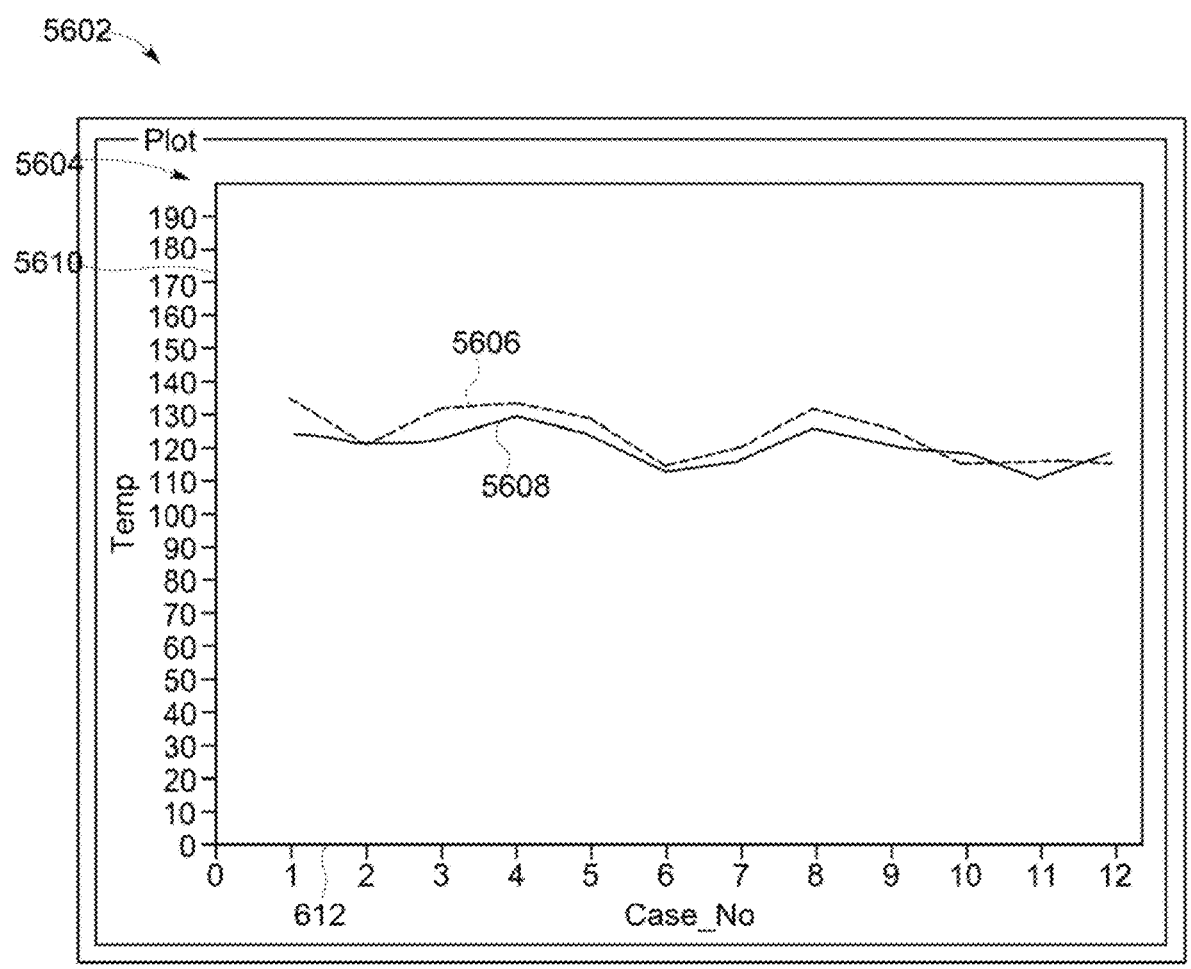
FIG. 41 shows a graphical user interface of the digital twin system for displaying a performance comparison graph according to an embodiment.

FIG. 41 shows a graphical user interface 602 of the digital twin system 5120 for displaying a performance comparison graph 604 according to an embodiment. The graphical user interface 602 may be generated by the input device 5302 and the output device 5304 of the digital twin system 5120. The graph 604 in the illustrated embodiment plots the manifold air temperature of the cooling subsystem 5210 according to the simulated performance data 606 and the field performance data 608 to show the variance between the two data sources. The graph 604 may be displayed by selecting the Plot button 522 on the window 504 shown in FIG. 5, and then selecting the manifold air temperature on a subsequent window that prompts the operator to select one or more parameters for plotting. The y-axis 610 of the graph 604 represents temperature in degrees Fahrenheit, and the x-axis 612 represents a number of cases or specific data points. As shown in the graph 604, the manifold air temperature of the field performance data 608 varies from the simulated performance data 606, but is generally within ten degrees or within five degrees throughout the number of cases. The illustrated variance is less than 510% (and is also less than 7%) of the value of the manifold air temperature of the simulated performance data 606. Although only the manifold air temperature is shown, the health predictor 5310 may compare multiple parameters of the simulated performance data to the field performance data.

Referring now back to the method 400 in FIG. 39, the performance index of the subsystem is determined at 410. For example, the health predictor 5310 may determine or predict the health or performance condition of the subsystem by following, at least in part, the steps 412, 414, and 416 of the method 400. At 412, it is determined whether the field performance data is within a designated variance threshold of the simulated performance data. The designated variance threshold may be within about 510%, about 7%, about 5% or the like, of the value represented in the simulated performance data. As shown in FIG. 41, the manifold air temperature in the field performance data is within 7% of the manifold air temperature in the simulated performance data. Therefore, the field performance data is determined to be within the designated variance threshold. In this case, the flow continues to 414, and the subsystem is determined to be in good or satisfactory health range. The satisfactory health range indicates that the subsystem (actually) performed in the field as the subsystem was expected to perform, within a certain degree of permitted variance (which may be attributable to noise or other variables). Since the subsystem performed as expected, the subsystem is predicted to be in good or at least satisfactory health and is unlikely to fail during a subsequent trip that is within the prescribed capability of the subsystem. Therefore, at 418, the likelihood of failure of the subsystem is predicted to be low.

If, on the other hand, the field performance data is determined to not be within the designated variance threshold of the simulated performance data, such that the variance is greater than 510%, for example, then flow continues to 416 and the subsystem is determined to be outside of the satisfactory health range. Optionally, this condition may be referred to as "poor health". The poor health of the subsystem indicates that the subsystem did not perform in the field up to the standard that the subsystem was expected to perform. Since the subsystem did not perform as expected, the subsystem is predicted to be in poor health, such that one or more components of the subsystem may be damaged and/or in need of maintenance. Depending on the extent of the damage, the subsystem may fail during a subsequent trip that is within the prescribed capability of the subsystem. Therefore, at 418, the likelihood of failure of the subsystem is predicted to be higher than the likelihood of failure when the subsystem is determined to be within the satisfactory health range.

Although the health of the subsystem is described qualitatively in 414 and 416, the health predictor 5310 optionally may determine a quantitative value for the performance composite index (e.g., a "performance condition score" or a "health score") for the subsystem. For example, the performance index may be based on a range from 51-10 or 51-100, which indicating the worst health or condition (e.g., the subsystem has failed) and 510 (or 5100) indicating the best health or condition (e.g., a brand new subsystem). The quantitative performance index may be determined based on a quantitative amount of the variance between the simulated performance data and the field performance data. For example, a variance of 52% indicates a better health than a variance of 4%, even though both subsystems would be considered within the satisfactory health range in 414. The subsystem having the 52% variance may be given a quantitative performance index of 9 (out of 510), while the subsystem with the 4% variance may be given a performance index of 7 (out of 510).

After determining the performance index of the subsystem, the digital twin system 5120 may take additional, responsive action. Several responsive actions are described below with reference to steps 417, 418, 420, 422, 424, 426, and 428. It is recognized that these responsive actions are optional, such that all of the actions may be performed, some of the actions may be performed, or none of the actions may be performed. Additionally, the digital twin system 5120 may be configured to take a responsive action that is not described in steps 417, 418, 420, 422, 424, 426, and 428.

For example, at 417, the digital twin system 5120 is configured to control the vehicle based on the performance index of the subsystem. For example, the digital twin system 5120 may control the vehicle by automatically slowing the vehicle, automatically stopping the vehicle, or preventing the vehicle from moving from a stationary position in response to determining that the subsystem has a less than satisfactory health or condition. Slowing, stopping, and/or preventing further movement of the vehicle may prevent additional strain and damage on the afflicted subsystem. In another embodiment, the digital twin system 5120 may control the vehicle by controlling the vehicle to travel to a maintenance center in order to receive maintenance on the afflicted subsystem. The digital twin system 5120 may control the vehicle during the current trip and/or during one or more subsequent trips based on the performance index. In another embodiment, the digital twin system 5120 may control the vehicle by setting operational limits on the movement of the vehicle based on the performance index of the subsystem, which is described in step 428.

At 428, the performance index may be used to limit a speed of the vehicle, limit an acceleration of the vehicle, limit a power output of an engine, and/or limit a distance traveled by the vehicle. For example, if the propulsion subsystem 5208 of a vehicle 5104 has a relatively poor quantitative performance index of 3, then certain limits may be established to reduce the strain on the propulsion subsystem 5208 in order to reduce the likelihood of a failure during the current trip or upcoming trips. The operational limits correspond to the afflicted subsystem. Therefore, if the cooling subsystem is determined to have a poor health, the acceleration and power output of the engine may be limited to reduce the load on the cooling system to dissipate heat from the engine. The operational limits may be narrower than limits set according to regulations (e.g., a speed limit for the route). Although the digital twin system 5120 is described above as the component that controls the movement of the vehicle based on the performance index, alternatively the vehicle control system 5110 onboard the specific vehicle 5104 and/or the fleet control system 5126 may control the vehicle based on the performance index.

At 420, a remaining life predictor 5324 of the digital twin system 5120 is configured to predict the remaining operational life of a subsystem based on the determined performance index of the subsystem. The remaining life predictor 5324 represents one or more processors of the digital twin system 5120. The remaining life predictor 5324 may access deterioration data associated with subsystems similar to the subsystem of the vehicle 5104. The deterioration data may track deterioration of the subsystems year over year. The deterioration data may be obtained from the diagnostic database 5128 or retrieved from the memory 5306 of the digital twin system 5120. The remaining life predictor 5324 is configured to correlate the performance index with the deterioration data to predict the remaining life of the subsystem. The remaining life of the subsystem refers to the amount of time or amount of trips before the performance of the subsystem either fails or falls below a designated threshold performance level, requiring significant and costly part replacements and/or repairs to remedy. For example, based on a specific type of subsystem (e.g., cooling subsystem 5210), the remaining life predictor 5324 may predict that a subsystem with a performance index of 6 has about five years remaining under forecasted usage and conditions. The remaining life predictor 5324 may also utilize additional information, such as the current age of the subsystem, the current usage of the subsystem, and the current conditions to which the subsystem is exposed during usage in order to predict the remaining life.

At 422, the digital twin system 5120 may schedule preventative maintenance for a vehicle based on the performance index of one or more subsystems of the vehicle. For example, the digital twin system 5120 may schedule preventative maintenance in response to determining a performance index for a subsystem that is below a lower health threshold, such as below 4 out of 510. The digital twin system 5120 may autonomously schedule the maintenance or may prompt an operator to schedule maintenance.

At 426, the digital twin system 5120 notifies the operator as to the health of the subsystem. For example, the performance index may be displayed on the output device 5304 for the operator to view. In addition, the digital twin system 5120 may communicate the performance index remotely using the communication device 5314. For example, the digital twin system 5120 may communicate the performance index for the cooling subsystem 5210 of the vehicle 5104b to the vehicle control system 5110 of the vehicle 5104b, to the fleet control system 5126, and/or to the diagnostic database 5128 (for logging).

At 424, the vehicles of the fleet may be ranked and/or scheduled for subsequent trips based on the performance index of the subsystems. The performance index may be used to select which vehicle is to perform which upcoming trip. For example, a first vehicle with a subsystem in better health than a subsystem of a second vehicle may be selected for a first trip that is more strenuous on the subsystem than a second trip, which is assigned to the second vehicle. Furthermore, a first vehicle with a subsystem having a performance index of 52 may be scheduled for maintenance prior to a second vehicle with a subsystem having a performance index of 3, because the subsystem of the first vehicle has worse health. The ranking and scheduling of the vehicles may be performed by the digital twin system 5120 or by the fleet control system 5126. For example, the digital twin system 5120 may communicate the performance indices to the fleet control system 5126, and the fleet control system 5126 may utilize the performance indices when determining a network trip schedule that includes multiple trips to be performed by multiple vehicles 5104 in the fleet 5106. In another example, the fleet control system 5126 may reassign a vehicle to a different task (e.g., trip) based on the performance indices of the subsystems. A vehicle with a propulsion subsystem 5208 in poor health may be reassigned from a longer, more arduous trip to a shorter, less strenuous trip.

In an embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data. The one or more processors are also configured to control the vehicle during the trip or during a subsequent trip of the vehicle based on the performance composite index.

Optionally, the one or more processors are configured to determine that the performance composite index of the subsystem is outside of a satisfactory health range responsive to the variance exceeding a designated variance threshold, and the one or more processors determine that the performance composite index of the subsystem is within the satisfactory health range responsive to the variance being within the designated variance threshold. Optionally, the designated variance threshold is 510% of the simulated performance data.

Optionally, the one or more processors are configured to control the vehicle by one or more of automatically slowing the vehicle, automatically stopping the vehicle, preventing the vehicle from moving, limiting a speed of the vehicle, limiting an acceleration of the vehicle, or limiting a distance traveled by the vehicle based on the performance composite index.

Optionally, the one or more processors are configured to receive the operating parameters of the subsystem from one or more of a vehicle control system on the vehicle or a diagnostics database that stores information about previous trips of the vehicle.

Optionally, the one or more processors are further configured to receive environmental conditions to which the vehicle is exposed during the trip. The one or more processors are configured to generate the digital twin of the subsystem based on both the operating parameters and the environmental conditions.

Optionally, the one or more processors are configured to determine the performance composite index of the subsystem of the vehicle during or after the trip of the vehicle.

Optionally, the one or more processors are further configured to predict a remaining life of the subsystem based on the performance composite index of the subsystem and deterioration data associated with subsystems similar to the subsystem of the vehicle. The deterioration data is stored in a database.

Optionally, the subsystem is a cooling system, and the simulated performance data includes one or more of an oil temperature, a coolant temperature, or a manifold air temperature during the trip.

Optionally, the subsystem is a propulsion subsystem, and the operating parameters includes one or more of a notch setting, a turbine speed, a fuel input rate, or an air input rate.

Optionally, the simulated performance data for the propulsion subsystem includes one or more of an engine power output, a fuel consumption rate, an engine temperature, or an exhaust emission rate during the trip.

Optionally, responsive to determining the performance composite index of the subsystem of the vehicle, the one or more processors are configured to schedule preventative maintenance for the vehicle.

Optionally, responsive to determining the performance composite index of the subsystem of the vehicle, the one or more processors are configured to select a subsequent trip for the vehicle from among multiple available trips.

Optionally, responsive to determining the performance composite index of the subsystem of the vehicle, the one or more processors are configured to activate an output device to notify an operator of the performance composite index of the subsystem.

Optionally, responsive to determining the performance composite index of the subsystem of the vehicle, the one or more processors are configured to rank the vehicle relative to other vehicles in a common fleet.

Optionally, responsive to determining the performance composite index of the subsystem of the vehicle, the one or more processors are configured to set operational limits for controlling the movement of the vehicle.

In another embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data.

Optionally, the one or more processors are configured to receive the operating parameters and the field performance data of the subsystem from one or more of a vehicle control system on the vehicle or a diagnostics database that stores information about previous trips of the vehicle.

In another embodiment, a method is provided that includes obtaining operating parameters of a subsystem of a vehicle that is configured to travel along a route during a trip. The method also includes generating a digital twin of the subsystem based on the operating parameters, and receiving simulated performance data generated by execution of the digital twin with a designated model of the subsystem. The method further includes obtaining field performance data of the subsystem that is monitored by one or more sensors onboard the vehicle during the trip, and determining a performance composite index of the subsystem of the vehicle based on a variance between the simulated performance data and the field performance data.

Optionally, the performance composite index of the subsystem is determined to be outside of a satisfactory health range responsive to the variance exceeding a designated variance threshold, and the performance composite index of the subsystem is determined to be within the satisfactory health range responsive to the variance being within the designated variance threshold. Optionally, the designated variance threshold is 510% of the simulated performance data.

Optionally, the operating parameters of the subsystem are received from one or more of a vehicle control system on the vehicle or a diagnostics database that stores information about previous trips of the vehicle.

Optionally, the method further includes receiving environmental conditions to which the vehicle is exposed during the trip. The digital twin of the subsystem is generated based on both the operating parameters and the environmental conditions.

Optionally, the method further includes predicting a likelihood of failure of the subsystem during the trip or during a subsequent trip based on the performance composite index of the subsystem.

Optionally, the method further includes predicting a remaining life of the subsystem based on the performance composite index of the subsystem and deterioration data associated with subsystems similar to the subsystem of the vehicle. The deterioration data is stored in a database.

Optionally, the subsystem is a cooling system. The simulated performance data includes one or more of an oil temperature, a coolant temperature, or a manifold air temperature of the cooling system during the trip.

Optionally, the subsystem is a propulsion subsystem. The operating parameters include one or more of a notch setting, a turbine speed, a fuel input rate, or an air input rate. The simulated performance data for the propulsion subsystem includes one or more of an engine power output, a fuel consumption rate, an engine temperature, or an exhaust emission rate during the trip.

Optionally, the method further includes scheduling preventative maintenance for the vehicle responsive to determining the performance composite index of the subsystem of the vehicle.

Optionally, the method further includes selecting a subsequent trip of the vehicle from among multiple available trips responsive to determining the performance composite index of the subsystem of the vehicle.

Optionally, the method further includes activating an output device to notify an operator of the health of the subsystem responsive to determining the performance composite index of the subsystem of the vehicle.

Optionally, the method further includes ranking the vehicle relative to other vehicles in a common fleet responsive to determining the performance composite index of the subsystem of the vehicle.

Optionally, the method further includes setting operational limits for controlling the movement of the vehicle during the trip or a subsequent trip responsive to determining the performance composite index of the subsystem of the vehicle.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

In the appended claims, the terms "including" and "in which" are used as the plain English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 5112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. References to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a controller configured to obtain a route parameter and a vehicle parameter from discrete examinations of a route and a vehicle system, respectively, the route parameter indicative of a health of the route over which the vehicle system travels, the vehicle parameter indicative of a health of the vehicle system, the discrete examinations of the route and the vehicle system separated from each other by one or more of location or time, the controller configured to:
   examine the route parameter and the vehicle parameter to determine whether the route and the vehicle system are physically damaged;
   receive interface information associated with one or more interfaces used to communicate with one or more components of the vehicle;
   receive application information associated with one or more applications configured to receive information from the one or more components of the vehicle via the one or more interfaces;
   store, based on the interface information and the application information, registration information that indicates whether the one or more applications are permitted to communicate via the one or more interfaces;

receive, from an application of the one or more applications, a request for vehicle information from an interface of the one or more interfaces;

verify whether the application is permitted to communicate via the interface; and selectively route the request for the vehicle information to the interface based on verifying whether the application is permitted to communicate via the interface; and examination equipment configured to continually monitor the route and the vehicle system responsive to determining that the route or the vehicle system is physically damaged.

2. The system of claim 1, wherein the controller is operable to receive at least a portion of the route parameter or the vehicle parameter from a stationary wayside unit disposed alongside the route being traveled by the vehicle system.

3. The system of claim 2, wherein the controller is operable to receive the at least the portion of the route parameter or the vehicle parameter from the wayside unit that includes information relating to whether there is a problem or potential problem with a wheel of the vehicle system.

4. The system of claim 1, wherein the controller is operable to switch operating modes of the vehicle system based on at least one of the route parameter or the vehicle parameter from the discrete examinations or information communicated from the examination equipment from continually monitoring the route or the vehicle system, wherein at least one of the operating modes comprises the controller slowing or stopping movement of the vehicle system, and wherein at least one of the operating modes comprises the controller monitoring the vehicle system for one or more indications that a wheel is exhibiting a problem with the vehicle system.

5. The system of claim 1, where the interface is included in an interface group that includes a plurality of interfaces; and where the controller, when verifying whether the application is permitted to communicate via the interface, is configured to: verify whether the application is permitted to communicate via the interface group.

6. The system of claim 1, where the controller, when verifying whether the application is permitted to communicate via the interface, is configured to:
determine one or more application types permitted to communicate via the interface;
determine an application type of the application; and
verify whether the application is permitted to communicate via the interface based on the application type of the application and the one or more application types permitted to communicate via the interface.

7. The system of claim 1, where the controller, when verifying whether the application is permitted to communicate via the interface, is configured to:
determine one or more entities whose applications are permitted to communicate via the interface;
determine an entity associated with the application; and
verify whether the application is permitted to communicate via the interface based on the entity associated with the application and the one or more entities whose applications are permitted to communicate via the interface.

8. A system comprising:
a controller configured to obtain a route parameter and a vehicle parameter from discrete examinations of a route and a vehicle system, respectively, the route parameter indicative of a health of the route over which the vehicle system travels, the vehicle parameter indicative of a health of the vehicle system, the discrete examinations of the route and the vehicle system separated from each other by one or more of location or time, the controller configured to:
examine the route parameter and the vehicle parameter to determine whether the route and the vehicle system are physically damaged;
receive interface information associated with one or more interfaces used to communicate with one or more components of the vehicle;
receive application information associated with one or more applications configured to receive information from the one or more components of the vehicle via the one or more interfaces;
store, based on the interface information and the application information, registration information that indicates whether the one or more applications are permitted to communicate via the one or more interfaces;
receive, from an application of the one or more applications, a request for vehicle information from an interface of the one or more interfaces;
verify whether the application is permitted to communicate via the interface; and
selectively route the request for the vehicle information to the interface based on verifying whether the application is permitted to communicate via the interface; and
examination equipment configured to continually monitor the route and the vehicle system responsive to determining that the route or the vehicle system is physically damaged,
wherein the controller is operable to receive at least a portion of the route parameter and the vehicle parameter from a stationary wayside unit disposed alongside the route being traveled by the vehicle system, and
wherein the controller is operable to receive the at least the portion of the route parameter and the vehicle parameter from the wayside unit that includes information relating to whether there is a problem or potential problem with a wheel of the vehicle system.

9. The system of claim 8, wherein the controller is operable to switch operating modes of the vehicle system based on at least one of the route parameter or the vehicle parameter from the discrete examinations or information communicated from the examination equipment from continually monitoring the route or the vehicle system, wherein at least one of the operating modes comprises the controller slowing or stopping movement of the vehicle system, and wherein at least one of the operating modes comprises the controller monitoring the vehicle system for one or more indications that a wheel is exhibiting a problem with the vehicle system.

10. The system of claim 8, where the interface is included in an interface group that includes a plurality of interfaces; and where the controller, when verifying whether the application is permitted to communicate via the interface, is configured to: verify whether the application is permitted to communicate via the interface group.

11. A system comprising:
a controller configured to obtain a vehicle parameter from discrete examinations of a vehicle system, the vehicle parameter indicative of a health of the vehicle system, the discrete examinations of the vehicle system separated from each other by location and time, the controller configured to:

examine the vehicle parameter to determine whether the vehicle system is physically damaged;

receive interface information associated with one or more interfaces used to communicate with one or more components of the vehicle;

receive application information associated with one or more applications configured to receive information from the one or more components of the vehicle via the one or more interfaces;

store, based on the interface information and the application information, registration information that indicates whether the one or more applications are permitted to communicate via the one or more interfaces;

receive, from an application of the one or more applications, a request for vehicle information from an interface of the one or more interfaces;

verify whether the application is permitted to communicate via the interface; and selectively route the request for the vehicle information to the interface based on verifying whether the application is permitted to communicate via the interface; and examination equipment configured to continually monitor the vehicle system responsive to determining that the vehicle system is physically damaged.

12. The system of claim 11, wherein the controller is operable to receive at least a portion of the vehicle parameter from a stationary wayside unit disposed alongside the route being traveled by the vehicle system.

13. The system of claim 12, wherein the controller is operable to receive the at least the portion of the vehicle parameter from the wayside unit that includes information relating to whether there is a problem or potential problem with a wheel of the vehicle system.

14. The system of claim 11, wherein the controller is operable to switch operating modes of the vehicle system based on the vehicle parameter from the discrete examinations or information communicated from the examination equipment from continually monitoring the vehicle system, wherein at least one of the operating modes comprises the controller slowing or stopping movement of the vehicle system, and wherein at least one of the operating modes comprises the controller monitoring the vehicle system for one or more indications that a wheel is exhibiting a problem with the vehicle system.

15. The system of claim 11, where the interface is included in an interface group that includes a plurality of interfaces; and where the controller, when verifying whether the application is permitted to communicate via the interface, is configured to: verify whether the application is permitted to communicate via the interface group.

16. The system of claim 11, where the controller, when verifying whether the application is permitted to communicate via the interface, is configured to:

determine one or more application types permitted to communicate via the interface;

determine an application type of the application; and verify whether the application is permitted to communicate via the interface based on the application type of the application and the one or more application types permitted to communicate via the interface.

17. The system of claim 11, where the controller, when verifying whether the application is permitted to communicate via the interface, is configured to:

determine one or more entities whose applications are permitted to communicate via the interface;

determine an entity associated with the application; and verify whether the application is permitted to communicate via the interface based on the entity associated with the application and the one or more entities whose applications are permitted to communicate via the interface.

\* \* \* \* \*